US012795749B2

(12) United States Patent
Ko et al.

(10) Patent No.: US 12,795,749 B2
(45) **Date of Patent: *Nov. 10, 2026**

(54) WIRELESS COMMUNICATION METHOD USING MULTIPLE LINKS, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/364,708

(22) Filed: Oct. 21, 2025

(65) Prior Publication Data

US 2026/0046942 A1 Feb. 12, 2026

Related U.S. Application Data

(63) Continuation of application No. 19/001,317, filed on Dec. 24, 2024, now Pat. No. 12,490,313, which is a (Continued)

(30) Foreign Application Priority Data

Jun. 24, 2022 (KR) ........................ 10-2022-0077879
Jun. 29, 2022 (KR) ........................ 10-2022-0080070
Jul. 4, 2022 (KR) ........................ 10-2022-0082005

(51) Int. Cl.
*H04W 74/0833* (2024.01)
*H04W 48/16* (2009.01)
*H04W 74/04* (2009.01)

(52) U.S. Cl.
CPC ......... *H04W 74/085* (2013.01); *H04W 48/16* (2013.01); *H04W 74/04* (2013.01)

(58) Field of Classification Search
CPC .... H04W 74/04; H04W 74/085; H04W 48/16
See application file for complete search history.

(56) References Cited

U.S. PATENT DOCUMENTS 11,690,107 B2 6/2023 Seok
11,864,045 B2 1/2024 Patil et al.
(Continued)

FOREIGN PATENT DOCUMENTS

CN 115412896 A * 11/2022 ............ H04W 88/10
CN 116847437 10/2023
(Continued)

OTHER PUBLICATIONS

International Search Report for PCT/KR2023/008877 mailed on Oct. 5, 2023 and its English translation from WIPO (now published as WO2023/249474).
(Continued)

*Primary Examiner* — Sujoy K Kundu
*Assistant Examiner* — Vladislav Y Agureyev
(74) *Attorney, Agent, or Firm* — EIP US LLP

(57) ABSTRACT

A non-access point (AP) multi-link device (MLD) of the present invention, comprising a plurality of stations operating on a plurality of links in a wireless communication system, may receive a frame from an AP MLD comprising a plurality of APs, operating on a plurality of links, and may process each of one or more TBTT information fields on the (Continued)

basis of a TBTT information type subfield and a TBTT information length field included in the frame.

20 Claims, 47 Drawing Sheets

Related U.S. Application Data continuation of application No. PCT/KR2023/008877, filed on Jun. 26, 2023.

(56) References Cited

U.S. PATENT DOCUMENTS

| | | | | |
|---|---|---|---|---|
| 11,871,466 | B2 | 1/2024 | Patil et al. | |
| 2015/0208330 | A1* | 7/2015 | Park | H04W 48/16 370/338 |
| 2015/0230093 | A1 | 8/2015 | Park | |
| 2020/0221545 | A1 | 7/2020 | Stacey | |
| 2020/0280909 | A1* | 9/2020 | Gan | H04W 48/08 |
| 2021/0274574 | A1 | 9/2021 | Ghosh et al. | |
| 2021/0315025 | A1 | 10/2021 | Seok | |
| 2021/0321243 | A1 | 10/2021 | Patil | |
| 2022/0110123 | A1 | 4/2022 | Adachi | |
| 2022/0132419 | A1 | 4/2022 | Kwon et al. | |
| 2022/0386301 | A1 | 12/2022 | Lu et al. | |
| 2023/0053972 | A1 | 2/2023 | Patil | |
| 2023/0054755 | A1 | 2/2023 | Patil | |
| 2023/0144897 | A1 | 5/2023 | Kneckt | |
| 2023/0232315 | A1* | 7/2023 | Chitrakar | H04W 48/12 370/329 |
| 2023/0262585 | A1 | 8/2023 | Naik | |
| 2023/0284107 | A1 | 9/2023 | Gan | |
| 2023/0319924 | A1 | 10/2023 | Kim | |
| 2024/0049321 | A1 | 2/2024 | Kim | |
| 2024/0276572 | A1 | 8/2024 | Dong | |
| 2024/0284305 | A1 | 8/2024 | Baron | |
| 2024/0430657 | A1 | 12/2024 | Guo | |
| 2025/0063530 | A1 | 2/2025 | Huang | |

FOREIGN PATENT DOCUMENTS

| | | | |
|---|---|---|---|
| CN | 116709287 | B2 | 2/2024 |
| CN | 119174282 | A | 12/2024 |
| EP | 4221365 | A1 | 8/2023 |
| EP | 4383836 | | 6/2024 |
| JP | 7620092 | B2 | 1/2025 |
| KR | 10-2022-0031013 | | 3/2022 |
| KR | 10-2022-0048450 | | 4/2022 |
| WO | 2021183045 | A1 | 9/2021 |
| WO | 2021262092 | A1 | 12/2021 |
| WO | 2022/108370 | | 5/2022 |
| WO | 2023/249474 | | 12/2023 |

OTHER PUBLICATIONS

Written Opinion of the International Searching Authority for PCT/KR2023/008877 mailed on Oct. 5, 2023 and its English translation by Google Translate (now published as 2023/249474).

Jeongki Kim et al.: "Clarification on BSS parameter update", doc.: IEEE 802.11-21/0036r0, Feb. 9, 2021 slides 1-11.

LAN/MAN Standards Committee of the IEEE Computer Society: "IEEE P802.I lbe™/D2.0; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", May 2022, pp. 1-873.

LAN/MAN Standards Committee of the IEEE Computer Society: "IEEE P802.I lbe™/D0.3; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Jan. 2021, pp. 1-389.

LAN/MAN Standards Committee of the IEEE Computer Society: "IEEE P802.I lbe™/DO.4; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Mar. 2021, pp. 1-511.

Dorothy Stanley, HP Enterprise: "Liaison from ITU-T Focus Group on Vehicular Multimedia", doc.: IEEE 802.11-20/0223r0, Jan. 17, 2020, pp. 1-4.

Laurent Cariou: "MLO discovery: Discovery procedures (inclusion probing) and RNR", doc.: IEEE 802.II-20/1255r5, Aug. 20, 2020, pp. 1-6.

Laurent Cariou: "Resolutions for CC34 CIDs for MLO Discovery procedures, RNR", doc.: IEEE 802.11-21/028lr4, Mar. 1, 2021, pp. 1-46.

Kaiying Lu et al.: "Resolution for Miscellaneous CIDs related to Clause 35.3.18 (CC36)", Jun. 20, 2021, pp. 1-12.

Jang, Insung (LG Electronics), "Signaling of Beacon Interval for AP MLD," IEEE 802.11-20/1738r1, Feb. 2021, 11 pgs.

Japanese Notice of Allowance issued in 2024-575852 on Sep. 16, 2025, 5 pgs.

European Extended Search Report in EP Appln. No. 23827582.0, dated May 13, 2026, 10 pages.

Indian Examination Report in IN Appln. No. 202417104683, dated Sep. 1, 2026, 8 pages.

* cited by examiner

FIG.17

| AID12 subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| **2047** | **Response to the Trigger frame is transmitted in EHT TB PPDU** |
| **2048** | **Response to the Trigger frame is transmitted in NEXT TB PPDU** |
| 2049-4094 | Reserved |
| 4095 | Start of Padding field |

FIG.18
HE TRS Control in HE PPDU
HE TB PPDU
NEXT TRS Control in EHT PPDU
EHT TB PPDU
NEXT TRS Control in NEXT PPDU
NEXT TB PPDU

FIG.34

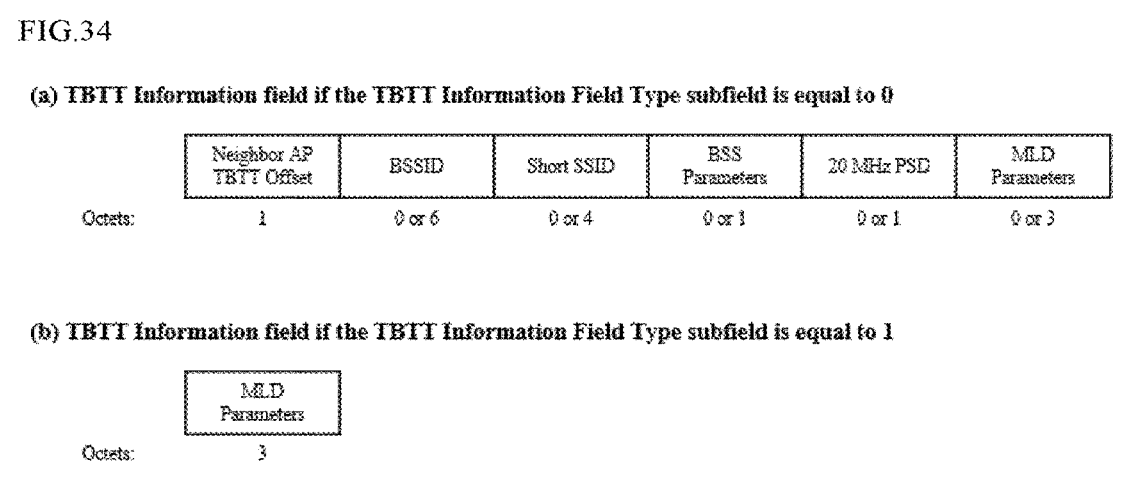

(a) TBTT Information field if the TBTT Information Field Type subfield is equal to 0

| | Neighbor AP TBTT Offset | BSSID | Short SSID | BSS Parameters | 20 MHz PSD | MLD Parameters |
|---|---|---|---|---|---|---|
| Octets: | 1 | 0 or 6 | 0 or 4 | 0 or 1 | 0 or 1 | 0 or 3 |

(b) TBTT Information field if the TBTT Information Field Type subfield is equal to 1

| | MLD Parameters |
|---|---|
| Octets: | 3 |

FIG.41

(a) EHT operation element format

| | | | | | |
|---|---|---|---|---|---|
| | Element ID | Length | Element ID Extension | EHT Operat ion Parame ters | EHT Operat ion Informa tion |
| Octets: | 1 | 1 | 1 | 1 | 0 or 3 or 5 |

(b) RHT operation parameter filed format

| | B0 | B1 | B2 | B3 B4 | B5 B7 |
|---|---|---|---|---|---|
| | EHT Operation Information Present | Disabled Sub channel Bitm ap Present | Group Addre ssed BU Indi cation Limit | Group Addre ssed BU Indi cation Expon ent | Reserved |
| Bits: | 1 | 1 | 1 | 2 | 3 |

WIRELESS COMMUNICATION METHOD USING MULTIPLE LINKS, AND WIRELESS COMMUNICATION TERMINAL USING SAME

CROSS-REFERENCE TO RELATED APPLICATIONS

This application is a continuation of U.S. application Ser. No. 19/001,317, filed Dec. 24, 2024, which is a continuation International Application No. PCT/KR2023/008877, filed Jun. 26, 2023, which claims priority to Republic of Korea Application No. 10-2022-0077879, filed Jun. 24, 2022, Republic of Korea Application No 10-2022-0080070 filed Jun. 29, 2022, and Republic of Korea Application No. 10-2022-0082005, filed Jul. 4, 2022, under 35 U.S.C. § 119(a). Each of the above-referenced patent applications is incorporated by reference in its entirety.

TECHNICAL FIELD

The present invention relates to a wireless communication method using multiple links, and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is to provide a wireless communication method using multiple links, and a wireless communication terminal using the same.

Technical tasks to be achieved in the specification are not limited to the technical tasks mentioned above, and other technical tasks that are not mentioned may be clearly understood by those skilled in the art on the basis of the following descriptions.

Solution to Problem

In a multi-link device (MLD) including a plurality of stations each operating on multiple links according to the disclosure, the multi-link device (MLD) including the plurality of stations each operating on the multiple links may include a transceiver; and a processor, the processor receives a frame from an AP in an AP MLD including a plurality of access points (APs), the frame includes a reduced neighbor report (RNR) element including one or more neighbor AP information fields including information related to other APs included in the AP MLD, the neighbor AP information field includes a target beacon transmission time (TBTT) information field type subfield, a TBTT information length field, and a TBTT information set field including one or more TBTT information fields, the processor performs processing of each of the one or more TBTT information fields based on the TBTT information type subfield and the TBTT information length field, and when the value of the TBTT information type subfield is “0”, each of the one or more TBTT information fields is processed up to a first octet value or a second octet value by comparing the value of the TBTT information length field with a first threshold value and/or a second threshold value, and when the value of the TBTT information type subfield is “1”, each of the one or more TBTT information fields is processed up to a third octet value by comparing the value of the TBTT information length field with a third threshold value.

In addition, in the disclosure, the TBTT information field type subfield is used to indicate the content and/or length of the one or more TBTT information fields, and the TBTT information length field indicates the length of each of the one or more TBTT information fields.

In addition, in the disclosure, when the value of the TBTT information type subfield is “0” and the value of the TBTT information length field is less than the first threshold value and equal to or greater than the second threshold value, each of the one or more TBTT information fields is processed up to the second octet value, and the second octet value is less than the first octet value.

In addition, in the disclosure, remaining octets except up to the second octet value are not processed in each of the one or more TBTT information fields.

In addition, in the disclosure, when the value of the TBTT information type subfield is “0” and the value of the TBTT information length field is equal to or greater than the first threshold value, the one or more TBTT information fields are processed up to the first octet value, and the second octet value is less than the first octet value.

In addition, in the disclosure, remaining octets except up to the first octet value are not processed in each of the one or more TBTT information fields.

In addition, in the disclosure, the value of the TBTT information type subfield is “0” and the value of the TBTT information length field is less than the second threshold value, the one or more TBTT information fields are not processed.

In addition, in the disclosure, when the value of the TBTT information type subfield is “1” and the value of the TBTT information length field is equal to or greater than the third threshold value, the one or more TBTT information fields are processed up to the third octet value.

In addition, in the disclosure, remaining octets except up to the third octet value are not processed in each of the one or more TBTT information fields.

In addition, in the disclosure, when the value of the TBTT information type subfield is “1” and the value of the TBTT information length field is less than the third threshold value, the one or more TBTT information fields are not processed.

In addition, in the disclosure, each of the one or more TBTT information fields includes a neighbor AP TBTT offset subfield, and the neighbor AP TBTT offset subfield indicates an offset between the TBTT for the AP to transmit a beacon frame and the TBTT for another AP to transmit a beacon frame.

In addition, in the disclosure, when the other AP is included in the AP MLD, the offset value indicated by the neighbor AP TBTT offset subfield is configured to a value excluding the preconfigured value related to Unknown.

In addition, in the disclosure, the preconfigured value is “255”.

In addition, the disclosure provides methods of receiving a frame from an AP in an AP MLD including a plurality of access points (APs), the frame includes a reduced neighbor report (RNR) element including one or more neighbor AP information fields including information related to other APs included in the AP MLD, and the neighbor AP information field includes a TBTT information set field including a target beacon transmission time (TBTT) information field type subfield, a TBTT information length field, and one or more TBTT information fields; and processing each of the one or more TBTT information fields based on the TBTT information type subfield and the TBTT information length field, and when the value of the TBTT information type subfield is “1”, each of the one or more TBTT information fields is processed up to a third octet value by comparing the value of the TBTT information length field with a third threshold value.

Advantageous Effects of Invention

An embodiment of the present invention provides a wireless communication method efficiently using multiple links, and a wireless communication terminal using the same.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 17 illustrates a method for indicating a trigger-based PPDU format according to an embodiment of the present invention.

FIG. 34 is a drawing illustrating an example of a TBTT information field format according to an embodiment of the disclosure.

FIG. 41 is a drawing illustrating an example of an EHT operation element according to an embodiment of the disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
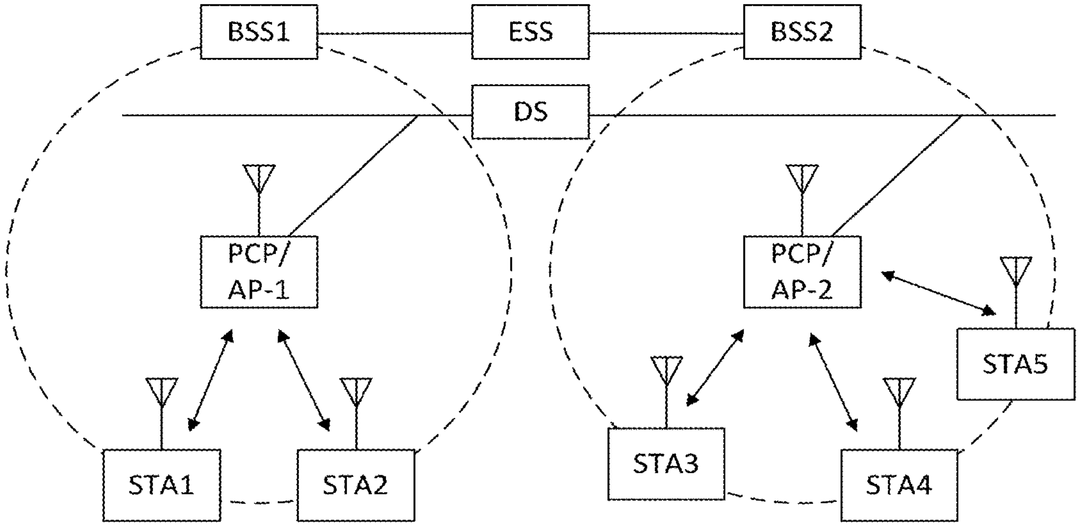
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term "terminal" may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e., eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
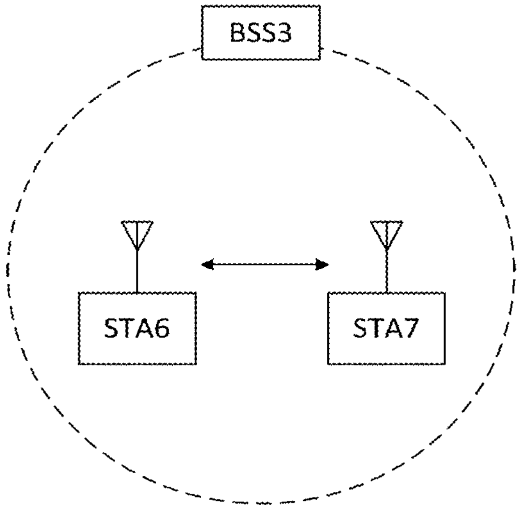
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
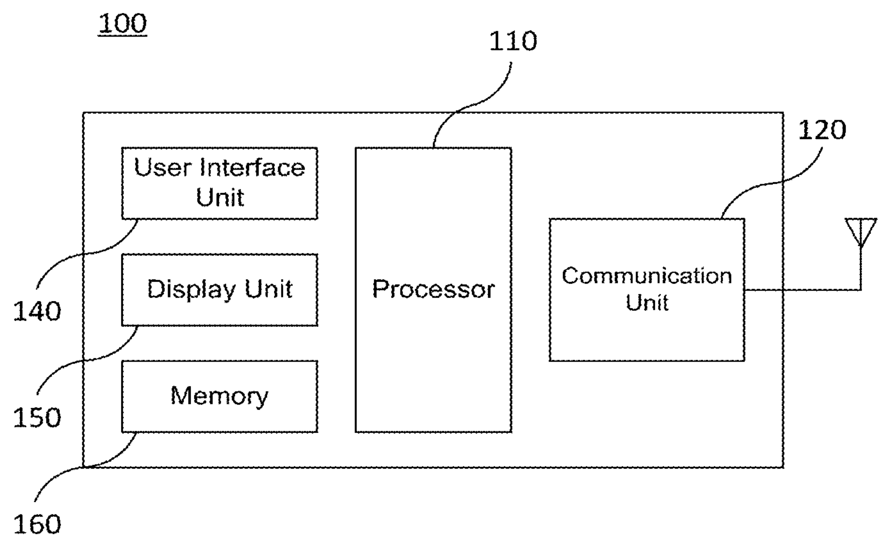
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data.

The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
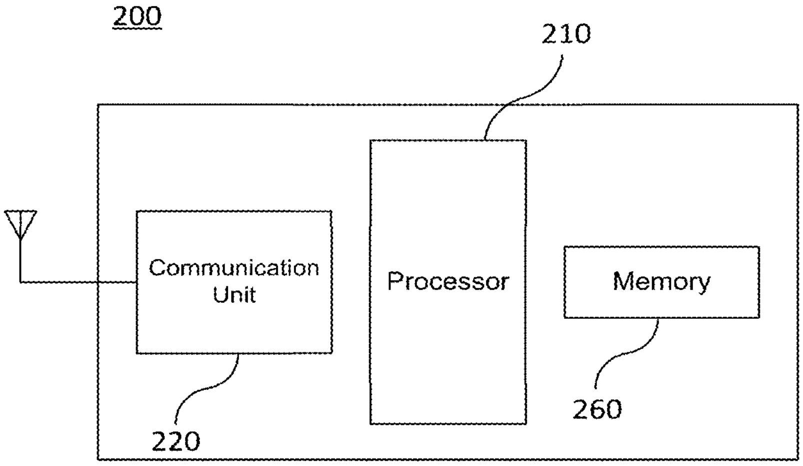
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
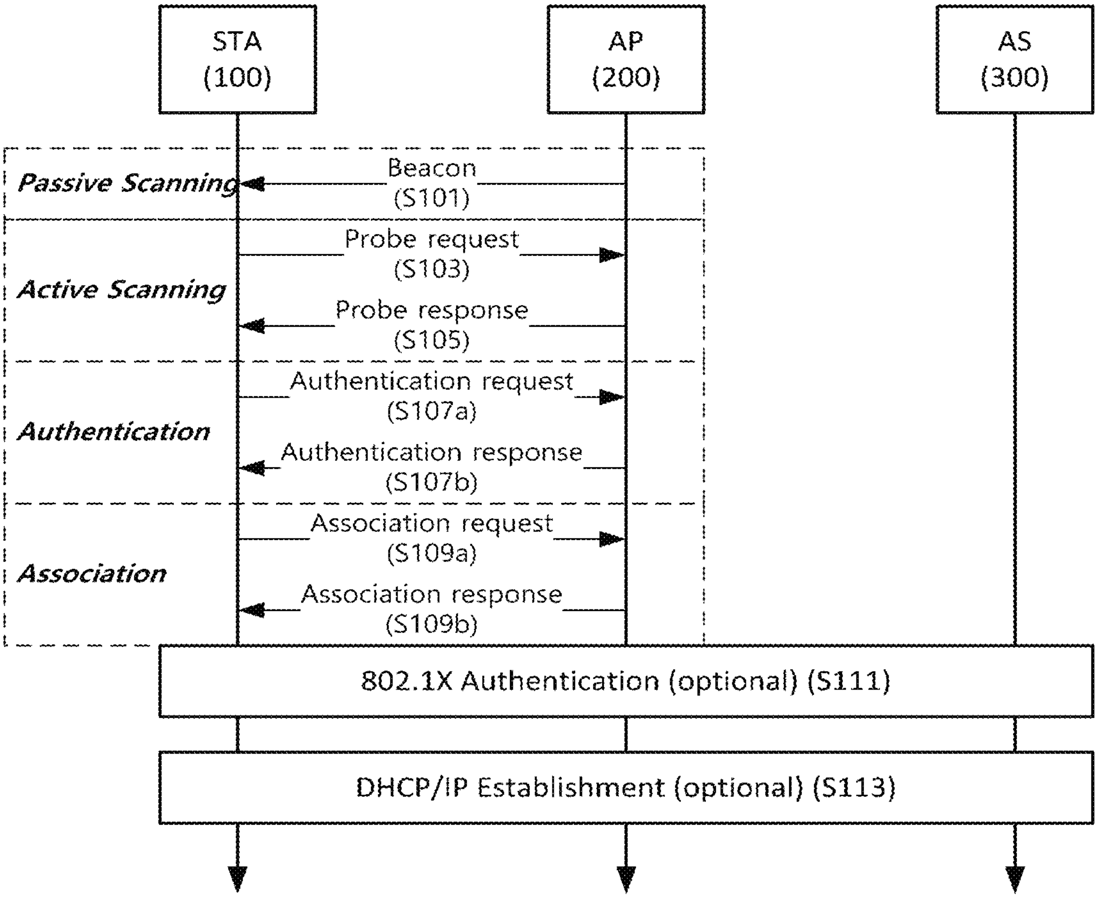
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
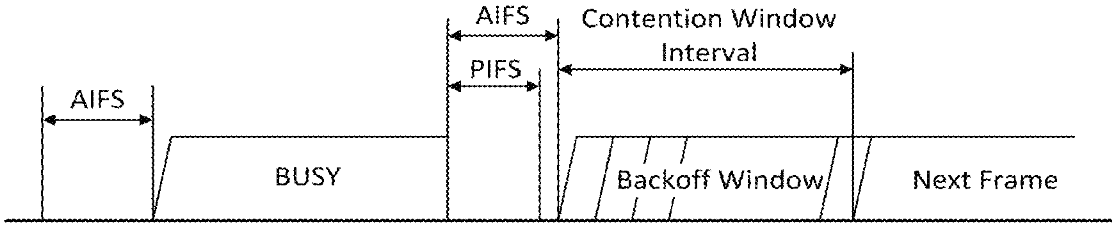
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal with data to be transmitted performs a backoff procedure after a time of Inter Frame Space (IFS), such as Arbitration IFS (AIFS), PCF IFS (PIFS), etc. according to the situation of each terminal. According to an embodiment, the AIFS may be used as a configuration to replace the existing DCF IFS (DIFS). Each terminal waits while decreasing the slot time by a random number determined for the corresponding terminal during the interval of the idle state of the channel, and a terminal that has exhausted all of the slot time attempts to access the corresponding channel. As described above, a period in which each terminal performs a backoff procedure is referred to as a contention window period. In this case, the random number may be referred to as a backoff counter. That is, the initial value of the backoff counter is configured by an integer that is a random number acquired by the terminal. When the terminal detects that the channel is idle during the slot time, the terminal may decrease the backoff counter by 1. In addition, when the backoff counter reaches 0, the terminal may be allowed to perform channel access in the corresponding channel. Accordingly, transmission of the terminal may be allowed when the channel is idle during the AIFS time and the slot time of the backoff counter.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
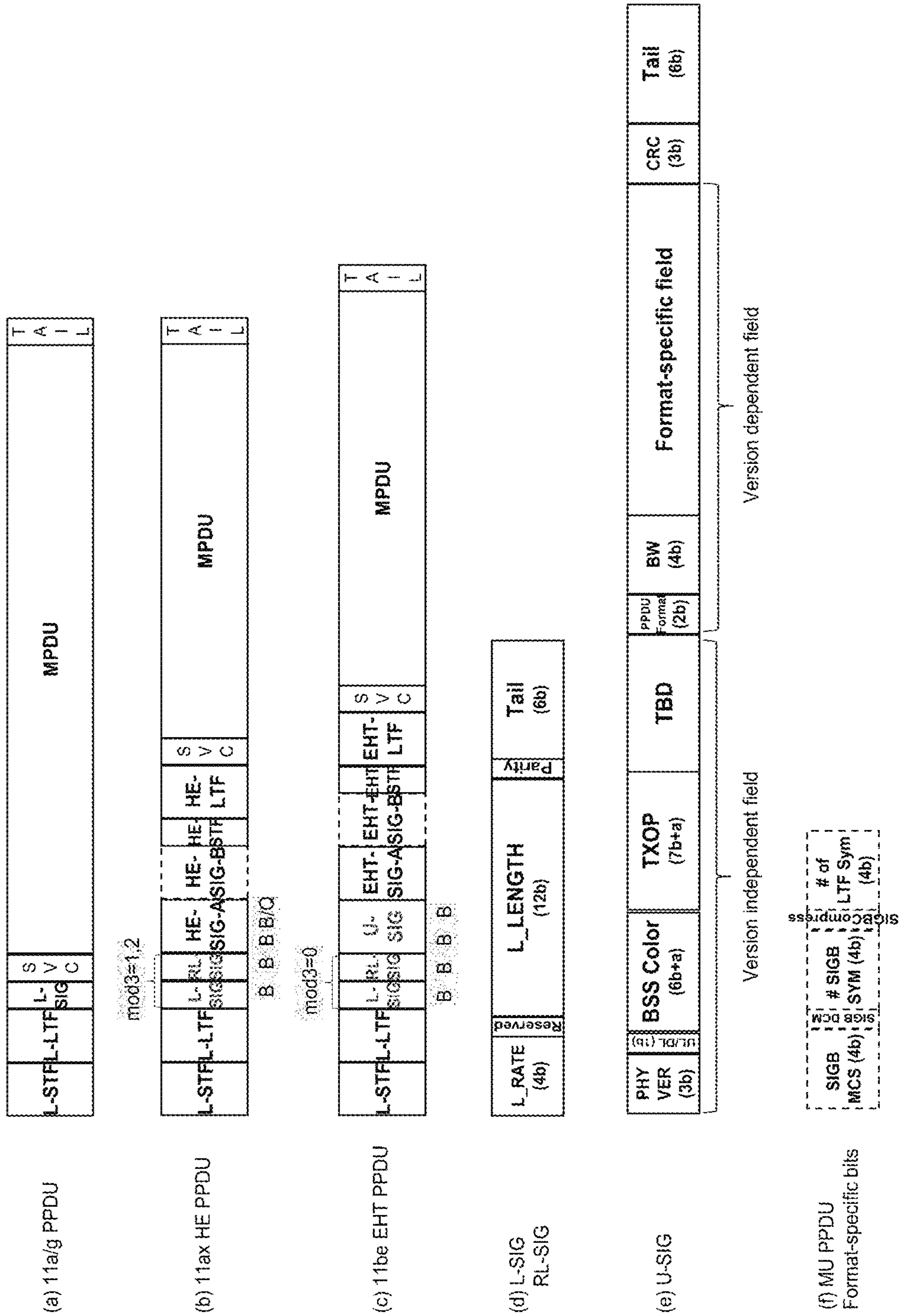
FIG. 7 illustrates an example of a format of a PLCP Protocol data unit (PPDU) for each of various standard generations.

FIG. 7 illustrates an example of a format of a PPDU (Physical layer Protocol Data Unit) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(*d*) illustrates a 24-bit information configuration of L-SIG.

Referring to FIG. 7(*d*), the L-SIG includes an L_RATE field and an L_LENGTH field. The L_RATE field includes 4 bits and indicates an MCS used for data transmission. Specifically, the L_RATE field indicates one value among transmission rates of Jun. 9, 2012/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of an L_LENGTH field is a byte, and a total of 12 bits may be allocated and signaling can be performed up to 4095. The length of the corresponding PPDU may be indicated by a combination of the L_LENGTH field and an L_RATE field. In this case, a legacy terminal and a non-legacy terminal may interpret the L_LENGTH field in different methods.

First, a method for interpreting the length of the corresponding PPDU by the legacy terminal or the non-legacy terminal by using the L_LENGTH field is as follows. When a value of the L_RATE field is configured to indicate 6 Mbps, three bytes (i.e., 24 bits) may be transmitted during 4 us corresponding to a 64 FFT symbol duration. Accordingly, the number of 64 FFT reference symbols after the L-SIG is acquired by adding three bytes corresponding to the SVC field and the tail field to the value of the L_LENGTH field and then dividing the same by three bytes corresponding to a transmission amount of one symbol. The length of the corresponding PPDU, i.e., a reception time (RXTIME) is acquired by multiplying the acquired number of symbols by 4 us corresponding to one symbol duration and then adding 20 us corresponding to a time required to transmit the L-STF, the L-LTF, and the L-SIG. This is represented as shown in equation 1 below.

$$RXTIME(us) = \left(\left\lceil \frac{\text{L\_LENGTH} + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH(byte)} = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = \quad \text{[Equation 3]}$$

$$T_{L-STF} + T_{L-LTF} + T_{L-SIG} + T_{RL-SIG} + T_{U-SIG} + (T_{EHT-SIG-A}) + (T_{EHT-SIG-B}) + T_{EHT-STF} + N_{EHT-LTF} \cdot T_{EHT-LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3 (k+1)} indicate the same PPDU length.

Referring to FIG. 7(*e*), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(*f*) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
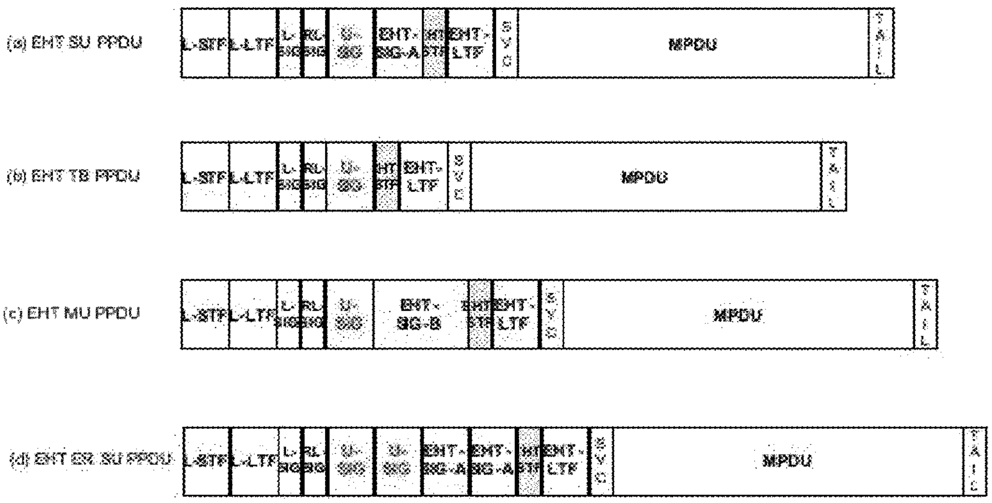
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in the specification, a frame or a MAC frame may be used interchangeably with an MPDU.

When a single wireless communication device communicates by using multiple links, communication efficiency of the wireless communication device may be improved. In this case, the link may be composed of one radio medium that may be used to deliver a MAC service data unit (MSDU) as a physical path. For example, when the frequency band of one link is being used by another wireless communication device, the wireless communication device may continue to communicate through another link. In this way, the wireless communication device may effectively use a plurality of channels. In addition, when the wireless communication device communicates simultaneously by using multiple links, the overall throughput may be increased. However, in the existing wireless LAN, it is prescribed on the premise that one wireless communication device uses one link. Therefore, there is a need for a wireless LAN operation method to use multiple links. A wireless communication method of a wireless communication device using multiple links is described with reference to FIGS. 9 to 26. First, a specific configuration of a wireless communication device using multiple links is described with reference to FIG. 9.

Figure 9:
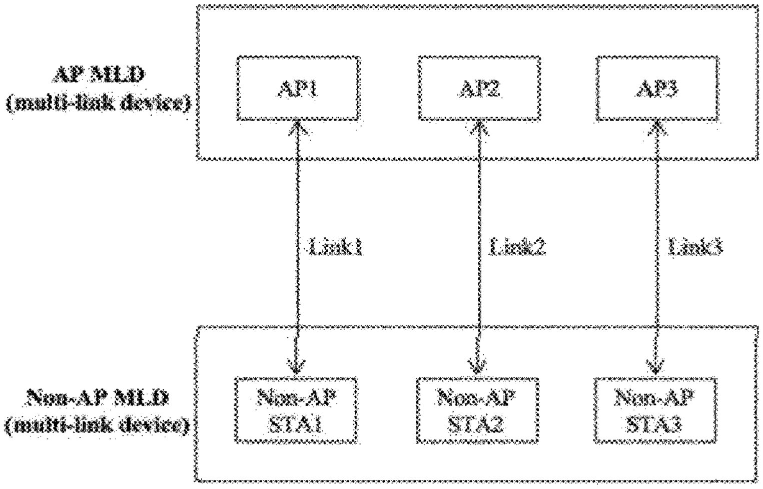
FIG. 9 illustrates a multi-link device according to an embodiment of the present invention.

FIG. 9 illustrates a multi-link device according to an embodiment of the disclosure.

A multi-link device (MLD) may be defined for the wireless communication method using multiple links as described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to a logical link control (LLC). In addition, the MLD may have one MAC data service.

A plurality of stations included in the multi-link device may operate in multiple links. In addition, a plurality of stations included in the multi-link device may operate on multiple channels. Specifically, a plurality of stations included in the multi-link device may operate on multiple different links or multiple different channels. For example, a plurality of stations included in the multi-link device may operate on multiple different channels of 2.4 GHz, 5 GHz, and 6 GHz.

The operation of a multi-link device may be referred to as a multi-link operation, an MLD operation, or a multi-band operation. In addition, when a station affiliated with the multi-link device is an AP, the multi-link device may be referred to as an AP MLD. In addition, when a station affiliated with the multi-link device is a non-AP, the multi-link device may be referred to as a non-AP MLD.

FIG. 9 illustrates an operation in which a non-AP MLD and an AP-MLD communicate. Specifically, the non-AP MLD and the AP-MLD communicate by using three links each. The AP MLD includes a first AP (AP1), a second AP (AP2), and a third AP (AP3). The non-AP MLD includes a first non-AP STA (non-AP STA1), a second non-AP STA (non-AP STA2), and a third non-AP STA (non-AP STA3). The first AP (AP1) and the first non-AP STA (non-AP STA1) communicate through the first link (link1). In addition, the second AP (AP2) and the second non-AP STA (non-AP STA2) communicate through the second link (link2). In addition, the third AP (AP3) and the third non-AP STA (non-AP STA3) communicate through the third link (link3).

The multi-link operation may include a multi-link setup operation. The multi-link setup corresponds to the association operation of the single-link operation described above, and may need to be preceded first for frame exchange in the multi-link. The multi-link device may obtain information necessary for the multi-link setup from the multi-link setup element. Specifically, the multi-link setup element may include capability information related to the multi-link. In this case, the capability information may include information indicating whether any one of the multiple devices included in the multi-link device may perform transmission and another device may perform reception at the same time. In addition, the capability information may include information on a link that may be used by each station included in the MLD. In addition, the capability information may include information on a channel that may be used by each station included in the MLD.

The multi-link setup may be configured through negotiation between peer stations. Specifically, the multi-link setup may be performed through communication between stations without communication with the AP. In addition, the multi-link setup may be configured through any one link. For example, even when the first to third links are configured through the multi-link, the multi-link setup may be performed through the first link.

In addition, a mapping between a traffic identifier (TID) and a link may be configured. Specifically, a frame corresponding to a TID of a specific value may be exchanged only through a predesignated link. The mapping between a TID and a link may be configured directional-based. For example, when multiple links are configured between a first multi-link device and a second multi-link device, the first multi-link device may be configured to transmit a frame of the first TID to the first link of the multiple links, and the second multi-link device may be configured to transmit a frame of the second TID to the first link. In addition, a default setting may exist in the mapping between a TID and a link. Specifically, if there is no additional setting in the multi-link setup, the multi-link device may exchange a frame corresponding to a TID in each link according to the default setting. In this case, the default setting may be that all TIDs are exchanged in one link.

The TID is described in detail. TID is an ID that classifies traffic and data to support quality of service (QoS). In addition, the TID may be used or allocated to a higher layer than the MAC layer. In addition, the TID may indicate a traffic category (TC) and a traffic stream (TS). In addition, the TID may be distinguished into 16. For example, the TID may be designated as one of 0 to 15. Depending on the access policy, channel access, or medium access method, the TID value used may be designated differently. For example, when enhanced distributed channel access (EDCA) or hybrid coordination function contention based channel access (HCAF) is used, the value of the TID may be allocated from 0 to 7. When EDCA is used, the TID may indicate user priority (UP). In this case, UP may be designated according to TC or TS. The UP may be allocated at a higher layer than MAC. In addition, when HCF controlled channel access (HCCA) or SPCA is used, the value of the TID may be allocated from 8 to 15. When HCCA or SPCA is used, the TID may indicate the TSID. In addition, when HEMM or SEMM is used, the value of the TID may be allocated from 8 to 15. When HEMM or SEMM is used, the TID may indicate the TSID.

UP and AC may be mapped. AC may be a label for providing QoS in the EDCA. AC may be a label for indicating an EDCA parameter set. The EDCA parameter or EDCA parameter set is a parameter used in the channel contention of the EDCA. The QoS station may use AC to ensure QoS. In addition, AC may include AC_BK, AC_BE, AC_VI, and AC_VO. Each of AC_BK, AC_BE, AC_VI, and AC_VO may represent a background, a best effort, a video, and a voice. In addition, AC_BK, AC_BE, AC_VI, and AC_VO may be classified as sub-ACs. For example, AC_VI may be subdivided into AC_VI primary and AC_VI alternate. In addition, AC_VO may be subdivided into AC_VO primary and AC_VO alternate. In addition, UP or TID may be mapped to AC. For example, 1, 2, 0, 3, 4, 5, 6, and 7 of UP or TID may be mapped to AC_BK, AC_BK, AC_BE, AC_BE, AC_VI, AC_VI, AC_VO, AC_VO, respectively. In addition, 1, 2, 0, 3, 4, 5, 6, and 7 of UP or TID may be mapped to AC_BK, AC_BK, AC_BE, AC_BE, AC_VI alternate, AC_VI primary, AC_VO primary, and AC_VO alternate, respectively. In addition, 1, 2, 0, 3, 4, 5, 6, and 7 of UP or TID may in order of priority. That is, 1 may be a low priority, and 7 may be a high priority. Accordingly, the priority may be increased in the order of AC_BK, AC_BE, AC_VI, and AC_VO. In addition, AC_BK, AC_BE, AC_VI, and AC_VO may correspond to each of AC indexes (ACIs) 0, 1, 2, and 3. Because of these characteristics of TID, the mapping between TID and link may represent the mapping between AC and link. In addition, the mapping between link and AC may represent the mapping between TID and link.

As described above, a TID may be mapped to each of multiple links. The mapping may be designation of a link to which traffic corresponding to a specific TID or AC may be exchanged. In addition, a TID or AC that may be transmitted in each transmission direction within a link may be designated. As described above, there may be a default setting for the mapping between the TID and the link. Specifically, if there is no additional setting in the multi-link setup, the multi-link device may exchange frames corresponding to the TID on each link according to the default setting. In this case, the default setting may be that all TIDs are exchanged on any one link. Any TID or AC may always be mapped to at least one link at any time. The management frame and the control frame may be transmitted on all links.

When a link is mapped to a TID or AC, only a data frame corresponding to the TID or AC mapped to the corresponding link may be transmitted from the corresponding link. Accordingly, when a link is mapped to a TID or AC, a frame does not correspond to the TID or AC mapped to the corresponding link cannot be transmitted from the corresponding link. When the link is mapped to the TID or AC, the ACK may also be transmitted based on the link to which the TID or AC is mapped. For example, a block ACK agreement may be determined based on a mapping between a TID and a link. In another specific embodiment, the mapping between the TID and the link may be determined based on the block ACK agreement. Specifically, a block ACK agreement may be established for a TID mapped to a specific link.

QoS may be secured through the mapping between the TID and the link described above. Specifically, AC or TID having a high priority may be mapped to a link with a relatively small number of stations operating or a good channel condition. In addition, the mapping between the TID and the link described above may allow the station to remain in a power save state for long time.

Figure 10:
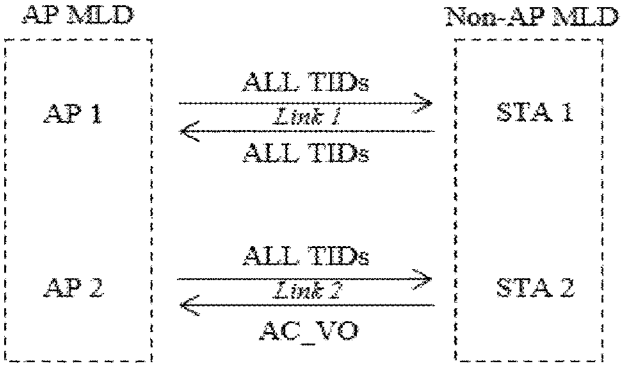
FIG. 10 illustrates an example of a TID-to-link mapping method according to an embodiment of the present invention.

FIG. 10 illustrates a multi-link mapped according to a TID-to-link mapping method according to an embodiment of the disclosure.

Referring to FIG. 10, as described in FIG. 9, there may be a mapping relationship between a TID and a link. In addition, in the present invention, the mapping relationship between the TID and the link may be referred to as TID-to-link mapping, TID to link mapping, TID mapping, link mapping, etc. The TID may indicate a traffic identifier. In addition, the TID may be an identifier (ID) for classifying traffic, data, etc. to support quality of service (QoS).

In addition, the TID may be an ID used in or allocated to a layer higher than the MAC layer. The TID may indicate traffic categories (TCs) and traffic streams (TSs). In addition, the TID may have 16 values, and for example, may be indicated by one of values from 0 to 15. In addition, different TID values may be used according to an access policy or a channel access or medium access method. For example, a possible TID value when enhanced distributed channel access (EDCA) (hybrid coordination function (HCF) contention-based channel access) is used, may be 0 to 7. In addition, when the EDCA is used, a TID value may indicate a user priority (UP), and the UP may be related to a TC or a TS. In addition, the UP may have a value allocated in a layer higher than the MAC layer. In addition, when HCF controlled channel access (HCCA) or SPCA is used, a possible TID value may be 8 to 15. In addition, when the HCCA or SPCA is used, the TID may indicate a TSID. In addition, when HEMM or SEMM is used, a possible TID value may be 8 to 15. In addition, when the HEMM or SEMM is used, the TID may indicate the TSID.

In addition, there may be a mapping relationship between the UP and an access category (AC). The AC may be a label for providing the QoS in the EDCA, or a label indicating a set of EDCA parameters. An EDCA parameter or a set of EDCA parameters may be used for channel association. The AC may be used by a QoS STA.

A value of the AC may be configured by one of AC_BK, AC_BE, AC_VI, and AC_VO. The AC_BK, AC_BE, AC_VI, and AC_VO may indicate a background, a best effort, a video, and a voice, respectively. In addition, the AC_BK, AC_BE, AC_VI, and AC_VO may be subdivided. For example, AC_VI may be divided into AC_VI primary and AC_VI alternate. In addition, AC_VO may be divided into AC_VO primary and AC_VO alternate. In addition, a UP value or a TID value may be mapped to an AC value. For example, 1, 2, 0, 3, 4, 5, 6, and 7 of the UP value or the TID value may be mapped to AC_BK, AC_BK, AC_BE, AC_BE, AC_VI, AC_VI, AC_VO, and AC_VO, respectively. Alternatively, 1, 2, 0, 3, 4, 5, 6, and 7 of the UP value or the TID value may be mapped to AC_BK, AC_BK, AC_BE, AC_BE, AC_VI alternate, AC_VI primary, AC_VO primary, and AC_VO alternate, respectively. In addition, 1, 2, 0, 3, 4, 5, 6, and 7 of the UP value or the TID value may have higher priorities in order. That is, 1 may have a lower priority, and 7 may have a higher priority. Accordingly, the priorities of AC_BK, AC_BE, AC_VI, and AC_VO may increase in order. In addition, AC_BK, AC_BE, AC_VI, and AC_VO may correspond to AC index (ACI) 0, 1, 2, and 3, respectively.

Accordingly, there may be a relation between the TID and the AC. Accordingly, the TID-to-link mapping in the present invention may be a mapping relationship between the AC and the link. In addition, in the present invention, mapping of the TID may correspond to mapping of the AC, and vice versa.

According to an embodiment of the present invention, there may be a TID mapped to each link of multiple links. For example, there may be mapping relating to a link among the multiple links, in which a specific TID or a specific AC is allowed to perform transmission or reception. In addition, such mapping may be defined separately for each of the opposite directions of the link. In addition, as described above, in the mapping between the TID and the link, there may be a default setup. For example, the mapping between the TID and the link normally indicates mapping between a link to all TIDs. In addition, according to an embodiment, a specific time point, a TID or an AC may be mapped to at least one link. In addition, a management frame or a control frame may be transmitted in all links.

In the present invention, a data frame corresponding to a TID or an AC mapped for a direction of a link may be transmitted. In addition, a data frame corresponding to a TID or an AC not mapped to a direction of a link may not be transmitted.

According to an embodiment, the TID-to-link mapping may be also applied to an acknowledgment. For example, a block ack agreement may be based on the TID-to-link mapping. Alternatively, the TID-to-link mapping may be based on the block ack agreement. For example, there may be a block ack agreement for the TID for which the TID-to-link mapping is performed.

Through the TID-to-link mapping, the QoS service can be provided. For example, by mapping an AC or a TID having a higher priority to a link in a good channel state or having a smaller number of STAs, data of the corresponding AC or TID may be promptly transmitted. Alternatively, the TID-to-link mapping may be performed so that an STA of a specific link can save power (enter a doze state).

Referring to FIG. 10, there may be an AP MLD including AP 1 and AP 2. In addition, there may be a non-AP MLD including STA 1 and STA 2. In addition, multiple links, Link 1 and Link 2, may be in present in the AP MLD. AP 1 and STA 1 may be associated through Link 1, and AP 2 and STA 2 may be associated through Link 2.

Accordingly, Link 1 may include a link for transmission from AP 1 to STA 1 and/or a link for transmission from STA 1 to AP 1, and Link 2 may include a link for transmission from AP 2 to STA 2 and/or a link for transmission from STA 2 to AP 2. In this case, each link may be mapped to a TID and/or an AC.

For example, all TIDs and all ACs may be mapped to a link for transmission from AP 1 to STA 1 in Link 1, and a link for transmission from STA 1 to AP 1 in Link 1. In addition, only a TID corresponding to AC_VO or AC_VO may be mapped to a link for transmission from STA 2 to AP 2 in Link 2. In addition, only data of the mapped TID and/or AC may be transmitted through the corresponding link. In addition, data of a TID or AC not mapped to a link cannot be transmitted through the corresponding link.

Figure 11:
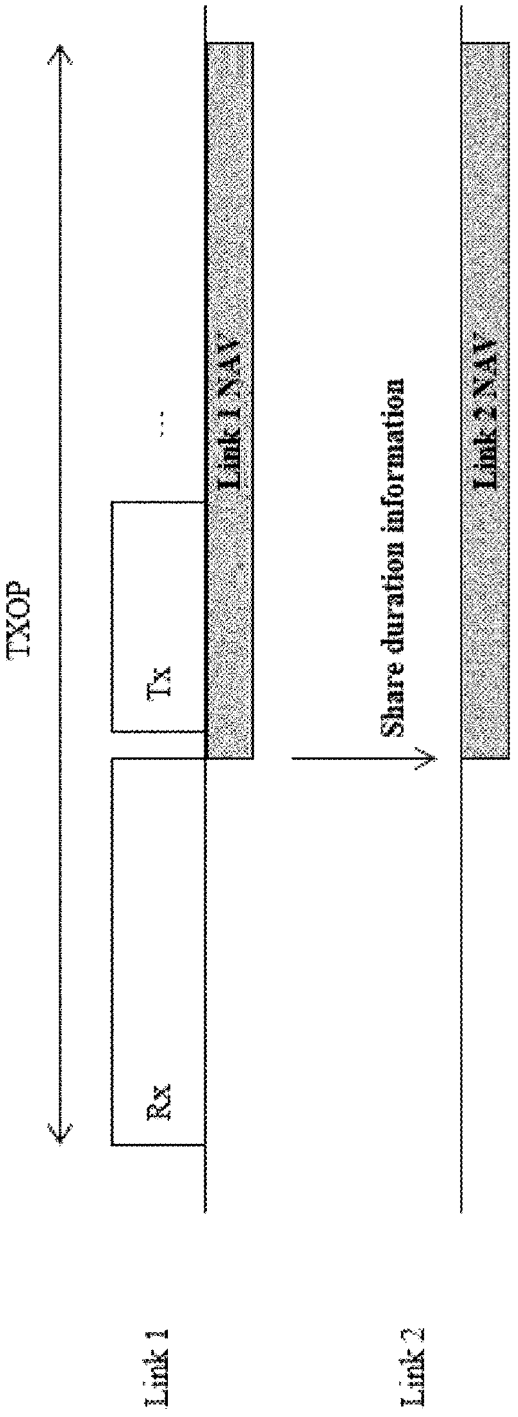
FIG. 11 illustrates an example of a multi-link NAV setup operation according to an embodiment of the present invention.

FIG. 11 illustrates an example of a multi-link NAV setup operation according to an embodiment of the present invention.

An operation in which an MLD performs simultaneous transmission and reception (STR) may be limited, and this may be associated with a frequency interval between multiple links for a multi-link operation.

Accordingly, according to an embodiment of the present invention, when an interval between links is m MHz, simultaneous transmission or reception may be limited, and with respect to n greater than m, when an interval between links is n MHz, simultaneous transmission or reception may not be limited. This embodiment may be for solving a problem of limitation on the simultaneous transmission or reception, and a redundant description may be omitted. In addition, this embodiment may be applied to an MLD which cannot perform the STR.

According to an embodiment of the present invention, duration information may be shared between links for multi-link operation. In an embodiment, the duration information may be TXOP duration information transmitted in a signaling field of a preamble. The signaling field may be the U-SIG field described above. Alternatively, the signaling field may be the HE-SIG-A field described above. As another embodiment, the duration information may be duration information indicated by a duration ID/field including a MAC header. As another embodiment, the duration information may be duration information indicated by a length field (L length field) included in an L-SIG field. According to an embodiment, duration information indicated by a U-SIG field or a HE-SIG-A or a duration ID/field may be a value indicating TXOP duration. According to an embodiment, duration information indicated by an L-SIG field may be the length of a physical layer protocol data unit (PPDU) including the L-SIG field, or a value indicating the end of the PPDU including the L-SIG field.

In addition, according to an embodiment of the present invention, transmission or channel access for duration based on duration information shared between links may be limited. A method for limiting the transmission or the channel access may include configuring a NAV. Alternatively, the NAV may be reset to resume the transmission or channel access. In this case, the NAV may be an intra-BSS NAV. The intra-BSS NAV may be a NAV configured by an intra-BSS frame (or PPDU). That is, an STA belonging to an MLD may configure a NAV on the basis of a frame (or PPDU) directed to another STA belonging to the MLD.

According to an embodiment of the present invention, there may be an inter-link NAV. In the multi-link operation, the inter-link NAV may be a NAV used by STAs of multiple links belonging to an MLD. For example, transmission may not be performed through Link 2 on the basis of the inter-link NAV configured on the basis of duration information received through Link 1. In addition, for the MLD which cannot perform the STR, the inter-link NAV may be present or used. For example, when the inter-link NAV is configured, the MLD having configured the corresponding inter-link NAV may not perform transmission or channel access in multiple links (or all links used by the MLD).

In addition, as a type of the NAV, there may be a basic NAV, in addition to an inter-BSS NAV. The basic NAV may be a NAV configured by an inter-BSS frame (or PPDU), and the basic NAV may be configured by a frame (or PPDU) for which whether it is an intra-BSS frame or an inter-BSS frame is not determined.

When an inter-link NAV is separately used, it may be advantageous in a situation in which a NAV setup is updated, compared to a case where the inter-link NAV is not used. For example, a situation in which it is allowed to reset a NAV configured by another link may occur. For example, it may be allowed to reset an inter-link NAV which has been configured upon determination that the inter-link NAV is configured on the basis of a frame (or PPDU) but the frame (or PPDU) is not directed to the same MLD. When there is an MLD operating in Link 1 and Link 2, a NAV for Link 1 may be configured on the basis of a frame received through Link 1. Thereafter, the NAV of Link 1 may be updated on the basis of a frame of Link 2. In addition, when there is no need to maintain a NAV by Link 2 and the NAV of Link 1 is reset, NAV information configured on the basis of the frame received through Link 1 may be lost. When the inter-link NAV is used together with the NAV for each link, the NAV for each link may be maintained even though the inter-link NAV is reset, and thus such a problem can be resolved.

An embodiment of the present invention provides an example of configuring a NAV, but the embodiment of the present invention is not limited thereto, and may be applied to a case of indicating a physical layer to stop performing channel access or indicating that a channel state is busy. In addition, the present invention is not limited to a case of resetting the NAV, and may be also applied to a case of indicating a physical layer to continuously perform channel access or indicating that the channel state is idle. In this case, the primitive exchanged between a physical layer and a MAC layer may be used. Alternatively, the primitive exchanged between one STA of the MLD and another STA may be used. Alternatively, the primitive exchanged between one MAC layer of the MLD and another MAC layer may be used.

According to an embodiment of the present invention, when an STA belonging to an MLD starts PPDU reception, another STA belonging to the MLD may need to stop channel access. As described above, the channel access may be stopped on the basis of the received duration information, but a time interval for obtaining duration information from a PPDU reception start time point may be required due to the location of a field including the duration information or a time required for decoding, or the like. Accordingly, when channel access and transmission are performed during this time interval, the problem described above may occur. Accordingly, according to an embodiment of the present invention, an STA of an MLD may stop performing channel access from a time point at which another STA of the MLD starts reception. In addition, when it is identified that a frame received after another STA of the MLD starts reception is not directed toward another STA, channel access may be restarted.

Figure 12:
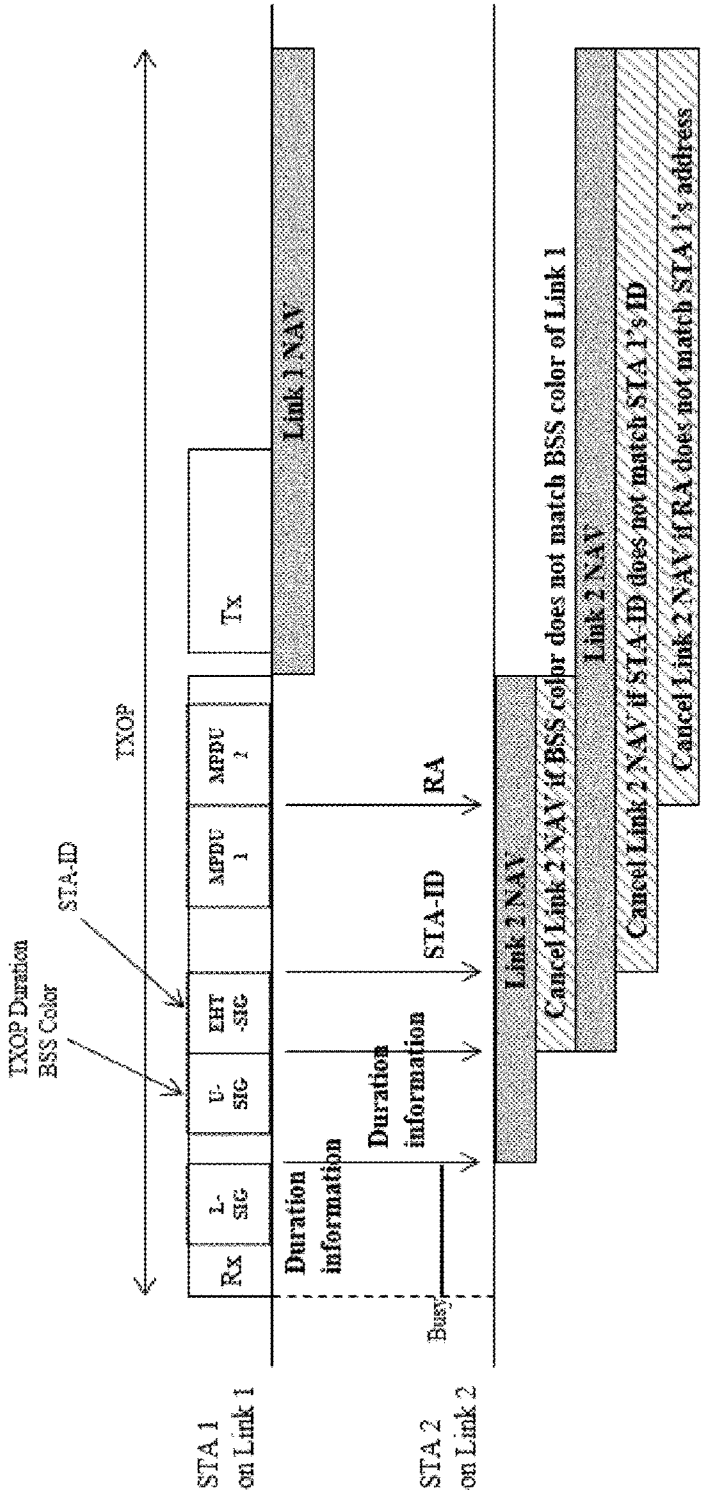
FIG. 12 illustrates another example of a multi-link NAV setup operation according to an embodiment of the present invention.

FIG. 12 illustrates another example of a multi-link NAV setup operation according to an embodiment of the present invention.

FIG. 12 more specifically describes the specific method in the embodiment described in FIG. 11, and a redundant description may be omitted.

As described above, on the basis of a frame or a PPDU received by one STA belonging to an MLD, another STA belonging to the same MLD may stop or resume performing channel access or transmission. In the present invention, stopping the channel access or transmission may include an operation such as configuring (updating) a NAV, determining a channel state as busy, or stopping CCA. In addition, resuming the channel access or transmission may include an operation such as resetting a NAV, canceling the NAV setup, determining the channel state as idle, or performing the CCA. Hereinafter, such operations may be indicated as stopping or resuming channel access. In addition, it may be described that STA 1 and STA 2 belong to an MLD, and STA 1 and STA 2 operate in Link 1 and Link 2, respectively. In addition, the frame and the PPDU may be interchangeably indicated. In addition, as described in FIG. 11, the NAV in this case may be an intra-BSS NAV or an inter-link NAV.

According to an embodiment of the present invention, when STA 1 starts to receive a frame, STA 2 stops performing channel access. In addition, when STA 1 acquires duration information from an L-SIG, STA 2 may continuously stop performing the channel access. In this case, STA 2 may determine the channel access stopping state to be continued by the end of the frame received by STA 1. In addition, when STA 1 fails to correctly decode the L-SIG (in a case of invalid L-SIG), STA 2 may resume performing channel access.

In addition, TXOP duration and a BSS color may be received from the U-SIG of the frame received by STA 1. If the received BSS color indicates an intra-BSS, or the BSS color is a BSS color corresponding to STA 1, the channel access may be stopped. As an embodiment, a channel access stop period may last by the end of the received frame. In this case, it is advantageous in that the channel access can be promptly started after the received frame. As another embodiment, in this case, the channel access stop period may be TXOP duration. In this case, duration of the stopped channel access may be updated on the basis of the L-SIG. In this case, it is advantageous in that a sequence after the received frame can be better protected.

Alternatively, there may be a case where the TXOP duration and the BSS color are received from the U-SIG of the frame received by STA 1, and the received BSS color does not indicate an intra-BSS, or the BSS color is not a BSS color corresponding to STA 1. Alternatively, there may be a case where STA 1 has failed to successfully decode the U-SIG. In this case, STA 2 may resume the channel access.

Alternatively, when information acquired from the U-SIG of the frame received by STA 1 indicates that the corresponding frame is a frame not received by STA 1, STA 2 may resume performing channel access. For example, when a PHY identifier acquired from the U-SIG corresponds to an ID corresponding to a future standard or an unrecognizable ID, STA 2 may resume performing channel access.

In addition, the case in which the U-SIG is received is described above, but the same embodiment is applicable to a case in which a HE PPDU is received and a case in which a HE-SIG-A is received. For example, the HE-SIG-A may include TXOP duration and a BSS color, and accordingly the same operation described above may be performed.

In addition, an STA-ID may have been received from an EHT-SIG of the frame received by STA 1. When the received STA-ID is an indicator to be received by STA 1, for example, when STA-ID indicates STA 1, STA-ID indicates a group to which STA 1 belongs, or STA-ID indicates broadcast, STA 2 may continuously stop performing the channel access.

In addition, an STA-ID may have been received from an EHT-SIG of the frame received by STA 1. When the received STA-ID corresponds to an indicator which does not correspond to STA 1, for example, when STA-ID does not indicate an indicator corresponding to STA 1, STA-ID does not indicate a group to which STA 1 belongs, and STA-ID does not indicate broadcast, STA 2 may resume performing channel access. Alternatively, even when STA 1 has failed to successfully decode the EHT-SIG, STA 2 may resume performing channel access.

In addition, the case in which the EHT-SIG is received is described above, but the same embodiment is applicable to a case in which a HE PPDU is received and a case in which a HE-SIG-B is received. For example, the HE-SIG-B may include an STA-ID, and accordingly, the same operation described above may be performed.

In addition, a MAC header of the frame received by STA 1 may have been received. When a receiver address (RA) or a destination address (DA) included in the received MAC header indicates a value to be received by STA 1, for example, when an RA or a DA indicates STA 1, indicates a group to which STA 1 belongs, or an STA-ID indicates broadcast, STA 2 may continuously stop performing the channel access. In this case, the stopped channel access period may be based on duration information included in the received MAC header. More specifically, the stopped channel access period may be based on duration information indicated by a duration/ID field included in the received MAC header.

In addition, a MAC header of the frame received by STA 1 may have been received. When an RA or a DA included in the received MAC header is an indicator not corresponding to STA 1, for example, when the RA or the DA does not indicate an indicator corresponding to STA 1, does not indicate a group to which STA 1 belongs, and does not indicate broadcast, STA 2 may resume performing channel access. Alternatively, STA 1 may not have received all MAC headers. For example, STA 1 may have failed to receive all MPDUs included in an A-MPDU. In this case, STA 2 may resume performing channel access.

The stopping and resuming of channel access, described in FIG. 12, may operate according to a decoding order as STA 1 starts receiving a frame (or PPDU) and decodes the same in order. The decoding order may be based on a PPDU format, a frame format, and the like. For example, decoding may be performed in the sequence of an L-SIG, a U-SIG, an EHT-SIG, and a MAC header (in a case of an EHT PPDU). Alternatively, decoding may be performed in the sequence of an L-SIG, a HE-SIG-A, a MAC header (in a case of a HE SU PPDU or a HE TB PPDU). Alternatively, decoding may be performed in the sequence of an L-SIG, a HE-SIG-A, a HE-SIG-B, a MAC header (in a case of a HE MU PPDU). Alternatively, decoding may be performed in the sequence of an L-SIG and an MAC header (in a case of a 11a/g PPDU).

According to an embodiment of the present invention, the STA-ID mentioned above may be a value indicating an intended receiver of a PPDU or a resource unit (RU). In addition, the STA-ID may be included in an EHT-SIG field, a HE-SIG-B field, or the like. In addition, the STA-ID may indicate a value corresponding to a single STA. For example, when multiple STAs are included in an MLD, the STA-ID may indicate a value corresponding to one of the multiple STAs. In addition, the STA-ID may be a value based on a MAC address or an AID of the STA.

Figure 13:
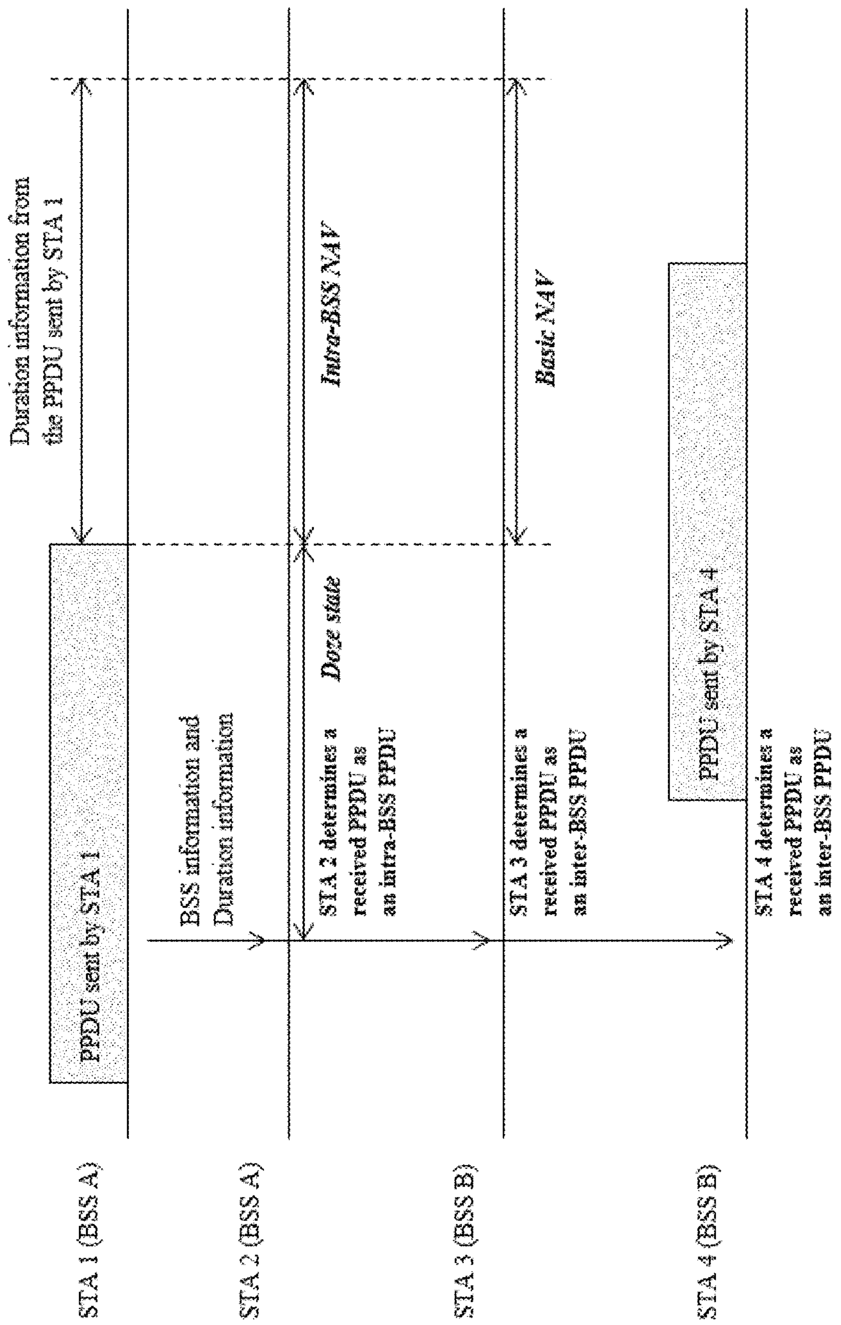
FIG. 13 illustrates an example of BSS classification and an operation based thereon according to an embodiment of the present invention.

FIG. 13 illustrates an example of BSS classification and an operation based thereon according to an embodiment of the present invention.

According to an embodiment, an STA may classify (or determine) a BSS on the basis of a received frame or a received PPDU. The classifying of the BSS may include an operation of classifying whether or not the received frame or the received PPDU corresponds to a BSS to which the STA performing the classification belongs. Alternatively, the classifying of the BSS may mean an operation of classifying whether or not the received frame or the received PPDU has been transmitted from a BSS to which the STA performing the classification belongs. In addition, the classifying of the BSS may include an operation of whether or not the received frame or the received PPDU corresponds to a BSS to which the STA performing the classification does not belong. Alternatively, the classifying of the BSS may mean an operation of classifying whether or not the received frame or the received PPDU has been transmitted from a BSS to which the STA performing the classification does not belong. In addition, the classifying of the BSS may include an operation of classifying a BSS to which the received frame or the received PPDU belongs. Alternatively, the classifying of the BSS may mean an operation of classifying a BSS from which the received frame or the received PPDU has been transmitted. According to an embodiment of the present invention, the BSS to which the STA performing the classification belongs may be referred to as an intra-BSS. Alternatively, BSSs including the BSS to which the STA performing the classification belongs may be referred to as an intra-BSS. In addition, a BSS other than the intra-BSS may be referred to as an inter-BSS. Alternatively, a BSS other than the intra-BSS may be an inter-BSS or an unclassified BSS. Alternatively, the inter-BSS may include the unclassified BSS. In addition, the BSS to which the STA performing the classification does not belong may be referred to as an inter-BSS.

According to an embodiment, when it is determined that the received frame or the received PPDU corresponds to an intra-BSS or has been transmitted from the intra-BSS, the received frame and the received PPDU may be an intra-BSS frame and an intra-BSS PPDU, respectively. In addition, when it is determined that the received frame or the received PPDU corresponds to an inter-BSS, or has been transmitted from the inter-BSS, the received frame and the received PPDU may be an inter-BSS frame and an inter-BSS PPDU, respectively. In addition, a PPDU including the intra-BSS frame may be an intra-BSS PPDU. In addition, a PPDU including the inter-BSS frame may be an inter-BSS PPDU.

According to an embodiment, the BSS may be classified on the basis of one or more BSS classification conditions. For example, the BSS may be classified according whether at least one of the one or more BSS classification conditions is satisfied.

The BSS classification condition may include a condition based on a BSS color. The BSS color may be an identifier for the BSS. In addition, the BSS color may be included in a preamble of a PPDU, and more specifically, in a signaling field (for example, a HE-SIG-A field, a U-SIG field, or a VHT-SIG-A field). In addition, the BSS color may be included in a TXVECTOR transferred from a MAC layer to a PHY layer of a transmitter. In addition, the BSS color may be included in an RXVECTOR transferred from a PHY layer to a MAC layer of a receiver. Parameters included in the TXVECTOR and the RXVECTOR may be referred to as a TXVECTOR parameter and an RXVECTOR parameter, respectively. In addition, the BSS color may be included in the TXVECTOR parameter or the RXVECTOR parameter. In addition, a BSS color configured by an AP may be informed to STAs. According to an embodiment, the BSS may be classified on the basis of a BSS color included in a received PPDU. When a BSS color included in the PPDU received by the STA differs from a BSS color of the BSS corresponding to the STA, the received PPDU may be classified as an inter-BSS PPDU. Alternatively, when the BSS color included in the PPDU received by the STA differs from the BSS color of the BSS corresponding to the STA and the value thereof is not 0, the received PPDU may be classified as an inter-BSS PPDU. In addition, when the BSS color included in the PPDU received by the STA is identical to the BSS color of the BSS corresponding to the STA, the received PPDU may be classified as an intra-BSS PPDU.

The BSS classification condition may include a condition based on a MAC address. The MAC address may be included in a MAC header of a frame. In addition, the MAC address may include a receiver address (RA), a transmitter address (TA), a BSSID, a source address (SA), a destination address (DA), and the like. According to an embodiment, the BSS may be classified on the basis of the MAC address included a received frame. When a MAC address included in the received frame differs from a BSSID of a BSS corresponding to the STA, the received frame may be classified as an inter-BSS frame. More specifically, when all MAC addresses included in the received frame differ from the BSSID of the BSS corresponding to the STA, the received frame may be classified as an inter-BSS frame. In addition, when the MAC address included in the received frame is identical to the BSSID of the BSS corresponding to the STA, the received frame may be classified as an intra-BSS frame. More specifically, when at least one of MAC addresses included in the received frame is identical to the BSSID of the BSS corresponding to the STA, the received frame may be classified as an intra-BSS frame.

The corresponding BSS may include a BSS associated with the STA. In addition, the corresponding BSS may include a BSS included in as set of multiple BSSIDs, such as the BSS associated with the STA. In addition, the corresponding BSS may include a BSS included in a co-hosted BSSID set, such as the BSS associated with the STA. In addition, information relating to one or more BSSs included in the same set of multiple BSSIDs or the same co-hosted BSSID set may be transferred through one frame.

The BSS classification condition may include a condition based on a partial AID field value included in a VHT PPDU. The partial AID field may be included in a preamble of a VHT PPDU. In addition, the partial AID field may be included in a VHT-SIG-A field included in the VHT PPDU. According to an embodiment, the partial AID field may indicate a part of a BSS color. For example, when a partial BSS color function is used, the partial AID field may indicate a part of the BSS color. Alternatively, when an AID assignment rule is used, the partial AID field may indicate a part of the BSS color. The AID assignment rule may be a method for allocating an AID on the basis of a part of the BSS color. In addition, when a group ID field included in the VHT-SIG-A field of the VHT PPDU has a preconfigured value (for example, when a group ID field is configured as 63), the partial AID field may indicate a part of the BSS color. According to an embodiment, in a case where a partial AID field of the received PPDU indicates a part of the BSS color, when the received partial AID field value differs from a part of the BSS color corresponding to the received STA, the received PPDU may be classified as an inter-BSS PPDU.

In addition, in a case where the partial AID field of the received PPDU indicates a part of the BSS color, when the received partial AID field value is identical to a part of the BSS color corresponding to the received STA, the received PPDU may be classified as an intra-BSS PPDU. In addition, the part of the BSS color may be 4 LSBs of the BSS color. According to another embodiment, the partial AID field may indicate a part of the BSSID. For example, in a case where a group ID field included in the VHT-SIG-A field of the VHT PPDU has a preconfigured value (for example, when a group ID field is configured as 0), the partial AID field may indicate a part of the BSSID. According to an embodiment, in a case where a partial AID field of the received PPDU indicates a part of the BSSID, when the received partial AID field value differs from a part of the BSSID corresponding to the received STA, the received PPDU may be classified as an inter-BSS PPDU. In addition, in a case where a partial AID field of the received PPDU indicates a part of the BSSID, when the received partial AID field is identical to a part of the BSSID corresponding to the received STA, the received PPDU may be classified as an intra-BSS PPDU. In addition, in this case, the part of the BSSID may be 9 MSBs of the BSSID. In addition, the partial AID field value may be included in TXVECTOR parameter PARTIAL_AID or RXVECTOR parameter PARTIAL_AID. In addition, the group ID field value may be included in TXVECTOR parameter GROUP_ID or RXVECTOR parameter GROUP_ID.

The BSS classification condition may include a condition for receiving a PPDU having a preconfigured condition by an AP. For example, the PPDU having a preconfigured condition may include a downlink PPDU. According to an embodiment, the downlink PPDU may include a VHT MU PPDU. In addition, the downlink PPDU may include a PPDU in which signaling indicating either uplink or downlink is configured with a preconfigured value. The signaling indicating either the uplink or the downlink may be included in a signaling field of a HE PPDU. Alternatively, the signaling indicating either the uplink or the downlink may be included in a U-SIG. The U-SIG may be included in a preamble an EHT PPDU or a PPDU after the EHT standard.

In addition, there may be a case where a PPDU cannot be classified as an intra-BSS PPDU or an inter-BSS PPDU. For example, when both the condition for classifying the PPDU as the intra-BSS PPDU and the condition for classifying the PPDU as the inter-BSS PPDU, which are described above, are not satisfied, the PPDU may not be classified as the intra-BSS PPDU or the inter-BSS PPDU.

In addition, during the BSS classification, when classification results according to multiple conditions do not match, a final result may be determined according to a preconfigured condition. For example, when a result according to a condition based on the BSS color and a result according to a condition based on the MAC address do not match, the result according to the condition based on the MAC address may be prioritized, or a final result may be determined on the basis of the result according to the condition based on the MAC address. Alternatively, when both the condition for classifying the PPDU as the intra-BSS PPDU and the condition for classifying the PPDU as the inter-BSS PPDU are satisfied, the PPDU may be classified as the intra-BSS PPDU.

According to an embodiment of the present invention, the STA may perform an operation based on the classified BSS. The operation based on the classified BSS may include an intra-PPDU power save operation. The intra-PPDU power save operation may be a power save operation based on the received PPDU. When the preconfigured condition is satisfied, the intra-PPDU power save operation may be performed. The preconfigured condition may include a condition for classifying the received PPDU as the intra-BSS PPDU. In addition, the preconfigured condition may include a condition in which an intended receiver of the received PPDU is not an STA having received the PPDU. For example, when an ID or an address included in the PPDU does not correspond to the STA having received the PPDU, the intended receiver of the PPDU may not be an STA having received the PPDU. The ID may be included in a preamble of the PPDU. For example, the ID may be STA_ID included in the preamble of the PPDU. In addition, STA_ID may be included in a HE MU PPDU or an EHT PPDU. In addition, the address may be the MAC address described above. In addition, when signaling indicating either the uplink or the downlink, included in the received PPDU, indicates the uplink, the intended receiver of the PPDU may not be the STA having received the PPDU. In addition, when the configuration of the received PPDU is made so that the STA having received the PPDU is not supported, the intended receiver of the PPDU may not be the STA having received the PPDU. The configuration of the received PPDU may include an MCS, the number of spatial streams, a channel width, and the like of the PPDU. In addition, when the configuration of the received PPDU is made so that the STA having received the PPDU is not supported, the PHY-RXEND.indication (UnsupportedRate) primitive may be received. In addition, when the received PPDU has a preconfigured format, the intended receiver of the PPDU may not be the STA having received the PPDU. The preconfigured format may include a TB PPDU. The TB PPDU may include a HE TB PPDU and an EHT TB PPDU. In addition, the TB PPDU may be a PPDU transmitted as a response to a triggering frame. The triggering frame may include a trigger frame. The triggering frame may include a frame including triggering information. The triggering information may be included in a MAC header, for example, an A-control field. In addition, the triggering information or information included in the trigger frame may include the length of a responding PPDU, an RU to be used when responding, a PHY configuration to be used when responding, a MAC configuration, and the like. The intra-PPDU power save operation may be an operation in which entering the doze state by the end of the received PPDU is allowed. As another embodiment, when it is determined that the intended receiver of the frame or the PPDU received by an STA is not the STA described above, reception or decoding of the PPDU or the frame may be stopped.

The operation based on the classified BSS may include an operation of configuring (or updating) a NAV. According to an embodiment, an STA may manage one or more NAVs. In addition, when the STA has received the PPDU or the frame, a NAV corresponding to the BSS classified on the basis of the received PPDU or the received frame may be configured. For example, the intra-BSS NAV may be a NAV corresponding to the intra-BSS PPDU. In addition, a basic NAV may be a NAV corresponding to a PPDU other than the intra-BSS PPDU. Alternatively, the basic NAV may be a NAV corresponding to the inter-BSS PPDU. In addition, when the NAV is configured on the basis of the received PPDU or the received frame, duration information included in the received PPDU or the received frame may be used. The duration information may include a TXOP. The TXOP may mean a value included in a TXOP field. The TXOP field may be included in a preamble of a PPDU. For example, the TXOP field may be included in a HE-SIG-A field of a HE PPDU. Alternatively, the TXOP field may be included in a U-SIG field of an EHT PPDU or a PPDU after the EHT standard. In addition, the duration information may be included in the MAC header. For example, the duration information may be included in a duration/ID field included in the MAC header.

The operation based on the classified BSS may include a spatial reuse operation. In addition, the operation based on the classified BSS may include a channel access operation. The spatial reuse information may be a channel access operation. When an STA receives a PPDU or a frame and a preconfigured condition is satisfied, the spatial reuse operation may be performed. The preconfigured condition may include a condition in which the received PPDU or the received frame corresponds to an inter-BSS. In addition, the preconfigured condition may include a condition in which a signal strength of the received PPDU or the received frame may have a value smaller than a threshold. For example, the threshold may be variable. In addition, the threshold may be a threshold for an OBSS PD-based spatial reuse operation. In addition, the threshold may be a value equal to or greater than a CCA threshold. In addition, the threshold may be a value based on power to be transmitted. The spatial reuse operation may include an operation of transmitting a PPDU. In addition, the spatial reuse operation may include an operation of resetting PHY. For example, the operation of resetting PHY may be an operation of issuing the PHY-CCARESET.request primitive. In addition, the spatial reuse operation may include an operation of not configuring a NAV on the basis of the received PPDU or the received frame. When the STA performs the spatial reuse operation, the STA may transmit the PPDU while the received PPDU or the received frame is transmitted or received.

Referring to FIG. 13, there may be BSS A and BSS B, and BSS A and BSS B may be different from each other. In addition, each of BSS A and BSS B may correspond to an inter-BSS. That is, a PPDU or a frame transmitted from BSS B by an STA associated with BSS A may be classified as an inter-BSS PPDU or an inter-BSS frame. In addition, there may be STA 1 and STA 2 belonging to BSS A (or associated with an AP operating BSS A). There may be STA 3 and STA 4 belonging to BSS B (or associated with an AP operating BSS B). Referring to FIG. 13, STA 1 may transmit a PPDU. In addition, the PPDU transmitted by STA 1 may include information on the BSS. For example, information on the BSS may be information for classifying the above-described BSS. In addition, the PPDU transmitted by STA 1 may include duration information.

STA 2 may receive the PPDU transmitted by STA 1, and may classify a BSS for the corresponding PPDU. In addition, since STA 2 and STA 1 belong to BSS A, the PPDU received by STA 2 may be classified as an intra-BSS PPDU. In addition, the PPDU received by STA 2 may be a UL PPDU or a PPDU in which the STA is not an intended receiver. Accordingly, according to the above-described embodiment, STA 2 may perform the intra-PPDU power saving. Referring to FIG. 13, STA 2 may enter the doze state by the end of the received PPDU. In addition, STA 2 may configure a NAV on the basis of duration information included in the received PPDU. STA 2 may configure an intra-BSS NAV since STA 2 has classified the received PPDU as the intra-BSS PPDU.

STA 3 may receive a PPDU transmitted by STA 1, and may classify a BSS for the corresponding PPDU. In addition, STA 3 and STA 1 belong to BSS B and BSS A, respectively, and thus the PPDU received by STA 3 may be classified as an inter-BSS PPDU. In addition, STA 3 may configure a NAV on the basis of duration information included in the received PPDU. A basic NAV may be configured since STA 3 has classified the received PPDU as the inter-BSS PPDU.

STA 4 may receive a PPDU transmitted by STA 1, and may classify a BSS for the corresponding PPDU. In addition, STA 4 and STA 1 belong to BSS B and BSS A, respectively, the PPDU received by STA 4 may be classified as an inter-BSS PPDU. In addition, a signal strength of the PPDU received by STA 4 may have a value smaller than a threshold. Accordingly, the PPDU received by STA 4 has been classified as the inter-BSS PPDU and the signal strength of the PPDU received by STA 4 has a value smaller than the threshold, STA 4 may perform a spatial reuse operation. Accordingly, STA 4 may perform channel access and a backoff procedure, and may start transmission. For example, STA 4 may start transmission at a time point by which the PPDU transmitted by STA 1 has not yet ended.

Figure 14:
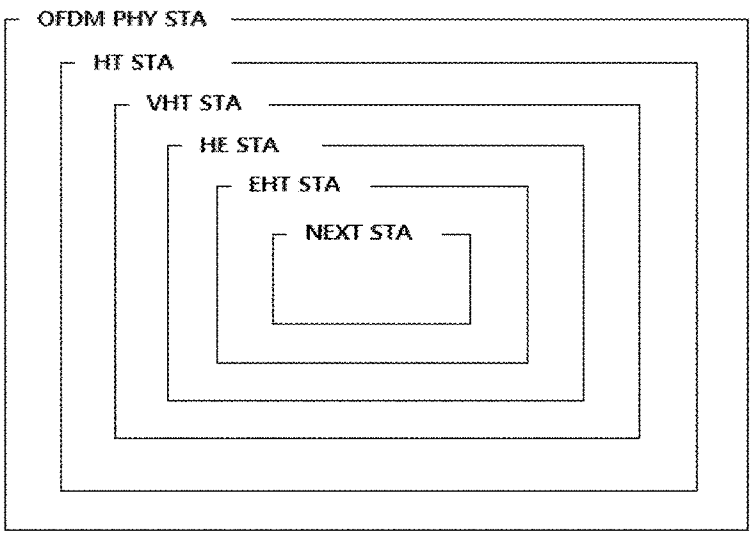
FIG. 14 illustrates a wireless LAN function according to an embodiment of the present invention.

FIG. 14 illustrates a wireless LAN function according to an embodiment of the present invention.

Referring to FIG. 14, a wireless LAN in one standard may include a function of a wireless LAN in another standard. Alternatively, a wireless LAN in one standard may also be a wireless LAN in another standard. Here, the wireless LAN may mean an STA. In addition, here, the wireless LAN may mean an MLD including the STA. For example, the wireless LAN standard may include a standard function of the previous generation and may include an additional function. For example, an HT STA may also be an OFDM PHY STA. In addition, the HT STA may perform an additional function as well as a function of the OFDM PHY STA. For example, a VHT STA may also be the HT STA. In addition, the VHT STA may also perform an additional function as well as a function of the HT STA. For example, a HE STA may also be the VHT STA. In addition, the HE STA may also perform an additional function as well as a function of the VHT STA. In addition, an ETH STA may also be the HE STA. In addition, the ETH STA may also perform an additional function as well as a function of the HE STA. In addition, there may be standards after the EHT standard. In the present invention, the standard after the EHT standard may be referred to as a NEXT standard, and an STA following the NEXT standard may be referred to as a NEXT STA. The NEXT STA may also be the EHT STA. In addition, the NEXT STA may also perform an additional function as well as a function of the EHT STA.

FIG. 14 is a diagram illustrating a relationship among STAs of the respective standards. Referring to FIG. 14, in a case of the EHT STA, the STA may be the HE STA, the VHT STA, the HT STA, and the OFDM PHY STA. In addition, in a case of the NEXT STA, the STA may be the EHT STA, the HE STA, the VHT STA, the HT STA, and the OFDM PHY STA.

Figure 15:
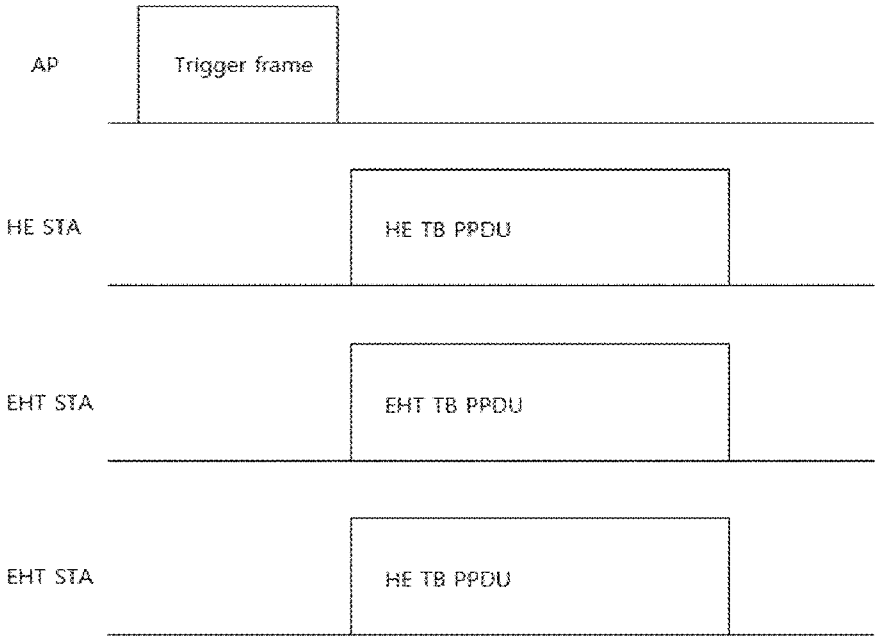
FIG. 15 illustrates an uplink (UL) multi-user (MU) operation according to an embodiment of the present invention.

FIG. 15 illustrates an uplink (UL) multi-user (MU) operation according to an embodiment of the present invention.

Referring to FIG. 15, an AP may indicate PPDU transmission to at least one STA through a specific frame (for example, a triggering frame), and the at least one STA may simultaneously transmit PPDUs having the same format or different formats on the basis of the specific frame transmitted from the AP.

Specifically, as described in FIG. 15, a frame indicating (soliciting) or triggering multi-user (MU) transmission may be transmitted, and one or more STAs may respond to the frame or transmission on the basis of the frame. In this case, when the one or more STAs transmit a response to the frame, the one or more STAs may simultaneously transmit immediate responses on the basis of the frame, and the response to the frame may start to be transmitted after an SIFS from the end of a PPDU including the frame. For example, when the frame indicates an immediate response, the one or more STAs may transmit immediate response to the frame. The frame indicating or triggering transmission to the one or more STAs may be a trigger frame or a frame including, in a MAC header, information indicating that uplink transmission is indicated or triggered to the one or more STAs. In this case, the frame may include, in the MAC header, information (for example, a TRS control subfield) triggering or indicating the uplink transmission to one STA only.

For example, the information indicating or triggering the uplink information, included in the MAC header, may be an HT control field, a control subfield, or triggered response scheduled (TRS) or a TRS control subfield included in an A-control subfield.

The frame for indicating or triggering the uplink transmission may be transmitted by the AP, and when the frame for indicating or triggering the uplink transmission corresponds to a trigger frame, a response to the frame may be transmitted through a triggered-based PPDU (TB PPDU) format. In this case, the TB PPDU may include a NEXT TB PPDU which can be defined in the next standard, as well as the HE TB PPDU and the EHT TB PPDU, which are described above.

The HE TB PPDU may include a preamble, data, and packet extension (PE), and the preamble may include an L-STF, an L-LTF, an L-SIG, an RL-SIG, a HE-SIG-A, a HE-STF, and a HE-LTF in order.

Each of the EHT TB PPDU and the NEXT TB PPDU may also include a preamble, data, PE, and the like, and the preamble of each of the EHT TB PPDU and the NEXT TB PPDU may include an L-STF, an L-LTF, an L-SIG, an RL-SIG, a U-SIG, an (EHT-/NEXT-) STF, an (EHT-/NEXT-) LTF in order.

The frame indicating or triggering a PPDU to one or more STAs may include information required for the one or more STAs to transmit TB PPDUs. For example, when a type subfield included in a frame is "01" (B3 and B2), and a subtype subfield is "0010" (B7, B6, B5, and B4), the frame including the type subfield and the subtype subfield may be a trigger frame corresponding to a control frame.

If a response to a TB PPDU is indicated or triggered to multiple STAs and formats of PPDUs responded by the multiple STAs are different, a problem that it is difficult for the AP indicated or triggered the response to receive a PPDU corresponding to a response transmitted from the multiple STAs may occur. Alternatively, information pieces included in preambles of PPDUs responded by the multiple STAs are different according to the format, a problem that it is difficult for the AP indicated or triggered the response to receive a PPDU corresponding to a response transmitted from the multiple STAs may occur.

Accordingly, to solve this problem, when the multiple STAs respond to the frame of the AP, the format of the responded PPDU and/or types of information pieces included the preamble of the PPDU may be configured to be identical. For example, when the multiple STAs transmit HE TB PPDUs as a response to the frame of the AP, the AP transfers information so that information pieces included in the L-STF, L-LTF, the L-SIG, the RL-SIG, and the HE-SIG-A are identical or an agreement on the information included in the HE TB PPDU may be made, so that the AP can successfully receive the preambles transmitted by the multiple STAs. However, when the HE TB PPDU, the EHT TB PPDU, and the NEXT TB PPDU are simultaneously transmitted through an overlapping subband, the respective TB PPDU formats are different, and thus a problem that it is difficult for the AP to receive the same may occur.

According to an embodiment of the present invention, a HE STA may transmit a HE TB PPDU. In addition, an EHT STA may transmit the EHT TB PPDU or the HE TB PPDU. In addition, a NEXT STA may transmit the NEXT TB PPDU, the EHT TB PPDU, or the HE TB PPDU. This is because an STA in a certain standard may include a function of the previous standard, as described above.

As shown in FIG. 15, when the AP transmits a frame for scheduling transmission of a TB PPDU to the HE STA or the EHT STA and indicates or triggers transmission of the TB PPDU through the frame, there may be no accurate indication or protocol for the format of the TB PPDU. In this case, the HE STA may transmit the HE TB PPDU as a response to the frame, and the EHT STA may respond with the EHT TB PPDU or the HE TB PPDU. In this case, it may be difficult for the AP to receive the TB PPDUs transmitted by the STAs, and there may be a problem in that a medium is occupied and transmission opportunities of other STAs are thus reduced even though the AP has failed to successfully receive the TB PPDUs from the multiple STAs and the transmission has failed to be successfully performed.

Hereinafter, in the present invention, indicating to the STA may mean indicating a response from the STA, and the triggering and the indicating may be used in the same meaning.

In addition, the HE trigger frame, the EHT trigger frame, and the NEXT trigger frame may be trigger frames defined in the HE, EHT, and NEXT standards, respectively. In addition, in the present invention, the HE TRS, the EHT TRS, and the NEXT TRS may be TRSs defined in the HE, EHT, and NEXT standards, respectively.

Figure 16:
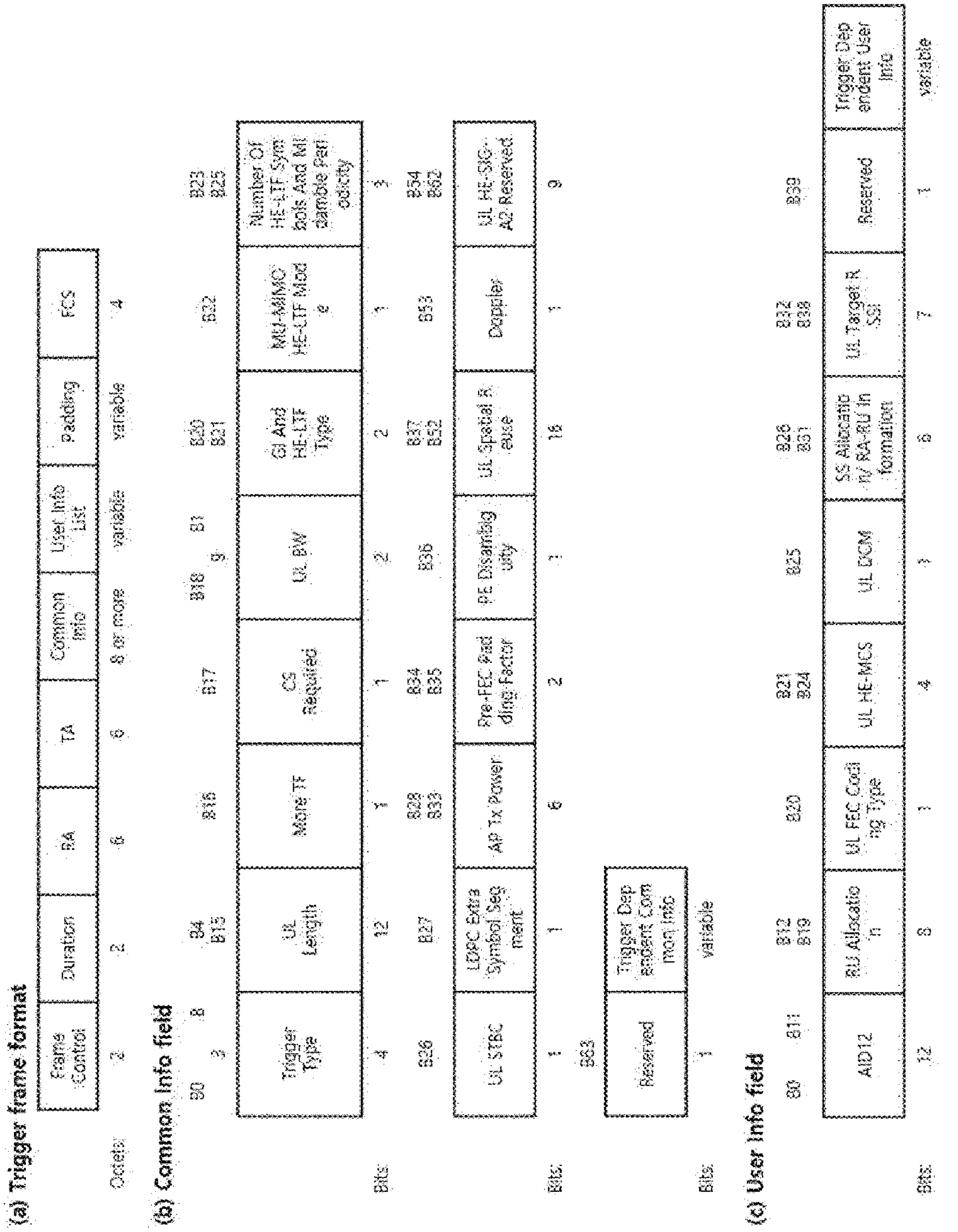
FIG. 16 illustrates a trigger frame format according to an embodiment of the present invention.

FIG. 16 illustrates a format of a trigger frame according to an embodiment of the present invention.

FIG. 16A illustrates a format of a trigger frame, and FIG. 16B and FIG. 16C illustrate a common information (info) field and a user info field included a trigger frame, respectively.

Referring to FIG. 16A, as a trigger MAC header, a frame may include a frame control field, a duration field, and an address field, and may include a common info field and a user info list field. The address field may include a resource allocation (RA) field and a transmitter address (TA) field.

The common info field may include information commonly applied to all STAs indicated by the trigger frame. FIG. 16B illustrates an example of the common info field.

The user info list field may include zero or more user info fields, and the user info list field of a trigger frame remaining after excluding a specific type of a trigger frame may include one or more user info fields. FIG. 16C illustrates an example of the user info field.

The trigger frame may further include a padding field and a frame check sequence (FCS) field. The padding field may be used to increase the length of a frame to secure a time required for an STA receiving the trigger frame to prepare a response to the trigger frame, and may be selectively included in the trigger frame.

Referring to FIG. 16B, the common info field may include a trigger type subfield. The trigger type subfield may be used to identify a trigger frame variant. Alternatively, the type of the trigger frame may be indicated on the basis of a value of the trigger frame subfield. In addition, the length and information included in the trigger dependent common info subfield and the trigger dependent user info subfield, illustrated in FIG. 16, may be determined on the basis of the trigger type subfield. For example, the trigger type subfield may be indicated through B0 to B3 bits of the common info field.

The common info field may include an uplink (UL) length subfield. The UL length subfield may include information on the length of a TB PPDU corresponding to a response to the trigger frame, and may include information on the length of a frame responding to the trigger frame. In addition, the UL length subfield may indicate a value to be included in an L-SIG length subfield of a TB PPDU responding to the trigger frame. Accordingly, an STA receiving the trigger frame and responding with the TB PPDU may configure a value of the length subfield included in the L-SIG of the TB PPDU on the basis of the value of the UL length subfield included in the received trigger frame. Specifically, the STA responding with the TB PPDU may configure the length subfield included in the L-SIG of the TB PPDU as a value of the UL length subfield included in the received trigger frame. For example, the STA may configure the length subfield included in the L-SIG of the TB PPDU and transmit the TB PPDU on the basis of the values of B4 to B15 bits of the common info field indicating the UL length subfield.

In addition, the common info field may further include an uplink bandwidth (BW) subfield. The UL BW subfield may indicate a BW value included in a signaling field (for example, a HE-SIG-A, a U-SIG, or the like) of a TB PPDU responding to the trigger frame, and may indicate a maximum BW of the TB PPDU transmitted as a response to the trigger frame. Accordingly, an STA may configure a BW value included in the signaling field of the TB PPDU on the basis of a value of the UL BW subfield included in the trigger frame.

In addition, the common info field may further include information, etc. to be included in the signal field of the TB PPDU corresponding to a response to the trigger frame. Accordingly, after receiving the trigger frame, the STA may configure information pieces included in the TB PPDU on the basis of information pieces included in the trigger frame.

Referring to FIG. 16C, the user info field may include an AID12 subfield. The AID12 subfield may be used to indicate a function of the user info field or an intended receiver of the user info field including the AID12 subfield. Accordingly, the AID12 subfield may play a role of indicating the function of the trigger frame or the intended receiver of the trigger frame including the AID12 subfield. For example, when the value of the AID12 subfield corresponds to a preconfigured value, the user info field may indicate a random access resource unit (RA-RU). That is, the preconfigured value of the AID12 subfield may indicate that the user info field indicates the RA-RU. Specifically, when the value of the AID12 subfield is “0”, the user info field may indicate the RA-RU for associated STAs. For example, when the value of the AID12 subfield is “0”, the user info field may indicate the RA-RU for the associated STA, and when the value of the AID12 subfield is “2045”, the user info field may indicate the RA-RU for unassociated STAs. For an STA corresponding to an STA ID (for example, an association ID (AID)) indicated by the value of the AID12 subfield, a response may be indicated by the user info field including the AID12 subfield or the trigger frame including the AID subfield. For example, the AID12 subfield may indicate the AID or 12 LSBs of the AID. The STA corresponding to the value indicated by the AID12 subfield may transmit the TB PPDU as a response to the received trigger frame. In this case, the value of the AID12 subfield may be in the range of “1” to “2007” (including 1 and 2007) and the AID12 subfield corresponds to a preconfigured value (for example, “2046”, etc.), the RU corresponding to the preconfigured value of the AID12 subfield may not be allocated to any STAs. In addition, when the AID subfield corresponds to a preconfigured value (for example, “4095”, etc.), the preconfigured value may indicate that padding of the trigger frame starts.

Information of the user info field including the AID12 subfield may be information corresponding to STAs indicating the AID12 subfield. For example, a resource unit (RU) allocation subfield may indicate the size, the location, etc. of an RU. In this case, the value of the RU allocation subfield of the user info field including the AID12 subfield may be information corresponding to the STA indicated by the AID12 subfield. That is, the RU indicated by the RU allocation subfield of the AID12 subfield may be an RU allocated to the STA indicated by the AID12 subfield.

In addition, the user info field may indicate a coding method (UL FEC coding type) for generation of a TB PPDU transmitted as a response to the trigger frame, a modulation method (UL HE-MCS and UL DCM), and power (UL target RSSI), etc.

FIG. 17 illustrates a method for indicating a triggered-based (TB) PPDU according to an embodiment of the present invention.

Referring to FIG. 17, one STA may selectively transmit PPDUs having different formats on the basis that the indication is made by a trigger frame indicating PPDU transmission.

Specifically, an EHT STA may selectively transmit an EHT TB PPDU as well as a legacy PPDU (for example, a HE TB PPDU), and a NEXT STA may selectively transmit a HE TB PPDU, an EHT TB PPDU, and/or a NEXT TB PPDU. In this case, STAs to which several standards are applied, respectively, may be individually scheduled by one frame or one PPDU. In the wireless LAN, STAs to which multiple standards are applied use a common resource together, such a method may be advantageous. For example, a HE STA (a HE STA other than an EHT STA) and an EHT STA may respond with the HE TB PPDU through one frame. That is, a non-AP STA may transmit a triggering frame and indicate transmission of a HE TB PPDU to the EHT STA as well as the HE STA.

In addition, information for selecting a TB PPDU format may be included in a trigger frame corresponding to a triggering frame, a TRS, a PPDU including the trigger frame, or a PPDU including a TRS control subfield. That is, an AP STA may transmit, to at least one non-AP STA, the triggering frame including the information for selecting the TB PPDU format, and a non-AP STA may select a format of a PPDU to be responded, on the basis of the information included in the transmitted triggering frame. Thereafter, at least one non-AP STA may transmit a PPDU to the AP on the basis of the selected format.

Information on the format (TB PPDU format) of the PPDU corresponding to a response to the triggering frame may be present in a MAC level, and a trigger frame corresponding to one of the triggering frames may be classified into a HE trigger frame, an EHT trigger frame, and a NEXT trigger frame, and a response to each trigger frame may be classified into a HE TB PPDU, an EHT TB PPDU, and a NEXT TB PPDU.

In addition, classifying the trigger frame into the HE trigger frame, the EHT trigger frame, and the NEXT trigger frame may mean that the format of the TB PPDU corresponding to a response to the trigger frame is classified into the HE TB PPDU, the EHT TB PPDU, and the NEXT TB PPDU.

Whether the format of the trigger frame for classifying the TB PPDU is the HE trigger frame, the EHT trigger frame, or the NEXT trigger frame may be identified on the basis of a frame control field included in a MAC header. Specifically, the format of the trigger frame may be classified on the basis of a type subfield, a subtype subfield, and/or a control frame extension subfield. In addition, when a value of the type subfield, the subtype subfield, and/or the control frame extension subfield is a preconfigured value, the trigger frame may be identified as a HE trigger frame, and when a value is another preconfigured value, the trigger frame may be identified as an EHT trigger frame. In addition, when the value of the type subfield, the subtype subfield, and/or the control frame extension subfield is another preconfigure value, the trigger frame may be identified as a NEXT trigger frame.

For example, when the type subfield is 01 (B3 and B2) and the subtype subfield is 0010 (B7, B6, B5, and B4), the formats of the frame including the type subfield and the subtype subfield may be the HE trigger frame. In this case, entries of a type subfield (2 bits), a subtype subfield (4 bits), and/or a control frame extension subfield (4 bits), to which limited bits are allocated, may need to be additionally used in the EHT standard and the NEXT standard.

Alternatively, whether the format of the trigger frame is a HE trigger frame or an EHT trigger frame may be identified on the basis of a common info field included in the trigger frame. That is, the format of a PPDU to be transmitted as a response to the trigger frame may be determined on the basis of a value of a specific subfield (first subfield) included in the common info field. For example, the non-AP STA may select the HE TB PPDU or the EHT PPDU according to a value of the common info field to transmit the same through an allocated RU. In this case, a specific subfield (second subfield) of the user info field as well as the common info field may be additionally used to identify the format of the PPDU.

That is, a variant for determining the format of the PPDU corresponding to a response to the trigger frame may be determined on the basis of the common info field of the trigger frame, and the format of the PPDU may be determined according to the determined variant. For example, when the variant for determining the format of the PPDU is determined as the HE variant by the common info field, the non-AP STA may respond with the HE TB PPDU, and when the variant for determining the format of the PPDU is determined as the EHT variant by the common info field, the non-AP STA may respond with the EHT TB PPDU.

In this case, for the variant for determining the format of the PPDU, the user info field as well as the common info field may be additionally used.

For example, whether the trigger frame is the HE trigger frame, the EHT trigger frame, or the NEXT trigger frame may be identified on the basis of the trigger type subfield. For example, when the value of the trigger type subfield is a preconfigured value, the trigger frame may be the HE trigger frame. In addition, when the value of the trigger type subfield is a preconfigured value, the trigger frame may be the EHT trigger frame. When the value of the trigger type subfield is a preconfigured value, the trigger frame may be the NEXT trigger frame.

For example, when the value of the trigger type subfield is one of 0 to 7, the trigger frame may be the HE trigger frame, and when the value is not one of 0 to 7, the trigger frame may be the EHT trigger frame or the NEXT trigger frame. The trigger type subfield indicates various types of trigger frames, but in this case, it may be disadvantageous in that limited trigger type subfield spaces need to be used.

According to another embodiment, whether the trigger frame is the HE trigger frame, the EHT trigger frame, or the NEXT trigger frame may be identified on the basis of a UL length subfield of the trigger frame. For example, whether the trigger frame is the HE trigger frame, the EHT trigger frame, or the NEXT trigger may be identified on the basis of a value obtained by applying mod (remainder) calculation to the UL length subfield value. That is, whether the format of the PPDU to be transmitted as a response to the trigger frame is the HE PPDU or the EHT PPDU may be determined by using the value of the UL length subfield.

More specifically, whether the trigger frame is the HE trigger frame, the EHT trigger frame, or the NEXT trigger frame may be identified on the basis of a value obtained by applying mod (remainder) 3 calculation to the UL length subfield value. For example, when a result obtained by applying mod 3 to the UL length subfield value is not 0, the trigger frame may be the HE trigger frame. Alternatively, when a result obtained by applying mod 3 to the UL length subfield value is 1, the trigger frame may be the HE trigger frame. Alternatively, when a result obtained by applying mod 3 to the UL length subfield value is 0, the trigger frame may not be the HE trigger frame. Alternatively, when a result obtained by applying mod 3 to the UL length subfield value is 0, the trigger frame may be the EHT trigger frame or the NEXT trigger frame.

That is, when a value obtained by applying mod 3 to the UL length subfield value of the trigger frame is not 0, a response to the trigger frame may be transmitted to as the HE TB PPDU, and when a value obtained by applying mode 3 to the UL length subfield value is 1, a response to the trigger frame may be transmitted as the HE TB PPDU.

In addition, when a value obtained by applying mod 3 to the UL length subfield value of the trigger frame is 0, the format to be transmitted as a response to the trigger frame may be the EHT TB PPDU.

In addition, whether the trigger frame is the HE trigger frame, the EHT trigger frame, or the NEXT trigger frame may be identified by using an additional trigger frame classification method together with the method above. For example, by also using the classification method described in FIG. 16, whether the trigger frame is the HE trigger frame, the EHT trigger frame, or the NEXT trigger frame may be identified.

According to an embodiment, whether the format of the trigger frame is the HE trigger frame, the EHT trigger frame, or the NEXT trigger frame may be identified on the basis of the user info field of the trigger frame.

That is, similar to the common info field described above, whether the format of the trigger frame is the HE trigger frame or the EHT trigger frame may be identified on the basis of the user info field included in the trigger frame. That is, the format of the PPDU to be transmitted as a response to the trigger frame may be determined on the basis of the value of the specific subfield (second subfield) included in the user info field. For example, the non-AP STA may select the HE TB PPDU or the EHT TB PPDU according to a value of the user info field and transmit the same through an allocated RU. In this case, a specific subfield (first subfield) of the common info field as well as the user info field may be additionally used to identify the format of the PPDU.

That is, a variant for determining the format of the PPDU corresponding to a response to the trigger frame may be determined on the basis of the user info field of the trigger frame, and the format of the PPDU may be determined according to the determined variant. For example, when the variant for determining the format of the PPDU is determined as the HE variant by the user info field, the non-AP STA may respond with the HE TB PPDU, and when the variant for determining the format of the PPDU is determined by the user info field, the non-AP STA may respond with the EHT TB PPDU.

In this case, for the variant for determining the format of the PPDU, the common info field may be additionally used as well as the user info field.

For example, whether the trigger frame is the HE trigger frame, the EHT trigger frame, or the NEXT trigger frame may be identified on the basis of the AID12 subfield. According to an embodiment, the trigger frame may be identified as the HE trigger frame, the EHT trigger frame, or the NEXT trigger frame according to whether an AID12 subfield having a preconfigured value is included. In addition, in this case, there may be a problem in that an STA indicated by a user info field needs to keep checking an AID12 subfield existing after the user info field to determine the trigger frame format. To solve this problem, the user info field including the AID12 subfield indicating the type of the trigger frame may be present in the front part of the user info list. In addition, in order to prevent the HE STA, which cannot understand such a signaling method, from malfunctioning, the user info field including the AID12 subfield indicating the type of the trigger frame may be present after the user info fields corresponding to the HE STA.

In addition, in this case, the information of other subfield remaining after excluding the AID12 subfield included in the user info field may not be needed for a TB PPDU response, and thus subfields of the user info field including the AID12 subfield indicating the type of the trigger frame may be omitted. That is, the length of the user info field may vary on the basis of the AID12 subfield. Referring to FIG. 15, the AID12 subfield may play a role of indicating the TB PPDU format. For example, when the AID12 subfield is a preconfigured value, a response to the trigger frame including the AID12 subfield configured as the preconfigured value may be an EHT TB PPDU. For example, when the value of the AID12 subfield value is 2047, a response to the trigger frame including the AID12 subfield may be the EHT TB PPDU. In addition, when the AID12 subfield is a preconfigured value, a response to the trigger frame including the AID12 subfield configured as the preconfigured value may be a NEXT TB PPDU. For example, when the AID12 subfield value is 2048, a response to the trigger frame including the AID12 subfield may be the NEXT TB PPDU.

According to another embodiment, when a response is made on the basis of a user info field existing at a preconfigured location from an AID12 subfield having a preconfigured value, the response may be made in a TB PPDU format corresponding to the preconfigured value. For example, when the response is made on the basis of the user info field existing after the AID12 subfield having a preconfigured value, the response may be made in a TB PPDU format corresponding to the preconfigured value. If there are multiple values indicating the TB PPDU format and a response is made on the basis of a user info field existing after both predetermined value 1 and predetermined value 2, the response may be made in a TB PPDU format having a preconfigured priority, among a TB PPDU format corresponding to preconfigured value 1 and a TB PPDU format corresponding to preconfigured value 2. Referring to FIG. 17, when a response is made on the basis of a user info field existing after an AID12 subfield configured as 2047, the response may be made in an EHT TB PPDU. In addition, when a response is made on the basis of a user info field existing after an AID12 subfield configured as 2048, the response may be made in a NEXT TB PPDU. In addition, when a response is made on the basis of a user info field existing after both the AID12 subfield configured as 2047 and the AID12 subfield configured as 2048, the response may be made in a NEXT TB PPDU. In addition, when a response is made on the basis of a user info field existing before both the AID12 subfield configured as 2047 and the AID12 subfield configured as 2048, the response may be made in a HE TB PPDU.

In the present invention, an example in which an AID12 subfield indicates the type of a trigger frame, but the present invention is not limited thereto, and the type of the trigger frame may be indicated by other subfields of the user info field.

According to an embodiment, whether the trigger frame is the HE trigger frame, the EHT trigger frame, or the NEXT trigger frame may be identified on the basis of a padding field of the trigger frame. For example, whether the trigger frame is the HE trigger frame, the EHT trigger frame, or the NEXT trigger frame may be identified according to whether the padding field includes a preconfigured value indicating whether the trigger frame is the HE trigger frame, the EHT trigger frame, or the NEXT trigger frame.

According to an embodiment of the present invention, whether the trigger frame is the HE trigger frame, the EHT trigger frame, or the NEXT trigger frame may be identified by combining a method for classifying multiple trigger frames, described in the present invention. In addition, in the present invention, a description of the trigger frame is not limited thereto, and may be also applied to the TRS.

As another embodiment of the present invention, a frame of an AP may not able to indicate transmission of both the EHT PPDU and the HE PPDU through the triggering frame. That is, an EHT AP cannot transmit a trigger frame indicating both the HE TB PPDU and the EHT TB PPDU, and can indicate one PPDU format only.

Figure 18:
FIG. 18 illustrates an example of a UL MU operation according to an embodiment of the present invention.

FIG. 18 illustrates a UL MU operation according to another embodiment of the present invention.

As described above, transmission of a TB PPDU may be indicated through a TRS as well as a trigger frame. In addition, as described above, the TRS may be included in an HT control field. For example, when the HT control field includes an A-control field, the HT control field may include the TRS. The TRS may be transferred by the TRS control subfield. The A-control field may have a form in which control list fields can be consecutively connected. In addition, the control list field may include the TRS.

In addition, an intended receiver of a frame including the TRS may respond to the TRS. For example, an STA corresponding to an RA included in the frame including the TRS may respond to the TRS. The TRS may include information (UL data symbols) on the length of a frame or PPDU responding to the TRS, the location and size (RU allocation) of an RU to be used when responding to the TRS, information (AP Tx power and UL target RSSI) relating to power when responding to the TRS, information (UL HE-MCS) relating to a modulation method when responding to the TRS, and the like.

An embodiment of FIG. 18 may be a method for solving the problems described in FIGS. 14 to 15. In addition, as described above, an embodiment of the trigger frame may be also applied to the TRS. In addition, the details described above may be omitted.

According to an embodiment of the present invention, there may be a TRS (EHT TRS and NEXT TRS) defined in the EHT standard and the NEXT standard other than a TRS (HE TRS) defined in the HE standard. Accordingly, a TB PPDU responding to the TRS may be a HE TB PPDU, an EHT TB PPDU, and a NEXT TB PPDU according to whether the indicated TRS is the HE TRS, the EHT TRS, and the NEXT TRS. For example, a standard in which the TRS is defined may be determined through a control ID subfield of the A-control subfield. As an additional embodiment, the TRS may be divided into a HE TRS and a TRS other than the HE TRS.

Alternatively, for example, a standard in which the TRS is defined may be determined according to whether the HT control field is a HE variant, an EHT variant, or a NEXT variant. In addition, whether the HT control field is the HE variant, the EHT variant, or the NEXT variant may be determined according to a value of a preconfigured bit of the HT control field. For example, when B0 and B1 of the HT control field correspond to 1 and 1, the HT control field may be the HE variant. In addition, whether the HT control field is the HE variant, the EHT variant, or the NEXT variant may be determined by using an additional bit (for example, B31) and B0 and B1 of the HT control field.

According to an embodiment of the present invention, a TB PPDU format responding to the TRS may be determined on the basis of a PPDU format including the TRS. That is, when the PPDU indicating the PPDU transmission includes a TRS control subfield, the format of the PPDU may be determined on the basis of the format of the PPDU including the TRS control subfield. For example, when the format of the PPDU including the TRS control subfield is a HE PPDU, the format of the indicated PPDU may be the HE PPDU. However, when the format of the PPDU including the TRS control subfield is an EHT PPDU, the format of the indicated PPDU may be the EHT PPDU.

Referring to FIG. 18, when the TRS is transferred through the HE PPDU, the TB PPDU responding to the TRS may be the HE TB PPDU. In addition, when the TRS is transferred through the EHT PPDU, the TB PPDU responding to the TRS may be the EHT TB PPDU. In addition, when the TRS is transferred through the NEXT PPDU, the TB PPDU responding to the TRS may be the NEXT TB PPDU.

According to an embodiment of the present invention, interpretation on the subfield included in the TRS may vary on the basis of the PPDU format included in the TRS. For example, when the TRS is included in the HE PPDU, a UL HE-MCS subfield (or a subfield of an MCS) included in the TRS may indicate a value corresponding to a HE MCS table. When the TRS is included in the EHT PPDU, the UL HE-MCS subfield (or the subfield of the MCS) included in the TRS may indicate a value corresponding to an EHT MCS table. When the TRS is included in the NEXT PPDU, the UL HE-MCS subfield (or the subfield of the MCS) included in the TRS may indicate a value corresponding to a NEXT MCS table. In addition, interpretation on the RU allocation subfield may also vary on the basis of the PPDU format included in the TRS.

Figure 19:
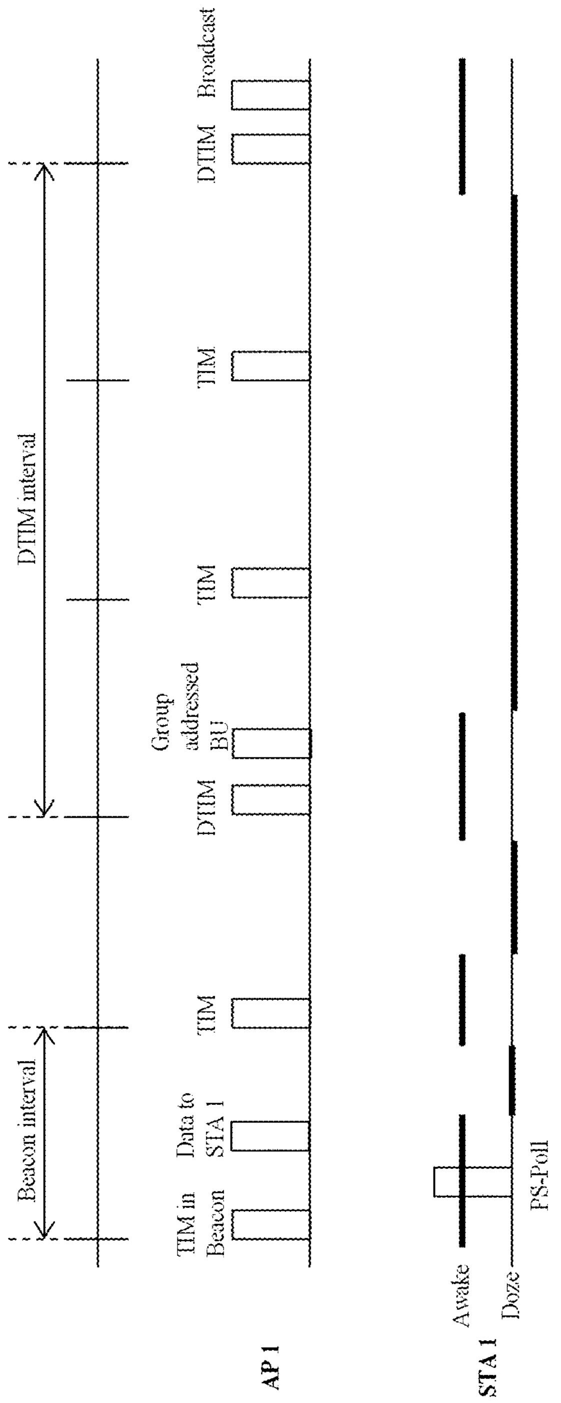
FIG. 19 illustrates a power management operation performed by a station according to an embodiment of the disclosure.

FIG. 19 illustrates a power management operation performed by a station according to an embodiment of the disclosure.

According to an embodiment of the disclosure, a station may operate in a power save (PS) mode. In this case, a station operating in the power save mode may switch between an awake state and doze state. In the awake state, the station operates with full power. In addition, in the wake state, the station may perform transmission and reception. In the doze state, the station may be restricted from performing transmission and reception. In the power save mode, when the frame to be transmitted is buffered in the station, the station may switch to the awake state and operate in the doze state in other cases. In the power save mode, the station may frequently move between the awake state and the doze state. In an active mode, the station always maintains a state capable of performing transmission and reception. That is, in the active mode, the station may always operate in the awake state.

In this way, when the station operates in the power save mode, the station in the doze state may not be able to perform reception. Accordingly, the AP may perform transmission by signaling to the station that the traffic to be transmitted is buffered and receiving a response thereto from the station. For convenience of description, the signaling that the traffic to be transmitted to the station by the AP is buffered is referred to as traffic indication. In addition, signaling for traffic indication is referred to as traffic indication signaling. The traffic indication between the AP and the station may be performed as follows. In the specification, the traffic may include any one of a frame, a BU, an MSDU, and an MPDU.

When traffic to be transmitted by an AP to a station is buffered, the AP may transmit a traffic indication signaling indicating that the traffic to be transmitted to the station is buffered. In the specification, the traffic indication signaling may indicate that traffic is buffered, and may not be limited to traffic for a specific station depending on the context. The traffic indication signaling may include at least one of a traffic indication map (TIM) element and a multi-link traffic element. The traffic indication signaling may be in a bitmap format. Specifically, the traffic indication signaling may indicate whether traffic corresponding to each bit of the bitmap is buffered in an AP transmitting the bitmap. In addition, the traffic indication signaling may indicate the recipient of the buffered traffic. For example, the traffic indication signaling may indicate that the buffered traffic corresponds to at least one of group addressed traffic, group cast traffic, broadcast traffic, and individually addressed traffic. The bitmap may signal which group the traffic corresponds to or which station the traffic corresponds to, based on the position of the bit in the bitmap. The station may determine whether traffic corresponding to the group including the station is buffered in the AP or whether traffic for the station is buffered in the AP based on the position of the bit of the bitmap.

Traffic indication signaling may be transmitted based on a predesignated time point. Accordingly, a station in the doze state may switch from the doze state to the awake state based on the time point at which the traffic indication signaling is transmitted. The traffic indication signaling may be included in a beacon frame. In addition, the traffic indication signaling may be included in a TIM frame. In addition, the AP may transmit the traffic indication signaling periodically. Specifically, the AP may transmit traffic indication signaling based on a target beacon transmission time (TBTT). However, when a channel is not idle (busy) in the TBTT, the AP may transmit traffic indication signaling later than the TBTT. The station may receive traffic indication signaling by maintaining an awake state in the TBTT. A beacon frame including traffic indication signaling may not be accurately transmitted to the TBTT. Accordingly, the station may maintain an awake state for a certain period of time including the TBTT time.

In the embodiments described above, it has been described that the traffic instruction signaling is transmitted by the AP and received by the station. In this case, the station may be a non-AP station. In addition, the AP may be included in the AP multi-link device, and the non-AP station may be included in the non-AP multi-link device. In addition, the traffic described above may refer to a bufferable unit (BU) or a buffered unit (BU).

The AP may transmit a delivery TIM (DTIM) before transmitting group address traffic or broadcast traffic. DTIM is a type of TIM that indicates whether group address traffic and broadcast traffic have been buffered in the AP. A beacon frame including the DTIM may be referred to as a DTIM beacon frame. When the DTIM received by the station indicates that group traffic for a group including the station is to be transmitted, the station may transmit a signaling to the AP indicating that station will receive the group traffic.

The station that has received the traffic indication signaling may transmit a signaling that retrieves transmission to the station. In this case, the signal that retrieves transmission to the station may be at least one of a PS-Poll frame or a U-APSD trigger frame. The AP that has received the signaling that retrieves transmission to the station transmits buffered traffic to the station.

In FIG. 19, a first AP (AP1) includes a TIM in a beacon frame and transmits the beacon frame every TBTT. The TIM transmitted by the first AP (AP1) indicates that traffic for a first station (STA1) is buffered. The first station (STA1) transmits a PS-Poll frame and remains in an awake state to receive traffic. The first AP (AP1) transmits the buffered traffic (data) to the first station (STA1). The first station (STA1) may receive the buffered traffic and enter the doze state. In addition, the first station (STA1) may remain in an awake state when transmitting the next TIM.

In addition, in FIG. 19, the first AP (AP1) transmits DTIM every three beacon frames. Therefore, a DTIM interval is three beacon frames. In this case, the first station STA1 operating in the power save mode maintains an awake state whenever a TIM is transmitted. The first AP (AP1) transmits broadcast traffic or group address traffic after transmitting the DTIM beacon. When the DTIM indicates that the broadcast traffic or group address traffic to be received by the first station (STA1) is buffered, the first station (STA1) maintains an awake state to receive the broadcast traffic or group address traffic. Through this, the first station (STA1) may stably receive the broadcast traffic or group address traffic even in the power save mode. A format of a TIM element that may be included in traffic indication signaling is described with reference to FIG. 20.

Figure 20:
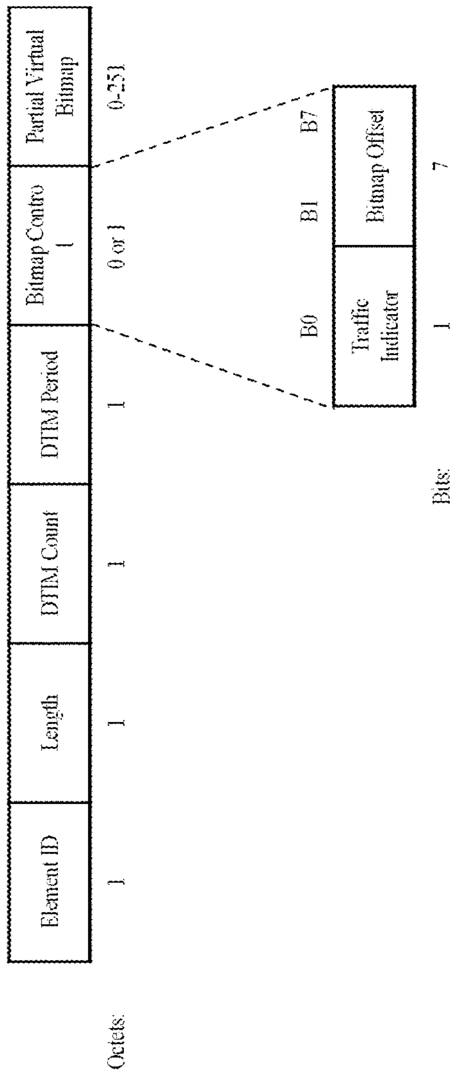
FIG. 20 illustrates a format of a TIM element according to an embodiment of the disclosure.

FIG. 20 illustrates a format of a TIM element according to an embodiment of the disclosure.

The TIM element includes the TIM described above. The TIM element may include at least one of an element ID subfield, a length subfield, a DTIM count subfield, a DTIM period subfield, a bitmap control subfield, and a partial virtual bitmap subfield. The length of the element ID subfield, the length subfield, the DTIM count subfield, the DTIM period subfield, and the bitmap control subfield is 1 octet, i.e., 8 bits. The partial virtual bitmap subfield may have a variable length within a maximum of 251 octets. The length of the partial virtual bitmap subfield may be determined by the bitmap control field or the bitmap offset subfield of the bitmap control field.

The element ID subfield indicates the ID of an element including the Element ID subfield.

The length subfield indicates the length of an element including the length subfield. Specifically, the length subfield may indicate the length of an element excluding the element ID subfield and the length subfield.

The DTIM count subfield indicates how many beacon frames will be transmitted until the next DTIM. Specifically, the value of the DTIM count subfield may indicate how many beacon frames will be transmitted until the next DTIM, including the beacon frame including the DTIM count subfield. For example, when the value of the DTIM count subfield is 0, it may indicate that the DTIM count subfield is included in the DTIM beacon.

The DTIM period subfield indicates the number of beacon frames transmitted between DTIMs. If all TIMs are DTIMs, the value of the DTIM period subfield is configured to 1.

The bitmap control subfield may include a traffic indicator subfield and a bitmap offset subfield. The traffic indicator subfield may be a 1-bit field, and the bitmap offset subfield may be a 7-bit field. The traffic indicator subfield may indicate whether group address traffic is buffered. Specifically, if the group address traffic is buffered, the AP may configure the value of the traffic indicator subfield to 1. The group address traffic may be traffic in which the AID of the receiver is 0. The bitmap offset subfield indicates the starting point of a bit corresponding to the partial virtual bitmap in the traffic indication virtual bitmap. The association ID (AID) corresponding to the partial virtual bitmap is determined according to the bitmap offset subfield.

Each bit of the partial virtual bitmap field indicates whether traffic to be transmitted to the station of the AID corresponding to each bit is buffered in the AP transmitting the TIM. When the value of the bit of the partial virtual bitmap field is 1, it may be indicated that traffic to be transmitted to the station of the AID corresponding to the bit of the Partial virtual bitmap field is buffered in the AP transmitting the TIM. When the value of the bit of the partial virtual bitmap field is 0, it may be indicated that traffic to be transmitted to the station of the AID corresponding to the bit of the Partial virtual bitmap field is not buffered in the AP transmitting the TIM. Accordingly, when the value of the bit of the partial virtual bitmap field is 1, the station receiving the TIM may determine that the traffic to be transmitted to the station of the AID corresponding to the bit in the partial virtual bitmap field is buffered in the AP transmitting the TIM. When the value of the bit of the partial virtual bitmap field is 0, the station receiving the TIM may determine that the traffic to be transmitted to the station of the AID corresponding to the bit in the partial virtual bitmap field is not buffered in the AP transmitting the TIM. In addition, the station receiving the TIM may determine that the traffic to be transmitted to the station of the AID not indicated by the partial virtual bitmap is not buffered in the AP transmitting the TIM.

The TIM element may include a traffic indication virtual bitmap subfield. In this case, the number of a bit in the traffic indication virtual bitmap subfield may indicate the AID of the station corresponding to the bit. Specifically, the bit with a bit number of n in the traffic indication virtual bitmap subfield indicates whether the frame to be transmitted to the station with an AID of n is buffered in the AP transmitting the TIM element. Specifically, if the bit number of the traffic indication virtual bitmap subfield is N, the corresponding bit may indicate whether traffic to be transmitted to the station with an AID of N or a group with a group ID of Nis buffered in the AP transmitting the TIM. The TIM may include a partial virtual bitmap subfield instead of the traffic indication virtual bitmap subfield. The partial virtual bitmap subfield is a subfield in which in which consecutive bits with a value of 0 are omitted from the traffic indication virtual bitmap subfield. The partial virtual bitmap subfield may be a subfield in which the first consecutive bit or the last consecutive bit is omitted from a set of consecutive bits with a value of 0 from the traffic indication virtual bitmap subfield. Specifically, the partial virtual bitmap subfield may be bits from octet number N1 to N2 of the traffic indication virtual bitmap subfield. N1 may be the largest even number where bit numbers 1 through (N1*8−1) are all 0 in the traffic indication virtual bitmap subfield. N2 may be the smallest number where bit numbers (N2+1)*8 through 2,007 are all 0 in the traffic indication virtual bitmap subfield. This may be a method to configure the partial virtual bitmap subfield when multiple BSSID sets are not supported, i.e., when dot11MultiBSSIDImplemented is false. In the specification, bit number n of a bitmap or subfield represents the $n+1^{th}$ bit of the bits of the bitmap or subfield.

When all bits except the bits with bit number 0 in the bits of the traffic indication virtual bitmap subfield are 0, the partial virtual bitmap subfield has a length of 1 octet, and the values of all bits in the partial virtual bitmap subfield may be configured to 0. In this case, the value of the bitmap offset field may be 0, and the value of the length field may be configured to 4.

In addition, when all bits of the traffic indication virtual bitmap subfield are 0 and all bits of the bitmap control subfield are 0, the TIM element may not include the partial virtual bitmap field and the bitmap control field. In this case, the value of the length field may be configured to 2. In this way, when the partial virtual bitmap field exists in the TIM, the bitmap control field may exist.

When multiple BSSID sets are supported, i.e., dot11MultiBSSIDImplemented is true, the method of configuring the partial virtual bitmap subfield may be performed according to the following embodiments. When multiple BSSID sets are used, a management frame transmitted from an AP corresponding to the transmitted BSSID may include information for a BSS corresponding to a nontransmitted BSSID. In this case, the management frame may include at least one of a beacon frame and a probe response frame. The TIM element of the beacon frame transmitted from the transmitted BSSID may indicate whether an AP corresponding to the nontransmitted BSSID included in the multiple BSSID sets including the transmitted BSSID buffers the frame. Considering this, a method of configuring the partial virtual bitmap subfield is described.

When the maximum number of BSSIDs that multiple BSSID sets may have is n, the bits from bitmap number 1 to bitmap number $(2^n-1)$ of the traffic indication virtual bitmap subfield may indicate whether the group address frame is buffered in the AP transmitting the TIM element. In this case, the group address frame may be a frame buffered in the AP corresponding to the nontransmitted BSSID. Accordingly, the group address frame is the group address frame of the AP or BSS corresponding to the nontransmitted BSSID. Each bit from bitmap number 1 to bitmap number $(2^n-1)$ of the traffic indication virtual bitmap subfield may indicate to the AP corresponding to each bit whether the frame is buffered. In this case, a bit whose bit number of the traffic indication virtual bitmap subfield is greater than $(2^n-1)$ indicates whether the frame to be transmitted to the station with an AID of n is buffered in the AP transmitting the TIM element. Accordingly, the AP may not allocate 1 to $2^n-1$ as an AID. In this embodiment, the bit corresponding to the inactive nontransmitted BSSID may be configured as a reserved bit. In this case, the value of the reserved bit may be configured to 0. In addition, the AP may allocate the station's AID from a number greater than or equal to $2^n$. In this case, the AP may allocate the station's AID from values from $2^n$ to 2,007. The EHT AP may not allocate 2,007 as an AID. The range to which the AID may be allocated in this way is referred to as an AID space. The transmitted BSSID and the nontransmitted BSSID may share one AID space. In a specific embodiment, the EHT AP may not allocate 2,007 as the station's AID.

The maximum number n of BSSIDs that multiple BSSID sets may have may be signaled through the multiple BSSID elements. The n may be a value indicated by the MaxBSSID indicator of multiple BSSID elements.

A method of configuring a partial virtual bitmap subfield is described. The method of configuring the partial virtual bitmap subfield may vary depending on the multiple BSSID sets related function of the AP transmitting the TIM element. The non-SIG AP may configure the partial virtual bitmap subfield through method A or method B. In addition, the SIG AP may configure the partial virtual bitmap subfield through method C. The non-HT AP, HT AP, VHT AP, HE AP, and EHT AP may all be non-SIG APs. The SIG AP refers to an AP operating in a frequency band below 1 GHz, and the non-SIG AP refers to an AP operating in a frequency band greater than 1 GHz.

First, method A is explained. The partial virtual bitmap subfield may be composed of bits from octet number 0 to N2 of the traffic indication virtual bitmap. N2 is the smallest number among the numbers that satisfy that all bit values are 0 from bit number (N2+1)*8 to 2,007 in the traffic indication virtual bitmap. If there is no N2 that satisfies this, N2 is 250. In method A, the value of the Bitmap Offset field is 0. In addition, the value of the length field is N2+4.

Method B is explained. The partial virtual bitmap subfield may be composed of bits from octet number 0 to (N0−1) of the traffic indication virtual bitmap and bits from octet number N1 to N2 of the traffic indication virtual bitmap. N0 may be the largest positive integer satisfying ($N0*8-2^n<8$). When N0 is an odd number, N1 may be the largest even number satisfying that N0<N1 and that all bit values from bit number N0*8 to (N1*8−1) are 0. When a value of N1>N0 does not exist, N1 may be N0. In addition, N2 is the smallest positive integer satisfying that all bit values from bit number N2+1)*8 to 2,007 of the traffic indication virtual bitmap are 0. When there is no N2 satisfying this, N2 may be 250. In method B, the value of the bitmap offset field is (N1−N0)/2. In addition, the value of the length field is (N0+N2−N1+4). When there is no buffered frame in any BSS corresponding to the transmitted BSSID and the nontransmitted BSSID, the length of the partial virtual bitmap subfield is 1 octet, and the values of the bits of the partial virtual bitmap subfield may be configured to all 0. In this case, the value of the bitmap offset field is 0. In addition, the value of the length field is 4.

When no individually addressed frame is buffered in any BSS corresponding to the transmitted BSSID or the non-transmitted BSSID, and the group addressed frame is buffered in more than one BSS, the partial virtual bitmap subfield may consist of bits from octet numbers 0 to (N0−1). N0 is the largest positive integer satisfying ($N0*8-2^n$)<8.

It may be necessary for the multi-link device to indicate the buffered traffic to each of the operating multi-links. This is described with reference to FIGS. 13 to 18.

Figure 21:
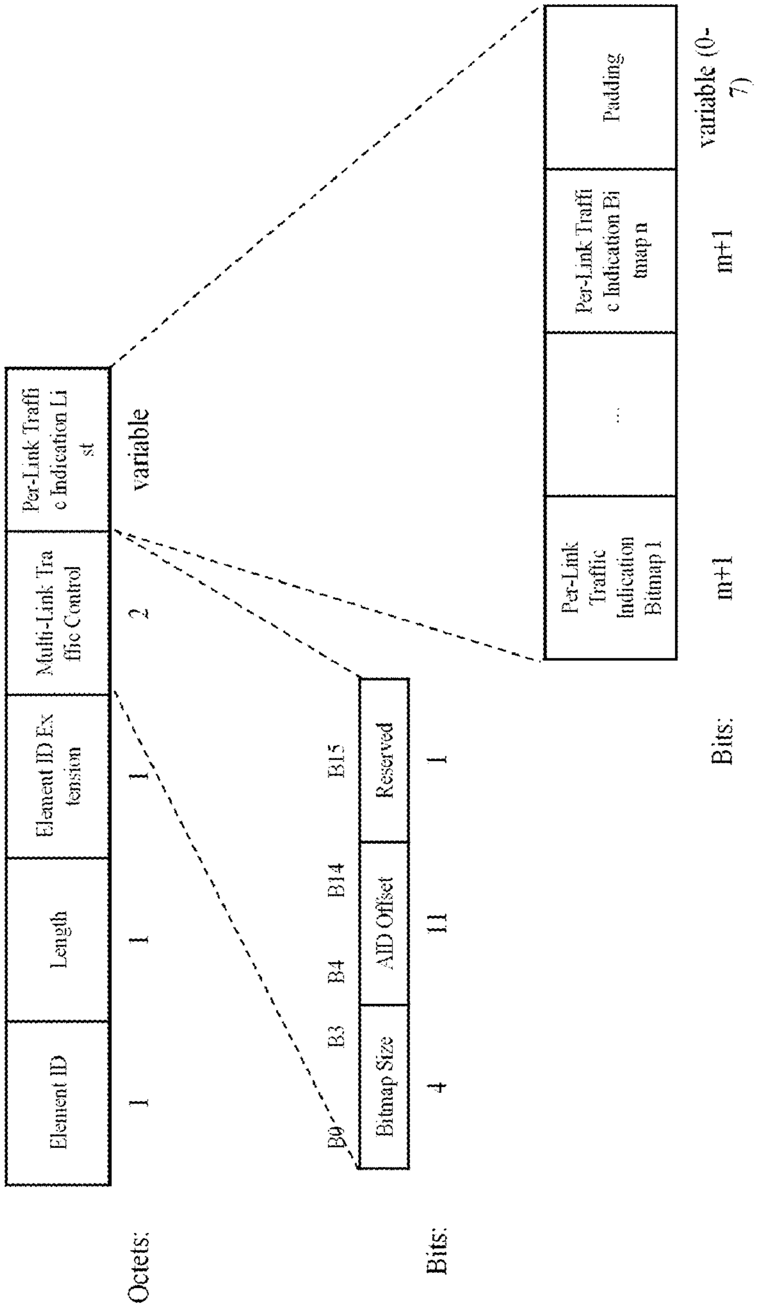
FIG. 21 illustrates a format of a multi-link traffic element according to an embodiment of the disclosure.

FIG. 21 illustrates a format of a multi-link traffic element according to an embodiment of the disclosure.

APs operating in one multi-link device may share an AID space. Specifically, one multi-link device may have one AID space. In this case, when indicating a buffered frame to an AP through the TIM element described with reference to FIG. 20, the station may find it difficult to determine in which link the frame is buffered. A traffic indication signaling method is required to solve this problem. Specifically, the multi-link device may perform traffic indication signaling for each link. In a specific embodiment, the multi-link device may perform traffic indication signaling for each station belonging to the multi-link device. The TIM element transmitted by the multi-link device may indicate whether there is a buffered frame in each of the multi-links on which the multi-link device operates. In this case, the TIM element transmitted by the multi-link device is referred to as a multi-link traffic element.

The multi-link device may transmit the multi-link traffic element through a beacon frame or a TIM frame. In addition, the multi-link traffic element may be included in a frame including a TIM element.

In FIG. 21, the multi-link traffic element may include an element ID subfield, a length subfield, an element ID extension subfield, a multi-link traffic control subfield, and a per-link traffic indication list subfield.

The element ID subfield is a 1-octet field and indicates the ID of the element including the element ID subfield.

The length subfield is a 1-octet field and indicates the length of the element including the length subfield. Specifically, the length subfield may indicate the length of the element excluding the element ID subfield and the length subfield.

The element ID extension subfield is a 1-octet field and indicates a value to identify the element when combined with the value of the element ID subfield including the Element ID Extension subfield.

The multi-link traffic control subfield is a 1-octet field and include a bitmap size subfield and an AID offset subfield. The bitmap size subfield is a 4-bit subfield and indicates the size of the per-link traffic indication bitmap subfield. When the value of bitmap size is M, the size of the per-link traffic indication bitmap subfield may be M+1. A value of 0 for bitmap size is a reserved value.

The AID offset subfield is an 11-bit subfield and indicates the starting position of the bits of the traffic indication virtual bitmap indicated by the per-link traffic indication list or per-link traffic indication bitmap subfield. Accordingly, the association ID (AID) corresponding to the per-link traffic indication list or per-link traffic indication bitmap subfield is determined according to the AID offset subfield. When the value of the AID offset is K, the per-link traffic indication list or per-link traffic indication bitmap subfield indicates first the bit number K of the traffic indication virtual bitmap. In addition, when the value of the AID offset is K, the smallest value of the AID corresponding to the per-link traffic indication list or per-link traffic indication bitmap subfield is K. The per-link traffic indication list subfield is a variable-length field and may include one or more per-link traffic indication bitmap subfields. When the value of the AID offset subfield is K, each per-link traffic indication bitmap subfield indicates first the bit number K of the traffic indication virtual bitmap. The number of per-link traffic indication bitmap subfields included in the per-link traffic indication list subfield may be the number of bits configured to 1 among the bits corresponding to the AID of the non-AP multi-link device in the partial virtual bitmap. Multiple per-link traffic indication bitmap subfields may be sorted according to the AID corresponding to the per-link traffic indication bitmap subfield in the per-link traffic indication list subfield. Specifically, multiple per-link traffic indication bitmap subfields may be sorted in ascending order of the AID corresponding to the per-link traffic indication bitmap subfield in the per-link traffic indication list subfield.

When the value of the bitmap size field is m, the size of the per-link traffic indication bitmap subfield is m+1 bits. When the TID-to-link mapping negotiation is successfully performed, the bit of the per-link traffic indication bitmap subfield indicates whether traffic to be transmitted to a non-AP station operating on the link corresponding to the bit is buffered. Specifically, when the value of the bit of the per-link traffic indication bitmap subfield is 1, the bit of the per-link traffic indication bitmap subfield may indicate that traffic to be transmitted to a non-AP station operating on the link corresponding to the bit is buffered. When the value of the bit of the per-link traffic indication bitmap subfield is 0, the bit of the per-link traffic indication bitmap subfield may indicate that traffic to be transmitted to a non-AP station operating on the link corresponding to the bit is not buffered. When the TID-to-link mapping is the default mapping, the bits in the per-link traffic indication bitmap subfield may indicate whether it is recommended to retrieve transmission of traffic buffered in the link corresponding to the bit. Specifically, when the value of a bit in the per-link traffic indication bitmap subfield is 1, the bits in the per-link traffic indication bitmap subfield may indicate that it is recommended to retrieve transmission of traffic buffered in the link corresponding to the bit. When the TID-to-link mapping of a link corresponds to the default mapping, the uplink transmission and downlink transmission performed on the link may be performed without TID restrictions. In addition, the default mapping is applied to links for which the TID-to-link mapping negotiation have not been successfully performed. Accordingly, when the TID-to-link mapping negotiation is successfully performed, it may indicate that the TID-to-link mapping negotiation is successfully performed and not all TIDs are mapped to all links.

A bit of the per-link traffic indication list subfield is mapped to a link according to the bit number of the bit. Specifically, a bit whose bit number corresponds to n in the per-link traffic indication list subfield may be mapped to a link whose link ID is n. In addition, the per-link traffic indication list subfield may include a padding field. Through this, the per-link traffic indication list subfield may have a length in octet units. The padding field may have a length between 0 and 7 bits.

The AP multi-link device may transmit a frame including a multi-link traffic element and a TIM element together. In this case, the frame may be a beacon frame. A method for signaling traffic buffered in an AP multi-link device by using the multi-link traffic element and the TIM element is described with reference to FIG. 14.

Figure 22:
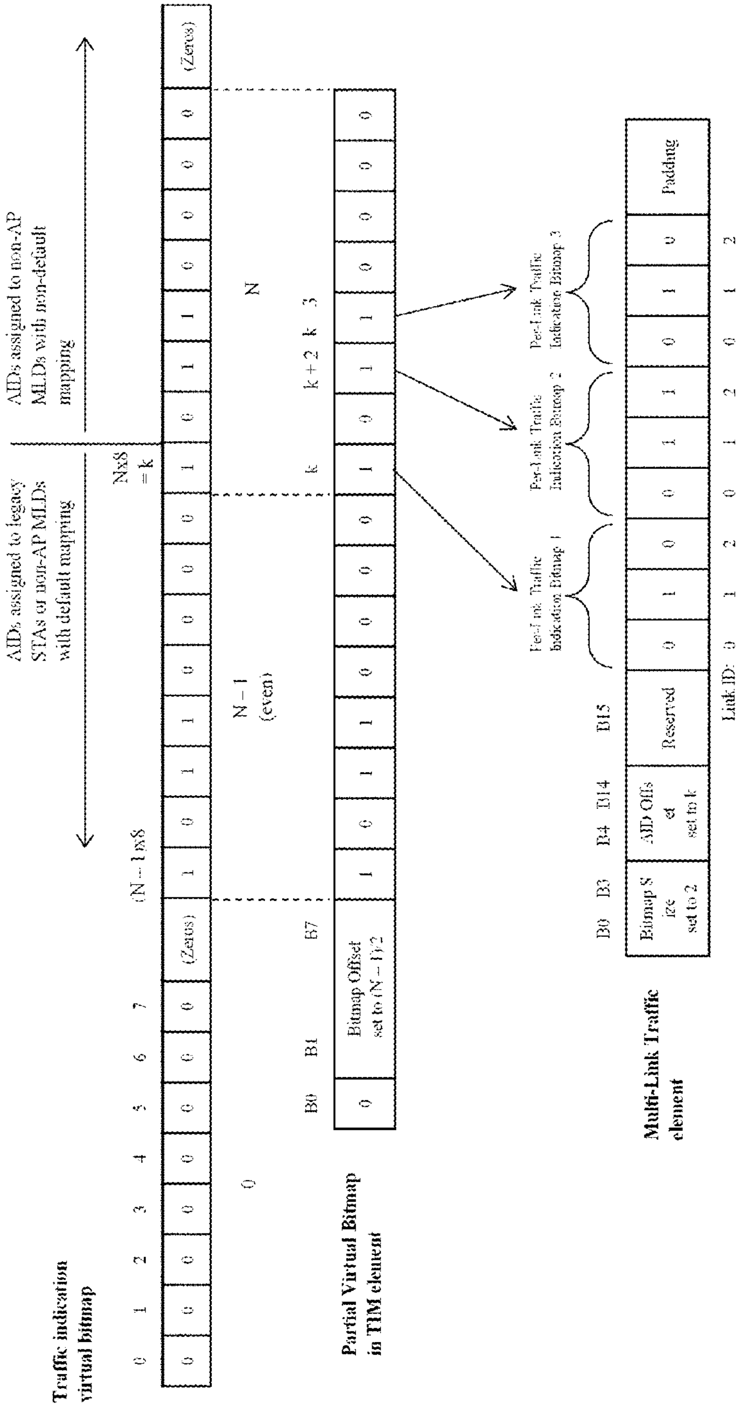
FIG. 22 illustrates a method for signaling traffic buffered in an AP multi-link device by a multi-link traffic element and a partial virtual bitmap subfield of a TIM element according to an embodiment of the disclosure.

FIG. 22 illustrates a method for signaling traffic buffered in an AP multi-link device by a multi-link traffic element and a partial virtual bitmap subfield of a TIM element according to an embodiment of the disclosure.

The bit corresponding to the non-AP multi-link device in the partial virtual bitmap subfield of the TIM element transmitted by the AP multi-link device or the traffic indication virtual bitmap may be configured to 1. In this case, the non-AP multi-link device may parse the multi-link traffic element. Based on the per-link traffic indication bitmap subfield corresponding to the non-AP multi-link device in the multi-link traffic element, the non-AP multi-link device may recommend from which link the non-AP multi-link device retrieves the transmission of buffered traffic, or the non-AP multi-link device may determine in which link the traffic is buffered. When the TID-to-link mapping negotiation is successfully performed as described in FIG. 21, based on the value of the bit of the per-link traffic indication bitmap subfield corresponding to the non-AP multi-link device, the non-AP multi-link device may determine whether traffic to be transmitted to the station of the non-AP multi-link device operating on the link corresponding to the bit is buffered. In addition, when the TID-to-link mapping is the default mapping, based on the value of the bit of the per-link traffic indication bitmap subfield corresponding to the non-AP multi-link device, the non-AP multi-link device may indicate whether the AP multi-link device recommends requesting transmission of buffered traffic from the link corresponding to the bit.

The non-AP multi-link device may request the AP multi-link device to transmit traffic buffered in a link corresponding to a bit configured to 1 among the bits in the per-link traffic indication bitmap subfield corresponding to the non-AP multi-link device. Specifically, when the TID-to-link mapping negotiation is successfully performed, the non-AP multi-link device may request the AP multi-link device to transmit traffic buffered in a link corresponding to a bit configured to 1 among the bits in the per-link traffic indication bitmap subfield corresponding to the non-AP multi-link device. When the TID-to-link mapping is the default mapping, the non-AP multi-link device may request the AP multi-link device to transmit traffic buffered in one or more links including a link corresponding to a bit configured to 1 among the bits in the per-link traffic indication bitmap subfield corresponding to the non-AP multi-link device. In these embodiments, the non-AP multi-link device may request transmission of buffered traffic from the AP multi-link device by transmitting a U-APSD trigger frame or a PS-Poll frame. When receiving the request for transmission of the buffered traffic, the AP multi-link device may transmit the buffered traffic to the non-AP multi-link device. In addition, when receiving the request for transmission of the buffered traffic, the AP multi-link device may transmit a QoS null frame instead of the buffered traffic.

In an embodiment of FIG. 22, a legacy station before EHT or a station with TID-to-link mapping configured as the default mapping is allocated an AID value smaller than K. A non-AP station for which negotiation on the TID-to-link mapping is successfully performed is allocated an AID value equal to or greater than K. In the traffic indication virtual bitmap of FIG. 22, all bits smaller than the bit number (N−1)*8 are configured to 0. Therefore, the AP multi-link device does not buffer traffic for a station whose AID is smaller than (N−1)*8. At least one of the bits corresponding to the bit number (N−1)*8 or more is configured to 1. N−1 is an even number, and the value of N*8 is the value of k. Therefore, the partial virtual bitmap subfield includes bit numbers starting from (N−1)*8 of the traffic indication virtual bitmap. In this case, the value of the bitmap offset subfield of the Partial Virtual Bitmap subfield is configured to (N−1)/2. In addition, among the bits of the partial virtual bitmap subfield, the values of the bits corresponding to AIDs (N−1)*8, (N−1)*8+2, (N−1)*8+3, k, k+2, and k+3 are configured to 1.

As described above, the AID offset subfield of the multi-link traffic element may indicate the AID of the multi-link device corresponding to the first one among the per-link traffic indication bitmap subfields of the multi-link traffic element. In FIG. 14, the value of the AID offset subfield is configured to K. The multi-link traffic element includes a per-link traffic indication bitmap subfield corresponding to the multi-link device indicated by the partial virtual bitmap subfield as 1. In FIG. 22, the multi-link traffic element includes a per-link traffic indication bitmap subfield for each station or non-AP multi-link device with AIDs corresponding to k, k+2, and k+3. In this case, the per-link traffic indication bitmap subfields are sorted in ascending order of the AID.

The value of the bitmap size field of the multi-link traffic element is 2. Therefore, the per-link traffic indication bitmap subfield of the multi-link traffic element includes 3 bits. In this case, the first bit B0 of the per-link traffic indication bitmap subfield is mapped in a link with a link ID of 0, the second bit B1 is mapped in a link with a link ID of 1, and the third bit B2 is mapped in a link with a link ID of 2.

As described above, default mapping is applied to corresponding the multi-link devices with an AID value of K, and the multi-link device with AID values of K+2 and K+3 has successfully performed the TID-to-link mapping. Therefore, the per-link traffic indication bitmap subfield corresponding to AID K indicates that a request for transmission of buffered traffic on a link with link ID 1 is recommended. In addition, the per-link traffic indication bitmap subfield corresponding to AID K+2 indicates that the AP multi-link device is buffering traffic on two links with link ID 1 and link ID 2. In this case, traffic buffered in the link with link ID 1 and traffic buffered in the link with link ID 2 may be the same or different. In addition, the per-link traffic indication bitmap subfield corresponding to AID K+3 indicates that the AP multi-link device is buffering traffic on a link with link ID 1.

However, it may not be guaranteed that the AID of the non-AP multi-link device connected to the AP multi-link device is continuously allocated. In addition, an AID of the non-AP station not included in the multi-link device may be allocated to an AID between the AIDs of the non-AP multi-link devices. In this case, it may be difficult for the non-AP multi-link device to determine which AID belongs to a station not included in the non-AP multi-link device. Therefore, when the multi-link traffic element does not include a per-link traffic bitmap subfield for the station that is not included in the non-AP multi-link device, the non-AP multi-link device may be difficult to parse the per-link traffic bitmap subfield. For example, in the embodiment of FIG. 14, AID K+1 may be allocated to a non-AP multi-link device, and a value of a bit corresponding to AID K+1 among the partial virtual bitmap subfields of the TIM element may be 1. In this case, a non-AP multi-link device with an AID of K+2 or K+3 cannot determine which of the three per-link traffic bitmap subfields is the per-link traffic bitmap subfield for the corresponding non-AP multi-link device. Therefore, a method for configuring the multi-link traffic element to solve this problem is required. This is described with reference to FIG. 15.

Figure 23:
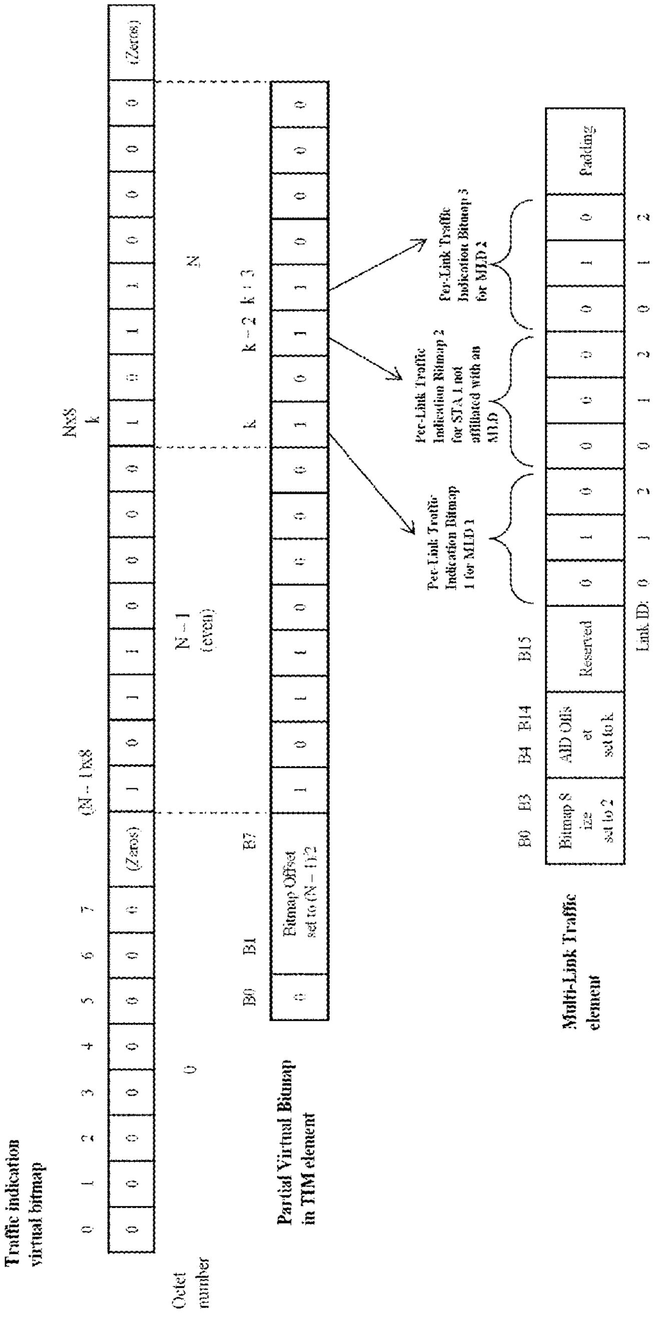
FIG. 23 illustrates a method for configuring a multi-link traffic element according to an embodiment of the disclosure.

FIG. 23 illustrates a method for configuring a multi-link traffic element according to an embodiment of the disclosure.

In an embodiment of the disclosure, the AP multi-link device may include a per-link traffic bitmap subfield for a non-AP station not included in the multi-link device in the multi-link traffic element. Specifically, even if the non-AP station is not included in the multi-link device, if the value of the bit of the traffic indication bitmap subfield or the partial virtual bitmap subfield corresponding to the non-AP station is 1, the AP multi-link device may include a per-link traffic bitmap subfield for the non-AP station in the multi-link traffic element. Therefore, the AP multi-link device may include a per-link traffic bitmap subfield for all stations corresponding to the bit of the traffic indication bitmap subfield or the bit of the partial virtual bitmap subfield configured to 1 in the multi-link traffic element. For convenience of description, the station corresponding to the bit of the traffic indication bitmap subfield or the bit of the partial virtual bitmap subfield configured to 1 is referred to as a station where buffered traffic is indicated.

In this case, the AP multi-link device may include a Per-Link Traffic Bitmap subfield for all buffered traffic indicated stations in the multi-link traffic element regardless of whether the station where the buffered traffic is indicated is a station belonging to a multi-link device, a non-AP multi-link device, or which AP or BSS it belongs to. Which AP or BSS the station to which the buffered traffic is indicated belongs may indicate whether the station to which the buffered traffic is indicated belongs to the multiplex BSSID sets.

The AP multi-link device may include the Per-Link Traffic Bitmap subfield as many as the number of stations to which traffic buffered in the multi-link traffic element is indicated. A method for the AP multi-link device to configure the Per-Link Traffic Bitmap subfield corresponding to a station that does not belong to the multi-link device.

The AP multi-link device may configure all the bit values of the per-link traffic bitmap subfield corresponding to a station that does not belong to the multi-link device to 0. That is, the AP multi-link device may configure the bit value of the per-link traffic bitmap subfield corresponding to a station that does not belong to the multi-link device as the reserved field. In another specific embodiment, the AP multi-link device may configure the bit value of the per-link traffic bitmap subfield corresponding to a station that does not belong to the multi-link device to an arbitrary value. In another specific embodiment, the AP multi-link device may configure the bit value of the per-link traffic bitmap subfield corresponding to a station that does not belong to the multi-link device to 1. In this case, the non-AP multi-link device may ignore the bit value of the per-link traffic bitmap subfield corresponding to a station that does not belong to the multi-link device. In another specific embodiment, the AP multi-link device may configure the bit value of the per-link traffic bitmap subfield corresponding to a station that does not belong to the multi-link device to 1. In another specific embodiment, the AP multi-link device may configure the value of a bit corresponding to a link in which a station not that does not belong to the multi-link device operates among the bits of the Per-Link Traffic Bitmap subfield to 1 and set the value of the remaining bits to 0.

In an embodiment of FIG. 23, the configuration of the traffic indication virtual bitmap and the configuration of the partial virtual bitmap subfield may be the same as the configuration of the traffic indication virtual bitmap and the configuration of the partial virtual bitmap subfield of FIG. 14. However, in an embodiment of FIG. 23, AID k and AIDk+3 correspond to non-AP multi-link devices. The AID K+2 corresponds to a station not included in the multi-link device. The AID k of the multi-link traffic element and the Per-Link Traffic Bitmap subfield corresponding to the AIDk+3 are configured as in the embodiment of FIG. 14. Since the AID K+2 is a station not included in the multi-link device, the bits of the Per-Link Traffic Bitmap subfield corresponding to the AID k+2 of the multi-link traffic element are all configured to 0.

The AID offset subfield of the multi-link traffic element may indicate a bit after all bits corresponding to the group ID and the group address frame in the bits of the Traffic indication virtual bitmap and the bits of the Partial Virtual Bitmap subfield. In this case, the group Id may include an AID value of 0. In addition, the group ID may include an AID corresponding to the bit number of the traffic identification virtual bitmap corresponding to the multiple BSSID sets, that is, the AID corresponding to the bit number. In addition, the group ID may include bit numbers of the traffic indication virtual bitmap corresponding to the transmitted BSSID and the nontransmitted BSSID, i.e., AIDs corresponding to the bit numbers. The group ID may include a value corresponding to AID 0 to $2^n-1$ when the maximum number of possible BSSIDs is $2^n$ of the multiplex BSSID sets. The AID offset subfield may indicate a value after the value corresponding to AID 0 to $2^n-1$ when the multi-BSSID sets are used and the maximum number of BSSIDs in the multiple BSSID sets is $2^n$. This is because the configuration of the AID offset field is not limited to the group address frame being transmitted through a specific link, so signaling for each link may be less meaningful.

According to another embodiment of the disclosure, even if the AID offset subfield indicates a bit prior to the bits of the traffic indication virtual bitmap and the bits of the partial virtual bitmap subfield indicating the group ID, the per-link traffic indication bitmap subfield corresponding to the group ID may not be included in the multi-link traffic element. Even if the AID offset subfield indicates a bit prior to the bits of the traffic indication virtual bitmap and the bits of the partial virtual bitmap subfield indicating the group ID, the multi-link traffic element may only include Per-Link Traffic Indication Bitmap subfields corresponding to individual stations among the stations to which buffered traffic is indicated. Specifically, when the maximum number of BSSIDs that may be configured in the multiple BSSID sets is $2^n$, the AID offset subfield may indicate bits corresponding to AIDs less than $(2^n-1)$ in the bits of the Traffic indication virtual bitmap and the bits of the Partial Virtual Bitmap subfield. In this case, the multi-link traffic element may only include Per-Link Traffic Indication Bitmaps configured to 1 among the bits corresponding to AID 2^n in the bits of the Traffic indication virtual bitmap and the bits of the Partial Virtual Bitmap subfield. A station receiving the multi-link traffic element may determine that the multi-link traffic element includes only per-link traffic indication bitmaps corresponding to the bit configured to 1 among the bits in the Traffic indication virtual bitmap and the bits in the Partial Virtual Bitmap subfield corresponding to AID $2^n$.

According to another embodiment of the disclosure, regardless of whether the AID Offset subfield indicates a bit before the bit indicating the Group ID in the bit of the Traffic indication virtual bitmap and the bit of the Partial Virtual Bitmap subfield, the multi-link traffic element may include a Per-Link Traffic Indication Bitmap corresponding to each of the bits configured to 1 after the bit indicated by the AID Offset subfield in the Traffic indication virtual bitmap and the Partial Virtual Bitmap subfields. In this case the AP multi-link device may configure all values of the Per-Link Traffic Indication Bitmap field corresponding to the bits of the Traffic indication virtual bitmap and the Partial Virtual Bitmap subfield corresponding to the group address to a predesignated value. The predesignated value may be 0. In another specific embodiment, the AP multi-link device may configure the value of the Per-Link Traffic Indication Bitmap field corresponding to the bits of the Traffic indication virtual bitmap and Partial Virtual Bitmap subfields corresponding to the group address to an arbitrary value. The AP multi-link device may configure the bit corresponding to the link on which the group address frame is transmitted to 1 in the bits of the Per-Link Traffic Indication Bitmap field corresponding to the bits of the Traffic indication virtual bitmap and Partial Virtual Bitmap subfields corresponding to the group address, and configure the remaining bits to 0.

Figure 24:
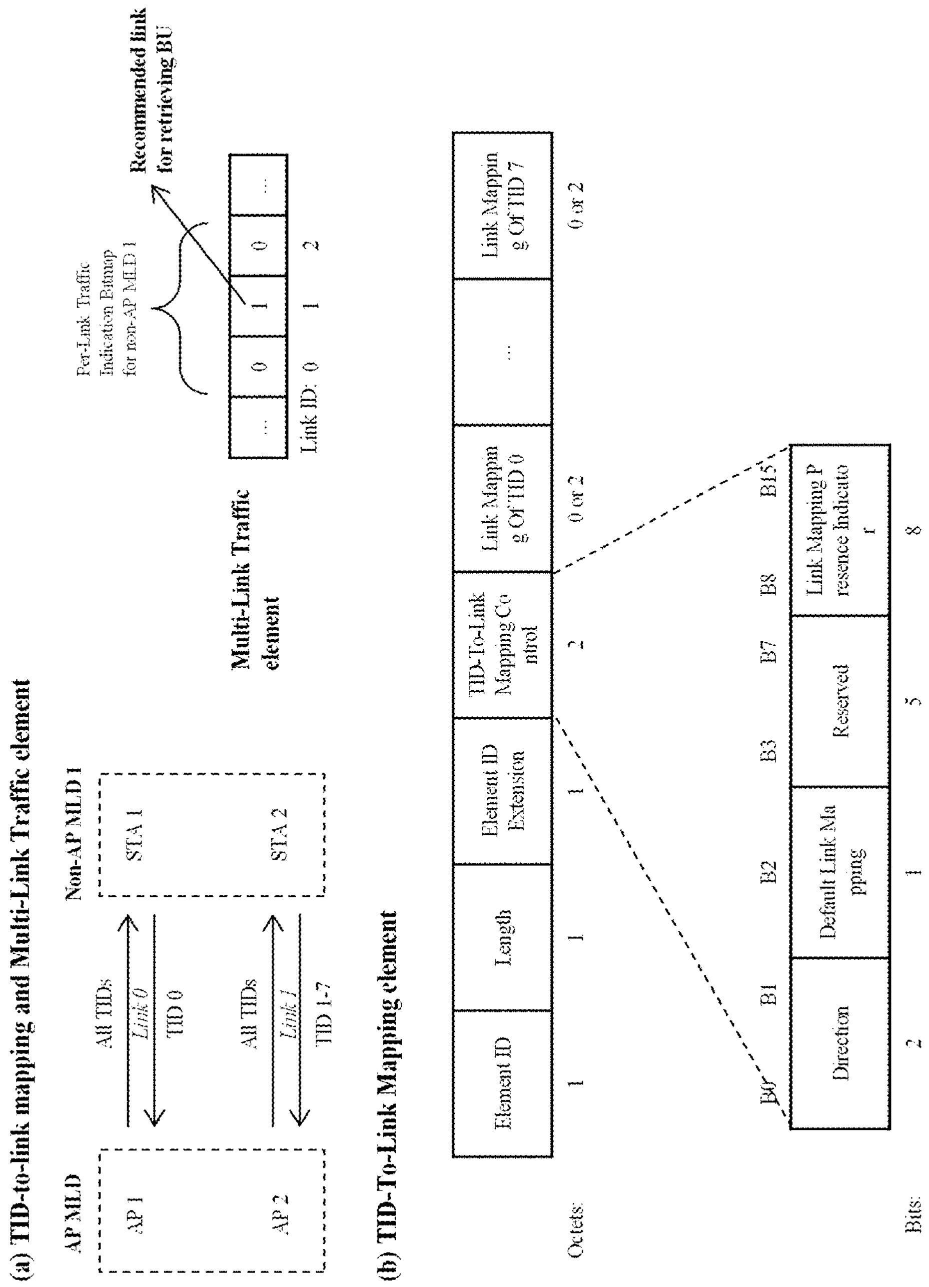
FIG. 24 illustrates a method for configuring the Per-Link Traffic Bitmap subfield of a multi-link traffic element when a link set in which an AP multi-link device operates and a link set in which a non-AP multi-link device communicating with the AP multi-link device operates are different according to an embodiment of the disclosure.

FIG. 24 illustrates a method for configuring the Per-Link Traffic Bitmap subfield of a multi-link traffic element when a link set in which an AP multi-link device operates and a link set in which a non-AP multi-link device communicating with the AP multi-link device operates are different according to an embodiment of the disclosure.

A link set in which an AP multi-link device operates and a link set in which a non-AP multi-link device communicating with the AP multi-link device operates may be different. For example, the AP multi-link device may communicate with a first non-AP multi-link device on the first to third links, and the AP multi-link device may communicate with a second non-AP multi-link device on the first to second links. In this case, the configuration method of the Per-Link Traffic Bitmap subfield of the multi-link traffic element may be problematic.

Even if the link set in which the AP multi-link device operates and the link set in which the non-AP multi-link device communicating with the AP multi-link device operates are different, the AP may configure the sizes of all Per-Link Traffic Indication Bitmap subfields included in the multi-link traffic element to be the same, and may configure the links to which each bit of all Per-Link Traffic Indication Bitmap subfields maps to be the same. Specifically, the AP multi-link device may configure the number of bits of all Per-Link Traffic Indication Bitmap subfields included in the multi-link traffic element to be greater than the number of links set by the AP multi-link device. This is because multiple link IDs configured by the AP multi-link device may not start from 0 or the IDs of multiple links may not be consecutive. For example, the AP multi-link device may configure the number of bits of all Per-Link Traffic Indication Bitmap subfields included in the multi-link traffic element to the maximum number of links that the AP multi-link device may configure. In another specific embodiment, the AP multi-link device may configure the number of bits of all Per-Link Traffic Indication Bitmap subfields included in the multi-link traffic element to a number that adds 1 to the value of the largest link ID that the AP multi-link device may configure.

A method of configuring the value of the bit of the Per-Link Traffic Indication Bitmap subfield corresponding to the link not configured by the AP multi-link device and the link not configured by the non-AP multi-link device corresponding to the Per-Link Traffic Indication Bitmap subfield may be problematic. For the convenience of description, the bit of the Per-Link Traffic Indication Bitmap subfield corresponding to the link not configured by the AP multi-link device and the link not configured by the non-AP multi-link device corresponding to the Per-Link Traffic Indication Bitmap subfield are referred to as no-link bits. The AP multi-link device may configure the value of the no-link bit to a predesignated value. Therefore, the AP multi-link device may configure the bit of the Per-Link Traffic Indication Bitmap subfield corresponding to the link not configured by the AP multi-link device or by the non-AP multi-link device to a predesignated value. In this case, the predesignated value may be 0. In another specific embodiment, the AP multi-link device may configure the value of the no-link bit to an arbitrary value. In this case, the non-AP station may ignore the value of the no-link bit.

In addition, the value of the bit of the Per-Link Traffic Indication Bitmap subfield corresponding to a disabled link may be configured to reserved. Specifically, the value of the bit of the Per-Link Traffic Indication Bitmap subfield corresponding to the disabled link may be configured to 0. In this case, the disabled link may be a link in which uplink and downlink transmissions are stopped. Specifically, the disabled link may be a link in which uplink transmissions and downlink transmissions of individual address frames are stopped. In this case, the non-AP station may ignore the value of the no disabled bit.

In the embodiment of FIG. 24, as illustrated in FIG. 24(*a*), the AP multi-link device AP MLD operates in a first link (link 0) to a third link (link 2). A first multi-link device MLD 1 and the AP multi-link device AP MLD configure the first link (link 0) to the third link (link 2). A second multi-link device MLD 2 and the AP multi-link device AP MLD configure a second link (link 1) to the third link (link 2). The second multi-link device MLD configures the number of bits of the Per-Link Bitmap subfield of the multi-link traffic element to 3 bits. The multi-link traffic element transmitted by the AP multi-link device AP MLD includes Per-Link Bitmap subfields corresponding to each of the first multi-link device MLD 1, a first station STA 1, and the second multi-link device MLD 2. The AP multi-link device AP MLD configures the value of the Per-Link Bitmap subfield corresponding to the first multi-link device MLD 1 according to the embodiments described with reference FIGS. 14 to 15. In addition, the AP multi-link device AP MLD configures the value of the Per-Link Bitmap subfield corresponding to the first station STA 1 according to the embodiments described with reference to FIG. 23. The AP multi-link device AP MLD configures the value of the first bit B0 to the second bit B1 of the Per-Link Bitmap subfield corresponding to the second multi-link device MLD 2 according to the embodiments described with reference FIGS. 22 to 23. In addition, the AP multi-link device AP MLD configures the value of the third bit B2 of the Per-Link Bitmap subfield corresponding to the second multi-link device MLD 2 to a predesignated value of 0 as described above.

In the above-described implementations, the bit number of the bit of the Per-Link Traffic Indication Bitmap subfield and the ID of the link corresponding to the bit are the same. Depending on the specific implementation, the bit number of the bit of the Per-Link Traffic Indication Bitmap subfield and the ID of the link corresponding to the bit may not be the same. The link ID of the link configured by the AP multi-link device that transmitted the Per-Link Traffic Indication Bitmap subfield may be mapped in ascending order to the bit number of the bit of the Per-Link Traffic Indication Bitmap subfield. The AP multi-link device may configure a link with ID 1 and a link with ID 3, and the Per-Link Traffic Indication Bitmap subfield may be a 2-bit field. In this case, the first bit B0 of the Per-Link Traffic Indication Bitmap subfield is mapped to the link with ID 1, and the second bit B1 is mapped to the link with ID 3.

A method of configuring a multi-link is described with reference to FIGS. 25 to 29. First, the multi-link element is described with reference to FIG. 25.

Figure 25:
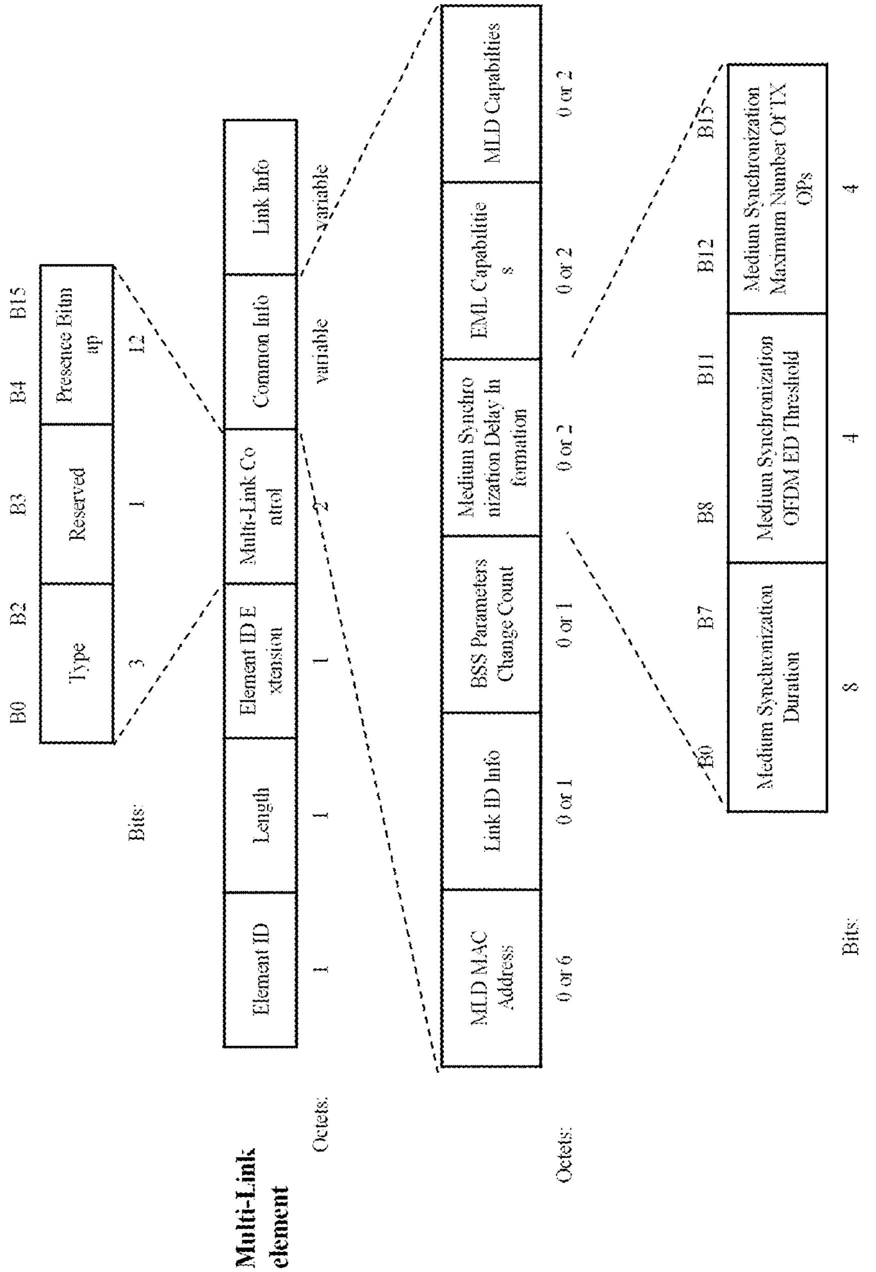
FIG. 25 illustrates signaling related to a multi-link element and MediumSyncDelay according to an embodiment of the disclosure.

FIG. 25 illustrates signaling related to a multi-link element and MediumSyncDelay according to an embodiment of the disclosure.

A multi-link device may perform multi-link discovery and multi-link setup by using a multi-link element. In this case, the multi-link element may be included in a management frame. Specifically, the multi-link element may be included in at least one of a beacon frame, a probe request frame, a probe response frame, an authentication frame, an association request frame, an association response frame, a reassociation request frame, and a reassociation response frame.

The multi-link element may include an element ID subfield, a length subfield, an element ID extension subfield, a multi-link control subfield, a common info subfield, and a link info subfield. The element ID subfield or the element ID extension subfield may indicate an ID of an element including the element ID subfield or the element ID extension subfield. The length subfield may indicate the length of an element including the length subfield. The multi-link control subfield may include a type subfield and a presence bitmap subfield. The type subfield may indicate what type the multi-link element is. In addition, the format of the multi-link element may be determined based on what type the multi-link element is. The presence bitmap subfield may indicate whether a subfield that may be included in the multi-link element is included. For example, the presence bitmap subfield may indicate whether a subfield that may be included in a common info subfield included in the multi-link element is included. The subfield indicating whether the presence bitmap subfield is included may include a MAC address subfield of the multi-link device, a Link ID Info subfield, a BSS Parameters Change Count subfield, a medium synchronization delay information subfield, a EML Capabilities subfield, and an MLD Capabilities subfield. In addition, the medium synchronization delay information subfield may include information related to MediumSyncDelay.

The common info subfield may include information on multiple links or all links. The Common Info subfield may include information that is common to multiple links or all links or information that is commonly applied. The link info subfield may include information on the link corresponding to the link info subfield.

Information related to MediumSyncDelay indicates the value to be configured to the duration of MediumSyncDelay and may have a default value. In a specific situation, the multi-link device may initialize the duration of the MediumSyncDelay to a default value. In addition, if the multi-link device (non-AP multi-link device) does not receive information related to MediumSyncDelay from a peer multi-link device (AP multi-link device), the multi-link device may configure the duration of MediumSyncDelay to a default value. If the multi-link device (non-AP multi-link device) receives information related to MediumSyncDelay from a peer multi-link device (AP multi-link device), the multi-link device may configure the duration of MediumSyncDelay to a value indicated by the information related to the received MediumSyncDelay.

In FIG. 25, the medium synchronization delay information subfield may include a medium synchronization duration subfield, a medium synchronization OFDM ED threshold subfield, and a medium synchronization maximum number of TXOPs subfield.

The medium synchronization duration subfield may indicate MediumSyncDelay. That is, the medium synchronization duration subfield may indicate a value that configures the MediumSyncDelay timer. For example, the medium synchronization duration subfield may be an 8-bit field. In addition, the medium synchronization duration subfield may indicate a duration in 32 us units. That is, when the medium synchronization duration subfield is configured to A, the time indicated by the medium synchronization duration subfield may be A*32 us.

The medium synchronization OFDM ED threshold subfield may indicate the CCA threshold when MediumSyncDelay is applied. The CCA threshold indicated by the medium synchronization OFDM ED threshold subfield may be the CCA ED threshold. That is, the medium synchronization OFDM ED threshold subfield may indicate dot11MSDOFDMEDthreshold. The medium synchronization OFDM ED threshold subfield may be a 4-bit field. The CCA threshold indicated by the medium synchronization OFDM ED threshold subfield is the value of the medium synchronization OFDM ED threshold subfield plus −72, and the unit of the CCA threshold may be dBm. Therefore, when the value of the medium synchronization OFDM ED threshold subfield is 0 or greater, the CCA threshold indicated by the medium synchronization OFDM ED threshold subfield may be a value greater than −72 dBm. In addition, the maximum value of the CCA threshold indicated by the medium synchronization OFDM ED threshold subfield may be −62 dBm. In this case, the value of the medium synchronization OFDM ED threshold subfield may be configured within 0 to 10. In this case, 11 to 15 may be reserved as values of the medium synchronization OFDM ED threshold subfield. That is, when values of the medium synchronization OFDM ED threshold subfield is configured to 0 to 10, the medium synchronization OFDM ED threshold subfield may indicate that the CCA threshold is −72 dBm to −62 dBm. That is, if the value of the medium synchronization OFDM ED threshold subfield is x, the medium synchronization OFDM ED threshold subfield may indicate that the CCA threshold is x −72 dBM.

The medium synchronization maximum number of TXOPs subfield may indicate MSD_TXOP_MAX. That is, the medium synchronization maximum number of TXOPs subfield may indicate the maximum number of transmission attempts that a station may attempt to transmit while MediumSyncDelay is applied. The medium synchronization maximum number of TXOPs subfield may be a 4-bit field. In a specific embodiment, the value of the medium synchronization maximum number of TXOPs subfield may be MSD_TXOP_MAX. In another specific embodiment, the value of the medium synchronization maximum number of TXOPs subfield may be MSD_TXOP_MAX+1. In another specific embodiment, the value of the medium synchronization maximum number of TXOPs subfield may be MSD_TXOP_MAX−1. This embodiment may be applicable when the value of the medium synchronization maximum number of TXOPs subfield is not configured to the maximum value. When the value of the medium synchronization maximum number of TXOPs subfield is configured to the maximum value, for example when the medium synchronization maximum number of TXOPs subfield is a 4-bit field, 15, the medium synchronization maximum number of TXOPs subfield may indicate that a station is allowed to attempt transmission without limitation on the number of transmission attempts while MediumSyncDelay is applied.

Figure 26:
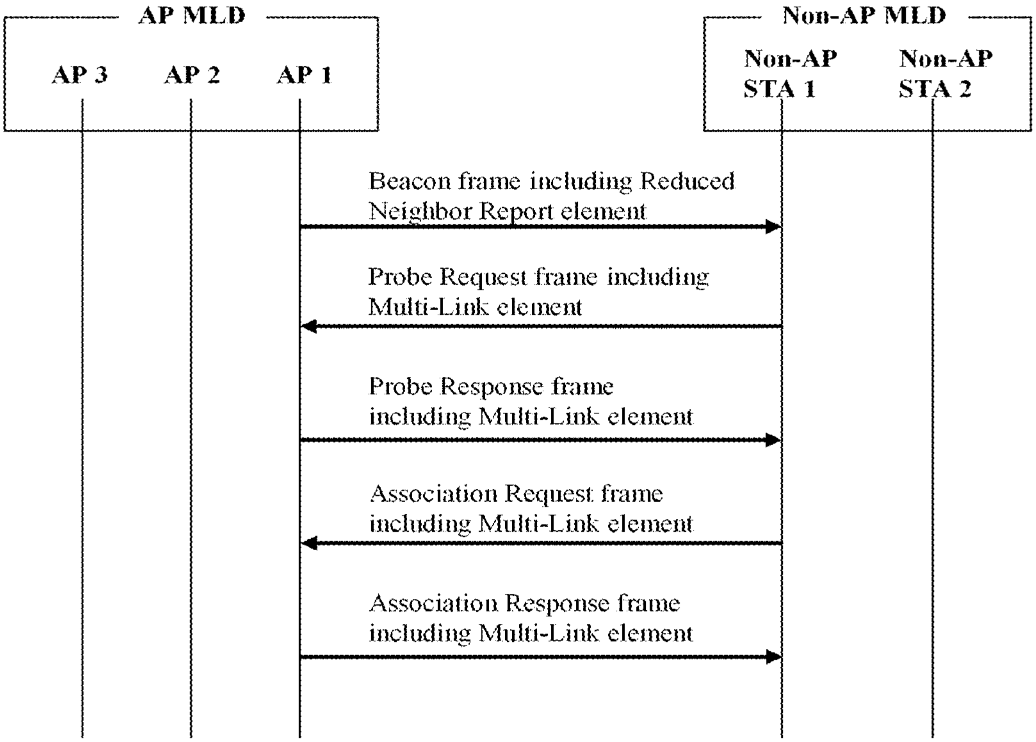
FIG. 26 illustrates a multi-link setup process according to an embodiment of the disclosure.

FIG. 26 illustrates a multi-link setup process according to an embodiment of the disclosure.

In FIG. 26, an AP multi-link device includes a first AP (AP 1), a second AP (AP 2), and a third AP (AP 3). A non-AP multi-link device non-AP MLD includes a first non-AP station (STA 1), a second non-AP station (STA 2), and a third non-AP station (STA 3). The first AP (AP 1) and the first non-AP station (STA 1) operate on a first link (link 1). In addition, the second AP (AP 2) and the second non-AP station (STA 2) operate on a second link (link 2). In addition, the third AP (AP 3) operates on a third link (link 3).

The first AP (AP 1) may transmit a reduced neighbor report element to signal the presence of an AP multi-link device AP MLD and parameters related to the AP multi-link device AP MLD. The reduced neighbor report element transmitted by the first AP (AP 1) may include information on the second AP (AP 2) or the third AP (AP 3). The reduced neighbor report element may be included in a beacon frame or a probe response frame.

In addition, the first non-AP station STA 1 that receives the frame including the reduced neighbor report element may recognize the AP or AP multi-link device indicated by the reduced neighbor report element. In this case, the first non-AP station STA 1 may transmit a probe request frame including the multi-link element to the first AP (AP 1) to request information on the AP multi-link device AP MLD or the multi-link on which the AP multi-link device AP MLD operates from the first AP (AP 1). In this case, the multi-link element may include information on the non-AP multi-link device or information on the AP included in the non-AP multi-link device.

The first AP (AP 1) may transmit a probe response frame to a non-AP station STA 1 in response to the probe request frame. In this case, the probe response frame may include a multi-link element. The multi-link element may include information on the AP multi-link device or information on the AP included in an AP multi-link device AP MLD. Specifically, the multi-link element may include information requested by the first non-AP station STA 1.

The first non-AP station STA 1 may transmit an association request frame or a reassociation request frame to the first AP (AP 1). The association request frame and the reassociation request frame may include the multi-link element. In this case, the multi-link element may include information on a link on which the non-AP multi-link device intends to perform a multi-link setup. For example, in FIG. 25, the multi-link element may include information on the first link (link 1) and the second link (link 2).

The first AP (AP 1) may transmit an association response frame or a reassociation response frame to the first non-AP station STA 1. In this case, the association response frame and the reassociation response frame may include the multi-link element. In this case, the multi-link element may include information on a link on which multi-link setup is performed. The link on which multi-link setup is performed may be determined based on a link on which the non-AP multi-link device intends to perform multi-link setup. In FIG. 25, the multi-link element may include information on the first link (link 1) and the second link (link 2) on which the first non-AP station STA 1 intends to perform multi-link setup.

When the association response frame or the reassociation response frame is successfully transmitted, the multi-link setup for the link indicated by the multi-link element included in the association response frame or the reassociation response frame may be considered to have been successfully performed.

Figure 27:
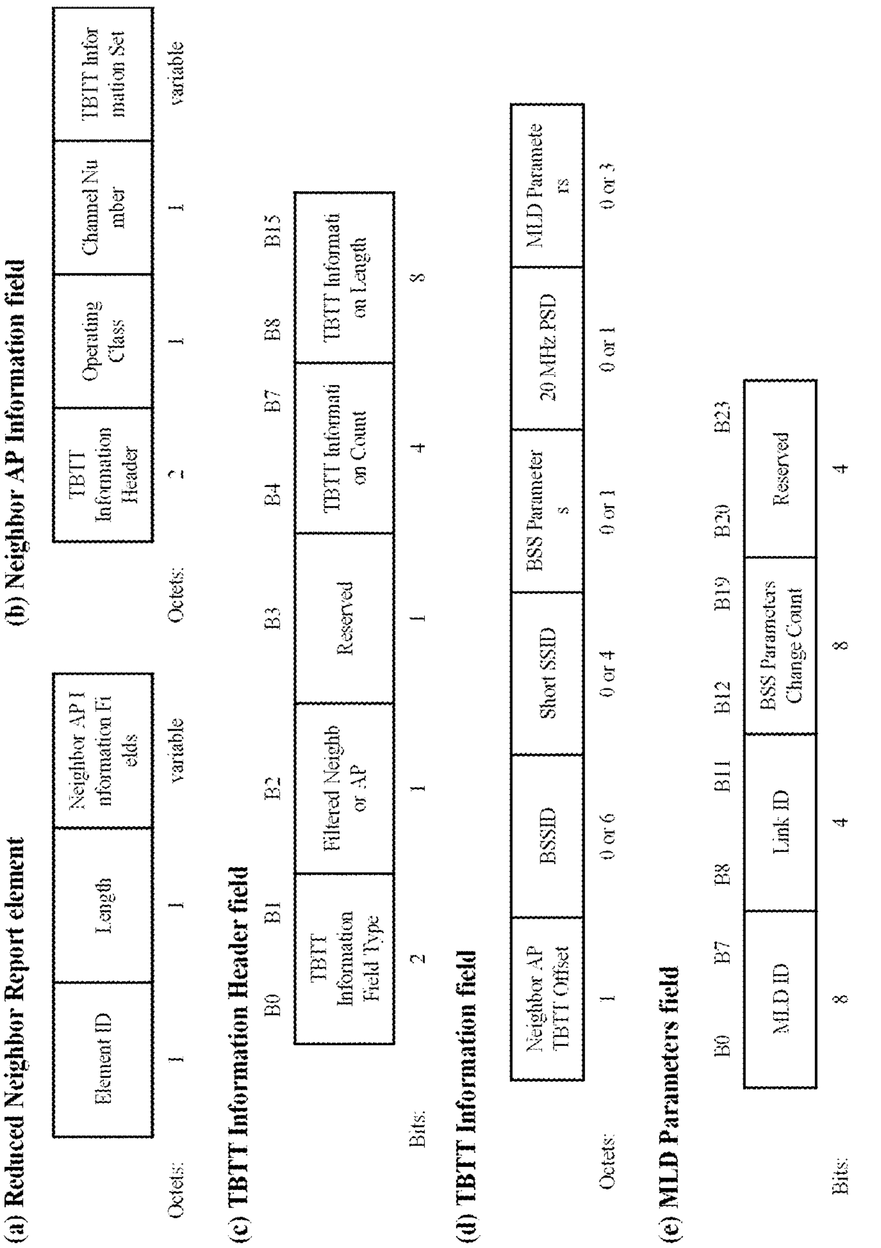
FIG. 27 illustrates a format of a reduced neighbor report element according to an embodiment of the disclosure.

FIG. 27 illustrates a format of a reduced neighbor report element according to an embodiment of the disclosure.

The reduced neighbor report element described in FIG. 26 is further described.

A station or AP transmitting an element is referred to as a reporting station or reporting AP. In addition, a station or AP indicated by an element is referred to as a reporting station or reporting AP. A station or AP transmitting a reduced neighbor report element or multi-link element is referred to as a reporting station or reporting AP. A station or AP indicated by a reduced neighbor report element or multi-link element is referred to as a reporting station or reporting AP.

Referring to FIG. 27(*a*), the reduced neighbor report element may include an Element ID subfield, a Length subfield, and one or more Neighbor AP Information subfields. The Element ID subfield may indicate an ID of the element. The Element ID subfield of the reduced neighbor report element may indicate an ID of the reduced neighbor report element. The Length subfield may indicate a size of the reduced neighbor report element. For example, the Length subfield may indicate a length of the reduced neighbor report element excluding the Element ID subfield and the Length subfield. That is, in the embodiment of FIG. 27(*a*), the Length subfield may indicate a length of the Neighbor AP Information subfield.

Each of one or more neighbor AP information fields included in the reduced neighbor report element may be the same as the Neighbor AP Information subfield illustrated in FIG. 27(*b*). The Neighbor AP Information subfield may include a TBTT Information Header subfield, an Operating Class subfield, a Channel Number subfield, and a TBTT Information Set subfield.

The TBTT Information Header subfield may be a 2-octet field. In addition, the format of the TBTT Information Header subfield may be as illustrated in FIG. 27(*c*). The TBTT Information Header subfield may include a TBTT Information Field Type subfield, a filtered neighbor AP subfield, a Reserved subfield, TBTT Information Count subfield, and a TBTT information length subfield. The TBTT Information Field Type subfield may be a 2-bit field, the filtered neighbor AP subfield may be a 1-bit field, the Reserved subfield may be a 1-bit field, the TBTT Information Count subfield may be a 4-bit field, and the TBTT information length subfield may be an 8-bit field.

The TBTT Information Field Type subfield identifies the TBTT information subfield together with the TBTT information length subfield. The value of the TBTT Information Field Type subfield may be configured to 0, and the values 1, 2, and 3 of the TBTT Information Field Type subfield may be reserved values.

When the filtered neighbor AP subfield is not included in the probe response frame transmitted by the TVHT AP, the filtered neighbor AP subfield is configured to the reserved field. The filtered neighbor AP subfield is reserved except when the Reduced Neighbor Report element is carried in a Probe Response frame transmitted by a TVHT AP. When the probe response frame transmitted by the TVHT AP includes the filtered neighbor AP subfield and all BSSs of the AP within the filtered neighbor AP subfield correspond to a specific SSID, the value of the filtered neighbor AP subfield may be configured to 1. Otherwise, the value of the filtered neighbor AP subfield may be configured to 0.

The TBTT Information Count subfield may indicate the number of TBTT information subfields included in the Neighbor AP Information subfield including the TBTT Information Count subfield. For example, the TBTT Information Count subfield may be set to a value obtained by subtracting 1 from the number of TBTT information subfields included in the Neighbor AP Information subfield including the TBTT Information Count subfield.

The TBTT information length subfield may indicate the length of each TBTT information subfield included in the Neighbor AP Information subfield including the TBTT information length subfield. In addition, the TBTT information length subfield may indicate the configuration of each TBTT information subfield included in the Neighbor AP Information subfield including the TBTT information length subfield. In this case, the TBTT information length subfield may indicate the length and configuration of each TBTT information subfield.

The TBTT Information Set subfield may include one or more TBTT information subfields.

The TBTT information subfield may be as illustrated in FIG. 24(*d*). The TBTT information subfield may include a neighbor AP TBTT offset subfield, a BSSID subfield, a Short SSID subfield, a BSS Parameters subfield, a 20 MHz PSD subfield, and a MLD Parameters subfield. The size of each subfield may be as illustrated in FIG. 24(*d*). In this case, the TBTT information subfield may be optionally included.

The neighbor AP TBTT offset subfield may indicate the offset lowered the interval between the immediately prior TBTT and the next TBTT of the AP transmitting the reduced neighbor report element, to the nearest TU. When the value of the neighbor AP TBTT offset subfield is 254, the neighbor AP TBTT offset subfield may indicate that the offset is 254 TU or larger. When the value of the neighbor AP TBTT offset subfield is 255, the neighbor AP TBTT offset subfield may indicate that the offset is unknown.

The BSSID subfield may indicate a BSSID.

The Short SSID subfield may indicate an SSID. Specifically, the Short SSID subfield may indicate abbreviated SSID information.

The BSS Parameters subfield may indicate information on the BSS. The information on the BSS may include information on the BSS operation.

The 20 MHz PSD subfield may indicate the maximum transmission power for the default category in the 20 MHz primary channel. In this case, the 20 MHz PSD subfield may indicate the maximum transmission power in dBm/MHz units. The value of the 20 MHz PSD subfield is a signed integer, and the value of −128 of the 20 MHz PSD subfield is a reserved value. The value 127 of the 20 MHz PSD subfield may indicate that there is no limit to the maximum transmission power for the default category. In addition, when the value of the 20 MHz PSD subfield, Y, is between −127 and 126, the 20 MHz PSD subfield may indicate that the maximum transmission power for the default category in the MHz main channel is Y/2 dBM/MHz.

The TBTT Information field configuration indicated by the value of the TBTT information length subfield may be as follows. When the value of the TBTT information length subfield is 1, the TBTT information subfield may include the neighbor AP TBTT offset subfield. When the value of the TBTT information length subfield is 2, the TBTT information subfield may include the neighbor AP TBTT offset subfield and the BSS Parameters subfield. When the value of the TBTT information length subfield is 4, the TBTT information subfield may include the neighbor AP TBTT offset subfield and the MLD Parameters subfield. When the value of the TBTT information length subfield is 5, the TBTT information subfield may include the neighbor AP TBTT offset subfield and the Short SSID subfield. When the value of the TBTT information length subfield is 6, the TBTT information subfield may include the neighbor AP TBTT offset subfield, the Short SSID subfield, and the BSS Parameters subfield. When the value of the TBTT information length subfield is 7, the TBTT information subfield may include the neighbor AP TBTT offset subfield and the BSSID subfield. When the value of the TBTT information length subfield is 8, the TBTT information subfield may include the neighbor AP TBTT offset subfield, the BSSID subfield, and the BSS Parameters subfield. When the value of the TBTT information length subfield is 9, the TBTT information subfield may include the neighbor AP TBTT offset subfield, the BSSID subfield, the BSS Parameters subfield, and the 20 MHz PSD subfield. When the value of the TBTT information length subfield is 10, the TBTT information subfield may include the neighbor AP TBTT offset subfield, the BSSID subfield, and the MLD parameter subfield. When the value of the TBTT information length subfield is 11, the TBTT information subfield may include the neighbor AP TBTT offset subfield, the BSSID subfield, and the Short SSID subfield. When the value of the TBTT information length subfield is 12, the TBTT information subfield may include the neighbor AP TBTT offset subfield, the BSSID subfield, the Short SSID subfield, and the BSS Parameters subfield. When the value of the TBTT information length subfield is 13, the TBTT information subfield may include the neighbor AP TBTT offset subfield, the BSSID subfield, the Short SSID subfield, the BSS Parameters subfield, and 20 MHz PSD subfield. When the value of the TBTT information length subfield is 16, the TBTT information subfield may include the neighbor AP TBTT offset subfield, the BSSID subfield, the Short SSID subfield, the BSS Parameters subfield, 20 MHz PSD subfield, and the MLD Parameters subfield. When the value of the TBTT information length subfield is 17 or greater, the TBTT information subfield may include the neighbor AP TBTT offset subfield, the BSSID subfield, the Short SSID subfield, the BSS Parameters subfield, 20 MHz PSD subfield, and the MLD Parameters subfield in the preceding 16 octets. The remaining subfields of the TBTT information subfield that are not described above may be designated as reserved. That is, the MLD Parameters subfield may be included when the TBTT information length subfield is 4, 10, 16, or 17 or greater.

The MLD parameter subfield may be as illustrated in FIG. 27(*e*). The MLD Parameters subfield may include an MLD ID subfield, a Link ID subfield, a BSS Parameters Change Count subfield, and a Reserved subfield. The MLD ID subfield may be an 8-bit field. In addition, the Link ID subfield may be a 4-bit field. In addition, the BSS Parameters Change Count subfield may be 8-bit. In addition, the Reserved subfield may be a 4-bit field.

The MLD ID subfield may indicate the ID of a multi-link device, for example, an AP multi-link device. The MLD subfield may indicate the ID of a multi-link device corresponding to the TBTT information subfield including the MLD ID subfield. A detailed method of specific configuring the MLD ID subfield may be as illustrated in FIG. 28.

The link ID subfield may indicate the ID of the link corresponding to the reported AP. If the reported AP does not belong to the multi-link device or the reporting AP does not have related information, the ID of the link may be configured to 15.

The BSS Parameters Change Count subfield may indicate an incremental value when a significant update occurs in the beacon frame of the reported AP. The value of the BSS Parameters Change Count subfield may be initialized to 0. The value of the BSS Parameters Change Count subfield may be incremented by 1 when a significant update occurs in the AP or BSS corresponding to the BSS Parameters Change Count subfield. The significant update may include updating predesignated parameters. The predesignated parameters may include operation parameters. When the reported AP does not belong to a multi-link device or the reporting AP does not have information on the multi-link device to which the reporting AP belongs, the value of the BSS Parameters Change Count subfield may be configured to 255.

Figure 28:
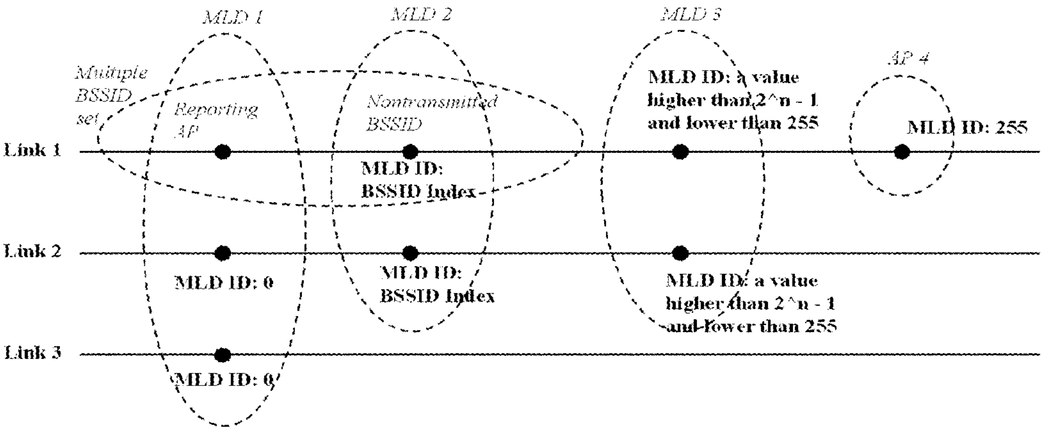
FIG. 28 illustrates a method for configuring an ID of a multi-link device according to an embodiment of the disclosure.

FIG. 28 illustrates a method for configuring an ID of a multi-link device according to an embodiment of the disclosure.

The ID of the multi-link device may be a value indicated by the MLD ID subfield described in FIG. 27. In addition, the MLD ID subfield may be 8 bits. The MLD ID subfield may represent a value from 0 to 255. In an embodiment of the disclosure, a reporting AP may represent an AP that configures and transmits the MLD ID subfield. In addition, a reported AP may represent an AP indicated by the MLD ID subfield or the TBTT information subfield including the MLD ID subfield.

According to an embodiment of the disclosure, the MLD ID subfield may be configured as follows. The MLD ID subfield may indicate an ID of an AP multi-link device to which the reported AP belongs. When the reported AP belongs to an AP multi-link device to which the reporting AP belongs, the MLD ID subfield may be configured to 0. When the reported AP belongs to a multi-link device set to which a nontransmitted BSSID belongs to the multiple BSSID sets, the value of the MLD ID subfield may be configured to the same value as the value of the BSSID Index field of the Multiple BSSID-Index element of the nontransmitted BSSID profile corresponding to the nontransmitted BSSID. When the reported AP is part of another AP multi-link device and the frame including the MLD ID subfield does not include multiple BSSID elements, the value of the MLD ID subfield may be configured to a value greater than 0 and less than 255. In addition, when the reported AP is part of another AP multi-link device and the frame including the MLD ID subfield includes multiple BSSID elements, the value of the MLD ID subfield may be configured to a value greater than $2^n-1$ and less than 255. In this case, n is the value of the MaxBSSID Indicator subfield of the multiple BSSID elements. When the reported AP is not part of the multi-link device or the reporting AP does not have information on the multi-link device, the value of the MLD ID subfield may be configured to 255. That is, when the reported AP belongs to the multi-link device to which the reporting AP belongs, the value of the MLD ID subfield may be configured to 0. Specifically, when the reported AP is not part of the multi-link device or the reporting AP does not have information on whether the reported AP belongs to the multi-link device, the value of the MLD ID subfield may be configured to 255. That is, when the reported AP belongs to the multi-link device to which the reporting AP belongs, the value of the MLD ID subfield may be configured to 0.

In the embodiment of FIG. 28, the reporting AP operates on the first link (link 1). The reporting AP belongs to the first multi-link device, and the reporting AP transmits the reduced neighbor report element and the MLD ID subfield. In addition, the first multi-link device MLD 1 operates on the first link (link 1), the second link (link 2), and the third link (link 3). In this case, the reporting AP sets the value of the MLD ID subfield corresponding to the AP operating on each of the second link (link 2) and the third link (link 3) to 0.

In addition, the reporting AP may transmit the multiple BSSID elements together with the reduced neighbor report element. In another specific embodiment, the reporting AP may not transmit the multiple BSSID elements. In this case, the case where the reporting AP transmits the multiple BSSID elements may be the case where the reporting AP belongs to the multiple BSSID sets. In addition, the case where the reporting AP does not transmit the multiple BSSID elements may be the case where the reporting AP does not belong to the multiple BSSID sets.

According to an embodiment of the disclosure, when the reported AP is included in the multiple BSSID sets to which the reporting AP belongs, the value of the MLD ID subfield may be configured to a BSSID index of the multiple BSSID sets. In addition, when the reported AP belongs to a multi-link device to which an AP belongs to the multiple BSSID sets to which the reporting AP belongs, the value of the MLD ID subfield may be configured to a BSSID index of the AP to which the multiple BSSID sets to which the reporting AP belongs. When the reported AP belongs to a multi-link device to which an AP of a nontransmitted BSSID belongs to the multiple BSSID sets to which the reporting AP belongs, the value of the MLD ID subfield may be configured to a BSSID index of the reported AP.

The multi-BSSID set to which the reporting AP belongs may include an AP that operates on the first link (link 1) and belongs to the second multi-link device MLD 2. The second multi-link device MLD 2 may include an AP operating on the first link (link 1) and an AP operating on the second link (link 2). The reporting AP may configure the value of the MLD ID subfield corresponding to the AP operating on the first link (link 1) belonging to the second multi-link device MLD 2 and the AP operating on the second link (link 2) belonging to the second multi-link device MLD 2 to the BSSID index of the reported AP. This is because that the AP of the second multi-link device MLD 2 operating on the first link (link 1) and the AP of the second multi-link device MLD 2 operating on the second link (link 2) belong to the same multi-BSSID set as the reporting AP or belong to a multi-link device included in the multi-BSSID set to which the reporting AP belongs.

When the reporting AP transmits multiple BSSID elements, when the reported AP does not belong to the multi-link device to which the reporting AP belongs, when the reported AP does not belong to the multiple BSSID sets to which the reporting AP belongs, and when the reported AP does not belong to the multi-link device to which an AP of the multiple BSSID sets including the reporting AP belongs, the value of the MLD ID subfield may be configured to a value greater than $2^n-1$ and less than a predesignated value.

In addition, when the reporting AP transmits multiple BSSID elements, when the reported AP does not belong to the multi-link device to which the reporting AP belongs, when the reported AP does not belong to the multiple BSSID sets to which the reporting AP belongs, and when the reported AP does not belong to the multi-link device to which an AP of the multiple BSSID sets including the reporting AP belongs, the value of the MLD ID subfield may be configured to a value greater than $2^n-1$ and less than a predesignated value. In addition, this may be limited to the case where the reported AP belongs to MLD. The above preconfigured value may be the largest value that the MLD ID subfield may represent. The above preconfigured value may be 255. In addition, n may be the MaxBSSID Indicator value corresponding to the multiple BSSID sets that includes the reporting AP.

In FIG. 28, the third multi-link device MLD 3 may include an AP operating on the first link (link 1) and an AP operating on the second link (link 2). In addition, the AP belonging to the third multi-link device (MLD 3) and operating on the first link (link 1) may not belong to the multiple BSSID sets to which the reporting AP belongs. In this case, the value of the MLD ID subfield for the AP belonging to the third multi-link device MLD 3 and operating on the first link (link 1) and the AP belonging to the third multi-link device MLD 3 and operating on the second link (link 2) may be configured to a value greater than 2^n−1 and less than 255. This is because that the AP belonging to the third multi-link device (MLD 3) and operating on the first link (link 1) and the AP belonging to the third multi-link device (MLD 3) and operating on the second link (link 2) do not belong to the multi-link device to which the reporting AP belongs, and these two APs are not included in the multi-link device to which an AP of the multiple BSSID sets including the reporting AP belongs.

When the reporting AP does not transmit multiple BSSID elements, and when the reporting AP does not belong to the multi-link device to which the reporting AP belongs, the value of the MLD ID subfield may be configured to a value greater than 0 and less than a predesignated value. In addition, this may be limited to the case where the reporting AP belongs to the multi-link device. In addition, the predesignated value may be the largest value that the MLD ID subfield may represent. The predesignated value may be 255.

In addition, 1) when the reported AP does not belong to a multi-link device, 2) when the reporting AP does not have information on whether the reported AP belongs to the multi-link device, and 3) when the reporting AP does not have information for configuring the value of the MLD ID subfield described above, the reporting AP may configure the value of the MLD ID subfield to a predesignated value. In another specific embodiment, 1) when the reported AP does not belong to a multi-link device, 2) when the reporting AP does not have information on whether the reported AP belongs to the multi-link device, and 3) when the reporting AP does not have information for configuring the value of the MLD ID subfield described above, the reporting AP may configure the value of the MLD ID subfield to a predesignated value or greater. The predesignated value may be the largest value that the MLD ID subfield may represent. The predesignated value may be 255.

In FIG. 28, the fourth AP (AP 4) operates on the first link (link 1). In this case, the fourth AP (AP 4) does not belong to any multi-link device. Therefore, the reporting AP may set the value of the MLD ID subfield corresponding to the fourth AP (AP 4) to 255.

The station may determine from which BSS the frame has been transmitted based on the MAC address field of the MAC header of the received frame. Specifically, the station may determine whether the received frame has been transmitted from an AP to which the station is associated or an AP belonging to multiple BSSIDs to which the station is associated based on the MAC address field of the MAC header of the received frame. In a specific embodiment, the station may determine whether the received frame has been transmitted from an AP to which the station is associated or an AP belonging to multiple BSSIDs to which the station is associated based on the TA field of the MAC header of the received frame. In this case, when the TA field of the frame received by the station indicates MAC address of the AP to which the station is associated or MAC address of the AP belonging to the multiple BSSID sets to which the station is associated, the station may determine that the received frame has been transmitted from the AP to which the station is associated or the AP belonging to the multiple BSSID sets to which the station is associated. when the TA field of the frame received by the station does not indicate MAC address of the AP to which the station is associated or MAC address of the AP belonging to the multiple BSSID sets to which the station is associated, the station may determine that the received frame has been transmitted from the AP to which the station is associated and the AP belonging to the multiple BSSID sets to which the station is associated.

The station may determine to which AP the frame is transmitted based on the MAC address field of the MAC header of the received frame. In specific embodiment, the station may determine whether the received frame has been transmitted from an AP to which the station is associated or an AP belonging to multiple BSSIDs to which the station is associated based on the RA field of the MAC header of the received frame. In this case, when the RA field of the frame received by the station indicates MAC address of the AP to which the station is associated or MAC address of the AP belonging to the multiple BSSID sets to which the station is associated, the station may determine that the received frame has been transmitted from the AP to which the station is associated or the AP belonging to the multiple BSSID sets to which the station is associated. when the RA field of the frame received by the station does not indicate MAC address of the AP to which the station is associated or MAC address of the AP belonging to the multiple BSSID sets to which the station is associated, the station may determine that the received frame has been transmitted from the AP to which the station is associated and the AP belonging to the multiple BSSID sets to which the station is associated.

The station may determine whether the frame is an inter-BSS frame based on the MAC address field of the MAC header of the received frame. The MAC address field may include at least one of the RA field, the TA field, and the BSSID field. When none of the RA field, the TA field, and the BSSID field of the frame received by the station indicates the MAC address of the AP to which to which the station is associated and the MAC address of the AP in the multi-plex BSSID set to which the station is associated, the station may determine the received frame as the inter-BSS frame. When at least one of the RA field, TA field, and BSSID field of the frame received by the station indicates the MAC address of the AP to which to which the station is associated and the MAC address of the AP in the multi-plex BSSID set to which the station is associated, the station may determine the received frame as the intra-BSS frame.

In these embodiments, the BSSID may be used instead of the MAC address of the AP.

When the BSS color included in the preamble of the PPDU received by the station is the same as the BSS color of the BSS to which the station belongs, and it is indicated that the preamble of the PPDU received by the station is for downlink transmission, the station may determine that the AP to which the station is associated or the AP belonging to a multi-BSSID set to which the station is associated has transmitted the received PPDU. When the BSS color included in the preamble of the PPDU received by the station is different from the BSS color of the BSS to which the station belongs, or it is not indicated that the preamble of the PPDU received by the station is for downlink transmission, the station may determine that the AP to which the station is associated or the AP belonging to a multi-BSSID set to which the station is associated has not transmitted the received PPDU.

The multiple BSSID sets may be a set of multiple BSSs in which information on the BSS may be signaled by a single beacon frame or a single probe response frame. Specifically, a set of BSSIDs indicated by a single multiple BSSID element may be referred to as the multiple BSSID sets. In addition, a single TIM element included in a single beacon frame or a single TIM frame may indicate a frame buffered in multiple BSSIDs included in the multiple BSSID sets. In addition, the single beacon frame or the single probe response frame may include multiple BSSID elements. The multiple BSSID elements may signal information on multiple BSSs. The BSSID of the BSS to which the single beacon frame or probe response frame described above is transmitted is referred to as a transmitted BSSID. In the multiple BSSID sets, the remaining BSSIDs except the transmitted BSSID may be referred to as nontransmitted BSSIDs. In addition, the BSS corresponding to the non-transmitted BSSID may not transmit the beacon frame or probe response frame.

As described above, the maximum number of BSSIDs that the multiple BSSID sets may include may be $2^n$. In this case, n may be a value signaled in the Multiple BSSID element. For example, n may be a value indicated by the MaxBSSID Indicator included in the Multiple BSSID element. A station receiving the Multiple BSSID element may determine the MAC address or BSSID of the AP included in the Multiple BSSID sets based on the received Multiple BSSID element. In addition, each of the multiple BSSID indices may be mapped to each of the BSSIDs included in the Multiple BSSID sets. Therefore, the BSSID included in the Multiple BSSID sets may be identified by the BSSID index. The maximum value of the MaxBSSID Indicator may be 8.

However, as an embodiment of the method of configuring the MLD ID subfield described above, there may be cases where the value of the MLD ID subfield cannot be configured.

In the embodiments described above, when at least one of the predesignated conditions is satisfied, the reporting AP may configure the value of the MLD ID subfield to a predesignated value. In another specific embodiment, if the predesignated condition is satisfied, the reporting AP may configure the value of the MLD ID subfield to a predesignated value or greater. The predesignated value may be the largest value that the MLD ID subfield may represent. In this case, the predesignated value may be 255. The predesignated condition may include at least one of 1) the reported AP does not belong to a multi-link device, 2) the reporting AP does not have information on whether the reported AP belongs to a multi-link device, and 3) the reporting AP does not have information to configure the value of the MLD ID subfield described above. In addition, the predesignated condition may include that the reported AP does not belong to the multi-link device to which an AP of the multiple BSSID sets including the reporting AP belongs when the value of the MaxBSSID Indicator field corresponding to the reporting AP is the maximum value. This condition may be that the reporting AP transmits multiple BSSID elements. The maximum value of the MaxBSSID Indicator field may be 8.

When the reporting AP transmits a multiple BSSID elements, and when the reported AP is an AP included in the multiple BSSID sets that includes the reporting AP, or belongs to the multi-link device to which an AP of the multiple BSSID sets including the reporting AP belongs, the MLD ID subfield may be configured to the BSSID index of the AP included in the multiple BSSID sets. When the value of the MaxBSSID Indicator subfield is 8, the maximum number of BSSIDs that the multiple BSSID sets may include may be $2^8=256$. Therefore, according to the conditions described above, there may not be a value greater than $2^n-1$ and less than 255.

In addition, when the value of the MaxBSSID Indicator subfield corresponding to the reporting AP is the maximum value, even if the reported AP belongs to the multi-link device to which an AP of the multiple BSSID sets including the reporting AP belongs, the reporting AP may not be able to configure the value of the MLD ID subfield. For example, the reporting AP may not indicate a multi-link device with a BSSID index of 255. This is because the value of the MLD ID subfield may be configured to 255 according to the embodiment described above. Therefore, when the value of the MLD ID subfield is 255, it is difficult to distinguish whether the value is 255 configured based on the BSSID index or 255 configured based on a predesignated value.

Accordingly, the condition for configuring the value of the MLD ID subfield to a predesignated value may further include that the reported AP belongs to the multi-link device to which an AP of the multiple BSSID sets including the reporting AP belongs when the value of the MaxBSSID Indicator subfield corresponding to the reporting AP is the maximum value. In another specific embodiment, the use of 255 as a BSSID index in a multi-BSSID set may not be permitted.

In addition, when following the embodiments described above, regardless of whether the reporting AP transmits multiple BSSID elements, it may be difficult for the reporting AP to configure the value of the MLD ID subfield. For example, when the reporting AP indicates information on a large number of APs, it may be difficult for the reporting AP to configure the value of the MLD ID subfield. The number of reported APs is greater than the number of IDs of multi-link devices that may be configured, so the reported AP may not be identified by the ID of the multi-link device. For example, when the reporting AP transmits multiple BSSID elements and the reporting AP transmits information on more than ($254-2^n+1$) APs, it may not be possible to identify the reported AP by the ID of the multi-link device in a limited range. When the reporting AP does not transmit the multiple BSSID elements and the reporting AP delivers information on more than ($254-1+1$) APs, the reported AP may not be identified with the limited range of IDs. The condition for configuring the value of the MLD ID subfield to the predesignated value may further include cases where the reported AP cannot be identified with the limited range of IDs.

To solve the problem described above, the size of the MLD ID subfield may be configured to a bit greater than 8 bits. In this case, the predesignated value may be the maximum value that the MLD ID subfield may indicate. That is, if the size of the MLD ID subfield is N bits, the predesignated value may be $2^N-1$. For example, the size of the MLD ID subfield may be 9 bits, and the predesignated value may be 511. As another example, the size of the MLD ID subfield may be 16 bits, and the predesignated value may be 65,535.

Figure 29:
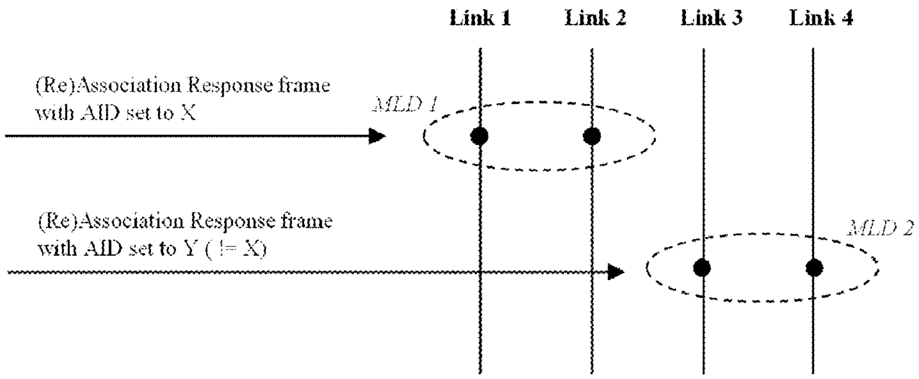
FIG. 29 illustrates a method for allocating an AID to a non-AP station belonging to a multi-link device according to an embodiment of the disclosure.
Figure 30:
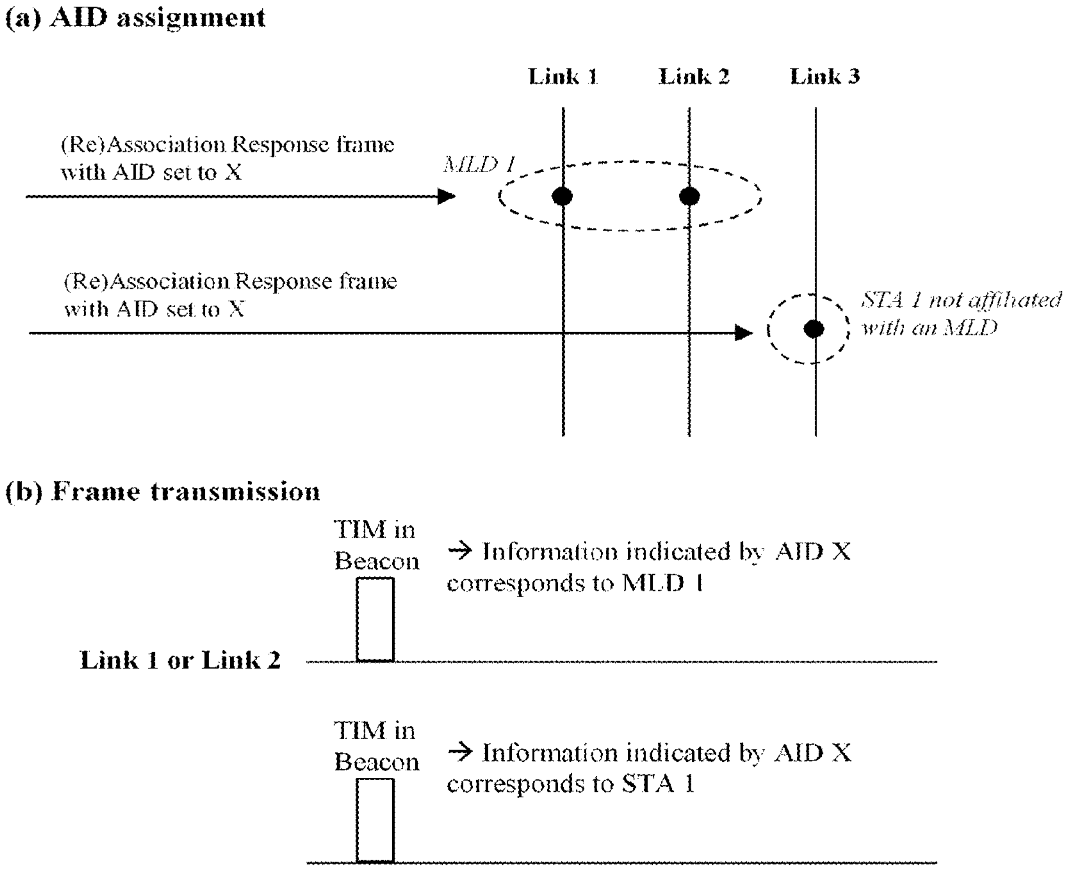
FIG. 30 illustrates a method for allocating an AID to a non-AP station belonging to a multi-link device according to an embodiment of the disclosure.

FIGS. 29 to 30 illustrate a method for allocating an AID to a non-AP station belonging to a multi-link device according to an embodiment of the disclosure.

According to an embodiment of the disclosure, one association ID (AID) may be allocated to a multi-link device. That is, the AIDs of the stations included in one multi-link device may be the same.

AID allocation may be performed by an AP. For example, the AP may transmit the AID allocated to the non-AP STA. The non-AP STA may recognize that the AID received from the AP is the AID corresponding to the AID itself. Upon receiving the subfield including the AID value allocated to the non-AP station, the non-AP station may recognize that the subfield including the AID value allocated to the non-AP station indicates the non-AP station.

The AID allocated to the non-AP station may be included in the association response frame or the reassociation response frame. When a multi-link setup is performed after the AP allocates the AID to the non-AP station, the AID allocated to the non-AP station may be allocated to the multi-link device to which the non-AP station belongs.

AID or information related to AID may be included in the preamble of the PPDU. In this case, the PPDU preamble may use the AID to indicate that the intended recipient of the PPDU is the non-AP station corresponding to the AID. The PPDU preamble may use the AID to indicate that the sender of the PPDU is the non-AP station corresponding to the AID. In addition, as described above, the AID may be used for traffic indication. A frame may use the AID to indicate that the station corresponding to the AID is the recipient of the frame. For example, a trigger frame may use the AID to indicate the station that the trigger frame triggers.

The AID allocated to a multi-link device may not be allowed to be allocated to another station or another multi-link device. In a specific embodiment, the AID allocated to a multi-link device may not be allowed to be allocated to a station or multi-link device operating on a link that is not operating on the link used by the multi-link device.

In FIG. 29, a first multi-link device MLD 1 operates on a first link (link 1) and a second link (link 2). In addition, a second multi-link device MLD 2 operates on a third link (link 3) and a fourth link (link 4). In this case, X is allocated as the AID of the first multi-link device MLD 1. Therefore, X is not allowed to be allocated but Y is allocated as the AID of the second multi-link device MLD 2.

In a specific embodiment of the disclosure, the AP multi-link device may reallocate an AID allocated to one multi-link device to another station or another multi-link device. If a predesignated condition is satisfied, the AP multi-link device may reallocate an AID allocated to one multi-link device to another station or another multi-link device. In this case, the predesignated condition may include that a multi-link device or station to which one AID is allocated in common operates on different links. That is, the predesignated condition may include that a multi-link device or station to which one AID is allocated in common operates on links not overlapped each other. In this case, it may not be allowed to allocate one AID to a station operating on one link and a plurality of multi-link devices. In another specific embodiment, the predesignated condition may include that a multi-link device or station to which one AID is allocated in common operates on channels not overlapped each other.

In FIG. 30(*a*), the first multi-link device MLD 1 operates on the first link (link 1) and the second link (link 2). The AP multi-link device allocates X to the AID of the station of the first multi-link device MLD 1. In this case, the AP multi-link device may allocate X as the AID of the first station STA1 that does not belong to the first multi-link device MLD 1 and operates on the third link (link) other than the first link (link 1) and the second link (link 2).

In such an embodiment, when a frame includes information on multiple links, a single AID allocated to multiple multi-link devices or stations may cause confusion. To prevent this, information transmitted from any one link may be applicable to a station or multi-link device operating on the corresponding link. For example, information transmitted from the first link may be applicable to the station or multi-link with AID X operating on the first link, and may not be applicable to the station or multi-link with AID X operating on the second link.

In FIG. 30(*b*), a beacon frame including a TIM is transmitted from each of the first link (link 1) and the second link (link 2). In this case, both the TIM transmitted from the first link (link 1) and the second link (link 2) indicate that traffic corresponding to AID X is buffered. The TIM transmitted from the first link (link 1) indicates that traffic for the multi-link device MLD 1 operating on the first link (link 1) is buffered, and The TIM transmitted from the second link (link 2) indicates that traffic for the station STA1 operating on the second link (link 2) is buffered.

A TID-to-link mapping negotiation is described with reference to FIGS. 31 to 33.

Figure 31:
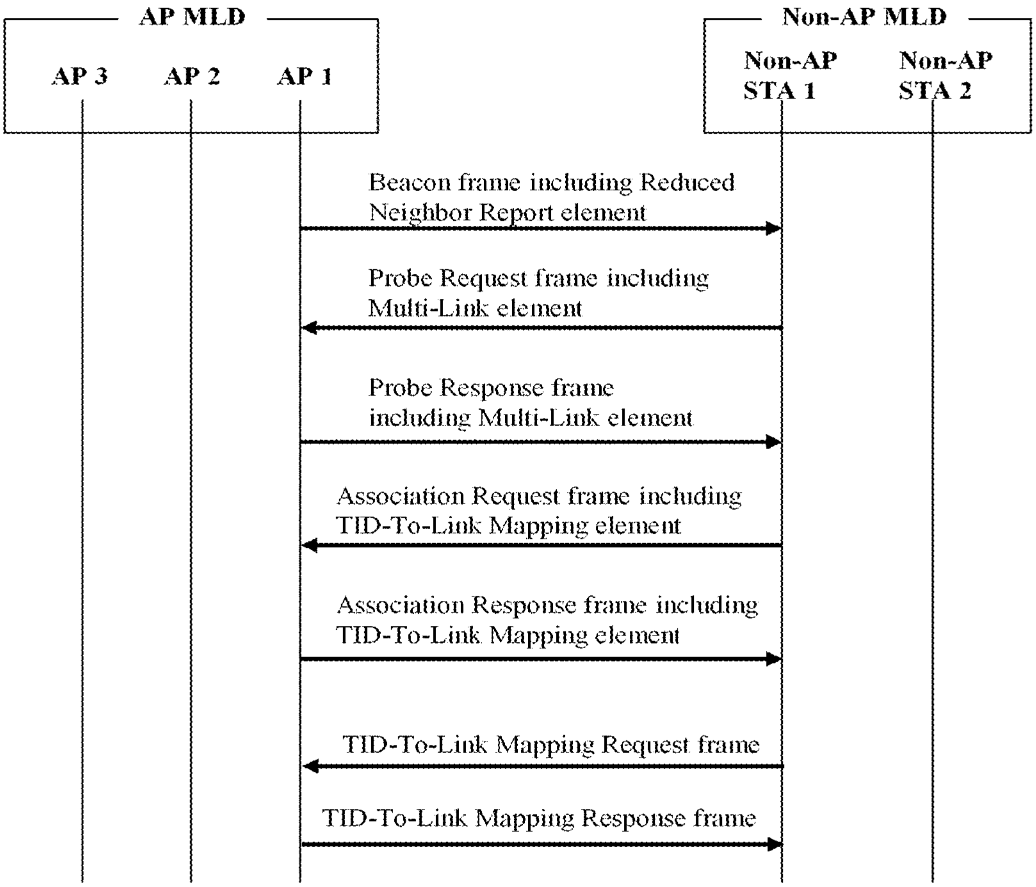
FIG. 31 illustrates a TID-to-link mapping negotiation in which an AP multi-link device transmits a TID-to-link mapping request according to an embodiment of the disclosure.

FIG. 31 a diagram illustrating a TID-to-link mapping negotiation according to an embodiment of the disclosure.

As described above, the default mapping may be applied to the link where the TID-to-link mapping is not performed. In addition, when the TID-to-link mapping is torn down on a link where the TID-to-link mapping negotiation is completed, default mapping may be applied to the link again.

The TID-to-link mapping negotiation may be performed through a TID-to-link mapping request and a TID-to-link mapping response. Specifically, a multi-link device may perform a TID-to-link mapping request by transmitting a frame including a TID-To-Link Mapping element. In this case, the frame may include an association request frame, a reassociation request frame, and a TID-to-link mapping request frame. Therefore, a non-AP station or a non-AP multi-link device may request TID-to-link mapping by transmitting the association request frame, the reassociation request frame, or the TID-to-link mapping request frame. An AP or an AP multi-link device may request TID-to-link mapping by transmitting the TID-to-link mapping request frame. The multi-link device that has received the TID-to-link mapping request may perform the TID-to-link mapping response by transmitting a frame including the TID-To-Link Mapping element. In this case, the frame may include the association response frame, the reassociation response frame, and the TID-to-link mapping response frame. Therefore, the AP or the AP multi-link device may respond to the TID-to-link mapping request by transmitting the association response frame, the reassociation response frame, or the TID-to-link mapping request frame. The non-AP station or the non-AP station multi-link device may respond to the TID-to-link mapping request by transmitting the TID-to-link mapping response frame.

The multi-link device may initiate TID-to-link mapping by transmitting the TID-to-link mapping request. In this case, the multi-link device may request default mapping by transmitting a frame including the TID-to-link element. The multi-link device that has received the TID-to-link mapping request may accept TID-to-link mapping by transmitting the TID-to-link mapping response to the TID-to-link mapping request. In this case, the multi-link device that has received the TID-to-link mapping request may accept TID-to-link mapping by transmitting a frame that does not include the TID-to-link Mapping element. In another specific embodiment, the multi-link device that has received the TID-to-link mapping request may accept the TID-to-link mapping by transmitting a frame including the TID-to-link Mapping element having the same content as the TID-to-link Mapping content received from the non-AP multi-link device.

In addition, the multi-link device that has received the TID-to-link mapping request may reject TID-to-link mapping by transmitting the TID-to-link mapping response to the TID-to-link mapping request. In this case, the multi-link device that has received the TID-to-link mapping request may reject TID-to-link mapping by transmitting a frame that does not include the TID-to-link Mapping element. In another specific embodiment, the multi-link device that has received the TID-to-link mapping request may reject the TID-to-link mapping by transmitting a frame including the TID-to-link Mapping element having content different from the received TID-to-link mapping element content. When the TID-to-link mapping is rejected, the default mapping may be applied to the link.

In these embodiments, the frame transmitted by the multi-link device for the TID-to-link mapping request and response may include at least one of the association request frame, association response frame, re-association request frame, re-association response frame, TID-to-link mapping request frame, and TID-to-link mapping response frame as described above. Specifically, the multi-link device that has received the TID-to-link mapping request may transmit the TID-to-link mapping response frame for the TID-to-link mapping request. In this case, the multi-link device that has received the TID-to-link mapping request may accept or reject the TID-to-link mapping request by inserting a status code into the TID-to-link mapping response frame. Specifically, the multi-link device that has received the TID-to-link mapping request may accept the TID-to-link mapping request by configuring the status code of the TID-to-link mapping response frame to SUCCESS. In addition, the multi-link device that has received the TID-to-link mapping request may reject the TID-to-link mapping request by configuring the status code of the TID-to-link mapping response frame to REJECT or DENIED_TID_TO_LINK_MAPPING. In addition, the multi-link device that has received the TID-to-link mapping request may reject the TID-to-link mapping request by configuring the status code of the TID-to-link frame to mapping response PREFERRED_TID_TO_LINK_MAPPING_SUGGESTED. In this case, the multi-link device that has received the TID-to-link mapping request may reject the TID-to-link mapping request while suggesting a preferred TID-to-link mapping. In addition, the multi-link device that has received the TID-to-link mapping request may reject the TID-to-link mapping request by transmitting a TID-To-Link mapping rejection frame.

The TID-To-Link Mapping element included in the TID-to-link matching request indicates the TID-to-link mapping that is the target of the TID-to-link mapping request. In addition, the TID-To-Link Mapping element transmitted when accepting the TID-to-link mapping may indicate the accepted TID-to-link mapping. In addition, the TID-To-Link Mapping element transmitted when rejecting the TID-to-link mapping may indicate the newly proposed TID-to-link mapping.

When the TID-to-link mapping request is accepted, the TID-to-link mapping included in the TID-to-link mapping request is configured to the link that is the target of the TID-to-link mapping. In addition, when the TID-to-link mapping request is rejected, the default mapping may be applied to the link that is the target of the TID-to-link mapping.

In addition, for TID-to-link mapping negotiation, the TID-to-link mapping request frame and the TID-to-link mapping response frame may include a dialog token. The dialog token maps the TID-to-link mapping request frame and the TID-to-link mapping response frame. Specifically, if the value of the dialog token of the TID-to-link mapping request frame and the value of the dialog token of the TID-to-link mapping response frame are the same, the TID-to-link mapping response frame may be the frame transmitted in response to the TID-to-link mapping request frame. Therefore, when the multi-link device that has received the TID-to-link mapping request frame transmits the TID-to-link mapping response frame, the multi-link device may configure the value of the dialog token of the TID-to-link mapping request frame to the value of the dialog token of the TID-to-link mapping request frame. When the multi-link device does not receive the TID-to-link mapping request frame but transmits the TID-to-link mapping response frame, the multi-link device may configure the dialog token value of the TID-to-link mapping response frame to a predesignated value. In this case, the predesignated value may be 0. That is, when the multi-link device transmits an unsolicited TID-To-Link Mapping Response frame, the multi-link device may configure the dialog token value of the TID-to-link mapping response frame to a predesignated value. The field indicating the dialog token in the TID-to-link mapping request frame and the TID-to-link mapping response frame may be a 1-octet field. The value of the dialog token may be any one from 0 to 255.

When the capability of the multi-link device supports TID-to-link mapping, the multi-link device may perform TID-to-link mapping. In addition, depending on the capability of the multi-link device, the range in which the multi-link device may perform TID-to-link mapping may vary. For example, depending on the capability of the multi-link device, the number of TIDs that the multi-link device may map to a link or the number of combinations of TID and link mapping that may be applied may vary. The capability of the multi-link device may indicate whether the multi-link device may map all TIDs to the same link set. In addition, the capability of the multi-link device may indicate how many link sets the TID may map to by the multi-link device.

In the embodiment of FIG. 31, the AP multi-link device AP MLD includes a first AP (AP 1), a second AP (AP 2), and a third AP (AP 3). The non-AP multi-link device non-AP MLD includes a first non-AP station non-AP STA 1 and a second non-AP station non-AP STA 2. The non-AP multi-link device non-AP MLD transmits the association request frame including the TID-to-link Mapping element to the AP multi-link device AP ML. The AP multi-link device AP ML may transmit the association response frame including the TID-to-link Mapping element to the non-AP multi-link device Non-AP MLD to accept or reject the TID-to-link mapping corresponding to the TID-to-link Mapping element. In addition, the non-AP multi-link device Non-AP MLD may transmit the TID-to-link mapping request frame to the AP multi-link device AP ML to renegotiate the TID-to-link mapping. In this case, the AP multi-link device AP ML may transmit the TID-to-link mapping response frame to the non-AP multi-link device Non-AP MLD to accept or reject the TID-to-link mapping corresponding to the TID-to-link Mapping element.

Figure 32:
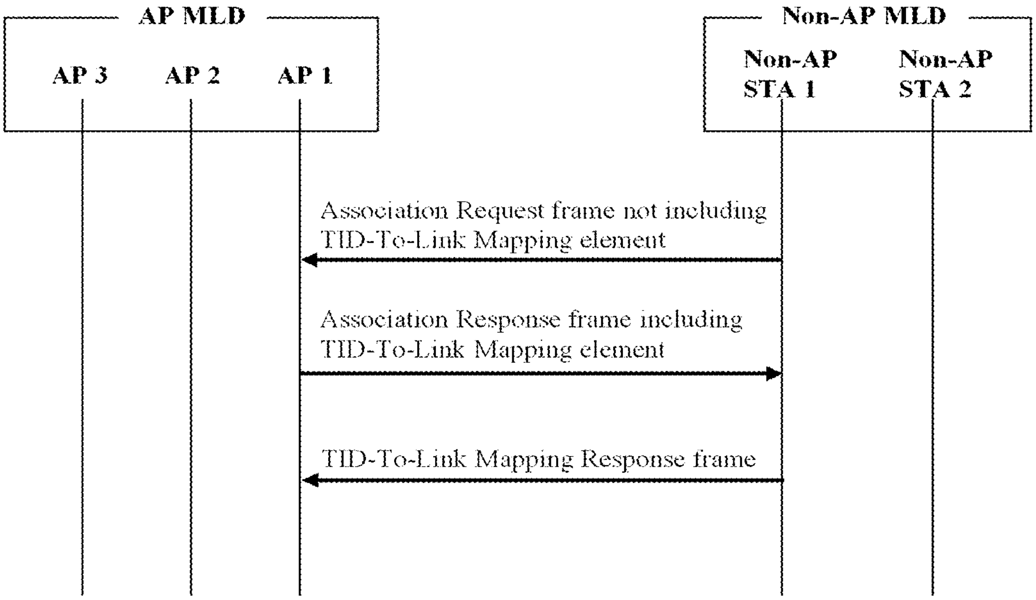
FIG. 32 illustrates a TID-to-link mapping negotiation in which an AP multi-link device transmits a TID-to-link mapping request according to an embodiment of the disclosure.

FIG. 32 illustrates a TID-to-link mapping negotiation in which an AP multi-link device transmits a TID-to-link mapping request according to an embodiment of the disclosure.

The AP multi-link device may transmit the TID-to-link mapping request through an association response frame, a reassociation response frame, and a TID-to-link mapping request frame. Specifically, the AP multi-link device may initiate TID-to-link mapping negotiation through the association response frame, the reassociation response frame, and the TID-to-link mapping request frame. In this case the AP multi-link device may include the TID-to-link Mapping element in the association response frame, the reassociation response frame, and the TID-to-link mapping request frame. Specifically, the AP multi-link device may initiate TID-to-link mapping negotiation by including the TID-to-link Mapping element in the association response frame, the reassociation response frame, and the TID-to-link mapping request frame. This is because the TID-to-link mapping request transmitted by the non-AP multi-link device may be in a form that the AP multi-link device does not need, and the non-AP multi-link device may not transmit the TID-to-link mapping request transmitted by the non-AP multi-link device. In addition, the AP multi-link device may easily grasp the overall network situation compared to the non-AP multi-link device, and thus may determine efficient TID-to-link mapping. In this case, the AP multi-link device transmits the association response frame or the reassociation response frame before completing the TID-to-link mapping negotiation, so that the multi-link setup and re-setup may be completed. When the non-AP multi-link device that has received the TID-to-link mapping request transmits the TID-to-link mapping response, the TID-to-link mapping negotiation is successfully completed.

The case in which the AP multi-link device may transmit the TID-to-link mapping request through the association response frame and the reassociation response frame may be limited. Specifically, when the association request frame does not request TID-to-link mapping, the AP multi-link device may transmit the TID-to-link mapping request through the association response frame. When the association request frame does not include the TID-to-link Mapping element, the AP multi-link device may determine that the association request frame does not request TID-to-link mapping. In addition, when the reassociation request frame does not request TID-to-link mapping, the AP multi-link device may transmit the TID-to-link mapping request through the reassociation response frame. When the reassociation request frame does not include the TID-to-link Mapping element, the AP multi-link device may determine that the reassociation request frame does not request TID-to-link mapping. When the association request frame transmitted by the non-AP multi-link device does not include the TID-to-link Mapping element, the non-AP multi-link device may determine that the association response frame received in response to the association request frame and including the TID-to-link Mapping element requests TID-to-link mapping. When the reassociation request frame transmitted by the non-AP multi-link device does not include the TID-to-link Mapping element, the non-AP multi-link device may determine that the reassociation response frame received in response to the reassociation request frame and including the TID-to-link Mapping element requests TID-to-link mapping. This is because that these embodiments may confuse the non-AP multi-link device about the intent of the association response frame including the TID-to-link element when the association request frame includes the TID-to-link element and the association request frame includes the TID-to-link element. This is also the case for the reassociation request frame.

In addition, in these embodiments, the AP multi-link device may not determine that the TID-to-link mapping is successfully completed until the AP multi-link device receives the TID-to-link mapping response from the non-AP multi-link device. Therefore, the AP multi-link device may operate according to the default mapping until the AP multi-link device receives the TID-to-link mapping response from the non-AP multi-link device. In addition, even if the AP multi-link device receives an ACK for the association response frame or the reassociation response frame, the AP multi-link device may not determine that the TID-to-link mapping is successfully completed.

The non-AP multi-link device may respond to the TID-to-link mapping request transmitted by the AP multi-link device through the association frame or the reassociation frame according to the embodiments described above. However, it is necessary to clearly indicate that the non-AP multi-link device responds to the TID-to-link mapping request transmitted by the AP multi-link device through the association frame or the reassociation frame. The non-AP multi-link device may transmit the TID-to-link mapping response as a response frame to the association response frame requesting TID-to-link mapping or the reassociation response frame requesting TID-to-link mapping. In addition, the non-AP multi-link device may configure the dialog token value of the TID TID-to-link mapping response to be the same as the dialog token value included in the association response frame requesting TID-to-link mapping or the reassociation response frame requesting TID-to-link mapping. However, the association response frame requesting TID-to-link mapping and the reassociation response frame requesting TID-to-link mapping may not include the dialog token.

Therefore, the TID-to-link Mapping element may include a response indication field indicating that it is a response to the TID-to-link mapping request. In this case, the response indication field may be included in the TID-to-Link Mapping Control field described above. In this case, the response indication field may be included in the TID-to-Link Mapping Control field described above. Specifically, the response indication field may be included in the reserved field of the TID-to-Link Mapping Control field described above. For example, the response indication field may be any one of the fourth bit B4 to the eighth bit B8 of the TID-to-Link Mapping Control field. The multi-link device that has received the TID-to-link element may determine whether the TID-to-link Mapping element requests TID-to-link mapping based on the response indication field.

Since the non-AP multi-link device transmits the TID-to-link mapping response frame in response to the association request frame or the reassociation request frame, the AP multi-link device needs to distinguish which frame the TID-to-link mapping response frame is a response to. Specifically, when the non-AP multi-link device transmits the TID-to-link mapping response frame in response to the association request frame or the reassociation request frame, the non-AP multi-link device may configure the dialogue token value of the TID-to-link mapping response frame to a random value. In addition, when the dialogue token value of the TID-to-link mapping response frame is the same as the dialogue token value of the TID-to-link mapping request frame transmitted by the AP multi-link device, the AP multi-link device may determine that the TID-to-link mapping response frame may be a response to the TID-to-link mapping request frame. In addition, when the dialogue token value of the TID-to-link mapping response frame is different from the dialogue token value of the TID-to-link mapping request frame transmitted by the AP multi-link device, the AP multi-link device may determine that the TID-to-link mapping response frame may be a response to the association request frame or the reassociation request frame.

In another specific embodiment, when the AP multi-link device transmits the TID-to-link mapping request through the association response frame or the reassociation response frame, the dialogue token value of the TID-to-link mapping response frame transmitted in response to the TID-to-link mapping request may be configured to a predesignated value. In this case, the predesignated value may be 0, 1, or 255. When the AP multi-link device transmits the TID-to-link mapping request through the association frame or the reassociation frame and receives the TID-to-link mapping response frame with the value of the predesignated value of the dialog token, the AP multi-link device may determine that the received TID-to-link mapping response frame is a response to the transmitted TID-to-link mapping request.

In another specific embodiment, when the AP multi-link device transmits the TID-to-link mapping request through the association response frame or the reassociation response frame, the status code of the TID-to-link mapping response frame transmitted in response to the TID-to-link mapping request may be a predesignated value. In this case, the predesignated value of the status code may be different from the value of the status code of the TID-to-link mapping response frame transmitted in response to the TID-to-link mapping request transmitted by the multi-link device through a frame other than the association frame and the reassociation frame. Through this, the AP multi-link device may determine, based on the status code of the received TID-to-link mapping response frame, whether the received TID-to-link mapping response frame is a response to the TID-to-link mapping request transmitted by the AP multi-link device through the association response frame or the reassociation response frame. Specifically, when the status code of the received TID-to-link mapping response frame is the predesignated value, the AP multi-link device may determine that the received TID-to-link mapping response frame is a response to the TID-to-link mapping request transmitted by the AP multi-link device through the association response frame or the reassociation response frame.

In another specific embodiment, the AP multi-link device may determine, based on the value of the Link Mapping field for the TID of the received TID-to-link mapping response frame, whether the received TID-to-link mapping response frame is a response to the TID-to-link mapping request transmitted by the AP multi-link device through the association response frame or the reassociation response frame. Specifically, when the value of the Link Mapping field for the TID of the received TID-to-link mapping response frame and the value of the Link Mapping field for the TID of the TID-to-link mapping request transmitted by the AP multi-link device through the association response frame or the reassociation response frame are the same, the AP multi-link device may determine that the received TID-to-link mapping response frame is a response to the TID-to-link mapping request transmitted by the AP multi-link device through the association response frame or the reassociation response frame. Specifically, the received TID-to-link mapping response frame may include Link Mapping fields for multiple TIDs. In this case, when the values of all Link Mapping fields included in the TID-to-link mapping response frame are the same as the values of all Link Mapping fields of the TID-to-link mapping request transmitted by the AP multi-link device through the association response frame or the reassociation response frame, the AP multi-link device may determine that the received TID-to-link mapping response frame is a response to the TID-to-link mapping request transmitted by the AP multi-link device through the association response frame or the reassociation response frame. When the value of the Link Mapping field for the TID of the TID-to-link mapping response frame received by the AP multi-link device is different from the value of the Link Mapping field for the TID of the TID-to-link mapping request transmitted by the AP multi-link device through the association response frame or the reassociation response frame, the AP multi-link device may not transmit an ACK for the received TID-to-link mapping response frame. In addition, when the Link Mapping field for the TID of the TID-to-link mapping response frame received by the AP multi-link device includes at least one of the values of the Link Mapping field for the TID of the TID-to-link mapping request transmitted by the AP multi-link device through the association response frame or the reassociation response frame, the AP multi-link device may not transmit an ACK for the received TID-to-link mapping response frame. In addition, when the TID-to-link mapping response frame received by the AP multi-link device does not include any Link Mapping field for the TID of the TID-to-link mapping request transmitted by the AP multi-link device through the association response frame or the reassociation response frame, or when the value of the Link Mapping field of the TID-to-link mapping response frame received by the multi-link device is different from the value of the Link Mapping field for the TID of the TID-to-link mapping request transmitted through the association response frame or the reassociation response frame, the AP multi-link device may not transmit an ACK for the received TID-to-link mapping response frame. The embodiments described above may also be applied when the TID-to-link mapping request is not transmitted through the association response frame or the reassociation response frame.

In the embodiment of FIG. 32, the AP multi-link device AP MLD includes a first AP (AP 1), a second AP (AP 2), and a third AP (AP 3). The non-AP multi-link device non-AP MLD includes a first non-AP station non-AP STA 1 and a second non-AP station non-AP STA 2. The non-AP multi-link device non-AP MLD transmits the association request frame not including the TID-to-link Mapping element to the AP multi-link device AP ML. The AP multi-link device AP ML transmits the association response frame including the TID-to-link Mapping element to the non-AP multi-link device non-AP MLD to request the TID-to-link mapping corresponding to the TID-to-link Mapping element. In this case, the non-AP multi-link device non-AP MLD transmits the TID-to-link mapping response frame to the AP multi-link device AP ML to accept the TID-to-link mapping request.

Figure 33:
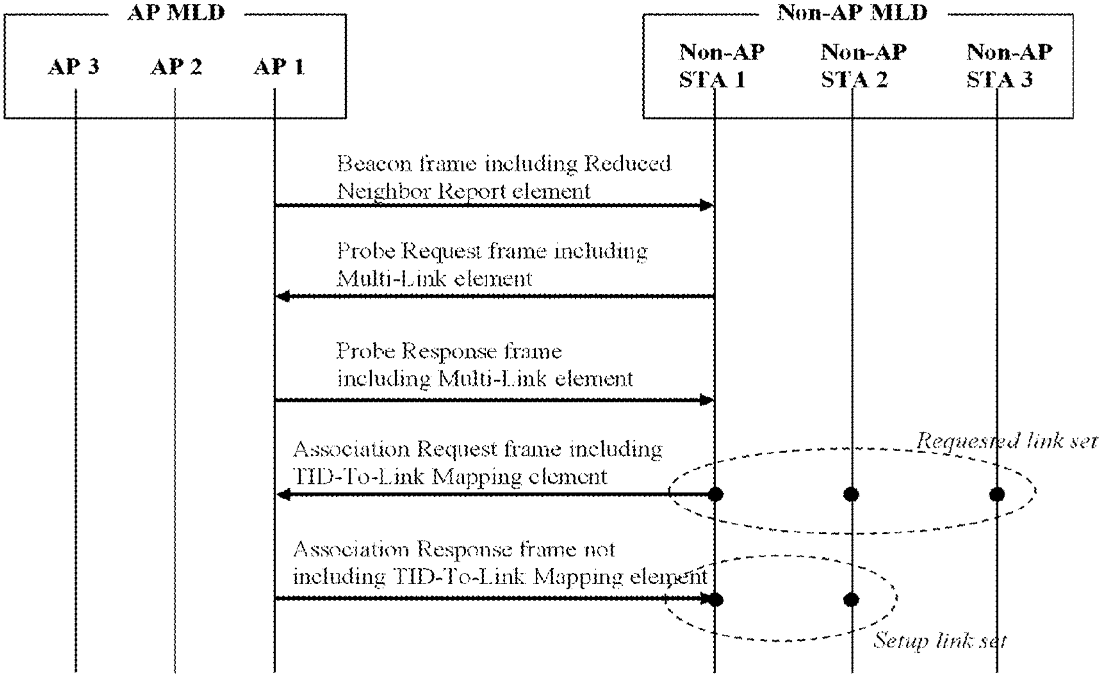
FIG. 33 illustrates a TID-to-link mapping negotiation when a link set requesting a TID-to-link mapping and a link set configured by a TID-to-link mapping response are different according to an embodiment of the disclosure.

FIG. 33 illustrates a TID-to-link mapping negotiation when a link set requesting a TID-to-link mapping and a link set configured by a TID-to-link mapping response are different according to an embodiment of the disclosure.

The link set requesting TID-to-link mapping in the association request frame or the reassociation request frame and the link set attempting to configure TID-to-link mapping in the association response frame or the reassociation response frame may be different. For example, TID-to-link mapping may be requested for three links in the association request frame or the reassociation request frame, and TID-to-link mapping may be configured for two links in the association response frame or the reassociation response frame. In addition, the fact that the link sets are different may include the fact that settings of the link sets are different. Specifically, the fact that the settings of the link sets are different may include the fact that the operating channels of the link sets are different. In addition, the fact that the link sets are different may include the fact that configurations of the link sets are different.

In some embodiments of FIG. 31, when the AP multi-link device receives the association request frame or the reassociation request frame including the TID-to-link Mapping element, the AP multi-link device may configure a multi-link by transmitting the association response frame or the reassociation response frame that does not include a TID-to-link Mapping element. However, as described above, the link set requesting TID-to-link mapping in the association request frame or the reassociation request frame and the link set attempting to configure TID-to-link mapping in the association response frame or the reassociation response frame may be different.

Accordingly, in another embodiment of the disclosure, when the AP multi-link device receives the association request frame or the reassociation request frame including the TID-to-link Mapping element and attempts to configure a link set different from the link set of the multi-link that the association request frame or the reassociation request frame attempts to configure, the AP multi-link device may transmit the association response frame or the reassociation response frame that does not include the TID-to-link Mapping element. Through this, the AP multi-link device may reject the TID-to-link mapping. In this case, a default mapping may be applied to the AP multi-link device and the non-AP multi-link device.

When the AP multi-link device receives the association request frame or the reassociation request frame including the TID-to-link Mapping element and transmits the association response frame or the re-association response frame that configure a link set different from the link set of the multi-link that the association request frame or the reassociation request frame, the AP multi-link device may transmit the association response frame or the reassociation response frame that does not include the TID-to-link Mapping element. In addition, when the non-AP multi-link device transmits the association request frame or the reassociation request frame including the TID-to-link Mapping element and receives the association response frame or the reassociation response frame that configures a link set different from the link set of the multi-link that the association request frame or the reassociation request frame attempts to configure, the non-AP multi-link device may determine that the TID-to-link mapping request is rejected even if the received association response frame or reassociation response frame does not include the TID-to-link Mapping element. In this case, a default mapping may be applied to the AP multi-link device and the non-AP multi-link device.

In another embodiment of the disclosure, when the AP multi-link device receives the association request frame or the reassociation request frame including the TID-to-link Mapping element and attempts to configure a link set different from the link set of the multi-link that the association request frame or the reassociation request frame attempts to configure, the AP multi-link device may transmit the association response frame or the reassociation response frame that includes the TID-to-link Mapping element. In this case, the TID-To-Link Mapping element included in the association response frame or the reassociation response frame may indicate the TID-to-link mapping proposed by the AP multi-link device. In this case, the operation of the non-AP multi-link device may be the same as the embodiments described with reference to FIG. 28.

In the embodiments described above, the operation of the multi-link device has been described for convenience of explanation, but the operation of the multi-link device may also be performed by a station included in the multi-link device.

FIG. 34 is a drawing illustrating an example of a TBTT information field format according to an embodiment of the disclosure.

FIG. 34 is an additional description of the TBTT information field described in FIG. 27, and the content described in FIG. 27 is equally applied to the embodiment, but will be omitted.

The AP or AP MLD may transmit a reduced neighbor report (RNR) element, and the non-AP STA or non-AP MLD may receive the RNR element. The RNR element may include information on the AP or AP MLD or BSS. The non-AP STA or non-AP MLD may probe the AP or AP MLD based on the received RNR element. The non-AP STA or non-AP MLD may further request information indication from the AP or AP MLD based on the received RNR element. For example, the non-AP STA or non-AP MLD may transmit a probe request frame to the AP or AP MLD based on the received RNR element. Alternatively, the non-AP STA or non-AP MLD may perform (re)association or multi-link (re)setup based on the received RNR element. (Re)Association or multi-link (re)setup may be performed by the non-AP STA or non-AP MLD transmitting the (Re)Association Request frame.

The RNR element may include one or more neighbor AP information fields.

The neighbor AP information field may include a TBTT Information Set field.

The TBTT Information Set field may include one or more TBTT Information fields. The number of TBTT Information fields included in the TBTT Information Set field may be indicated by the TBTT Information Count subfield included in the TBTT Information Set field.

The length of each TBTT information field included in the TBTT information set field included in the neighbor AP information field may be indicated by the TBTT information length subfield included in the neighbor AP information field. That is, the lengths of the TBTT information fields included in one neighbor AP information field may be the same.

The format and content of the TBTT information field may be determined based on the TBTT information header field included in the neighbor AP information field including the TBTT information field. More specifically, the format and content of the TBTT information field may be determined based on the TBTT information field type and the TBTT information field length indicated by the neighbor AP information field including the TBTT information field. The TBTT information field type may be indicated by the TBTT information field type subfield. In addition, the TBTT information field length may be indicated by the TBTT information length subfield. The neighbor AP information field includes one TBTT information field type subfield and one TBTT information length subfield. Therefore, the formats and contents of the TBTT information fields included in one neighbor AP information field may be the same.

Specifically, all TBTT information fields included in the neighbor AP information field may have the same format, length, and content, and the length may be indicated by the TBTT information length subfield. When the length of the TBTT information field is indicated by the TBTT information length subfield, the format and content of the TBTT information field may be determined according to the length. For example, the content included may vary depending on the length of the TBTT information field.

In addition, the operation of processing the TBTT information field by the terminal may be different based on the value of the TBTT information field type subfield and the value of the TBTT information length subfield included in the TBTT information header field of the neighbor AP information field. Specifically, the length of the TBTT information field processed by the terminal may vary depending on whether the value of the TBTT information field type subfield indicating the type (or format) of the TBTT information field is configured to the first value (e.g., "0") or the second value (e.g., "1"). In addition, the length of the TBTT information field processed may additionally be considered based on the value of the TBTT information length subfield. That is, when the value of the TBTT information field subfield is configured to the first value or the second value, the terminal may process all or only part of the TBTT information field, or may not process all of the TBTT information field, by comparing the value of the TBTT information length subfield with the first threshold value (e.g., 16 octets), the second threshold value (e.g., 13 octets), and/or the third threshold value (e.g., 3 octets). For example, when the value of the recognizable TBTT information field subfield is "0", if the length of the TBTT information field indicated by the TBTT information length subfield is equal to or less than the second threshold value, the terminal may ignore the entire TBTT information field of the received frame (e.g., a beacon frame or a probe response frame, etc.) without processing the entire TBTT information field. However, when the value of the recognizable TBTT information field subfield is "0", if the length of the TBTT information field indicated by the TBTT information length subfield is greater than the second threshold value and equal to or less than the first threshold value, the terminal may process the TBTT information field of the received frame only up to the first the second octet value (e.g., 13 Octet) and ignore remaining octets without processing the remaining octets. However, when the value of the recognizable TBTT information field subfield is "0", if the length of the TBTT information field indicated by the TBTT information length subfield is greater than the first threshold value, the terminal may process the TBTT information field of the received frame only up to the first the first octet value (e.g., 16 Octet) and ignore remaining octets without processing the remaining octets.

If the value of the recognizable TBTT information field subfield is "1", and if the length of the TBTT information field indicated by the TBTT information length subfield is less than the third threshold value, the terminal may ignore the entire TBTT information field of the received frame (e.g., a beacon frame or a probe response frame, etc.) without processing the entire TBTT information field. However, when the value of the recognizable TBTT information field subfield is "1", if the length of the TBTT information field indicated by the TBTT information length subfield is equal to or greater than the third threshold value, the terminal may process the TBTT information field of the received frame only up to the first the third octet value (e.g., 3 Octet) and ignore remaining octets without processing the remaining octets.

In another embodiment of the disclosure, the TBTT information field may be processed up to a specific threshold value depending on whether the value of the TBTT information length subfield includes the specific threshold value. That is, when the value of the TBTT information length subfield is less than the specific threshold value, the corresponding TBTT information field may not be processed. However, when the value of the TBTT information length subfield is greater than (equal to or greater than) the specific threshold value, the TBTT information field may be processed up to a length (octet) corresponding to the specific threshold value. In this case, when the value of the TBTT information length field is a value between two threshold values (e.g., greater than or equal to the second threshold value and less than or equal to the first threshold value), the TBTT information field may be processed up to a length corresponding to the second threshold value.

For example, when the value of the TBTT information field subfield is configured to the first value or the second value, the terminal may process all or only part of the TBTT information field, or may not process all of the TBTT information field, by comparing the value of the TBTT information length subfield with the first threshold value (e.g., 16 octets), the second threshold value (e.g., 13 octets), and/or the third threshold value (e.g., 3 octets). Specifically, when the value of the recognizable TBTT information field subfield is "0", if the length of the TBTT information field indicated by the TBTT information length subfield is less than the second threshold value, the terminal may ignore the entire TBTT information field of the received frame (e.g., a beacon frame or a probe response frame, etc.) without processing the entire TBTT information field. However, when the value of the recognizable TBTT information field subfield is "0", if the length of the TBTT information field indicated by the TBTT information length subfield is equal to or greater than the second threshold value and less than the first threshold value, the terminal may process the TBTT information field of the received frame only up to the first the second octet value (e.g., 13 Octet) and ignore remaining octets without processing the remaining octets. However, when the value of the recognizable TBTT information field subfield is "0", if the length of the TBTT information field indicated by the TBTT information length subfield is equal to or greater than the first threshold value, the terminal may process the TBTT information field of the received frame only up to the first the first octet value (e.g., 16 Octet) and ignore remaining octets without processing the remaining octets.

If the value of the recognizable TBTT information field subfield is "1", and if the length of the TBTT information field indicated by the TBTT information length subfield is less than the third threshold value, the terminal may ignore the entire TBTT information field of the received frame (e.g., a beacon frame or a probe response frame, etc.) without processing the entire TBTT information field. However, when the value of the recognizable TBTT information field subfield is "1", if the length of the TBTT information field indicated by the TBTT information length subfield is equal to or greater than the third threshold value, the terminal may process the TBTT information field of the received frame only up to the first the third octet value (e.g., 3 Octet) and ignore remaining octets without processing the remaining octets.

The TBTT information field type subfield may have a value of 0 to 3. In addition, the EHT STA may understand, realize, and recognize the case where the TBTT information field type subfield value is 0 or 1. In addition, the EHT STA may not recognize the case where the TBTT information field type subfield value is 2 or 3. The HE STA or the STA of a previous standard other than the EHT STA may understand, realize, and recognize the case where the TBTT information field type subfield value is 0, and may not recognize the case where the TBTT information field type subfield value is 1 to 3.

The TBTT information field configuration described in FIG. 27 may be an embodiment when the TBTT information field type subfield value is 0. FIG. 34(*a*) illustrates the TBTT information field format described in FIG. 21. According to an embodiment, when the TBTT information field type subfield value is 0 and the TBTT information length subfield value is 1, 2, 5, 6, 7, 8, 9, 11, 12, 13, 16, or 17 or more, the corresponding TBTT information field contents (subfields included in the TBTT information field) may be the same as described in FIG. 27. In addition, when the TBTT information field type subfield value is 0 and the TBTT information length subfield value is 0, 3, 4, 10, 14, or 15, the corresponding TBTT information field may not be defined (reserved). In addition, when the TBTT information field type subfield value is 0, the corresponding TBTT information field may always include the neighbor AP TBTT offset subfield.

FIG. 34(*b*) illustrates the TBTT information field format when the TBTT information field type subfield value is 1. When the TBTT information field type subfield value is 1, the corresponding TBTT information field may include the MLD Parameters field. For example, when the TBTT information field type subfield value is 1, The corresponding TBTT information field may always include the MLD Parameters field. In addition, when the TBTT information field type subfield value is 1 and the TBTT information length subfield value is 3, the corresponding TBTT information field may include the MLD Parameters field.

In the disclosure, the TBTT information field corresponding to the TBTT information field type subfield or the TBTT information length subfield may mean a TBTT information field included in a neighbor AP information field including the TBTT information field type subfield or the TBTT information length subfield.

The MLD Parameters field may include the subfields described in FIG. 21, and may additionally include an all updates included subfield in the bit at position B20. The all updates included subfield may indicate whether the frame including the RNR element including the all updates included subfield includes all updated elements that changed the value of the BSS Parameters Change Count subfield. If all the updated elements are included, the all updates included subfield may be configured to 1, otherwise it may be configured to 0.

According to an embodiment of the disclosure, the plurality of STAs may include STAs (i.e., APs) belonging to an AP MLD. For example, there may be a case where an AP MLD operates on an NSTR link pair. Such the AP MLD may be called an NSTR AP MLD or an NSTR mobile AP MLD or an NSTR soft AP MLD.

The NSTR mobile AP MLD may set up, allocate, and designate primary and nonprimary links. In addition, a non-AP MLD that completed multi-link setup with the NSTR mobile AP MLD may receive and determine which link is the primary link and which link is the nonprimary link from the NSTR mobile AP MLD. The NSTR mobile AP MLD may transmit a beacon frame, a Probe Response frame, an association response frame, and a reassociation response frame only on the primary link. The NSTR mobile AP MLD may not be able to transmit the beacon frame, the Probe Response frame, the association response frame, and the reassociation response frame on the nonprimary link. In addition, the non-AP MLD that completed (or trying to do) multi-link setup with the NSTR mobile AP MLD may transmit the Probe Request frame, the Association Request frame, and the Reassociation Request frame only on the primary link. The non-AP MLD that completed (or trying to do) multi-link setup with the NSTR mobile AP MLD may not be able to transmit the Probe Request frame, the Association Request frame, and the Reassociation Request frame on the nonprimary link.

In addition, the NSTR mobile AP MLD or a non-AP MLD associated with the NSTR mobile AP MLD may need to use the primary link together to initiate TXOP (initiate frame transmission) on the nonprimary link. For example, in order to initiate PPDU transmission on the nonprimary link, PPDU transmission on the primary link may need to be initiated simultaneously with the nonprimary link. In addition, a backoff procedure may exist to initiate PPDU transmission on the primary link and the nonprimary link simultaneously. For example, in a link where a backoff counter reaches 0, the backoff counter 0 value may be maintained, and in the link with the backoff counter 0, PPDU transmission may be initiated when the backoff counter reaches 0 on another link.

In addition, the AP MLD may indicate whether the AP MLD itself is the NSTR mobile AP MLD or the non-NSTR mobile AP MLD (an AP MLD operating on a STR link pair). For example, the multi-link element described in FIG. 20 may include the above indication. More specifically, the MLD Capabilities field of the Common Info field included in the multi-link element may include the above indication. More specifically, B7 bit of the MLD Capabilities field may indicate the above indication. The above indication may exist when the AP MLD transmits the multi-link element. For example, when the NSTR mobile AP MLD transmits the multi-link element, the bit value may be configured to 1. When the AP MLD other than the NSTR mobile AP MLD transmits multi-link element, the bit value may be configured to 0. The non-AP MLD receiving the bit may determine whether the multi-link element including the bit is the NSTR mobile AP MLD based on the bit.

In addition, the NSTR mobile AP MLD may include only the MLD Parameters subfield in the TBTT information field corresponding to the NSTR mobile AP MLD when transmitting the RNR element. In addition, there may not be a case where the AP MLD other than the NSTR mobile AP MLD includes only the MLD Parameters subfield in the TBTT information field corresponding to the AP MLD when transmitting the RNR element. The RNR element may be included in the beacon frame, the Probe Response frame, the association response frame, and the reassociation response frame. Therefore, the non-AP MLD receiving the TBTT information field may determine whether the AP MLD corresponding to the TBTT information field is the NSTR mobile AP MLD depending on whether the TBTT information field includes only the MLD Parameters field. Whether the TBTT information field includes only the MLD Parameters subfield may be determined based on a field indicating the length or type of the TBTT information field. For example, the MLD Parameters subfield may have a preconfigured length, for example, 3-octet. In addition, when the value indicating the length of the TBTT information field indicates the preset length, it may be determined that the TBTT information field includes only the MLD Parameters subfield and that the TBTT information field corresponds to the NSTR mobile AP MLD.

Alternatively, the AP or AP MLD (e.g., an NSTR mobile AP MLD) may configure the neighbor AP information field for the corresponding link differently to indicate whether the link is the primary link or the nonprimary link. For example, when the TBTT information field type subfield is configured to a preconfigured value, the neighbor AP information field including the TBTT information field type subfield or the TBTT information field corresponding to the TBTT information field type subfield may indicate whether the corresponding AP operates on the primary link or the nonprimary link. More specifically, when the TBTT information field type subfield is configured to a preconfigured value, the neighbor AP information field including the TBTT information field type subfield or the TBTT information field corresponding to the TBTT information field type subfield may indicate that the corresponding AP operates on the nonprimary link. The preconfigured value May be 1.

Alternatively, when the TBTT information field includes the MLD Parameters field and does not include all of the neighbor AP TBTT offset subfield, BSSID subfield, Short SSID subfield, BSS Parameters subfield, and 20 MHz PSD subfield, it may be indicated whether the AP corresponding to the TBTT information field operates on the primary link or the nonprimary link. More specifically, when the TBTT information field includes the MLD Parameters field and does not include all of the neighbor AP TBTT offset subfield, BSSID subfield, Short SSID subfield, BSS Parameters subfield, and 20 MHz PSD subfield, it may be indicated that the AP corresponding to the TBTT information field operates on the nonprimary link.

Accordingly, the AP operating on the primary link among the APs belonging to the NSTR mobile AP MLD may transmit the neighbor AP information field or the TBTT information field corresponding to an AP operating on the nonprimary link or on the nonprimary link. In this case, the TBTT information field type subfield value included in the neighbor AP information field may be configured to 1. In addition, the TBTT information field includes the MLD Parameters field, and may not include all of the neighbor AP TBTT offset subfield, BSSID subfield, Short SSID subfield, BSS Parameters subfield, and 20 MHz PSD subfield.

In addition, the AP operating on the primary link among the APs belonging to the NSTR mobile AP MLD may transmit the neighbor AP information field or the TBTT information field corresponding to the primary link or the AP. In this case, the TBTT information field type subfield value included in the neighbor AP information field may be configured to 0. In addition, the TBTT information field may include the MLD Parameters field.

The STA or non-AP MLD that receives the neighbor AP information field or the TBTT information field configured according to the embodiment described above may determine whether the received neighbor AP information field or the received TBTT information field corresponds to an NSTR mobile AP MLD, or corresponds to an AP operating on the primary link, or corresponds to an AP operating on the nonprimary link.

Figure 35:
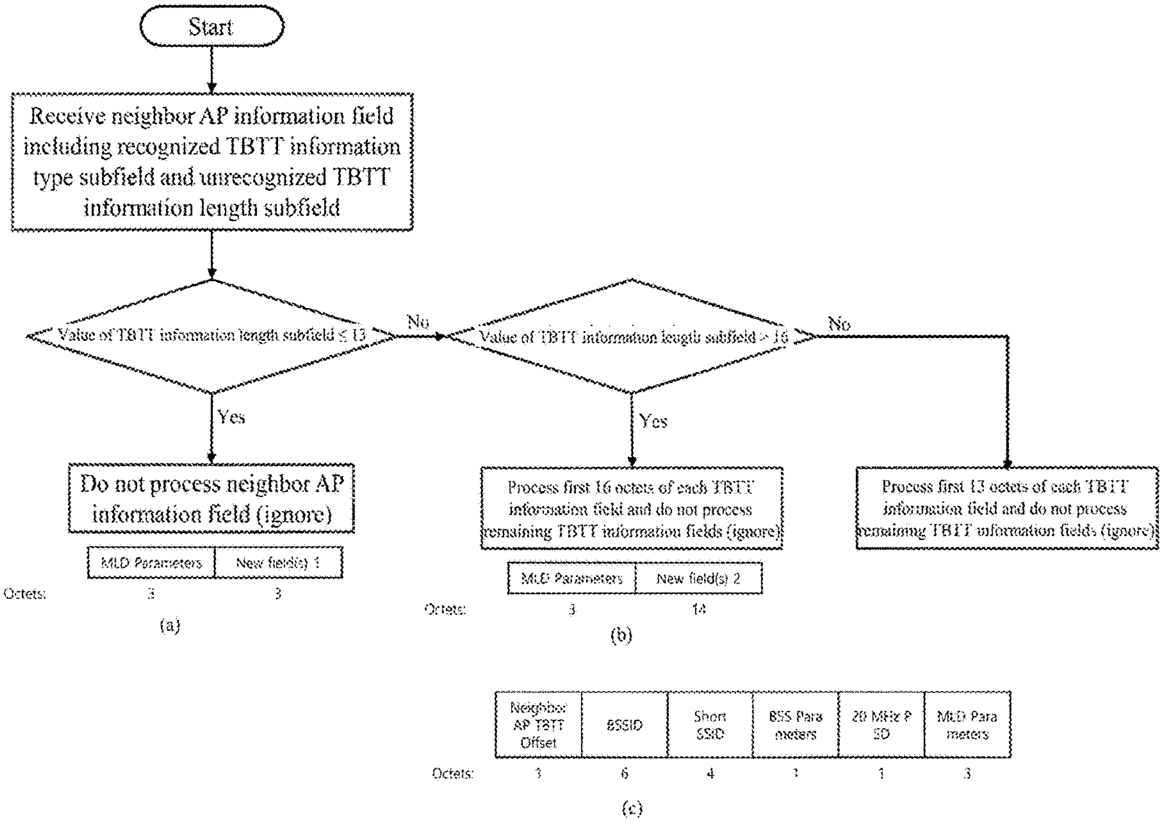
FIG. 35 is a drawing illustrating an example of a reception and processing operation of a neighbor AP information field according to an embodiment of the disclosure.

FIG. 35 is a drawing illustrating a reception and interpreting operation of a neighbor AP information field according to an embodiment of the disclosure.

According to an embodiment of the disclosure, when a STA receives a neighbor AP information field including an unrecognized (unknown) TBTT information field type subfield value, the neighbor AP information field and the remainder of the RNR element including the neighbor AP information field may be ignored.

According to an embodiment of the disclosure, an AP (reporting AP) included in an AP MLD may transmit a frame (e.g., a beacon frame or a probe response frame) including a reduced neighbor report (RNR) element to an STA included in a non-AP MLD. The non-AP STA may obtain information on other APs (reported APs) included in the AP MLD based on the received RNR element, and in this case, may recognize the content and format of TBTT information related to information of other APs based on the TBTT information field type subfield and the TBTT information length subfield included in the RNR element of the frame. In addition, the length at which the non-AP STA may process the TBTT information field based on the TBTT information length field may vary depending on the value of the TBTT information field type subfield. In this case, the content (or information) of the TBTT information field that is not processed may be ignored.

The TBTT Information Field Type subfield and the TBTT information length subfield may be included in the TBTT Information header included in the neighbor AP information field of the RNR element.

The TBTT information length subfield may indicate the length (e.g., octets) of each of the TBTT Information fields included in the TBTT Information set, and may have a value of 1, 5, 7, or 11. However, this is only an example, and the TBTT information length subfield may have a value other than 1, 5, 7, or 11. In addition, the TBTT information length subfield may indicate content of the TBTT Information field.

There may be a method that operates when the STA receives the neighbor AP information field including a recognized (known) TBTT information field type subfield value and an unrecognized TBTT information length subfield value. For example, there may be a method based on the threshold value 1 and threshold value 2, as described above.

For example, when the TBTT information length subfield is less than or equal to the threshold value 1, the neighbor AP information field containing the TBTT information length subfield may be ignored and the subsequent neighbor AP information field may be processed (decoded) (Operation 1).

When the TBTT information length subfield is greater than the threshold value 1, one octet with the first threshold value of each corresponding TBTT information field may be processed as if the TBTT information length subfield value is the threshold value 1, remaining octets ((TBTT information length subfield value-threshold value 1) octets) of each corresponding TBTT information field may be ignored, and the following neighbor AP information field may be processed. In addition, this may be an embodiment corresponding to the case where the threshold value 1 is less than the threshold value 2 and the TBTT information length subfield is less than the threshold value 2 as an additional condition (Operation 2).

When the TBTT information length subfield is greater than the threshold value 2, two octets with the first threshold value of each corresponding TBTT information field may be processed as if the TBTT information length subfield value is the threshold value 2, remaining octets ((TBTT information length subfield value-threshold value 2) octets) of each corresponding TBTT information field may be ignored, and the following neighbor AP information field may be processed (Operation 3).

According to an embodiment, the threshold 1 may be 13. In addition, the threshold 2 may be 16.

As an additional embodiment, there may be a threshold 3 that is greater than the threshold 2. In the embodiment described above for the threshold 1 and the threshold 2, there may be an embodiment in which the threshold 1 and the threshold 2 are changed to the threshold 2 and the threshold 3, respectively.

That is, there may be operation 1, operation 2, and operation 3 as possible operating methods. The STA may perform operation 1 according to the condition described for operation 1. In addition, the HE STA may perform operation 2 according to the condition described for operation 2. The non-HE STA may perform operation 1 or operation 2 according to the condition described for operation 2. The EHT STA may perform operation 3 according to the condition described for operation 3. The non-EHT STA may perform operation 1, operation 2, or operation 3 according to the condition described for operation 3.

In the described embodiment, the operation of processing a threshold number of TBTT information fields with unknown TBTT information length subfield values and ignoring the remainder may be for forward compatibility. It may be to allow interpretation as much as possible even if the TBTT information field includes information different from the information included in the TBTT information field known to the STA.

Referring to FIG. 35, the STA may receive the neighbor AP information field including a recognized TBTT information field type subfield value and an unrecognized TBTT information length subfield value. In this case, it may be identified whether the TBTT information length subfield value is 13 or less. If true, the neighbor AP information field may be ignored. If false, it may be identified whether the TBTT information length subfield value is greater than 16. If false (if the TBTT information length subfield value is greater than 13 and less than or equal to 16), the first 13 octets of each TBTT information field included in the neighbor AP information field may be processed as if the TBTT information length subfield value is 13, and the remaining TBTT information fields except for the first 13 octets may be ignored. If true (if the TBTT information length subfield value is greater than 16), the first 16 octets of each TBTT information field included in the neighbor AP information field may be processed as if the TBTT information length subfield value is 16, and the remaining TBTT information fields except for the first 16 octets may be ignored.

However, the design of the TBTT information field may be in the direction of increasing the length of the TBTT information field considering the forward compatibility, but this may correspond to one TBTT information field type subfield value. That is, for other TBTT information field type subfield values, the direction of increasing the length of the TBTT information field may not be defined. Therefore, when an unrecognized TBTT information length subfield value is received, a problem occurs in the interpretation of the neighbor AP information field.

For example, as illustrated in example 1 of FIG. 35, a neighbor AP information field having a TBTT information length subfield value greater than 3 and less than or equal to 13 may be received. In addition, the TBTT information field type subfield value included in the neighbor AP information field may be 1. In this case, the actually transmitted TBTT information field may be as illustrated in example 1 of FIG. 35. That is, the MLD Parameters field of 3 octets may be included in front and followed by new field(s) 1. In addition, for example, the length of new field(s) 1 may be 3 octets. Since the EHT STA may recognize that the TBTT information field type subfield value is 1 and cannot recognize that the TBTT information length subfield value is greater than 3, the EHT STA may operate according to the embodiment described in FIG. 35. Therefore, since the TBTT information length subfield value is less than or equal to 13, the neighbor AP information field may be ignored. Therefore, the STA cannot obtain information from the interpretable MLD Parameters field.

For example, as illustrated in example 2 of FIG. 35, a neighbor AP information field having a TBTT information length subfield value greater than 16 may be received. In addition, the TBTT information field type subfield value included in the neighbor AP information field may be 1. In this case, the actually transmitted TBTT information field may be as illustrated in example 2 of FIG. 35. That is, the MLD Parameters field of 3 octets may be included in front and followed by new field(s) 2. In addition, for example, the length of new field(s) 2 may be 14 octets. Since the EHT STA may recognize that the TBTT information field type subfield value is 1 and cannot recognize that the TBTT information length subfield value is greater than 3, the EHT STA may operate according to the embodiment described in FIG. 35. Therefore, since the TBTT information length subfield value is greater than 16, the 16 octets of the TBTT information field included in the neighbor AP information field may be interpreted as if the TBTT information length subfield value is 16. However, since the TBTT information field with the TBTT information length subfield value of 16 is the same as that illustrated in STA's interpretation (example 2) of FIG. 35, the information consisting of MLD parameters and new field(s) 2 is actually misinterpreted as in STA's interpretation (example 2).

Figure 36:
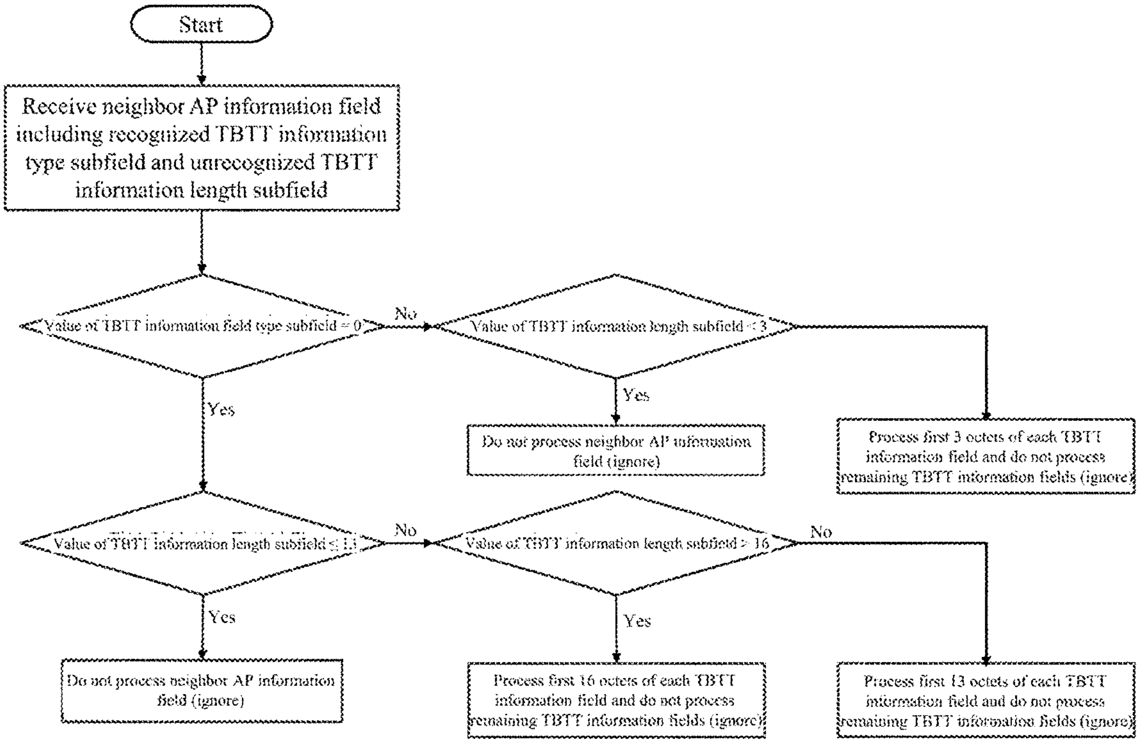
FIG. 36 is a drawing illustrating an example of a reception and processing operation of a neighbor AP information field according to an embodiment of the disclosure.

FIG. 36 is a drawing illustrating a reception and interpreting operation of a neighbor AP information field according to an embodiment of the disclosure.

The embodiment of FIG. 36 may be intended to solve the problem described in FIG. 35. In addition, the content described above in disclosure may be omitted. In addition, in the disclosure, embodiments that use the terms greater than or equal to, less than or equal to, greater than, less than, or similar meanings may be expanded to embodiments that replace them with the terms greater than, less than, greater than or equal to, less than or equal to.

According to an embodiment of the disclosure, when a STA receives a neighbor AP information field including an unrecognized (unknown) TBTT information field type subfield value, the neighbor AP information field and the remainder of the RNR element including the neighbor AP information field may be ignored.

That is, an AP (reporting AP) included in an AP MLD may transmit a frame (e.g., a beacon frame or a probe response frame) including an RNR element to a non-STA included in a non-AP MLD, and the non-AP STA may obtain and discover information on other APs (reported APs) included in the AP MLD based on the received RNR element. In this case, the non-AP STA may ignore the remaining fields (or octets) of the RNR element without processing them if the value of the TBTT information field type subfield included in the RNR element described above is an unrecognizable (or unknown) value. However, if the value of the TBTT information field type subfield included in the RNR element is a recognizable (or unknown) value, the non-AP STA may process only a part of the length (or only a part of the octets) or all of the TBTT information fields included in the TBTT information set, depending on the value of the TBTT information length subfield, based on the value of the TBTT information field type subfield. In this case, the unprocessed part may be ignored.

Specifically, all TBTT information fields included in the neighbor AP information field may have the same format, length, and content, and the length may be indicated by the TBTT information length subfield. When the length of the TBTT information field is indicated by the TBTT information length subfield, the format and content of the TBTT information field may be determined according to the length. For example, the content included may vary depending on the length of the TBTT information field.

In addition, the operation of processing the TBTT information field by the terminal may be different based on the value of the TBTT information field type subfield and the value of the TBTT information length subfield included in the TBTT information header field of the neighbor AP information field. Specifically, the length of the TBTT information field processed by the terminal may vary depending on format) of the TBTT information field is configured to the first value (e.g., “0”) or the second value (e.g., “1”). In addition, the length of the TBTT information field processed may additionally be considered based on the value of the TBTT information length subfield. That is, when the value of the TBTT information field subfield is configured to the first value or the second value, the terminal may process all or only part of the TBTT information field, or may not process all of the TBTT information field, by comparing the value of the TBTT information length subfield with the first threshold value (e.g., 16 octets), the second threshold value (e.g., 13 octets), and/or the third threshold value (e.g., 3 octets). For example, when the value of the recognizable TBTT information field subfield is “0”, if the length of the TBTT information field indicated by the TBTT information length subfield is equal to or less than the second threshold value, the terminal may ignore the entire TBTT information field of the received frame (e.g., a beacon frame or a probe response frame, etc.) without processing the entire TBTT information field. However, when the value of the recognizable TBTT information field subfield is “0”, if the length of the TBTT information field indicated by the TBTT information length subfield is greater than the second threshold value and equal to or less than the first threshold value, the terminal may process the TBTT information field of the received frame only up to the first the second octet value (e.g., 13 Octet) and ignore remaining octets without processing the remaining octets. However, when the value of the recognizable TBTT information field subfield is “0”, if the length of the TBTT information field indicated by the TBTT information length subfield is greater than the first threshold value, the terminal may process the TBTT information field of the received frame only up to the first the first octet value (e.g., 16 Octet) and ignore remaining octets without processing the remaining octets.

If the value of the recognizable TBTT information field subfield is “1”, and if the length of the TBTT information field indicated by the TBTT information length subfield is less than the third threshold value, the terminal may ignore the entire TBTT information field of the received frame (e.g., a beacon frame or a probe response frame, etc.) without processing the entire TBTT information field. However, when the value of the recognizable TBTT information field subfield is “1”, if the length of the TBTT information field indicated by the TBTT information length subfield is equal to or greater than the third threshold value, the terminal may process the TBTT information field of the received frame only up to the first the third octet value (e.g., 3 Octet) and ignore remaining octets without processing the remaining octets.

In another embodiment of the disclosure, the TBTT information field may be processed up to a specific threshold value depending on whether the value of the TBTT information length subfield includes the specific threshold value. That is, when the value of the TBTT information length subfield is less than the specific threshold value, the corresponding TBTT information field may not be processed. However, when the value of the TBTT information length subfield is greater than (equal to or greater than) the specific threshold value, the TBTT information field may be processed up to a length (octet) corresponding to the specific threshold value. In this case, when the value of the TBTT information length field is a value between two threshold values (e.g., greater than or equal to the second threshold value and less than or equal to the first threshold value), the TBTT information field may be processed up to a length corresponding to the second threshold value.

For example, when the value of the TBTT information field subfield is configured to the first value or the second value, the terminal may process all or only part of the TBTT information field, or may not process all of the TBTT information field, by comparing the value of the TBTT information length subfield with the first threshold value (e.g., 16 octets), the second threshold value (e.g., 13 octets), and/or the third threshold value (e.g., 3 octets). Specifically, when the value of the recognizable TBTT information field subfield is “0”, if the length of the TBTT information field indicated by the TBTT information length subfield is less than the second threshold value, the terminal may ignore the entire TBTT information field of the received frame (e.g., a beacon frame or a probe response frame, etc.) without processing the entire TBTT information field. However, when the value of the recognizable TBTT information field subfield is “0”, if the length of the TBTT information field indicated by the TBTT information length subfield is equal to or greater than the second threshold value and less than the first threshold value, the terminal may process the TBTT information field of the received frame only up to the first the second octet value (e.g., 13 Octet) and ignore remaining octets without processing the remaining octets. However, when the value of the recognizable TBTT information field subfield is “0”, if the length of the TBTT information field indicated by the TBTT information length subfield is equal to or greater than the first threshold value, the terminal may process the TBTT information field of the received frame only up to the first the first octet value (e.g., 16 Octet) and ignore remaining octets without processing the remaining octets.

If the value of the recognizable TBTT information field subfield is “1”, and if the length of the TBTT information field indicated by the TBTT information length subfield is less than the third threshold value, the terminal may ignore the entire TBTT information field of the received frame (e.g., a beacon frame or a probe response frame, etc.) without processing the entire TBTT information field. However, when the value of the recognizable TBTT information field subfield is "1", if the length of the TBTT information field indicated by the TBTT information length subfield is equal to or greater than the third threshold value, the terminal may process the TBTT information field of the received frame only up to the first the third octet value (e.g., 3 Octet) and ignore remaining octets without processing the remaining octets.

There may be a method that operates when the STA receives the neighbor AP information field including a recognized (known) TBTT information field type subfield value and an unrecognized TBTT information length subfield value. In this case, an operation based on the TBTT information field type subfield value may be performed. More specifically, an operation based on the TBTT information field type subfield value and the TBTT information length subfield value may be performed. For example, the embodiment described in FIG. 35 (the method based on the threshold 1 and the threshold 2) may be applied only when the TBTT information field type subfield value is a preconfigured value A. In addition, when the TBTT information field type subfield value is a preconfigured value B different from the preconfigured value A, an operation different from the embodiment described in FIG. 35 may be performed. More specially, when the TBTT information field type subfield value is the preconfigured value B different from the preconfigured value A, it is possible to perform an operation based on threshold a. Alternatively, when the TBTT information field type subfield value is the preconfigured value B different from the preconfigured value A, it is possible to perform an operation based on threshold a and threshold b. The operation based on threshold a and threshold b is an operation in which threshold 1 and threshold 2 are replaced with threshold a and threshold b in the operation described for threshold 1 and threshold 2 described in FIG. 35, and threshold 1 and threshold a may have different values, and threshold 2 and threshold b may have different values.

The operation based on threshold a is an operation in which threshold 1 is replaced with threshold a in the operation described for threshold 1 described in FIG. 35, and threshold 1 and threshold a may have different values.

According to an embodiment, threshold a may be 3. In addition, the preconfigured value A for the TBTT information field type subfield value may be 0. In addition, the preconfigured value B may be 1.

In addition, threshold a may be a value smaller than threshold 1.

In the embodiment of FIG. 36, when the STA receives the neighbor AP information field including a recognized (known) TBTT information field type subfield value and an unrecognized TBTT information length subfield value, the STA may determine what the TBTT information field type subfield value is or is 0. When the TBTT information field type subfield value is 0, the embodiment described in FIG. 35 may be performed. That is, it may be identified whether the TBTT information length subfield value is 13 or less. If true, the neighbor AP information field may be ignored. If false, it may be identified whether the TBTT information length subfield value is greater than 16. If false (if the TBTT information length subfield value is greater than 13 and less than or equal to 16), the first 13 octets of each TBTT information field included in the neighbor AP information field may be processed as if the TBTT information length subfield value is 13, and the remaining TBTT information fields except for the first 13 octets may be ignored. If true (if the TBTT information length subfield value is greater than 16), the first 16 octets of each TBTT information field included in the neighbor AP information field may be processed as if the TBTT information length subfield value is 16, and the remaining TBTT information fields except for the first 16 octets may be ignored.

However, if the TBTT information field type subfield value is a preconfigured value B, according to an embodiment, it is possible to determine whether the TBTT information length subfield value is less than (or less than or equal to) the threshold a. If the TBTT information length subfield value is less than (or less than or equal to) the threshold a, it is possible to ignore the neighbor AP information field including the TBTT information length subfield and process the subsequent neighbor AP information field. If the TBTT information length subfield value is greater than or equal to (or greater than) the threshold a, the a number of octets with the first threshold value of each corresponding TBTT information field included in the neighbor AP information field including the TBTT information length subfield may be processed as if the TBTT information length subfield value is the threshold value a, remaining octets ((TBTT information length subfield value-threshold value 2) octets) of each corresponding TBTT information field may be ignored, and the following neighbor AP information field may be processed. According to an embodiment, the threshold a may be the number of octets of the MLD Parameters field. That is, the threshold a may be 3. The preconfigured value B may be 1.

However, when the TBTT information field type subfield value is a preconfigured value B, the future TBTT information field design may be made to always be not less than the threshold a. In this case, it is determined whether the TBTT information length subfield value is less than threshold a, and if so, it may be unnecessary to ignore the neighbor AP information field including the TBTT information length subfield.

Accordingly, if the TBTT information field type subfield value is the preconfigured value B (and the TBTT information length subfield has the unrecognized value), according to another embodiment, the a number of octets with the first threshold value of each corresponding TBTT information field included in the neighbor AP information field including the TBTT information length subfield may be processed as if the TBTT information length subfield value is the threshold value a, remaining octets ((TBTT information length subfield value-threshold value 2) octets) of each corresponding TBTT information field may be ignored, and the following neighbor AP information field may be processed. According to an embodiment, the threshold a may be the number of octets of the MLD Parameters field. That is, the threshold a may be 3. The preconfigured value B may be 1.

Referring to FIG. 36, when the STA receives the neighbor AP information field including a recognized (known) TBTT information field type subfield value and an unrecognized TBTT information length subfield value, the STA may determine what the TBTT information field type subfield value is or is 0. When the TBTT information field type subfield value is not 0, that is, when the value is 1, the STA may perform an operation based on the described threshold a. More specifically, when the TBTT information field type subfield value is not 0, that is, when the value is 1, the STA may determine whether the TBTT information length subfield value is less than (or less than or equal to) 3. If the TBTT information length subfield value is less than (or less than or equal to) 3, the STA may ignore the neighbor AP information field, and process the subsequent neighbor AP information field. If the TBTT information length subfield value is greater than or equal to 3 (or greater), the STA may process the first 3 octets of each TBTT information field included in the neighbor AP information field as if the TBTT information length subfield value is 3, and ignore the remaining TBTT information fields except for the first 3 octets.

However, as described above, depending on the design direction of the TBTT information field when the TBTT information field type subfield value is 1, comparing the TBTT information length subfield value with 3 and the corresponding operation may be redundant. Therefore, when the block indicated by the dotted line in FIG. 36 does not exist and the TBTT information field type subfield value is not 0, operation (b) may be performed. That is, when the STA receives the neighbor AP information field including a recognized (known) TBTT information field type subfield value and an unrecognized TBTT information length subfield value, the STA may determine what the TBTT information field type subfield value is or is 0. When the TBTT information field type subfield value is not 0, that is, when the value is 1, the STA may process the first 3 octets of each TBTT information field included in the neighbor AP information field as if the TBTT information length subfield value is 3, and ignore the remaining TBTT information fields except for the first 3 octets.

In addition, in the embodiments described above, the operation of processing the threshold number of octets in front of the TBTT information field and ignoring the remainder assumes that the information to be added in the future is added after (on the MSB side) the information included in the TBTT information field currently recognized in the TBTT information field. If it is assumed that the information to be added in the future is added before (on the LSB side) the information included in the TBTT information field currently recognized in the TBTT information field, Instead of the operation of processing the threshold number of octets in front of the TBTT information field and ignoring the remainder in the embodiments described above, the operation of processing the threshold number of octets in the back of the TBTT information field and ignoring the remainder may be performed.

Figure 37:
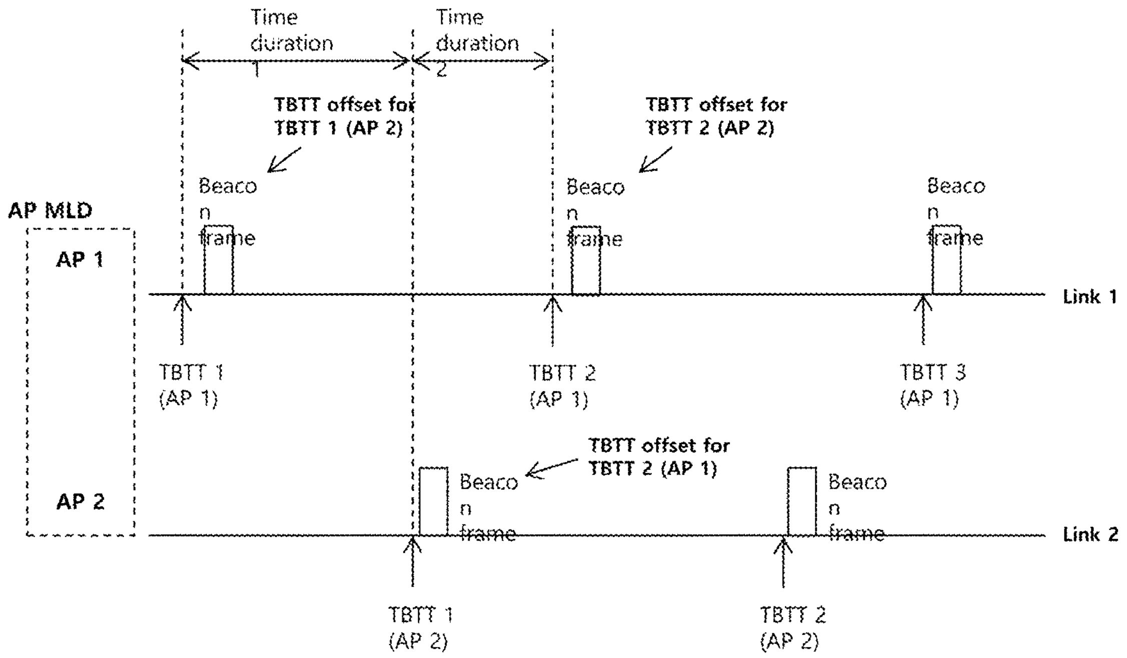
FIG. 37 is a drawing illustrating an example of a transmission of a beacon frame and a TBTT offset according to an embodiment of the disclosure.

FIG. 37 is a drawing illustrating an example of a transmission of a beacon frame and a TBTT offset according to an embodiment of the disclosure.

According to an embodiment of the disclosure, an AP may transmit a beacon frame. The beacon frame may be scheduled to the target beacon transmission time (TBTT) or transmitted. In addition, the TBTT may be periodic. Therefore, the beacon frame transmission may be periodic. In addition, the Beacon frame transmission may play a role in setting timing in the BSS. For example, a certain operation in the BSS may be performed at a time point in based on the beacon frame transmission time or the TBTT. The certain operation may include channel switching and BSS color change. In addition, the beacon frame may play a role in allowing the STAs of the BSS to match timing synchronization. The AP may schedule the next frame to transmit the Beacon frame at each TBTT. When scheduling the Beacon frame at the TBTT time, the AP may suspend the transmission of other frames until the Beacon frame is transmitted. According to an embodiment of the disclosure, the AP may perform a channel access procedure and a backoff procedure. Therefore, the AP may not transmit the Beacon frame exactly at the TBTT. In the disclosure, there may be an embodiment in which the embodiments for TBTT are changed to the time at which the actual Beacon frame is transmitted. The interval between two consecutive TBTTs may be called a beacon interval (BI). The Beacon frame transmitted by the AP may include information on the AP, BSS, or MLD.

A non-AP STA may determine timing for BSS by receiving a beacon frame.

In addition, the non-AP STA may receive information on the AP, BSS, or MLD included in Beacon frame.

Referring to FIG. 37, an AP 1 and an AP 2 operating on the link 1 and link 2, respectively, may exist. In addition, the AP 1 and AP 2 may belong to the same AP MLD. The AP 1 may schedule the beacon frame transmission to TBTT 1 (AP 1), TBTT 2 (AP 1), and TBTT 3 (AP 1). The AP 2 may schedule the beacon frame transmission to TBTT 1 (AP 2) and TBTT 2 (AP 2). In addition, the interval between TBTT 1 (AP 1) and TBTT 2 (AP 1) is a beacon interval, and it may be called a beacon interval 1. The interval between TBTT2 (AP 1) and TBTT3 (AP 1) is a beacon interval, and it may be called a beacon interval 2. The beacon interval 1 and beacon interval 2 may be the same. In addition, actual Beacon frame transmission may occur after TBTT.

The beacon frame or Probe Response frame may include a Beacon Interval field. The Beacon Interval field may indicate the time between TBTTs. More specifically, the Beacon Interval field may indicate the time between consecutive TBTTs. The time indicated by the Beacon Interval field may be in time units (TUs). For example, the Beacon Interval field may indicate the number of TUs. The Beacon Interval field may be 2-octet. 1 TU may be 1024 us.

As described above, the reduced neighbor report element or TBTT Information field may include a neighbor AP TBTT offset subfield. Therefore, the Beacon frame or Probe Response frame may include the neighbor AP TBTT offset subfield. As described above, the reduced neighbor report element or TBTT Information field may include information corresponding to another AP or another BSS. The reduced neighbor report element or TBTT Information field may include information corresponding to another AP belonging to the same AP MLD as the AP transmitting the reduced neighbor report element or the TBTT Information field. The reduced neighbor report element or TBTT Information field may include information corresponding to an AP MLD different from the AP MLD to which the AP transmitting the reduced neighbor report element or the TBTT Information field belongs. The reduced neighbor report element or TBTT Information field may include information corresponding to an AP operating on a link different from the link on which the AP transmitting the reduced neighbor report element or the TBTT Information field operates.

The neighbor AP TBTT offset subfield may indicate the offset between TBTTs. For example, the neighbor AP TBTT offset subfield may indicate the offset between the TBTTs corresponding to the AP transmitting the subfield and the TBTT of the AP corresponding to the neighbor AP TBTT offset subfield.

More specifically, the neighbor AP TBTT offset subfield may indicate an offset from the immediately prior TBTT of an AP transmitting a reduced neighbor report element including the neighbor AP TBTT offset subfield or a frame including the neighbor AP TBTT offset subfield to the next TBTT of an AP (reported AP) corresponding to the neighbor AP TBTT offset subfield. This may be an embodiment for a case where the reported AP or the BSS, the reported AP, or the BSSID of the BSS of the reported AP is not included in the multiple BSSID sets or the reported AP corresponds to a transmitted BSSID of the multiple BSSID sets.

In addition, the neighbor AP TBTT offset subfield may indicate an offset from the immediately prior TBTT of an AP transmitting a reduced neighbor report element including the neighbor AP TBTT offset subfield or a frame including the neighbor AP TBTT offset subfield to the next TBTT of the next TBTT of the transmitted BSSID of the multiple BSSID sets to which the reported AP belongs. This may be an embodiment for a case where the BSSID of the reported AP or the BSS of the reported AP or the BSS of the reported AP is included in the multiple BSSID sets and is a nontransmitted BSSID.

The offset indicated by the neighbor AP TBTT offset subfield may be in TU units. In this case, the value indicated by the neighbor AP TBTT offset subfield may be the offset rounded down to the nearest TU.

When an STA 1 transmits a frame or element including information on an STA 2, the STA 1 may be a reporting STA and the STA 2 may be a reported STA. When the reporting STA is an AP, the reporting STA may be a reporting AP. When the reported STA is an AP, the reported STA may be a reported AP.

The neighbor AP TBTT offset subfield indicates the offset in TUs, rounded down to nearest TU, to the following:

The next TBTT of the reported AP from the immediately prior TBTT of the AP that transmits this element (reduced neighbor report element) if the reported AP is not part of the multiple BSSID sets or is the transmitted BSSID of the multiple BSSID sets.

The next TBTT of the transmitted BSSID of the multiple BSSID sets of the reported AP from the immediately prior TBTT of the AP that transmits this element (reduced neighbor report element) if the reported AP is part of the multiple BSSID sets and is a nontransmitted BSSID.

Referring to FIG. 37, the Beacon frame transmitted by the AP 1 for TBTT 1 (AP 1) may include a TBTT offset for the AP 2. For example, the reduced neighbor report element transmitted by the AP 1 may indicate the TBTT offset. The reduced neighbor report element may include a TBTT Information Set field or a TBTT Information field corresponding to the AP 2. The neighbor AP TBTT offset subfield included in the TBTT Information Set field or the TBTT Information field may indicate the TBTT offset corresponding to the AP 2. The neighbor AP TBTT offset subfield corresponding to the AP 2 may indicate a Time duration 1. That is, the neighbor AP TBTT offset subfield may indicate the time (offset) from TBTT 1 (AP 1), which is the immediately prior TBTT of the AP 1 transmitting an element or frame including the neighbor AP TBTT offset subfield, to TBTT 1 (AP 2), which is the next TBTT of the AP 2, which is the reported AP corresponding to the neighbor AP TBTT offset subfield. Likewise, the AP 2 may transmit a neighbor AP TBTT offset subfield corresponding to the AP 1. The neighbor AP TBTT offset subfield for AP 1 included in the Beacon frame scheduled by AP 2 at TBTT 1 (AP 2) may indicate a Time duration 2. The neighbor AP TBTT offset subfield for the AP 1 included in the Beacon frame scheduled by the AP 2 at TBTT 1 (AP 2) may indicate the time (offset) from TBTT 1 (AP 2), which is the immediately prior TBTT of the AP 2 transmitting the element or frame including the neighbor AP TBTT offset subfield, to TBTT 2 (AP 1) which is the next TBTT of the AP 1 that is the reported AP corresponding to the neighbor AP TBTT offset subfield.

As an example, it may be assumed that there is an AP 3 included in the same multiple BSSID in which the AP 2 is included. In this case, the AP 2 may correspond to the transmitted BSSID and the AP 3 may correspond to the nontransmitted BSSID. In this case, the AP 1 may transmit information on the AP 3. For example, a Beacon frame scheduled by the AP 1 to TBTT 1 (AP 1) may include a TBTT Information Set field or a TBTT Information field for the AP 3. In this case, the TBTT Information Set field or the TBTT Information field may include a neighbor AP TBTT offset subfield for the AP 3. In this case, the neighbor AP TBTT offset subfield may indicate the time from TBTT 1 (AP 1) which is the immediately prior TBTT of the AP 1, which is the AP transmitting the element or frame including the neighbor AP TBTT offset subfield, to TBTT 1 (AP 2) which is the next TBTT of AP 2 corresponding to the transmitted BSSID of the multiple BSSID sets of the AP 3 which is the reported AP corresponding to the neighbor AP TBTT offset subfield.

According to an embodiment of the disclosure, the neighbor AP TBTT offset subfield may be 1-octet. The neighbor AP TBTT offset subfield may be capable of indicating a value of 0 to 255. According to an embodiment, a value of a preconfigured range indicated by the neighbor AP TBTT offset subfield may indicate a TBTT offset of the value of the preconfigured range. In addition, a value of another preconfigured range indicated by the neighbor AP TBTT offset subfield may indicate a TBTT offset of the value of or greater than the other preset range. In addition, the preconfigured value indicated by the neighbor AP TBTT offset subfield may indicate an unknown offset value. The unknown value may mean an unknown value, an unnotified value, etc. The preconfigured range may be 0 to 253 (inclusive). In addition, the other preconfigured range may be 254. In addition, the preconfigured range may be 255. In the previous embodiment, it was said that the neighbor AP TBTT offset subfield may indicate a value rounded down to a nearby TU, which may be combined with the disclosure. That is, for example, when the neighbor AP TBTT offset subfield value is 3, the neighbor AP TBTT offset subfield may indicate that the TBTT offset is rounded down to a nearby TU value is 3. In addition, when the neighbor AP TBTT offset subfield value is 254, the neighbor AP TBTT offset subfield may indicate that the TBTT offset is rounded down to a nearby TU value is 254 or more. However, in this case, since the TBTT offset is rounded down to 254 or more, it may mean the same as the TBTT offset is 254 or more.

According to another embodiment of the disclosure, there may be cases where the value indicated by the neighbor AP TBTT offset subfield is different. For example, when a non-AP MLD performs a multi-link setup with an AP MLD, there may be a case where the non-AP MLD receives a Beacon frame from the AP MLD only in one link and completes the multi-link setup. In this case, the non-AP MLD may need to know the TBTT for the remaining links except for the one link. To this end, the non-AP MLD may refer to the neighbor AP TBTT offset subfield for the remaining links except for the one link in the reduced neighbor report element included in the Beacon frame or Probe Response frame transmitted in the one link. However, if the value indicated by the neighbor AP TBTT offset subfield is unknown or is greater than the indicated value, it may be difficult for the non-AP MLD to know the TBTT for the remaining links except for the one link and to receive the Beacon frame. Therefore, there may be another configuration method for the case where the AP transmitting the neighbor AP TBTT offset subfield belongs to the AP MLD. In addition, when the information is on that a non-AP STA receiving the neighbor AP TBTT offset subfield corresponds to an AP belonging to an MLD, there may be a method for interpreting the neighbor AP TBTT offset subfield. Alternatively, when the non-AP STA receiving the neighbor AP TBTT offset subfield belongs to a non-AP MLD, there may be a method for interpreting the neighbor AP TBTT offset subfield.

According to an embodiment of the disclosure, the TBTT offset between APs belonging to the same AP MLD may not be greater than a preconfigured value. The preconfigured value may be 254 TUs. Therefore, when the neighbor AP TBTT offset subfield transmitted by the AP corresponds to an AP belonging to the same AP MLD as the AP, there may not be a case where the neighbor AP TBTT offset subfield value indicates a TBTT offset greater than 254 TUs.

Accordingly, when the value of the neighbor AP TBTT offset subfield received by a non-AP STA or a non-AP MLD is configured to a preconfigured value (e.g., 254), there may be two ways to interpret this. For example, a method 1 may be a method of interpreting that the TBTT offset indicated by the neighbor AP TBTT offset subfield is TUs of a preconfigured value when the received neighbor AP TBTT offset subfield is configured to the preconfigured value. For example, in a case where the reported AP corresponding to the neighbor AP TBTT offset subfield belongs to the same AP MLD as the reporting AP transmitting the neighbor AP TBTT offset subfield, it is possible to interpret the case based on the method 1.

The method 2 may be a method of interpreting that the TBTT offset indicated by the neighbor AP TBTT offset subfield is TUs greater than or equal to a preconfigured value when the received neighbor AP TBTT offset subfield is configured to the preconfigured value. For example, in a case where the reported AP corresponding to the neighbor AP TBTT offset subfield belongs to the different AP MLD from the reporting AP transmitting the neighbor AP TBTT offset subfield, or when the reported AP corresponding to the neighbor AP TBTT offset subfield does not belong to the AP MLD, it is possible to interpret the case based on the method 2.

According to an embodiment of the disclosure, whether the reported AP corresponding to the neighbor AP TBTT offset subfield belongs to the same AP MLD as the reporting AP transmitting the neighbor AP TBTT offset subfield or belongs to a different AP MLD may be determined based on the MLD Parameters field included in the TBTT Information field including the neighbor AP TBTT offset subfield. More specifically, it may be determined based on the MLD ID subfield included in the MLD Parameters field. For example, when the MLD ID subfield value is 0, the neighbor AP TBTT offset subfield included in the TBTT Information field including the MLD ID subfield may belong to the same AP MLD as the reporting AP. In addition, when the MLD ID subfield value is not 0, the neighbor AP TBTT offset subfield included in the TBTT Information field including the MLD ID subfield may not belong to the same AP MLD as the reporting AP.

In addition, whether the reported AP corresponding to the neighbor AP TBTT offset subfield belongs to the AP MLD or does not belong to the AP MLD may be determined based on the MLD Parameters field included in the TBTT Information field including the neighbor AP TBTT offset subfield.

According to an embodiment, whether the reported AP corresponding to the neighbor AP TBTT offset subfield belongs to the AP MLD may be determined based on whether the TBTT Information field including the neighbor AP TBTT offset subfield includes the MLD Parameters field. When the TBTT Information field including the neighbor AP TBTT offset subfield includes the MLD Parameters field, it may be determined that the reported AP corresponding to the neighbor AP TBTT offset subfield belongs to the AP MLD. When the TBTT Information field including the neighbor AP TBTT offset subfield does not include the MLD Parameters field, it may be determined that the reported AP corresponding to the neighbor AP TBTT offset subfield does not belong to the AP MLD.

According to another embodiment, whether the reported AP corresponding to the neighbor AP TBTT offset subfield belongs to the AP MLD may be determined based on the MLD ID subfield value of the MLD Parameters field included in the TBTT Information field including the neighbor AP TBTT offset subfield. For example, when the MLD ID subfield of the MLD Parameters field included in the TBTT Information field including the neighbor AP TBTT offset subfield is a preconfigured value, it may be determined that the reported AP corresponding to the neighbor AP TBTT offset subfield does not belong to the AP MLD. When the MLD ID subfield of the MLD Parameters field included in the TBTT Information field including the neighbor AP TBTT offset subfield is not the preconfigured value, it may be determined that the reported AP corresponding to the neighbor AP TBTT offset subfield does not belong to the AP MLD.

According to an embodiment of the disclosure, an AP belonging to an AP MLD may not configure the neighbor AP TBTT offset subfield to a preconfigured value if another AP belonging to the AP MLD is a reported AP. As described above, this may be to solve the problem that it is difficult for the non-AP MLD performing a multi-link set up with the above-described AP MLD to know the TBTT for the Beacon frame transmitted by the other AP. The preconfigured value may be a value indicating unknown. The preconfigured value may be 255.

However, exceptionally in the embodiment of the disclosure, there may be a case where an AP belonging to an AP MLD is able to configure the neighbor AP TBTT offset subfield to a preconfigured value when another AP belonging to the AP MLD is a reported AP. For example, when the reported AP is performing channel switching, it may be possible to configure the neighbor AP TBTT offset subfield for the reported AP to the preconfigured value. The period during which channel switching is performed may be between the target switch time and the time of beaconing (transmitting a Beacon frame) in the target operating class or target operating channel after the channel switching.

In the disclosure, the expression that an AP is included (belongs to, corresponds to) or not included (does not belong to, does not correspond to) in the multiple BSSID sets may have the same meaning as that a BSSID corresponding to the AP is included (belongs to, corresponds to) or not included (does not belong to, does not correspond to) in the multiple BSSID sets, respectively.

Figure 38:
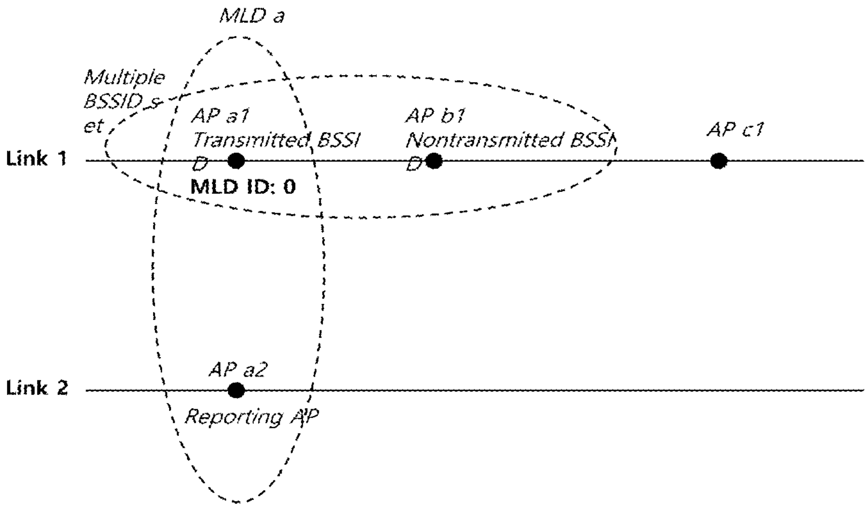
FIG. 38 is a drawing illustrating an example of a configuration of a multi-link and multi-BSSID set according to an embodiment of the disclosure.

FIG. 38 is a drawing illustrating a configuration of a multi-link and multi-BSSID set according to an embodiment of the disclosure.

As described above, the BSSID corresponding to the AP belonging to the MLD may be included in the multiple BSSID sets. In addition, the BSSID corresponding to the AP associated with the non-AP STA belonging to the MLD may be included in the multiple BSSID sets. The content described above may have been omitted in this embodiment. As described above, this embodiment may be to solve the problem that it is difficult for the non-AP MLD performing a multi-link set up with the above-described AP MLD to know the TBTT for the Beacon frame transmitted by the other AP. The preconfigured value may be a value indicating unknown. The preconfigured value may be 255. An embodiment for solving this is described in FIG. 37, but the same problem may occur when multiple BSSID sets are used together. For example, when an AP belonging to an AP MLD indicates a TBTT offset for an AP not belonging to the AP MLD, if the AP not belonging to the AP MLD is included in the same multiple BSSID sets as the AP belonging to the AP MLD, a more accurate TBTT may need to be indicated.

In this case, the offset value of TBTT included in the beacon frame may be restricted depending on whether the AP related to the offset value is included in the AP MLD. For example, if the TBTT offset value included in a frame (e.g., a beacon frame, etc.) including an RNR element by an AP (reporting AP) included in the AP MLD is a TBTT offset value for the AP included in the AP MLD, the corresponding TBTT offset value may be configured to a value indicating unknown (e.g., 255). That is, since the AP included in the AP MLD may recognize the offset value for another AP (reported AP) included in the same AP MLD, the TBTT offset value for the corresponding AP cannot be configured to unknown. Therefore, the TBTT offset value that may be indicated as a value of unknown may be a TBTT offset value for an AP included in an AP MLD different from the AP (reporting AP).

According to an embodiment of the disclosure, when an AP included in the same multiple BSSID sets as another AP belonging to the AP MLD is a reported AP, the AP belonging to the AP MLD may not configure the neighbor AP TBTT offset subfield for the reported AP to a preconfigured value. The preconfigured value may be a value indicating unknown. The preconfigured value may be 255. For example, the AP belonging to the AP MLD may transmit a neighbor AP TBTT offset subfield, the AP included in the same multiple BSSID sets as another AP belonging to the AP MLD may correspond to a nontransmitted BSSID, and the AP belonging to the AP MLD may not configure the neighbor AP TBTT offset subfield corresponding to the AP corresponding to the nontransmitted BSSID to the preconfigured value.

Referring to FIG. 38, an AP a1 and an AP a2 operating on the link 1 and link 2, respectively, may exist. In addition, the AP a1 and AP a2 may belong to the same AP MLD a. In addition, there may be an AP b1 operating in the link 1. The AP a1 and AP b1 may belong to the same multiple BSSID sets. The AP a1 and AP b1 may correspond to the transmitted BSSID and nontransmitted BSSID, respectively. There may be a case where the AP a2 is a reporting AP. For example, the AP a2 may transmit a Beacon frame or a Probe Response frame. In addition, the Beacon frame or the Probe Response frame may include a reduced neighbor report element. The reduced neighbor report element may include a TBTT Information field using the AP b1 as a reported AP. In such a case, the neighbor AP TBTT offset subfield included in the TBTT Information field may not be configured to a preconfigured value. According to the embodiment described in FIG. 37, the neighbor AP TBTT offset subfield for the AP b1 may be configured to a TBTT offset corresponding to a transmitted BSSID, but if the neighbor AP TBTT offset subfield for the AP b1 or the neighbor AP TBTT offset subfield for the AP a1 is configured to a preset value, there may be ambiguity for the STA receiving the neighbor AP TBTT offset subfield to determine the TBTT corresponding to the AP b1 or the AP a1.

In addition, when the AP a2 transmits the neighbor AP TBTT offset subfield corresponding to the AP a1, the neighbor AP TBTT offset subfield corresponding to the AP a1 may not be configured to a preconfigured value according to the embodiment described in FIG. 37.

In the disclosure, the AP b1 may or may not belong to an MLD.

According to the embodiment described above, when the value of the neighbor AP TBTT offset subfield received by a non-AP STA or a non-AP MLD is configured to a preconfigured value (e.g., 254), there may be two ways to interpret this. According to an embodiment of the disclosure, the interpretation method may be based on whether the reported AP belongs to the same AP MLD as the reporting AP, as well as whether the reported AP belongs to the multiple BSSID sets including APs in the same AP MLD as the reporting AP.

For example, a method 1 may be a method of interpreting that the TBTT offset indicated by the neighbor AP TBTT offset subfield is TUs of a preconfigured value when the received neighbor AP TBTT offset subfield is configured to the preconfigured value. For example, in a case where the reported AP corresponding to the neighbor AP TBTT offset subfield belongs to the same AP MLD as the reporting AP transmitting the neighbor AP TBTT offset subfield, it is possible to interpret the case based on the method 1. Alternatively, in a case where the reported AP corresponding to the neighbor AP TBTT offset subfield and the AP in the same AP MLD as the reporting AP transmitting the neighbor AP TBTT offset subfield belong to the same multiple BSSID sets, it is possible to interpret the case based on the method 1. Referring to FIG. 38, in a case where the neighbor AP TBTT offset subfield for AP b1 transmitted by the AP a2 is configured to the preconfigured value, it is possible to interpret the case based on the method 1.

The method 2 may be a method of interpreting that the TBTT offset indicated by the neighbor AP TBTT offset subfield is TUs greater than or equal to a preconfigured value when the received neighbor AP TBTT offset subfield is configured to the preconfigured value. For example, in a case where the reported AP corresponding to the neighbor AP TBTT offset subfield belongs to the different AP MLD from the reporting AP transmitting the neighbor AP TBTT offset subfield, or when the reported AP corresponding to the neighbor AP TBTT offset subfield does not belong to the AP MLD, that is a case 1, and the reporting AP transmitting the neighbor AP TBTT offset subfield is not in the same multiple BSSID sets as the AP in the same AP MLD, that is a case 2, it is possible to interpret the case based on the method 2. Referring to FIG. 38, in a case where the neighbor AP TBTT offset subfield for an AP c1 (the AP c1 may not be included in the multiple BSSID sets including the AP a1) transmitted by the AP a2 is configured to the preconfigured value, it is possible to interpret the case based on the method 2.

Whether the AP 1 and the AP 2 are included in the same multiple BSSID sets may be determined based on the Multiple BSSID element and/or the reduced neighbor report element corresponding to the AP 1 or the AP 2. Alternatively, whether the AP 1 and the AP 2 are included in the same multiple BSSID sets may be determined based on the BSSID corresponding to the AP 1 and the AP 2. The BSSID corresponding to the AP 1 and the AP 2 may be determined based on the BSSID subfield of the TBTT Information field corresponding to the AP 1 or the AP 2 included in the Multiple BSSID element or the reduced neighbor report element corresponding to the AP 1 or the AP 2. For example, when the Multiple BSSID element for AP 1 exists, the Multiple BSSID element may indicate the BSSID or BSSID index of the multiple BSSID sets indicated by the Multiple BSSID element. Therefore, when the BSSID or the BSSID index corresponds to AP 2, it may be determined that AP 1 and AP 2 are included in the same multiple BSSID sets. In addition, when the BSSID or the BSSID index does not correspond to the AP 2, it may be determined that the AP 1 and the AP 2 are not included in the same multiple BSSID sets.

Figure 39:
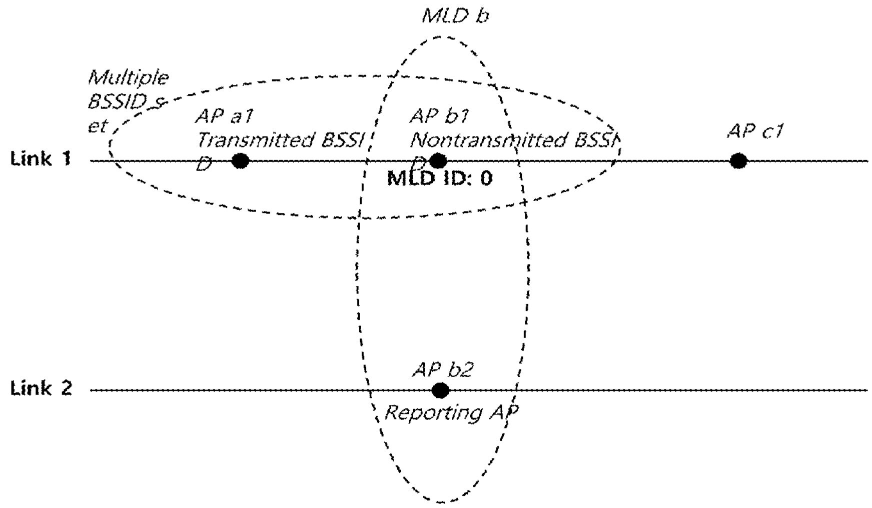
FIG. 39 is a drawing illustrating another example of a configuration of a multi-link and multi-BSSID set according to an embodiment of the disclosure.

FIG. 39 is a drawing illustrating another example of a configuration of a multi-link and multi-BSSID set according to an embodiment of the disclosure.

As described above, the BSSID corresponding to the AP belonging to the MLD may be included in the multiple BSSID sets. In addition, the BSSID corresponding to the AP associated with the non-AP STA belonging to the MLD may be included in the multiple BSSID sets. The content described above may have been omitted in this embodiment. As described above, this embodiment may be to solve the problem that it is difficult for the non-AP MLD performing a multi-link set up with the above-described AP MLD to know the TBTT for the Beacon frame transmitted by the other AP. The preconfigured value may be a value indicating unknown. The preconfigured value may be 255. An embodiment for solving this is described in FIG. 37, but the same problem may occur when multiple BSSID sets are used together. For example, when an AP belonging to an AP MLD indicates a TBTT offset for an AP not belonging to the AP MLD, if the AP not belonging to the AP MLD is included in the same multiple BSSID sets as the AP belonging to the AP MLD, a more accurate TBTT may need to be indicated.

According to an embodiment of the disclosure, when an AP included in the same multiple BSSID sets as another AP belonging to the AP MLD is a reported AP, the AP belonging to the AP MLD may not configure the neighbor AP TBTT offset subfield for the reported AP to a preconfigured value. The preconfigured value may be a value indicating unknown. The preconfigured value may be 255. For example, the AP belonging to the AP MLD may transmit a neighbor AP TBTT offset subfield, the AP included in the same multiple BSSID sets as another AP belonging to the AP MLD may correspond to a nontransmitted BSSID, and the AP belonging to the AP MLD may not configure the neighbor AP TBTT offset subfield corresponding to the AP corresponding to the nontransmitted BSSID to the preconfigured value.

Referring to FIG. 39, an AP b1 and an AP b2 operating on the link 1 and link 2, respectively, may exist. In addition, the AP b1 and AP b2 may belong to the same AP MLD b. In addition, there may be an AP a1 operating in the link 1. The AP a1 and AP b1 may belong to the same multiple BSSID sets. The AP a1 and AP b1 may correspond to the transmitted BSSID and nontransmitted BSSID, respectively. There may be a case where the AP b2 is a reporting AP. For example, the AP b2 may transmit a Beacon frame or a Probe Response frame. In addition, the Beacon frame or the Probe Response frame may include a reduced neighbor report element. The reduced neighbor report element may include a TBTT Information field using the AP a1 as a reported AP. In such a case, the neighbor AP TBTT offset subfield included in the TBTT Information field may not be configured to a preconfigured value. According to the embodiment described in FIG. 37, the neighbor AP TBTT offset subfield for the AP b1 may be configured to a TBTT offset corresponding to a transmitted BSSID, but if the neighbor AP TBTT offset subfield for the AP b1 or the neighbor AP TBTT offset subfield for the AP a1 is configured to a preset value, there may be ambiguity for the STA receiving the neighbor AP TBTT offset subfield to determine the TBTT corresponding to the AP b1 or the AP a1.

In addition, when the AP b2 transmits the neighbor AP TBTT offset subfield corresponding to the AP b1, the neighbor AP TBTT offset subfield corresponding to the AP b1 may not be configured to a preconfigured value according to the embodiment described in FIG. 37.

In the disclosure, the AP a1 may or may not belong to an MLD.

According to an embodiment of the disclosure, when there is an AP A belonging to AP MLD, the TBTT offset between APs belonging to the same multiple BSSID sets as another AP belongings to the AP MLD and the AP A may not be greater than a preconfigured value. The preconfigured value may be 254 TUs. Therefore, when the neighbor AP TBTT offset subfield transmitted by the AP corresponds to an AP belonging to the same AP MLD as the AP and an AP of the same multiple BSSID sets, there may not be a case where the neighbor AP TBTT offset subfield value indicates a TBTT offset greater than 254 TUs.

Referring to FIG. 39, the TBTT offset between the AP b2 and the AP a1 may not be greater than a preconfigured value. In addition, the interval between the TBTT corresponding to the AP b2 and the TBTT corresponding to the AP a1 may not be greater than the preconfigured value. In addition, since the TBTT of the AP a1 and the TBTT corresponding to the AP b1 may be the same, the TBTT offset between the AP b2 and the AP b1 may also not be greater than the preconfigured value.

According to the embodiment described above, when the value of the neighbor AP TBTT offset subfield received by a non-AP STA or a non-AP MLD is configured to a preconfigured value (e.g., 254), there may be two ways to interpret this. According to an embodiment of the disclosure, the interpretation method may be based on whether the reported AP belongs to the same AP MLD as the reporting AP, as well as whether the reported AP belongs to the multiple BSSID sets including the AP in the same AP MLD as the reporting AP.

For example, a method 1 may be a method of interpreting that the TBTT offset indicated by the neighbor AP TBTT offset subfield is TUs of a preconfigured value when the received neighbor AP TBTT offset subfield is configured to the preconfigured value. For example, in a case where the reported AP corresponding to the neighbor AP TBTT offset subfield belongs to the same AP MLD as the reporting AP transmitting the neighbor AP TBTT offset subfield, it is possible to interpret the case based on the method 1. Alternatively, in a case where the reported AP corresponding to the neighbor AP TBTT offset subfield and the AP in the same AP MLD as the reporting AP transmitting the neighbor AP TBTT offset subfield belong to the same multiple BSSID sets, it is possible to interpret the case based on the method 1. Referring to FIG. 39, in a case where the neighbor AP TBTT offset subfield for AP a1 transmitted by the AP b2 is configured to the preconfigured value, it is possible to interpret the case based on the method 1.

The method 2 may be a method of interpreting that the TBTT offset indicated by the neighbor AP TBTT offset subfield is TUs greater than or equal to a preconfigured value when the received neighbor AP TBTT offset subfield is configured to the preconfigured value. For example, in a case where the reported AP corresponding to the neighbor AP TBTT offset subfield belongs to the different AP MLD from the reporting AP transmitting the neighbor AP TBTT offset subfield, or when the reported AP corresponding to the neighbor AP TBTT offset subfield does not belong to the AP MLD, that is a case 1, and the reporting AP transmitting the neighbor AP TBTT offset subfield is not in the same multiple BSSID sets as the AP in the same AP MLD, that is a case 2, it is possible to interpret the case based on the method 2. Referring to FIG. 39, in a case where the neighbor AP TBTT offset subfield for an AP c1 (the AP c1 may not be included in the multiple BSSID sets including the AP b1) transmitted by the AP b2 is configured to the preconfigured value, it is possible to interpret the case based on the method 2.

The above description of a method for determining whether the AP 1 and the AP 2 are included in the same multiple BSSID sets may be omitted.

Figure 40:
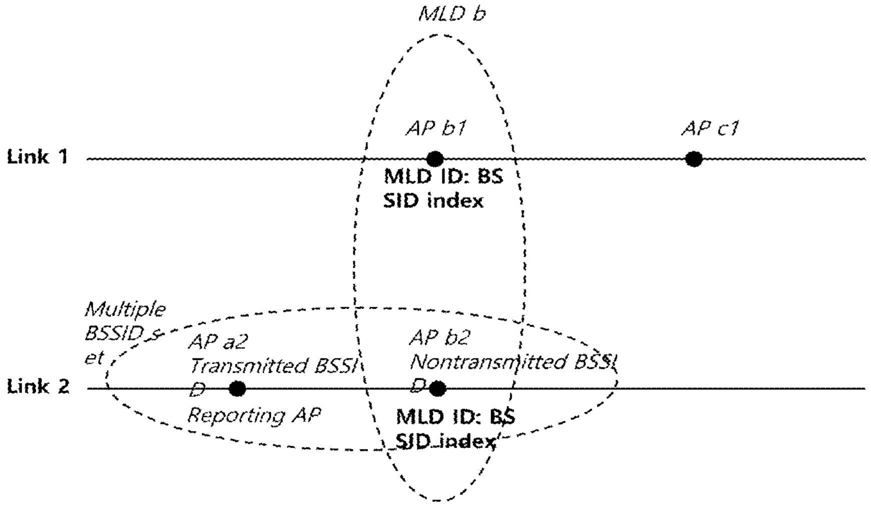
FIG. 40 is a drawing illustrating another example of a configuration of a multi-link and multi-BSSID set according to an embodiment of the disclosure.

FIG. 40 is a drawing illustrating another example of a configuration of a multi-link and multi-BSSID set according to an embodiment of the disclosure.

As described above, the BSSID corresponding to the AP belonging to the MLD may be included in the multiple BSSID sets. In addition, the BSSID corresponding to the AP associated with the non-AP STA belonging to the MLD may be included in the multiple BSSID sets. The content described above may have been omitted in this embodiment. As described above, this embodiment may be to solve the problem that it is difficult for the non-AP MLD performing a multi-link set up with the above-described AP MLD to know the TBTT for the Beacon frame transmitted by the other AP. The preconfigured value may be a value indicating unknown. The preconfigured value may be 255. An embodiment for solving this is described in FIG. 37, but the same problem may occur when multiple BSSID sets are used together. For example, when the AP does not belong to the AP MLD or does not belong to the same AP MLD as the AP, and indicates a TBTT offset for an AP that belongs to the same AP MLD as the AP that belongs to the same multiple BSSID sets as the AP, a more accurate TBTT may need to be indicated.

According to an embodiment of the disclosure, when an AP belonging to the same AP MLD as the AP included in the same multiple BSSID sets is a reported AP, the AP may not configure the neighbor AP TBTT offset subfield for the reported AP to a preconfigured value. The preconfigured value may be a value indicating unknown. The preconfigured value may be 255. For example, the AP may transmit the neighbor AP TBTT offset subfield, the AP may correspond to a transmitted BSSID, and the neighbor AP TBTT offset subfield corresponding to the AP belonging to the same multiple BSSID sets as the AP and the AP belonging to the same AP MLD may not be configured to the preconfigured value. According to another embodiment, the AP may correspond to a nontransmitted BSSID.

Referring to FIG. 40, an AP b1 and an AP b2 operating on the link 1 and link 2, respectively, may exist. In addition, the AP b1 and AP b2 may belong to the same AP MLD b. In addition, there may be an AP a2 operating in the link 2. The AP a2 and AP b2 may belong to the same multiple BSSID sets. The AP a2 and AP b2 may correspond to the transmitted BSSID and nontransmitted BSSID, respectively. There may be a case where the AP b2 is a reporting AP. For example, the AP a2 may transmit a Beacon frame or a Probe Response frame. In addition, the Beacon frame or the Probe Response frame may include a reduced neighbor report element. The reduced neighbor report element may include a TBTT Information field using the AP b1 as a reported AP. In such a case, the neighbor AP TBTT offset subfield included in the TBTT Information field may not be configured to a preconfigured value. If the neighbor AP TBTT offset subfield for the AP b1 is configured to a preset value, there may be ambiguity for the STA performing a multi-link setup with the STA b receiving the neighbor AP TBTT offset subfield to determine the TBTT corresponding to the AP b1.

In the disclosure, the AP a2 may or may not belong to an MLD. In addition, there may be an embodiment where the AP a2 corresponds to a nontransmitted BSSID and the AP b2 corresponds to a transmitted BSSID or a nontransmitted BSSID.

According to an embodiment of the disclosure, when there is an AP A belonging to the multiple BSSID sets, the TBTT offset between APs belonging to the same AP MLD as another AP belongings to multiple BSSID sets the and the AP A may not be greater than a preconfigured value. The preconfigured value may be 254 TUs. Therefore, when the neighbor AP TBTT offset subfield transmitted by the AP corresponds to an AP belonging to the same multiple BSSID sets as the AP and an AP in the same AP MLD, there may not be a case where the neighbor AP TBTT offset subfield value indicates a TBTT offset greater than 254 TUs.

Referring to FIG. 40, the TBTT offset between the AP a2 and the AP b1 may not be greater than a preconfigured value. In addition, the interval between the TBTT corresponding to the AP a2 and the TBTT corresponding to the AP b1 may not be greater than the preconfigured value. In addition, since the TBTT of the AP a2 and the TBTT corresponding to the AP b2 may be the same, the TBTT offset between the AP b2 and the AP b1 may also not be greater than the preconfigured value.

According to the embodiment described above, when the value of the neighbor AP TBTT offset subfield received by a non-AP STA or a non-AP MLD is configured to a preconfigured value (e.g., 254), there may be two ways to interpret this. According to an embodiment of the disclosure, the interpretation method may be based on whether the reported AP belongs to the same AP MLD as the reporting AP, as well as whether the reported AP belongs to the AP MLD including APs in the same multiple BSSID sets as the reporting AP.

For example, a method 1 may be a method of interpreting that the TBTT offset indicated by the neighbor AP TBTT offset subfield is TUs of a preconfigured value when the received neighbor AP TBTT offset subfield is configured to the preconfigured value. For example, in a case where the reported AP corresponding to the neighbor AP TBTT offset subfield belongs to the same AP MLD as the reporting AP transmitting the neighbor AP TBTT offset subfield, it is possible to interpret the case based on the method 1. Alternatively, in a case where the reported AP corresponding to the neighbor AP TBTT offset subfield and the AP of the same multiple BSSID sets as the reporting AP transmitting the neighbor AP TBTT offset subfield belong to the same AP MLD, it is possible to interpret the case based on the method 1. Referring to FIG. 39, in a case where the neighbor AP TBTT offset subfield for AP b1 transmitted by the AP a2 is configured to the preconfigured value, it is possible to interpret the case based on the method 1.

The method 2 may be a method of interpreting that the TBTT offset indicated by the neighbor AP TBTT offset subfield is TUs greater than or equal to a preconfigured value when the received neighbor AP TBTT offset subfield is configured to the preconfigured value. For example, in a case where the reported AP corresponding to the neighbor AP TBTT offset subfield belongs to the different AP MLD from the reporting AP transmitting the neighbor AP TBTT offset subfield, or when the reported AP corresponding to the neighbor AP TBTT offset subfield does not belong to the AP MLD, that is a case 1, and the reporting AP transmitting the neighbor AP TBTT offset subfield is not in the same AP MLD as the AP of the same multiple BSSID sets, that is a case 2, it is possible to interpret the case based on the method 2. Referring to FIG. 39, in a case where the neighbor AP TBTT offset subfield for an AP c1 (the AP c1 may not be included in the multiple BSSID sets including the AP b1) transmitted by the AP a2 is configured to the preconfigured value, it is possible to interpret the case based on the method 2.

The above description of a method for determining whether the AP 1 and the AP 2 are included in the same multiple BSSID sets may be omitted.

According to an embodiment of the disclosure, it may be possible to perform the embodiments described in FIGS. 37 to 40 together.

For example, when an AP transmits the neighbor AP TBTT offset subfield, if at least one of the following conditions is satisfied, the neighbor AP TBTT offset subfield may not be configured to a preconfigured value. The preconfigured value may be 255.

Condition 1: The reported AP corresponding to the neighbor AP TBTT offset subfield belongs to the same AP MLD as the reporting AP transmitting the neighbor AP TBTT offset subfield.

Condition 2: The reported AP corresponding to the neighbor AP TBTT offset subfield belongs to the same multiple BSSID sets as the multiple BSSID sets belonging to the same AP MLD as the reporting AP transmitting the neighbor AP TBTT offset subfield.

Condition 3: The reported AP corresponding to the neighbor AP TBTT offset subfield belongs to the same AP MLD as the AP belonging to the same multiple BSSID sets as the reporting AP transmitting the neighbor AP TBTT offset subfield.

In addition, when the STA receives the neighbor AP TBTT offset subfield transmitted by the AP and the neighbor AP TBTT offset subfield is configured to the preconfigured value, and when at least one of the conditions 1, 2, and 3 is satisfied, the neighbor AP TBTT offset subfield may be interpreted based on the method 1 described above. In addition, when none of the conditions 1, 2, and 3 are satisfied, the neighbor AP TBTT offset subfield may be interpreted based on the method 2 described above.

In addition, when the AP 1 and the AP 2 satisfy at least one of the following conditions, The TBTT offset between the AP 1 and the AP 2 may not be greater than a preconfigured value. The preconfigured value may be 254 TUs.

Condition a: AP 1 and AP 2 belong to the same AP MLD.

Condition b: AP of the multiple BSSID sets including AP 1 and AP 2 belong to the same AP MLD. In this case, the AP 2 may or may not belong to the multiple BSSID sets.

In addition, the above embodiments include embodiments in which the AP corresponding to the nontransmitted BSSID becomes the reporting AP, which may be an embodiment in which the AP corresponding to the nontransmitted BSSID transmits a Probe Response frame. Alternatively, it may be an embodiment in which the AP corresponding to the nontransmitted BSSID transmits a reduced neighbor report element.

FIG. 41 is a drawing illustrating an example of an EHT operation element according to an embodiment of the disclosure. The embodiment of FIG. 41 may be a modification of the EHT operation element and elements constituting the same, and the above-described content may be omitted.

Referring to FIG. 41 (*a*), the EHT operation element may include an EHT operation parameters field. The EHT Operation Parameters field may have a size of 1 octet. In addition, the EHT Operation element may include an EHT operation information field. The EHT operation information field may have a size of 0, 3, or 5 octets. The EHT operation information field may include an EHT operation information field or a Disabled Subchannel Bitmap field.

Referring to FIG. 41 (*b*), the EHT Operation Parameters field may include EHT Operation Information Present subfield, Disabled Subchannel Bitmap Present subfield, Group Addressed BU Indication Limit subfield, and Group Addressed BU Indication Exponent subfield. In addition, each subfield mentioned may be a size of 1, 1, 1, and 2 bits, respectively.

According to an embodiment, the EHT Operation Information Present subfield may indicate whether the EHT operation information field of FIG. 41 (*a*) exists. If the EHT Operation Information Present subfield is configured to 0, the EHT Operation element may not include the EHT operation information field. That is, the EHT operation information field may be 0 octets. If the EHT Operation Information Present subfield is configured to 1, the EHT Operation element may include the EHT operation information field. That is, the EHT operation information field may be 3 or 5 octets.

In addition, the Disabled Subchannel Bitmap Present subfield may indicate whether the EHT operation information field of FIG. 41 (*a*) includes the Disabled Subchannel Bitmap field described in the previous drawing. If the Disabled Subchannel Bitmap Present subfield is configured to 0, the EHT operation information field may not include the Disabled Subchannel Bitmap subfield. In this case, the size of the EHT operation information field may be 3 octets. If the Disabled Subchannel Bitmap Present subfield is configured to 1, the EHT operation information field may include the Disabled Subchannel Bitmap subfield. In this case, the size of the EHT operation information field may be 5 octets.

According to an embodiment of the disclosure, the Group Addressed BU Indication Limit subfield may indicate whether there is a limit to indicating the presence of buffered group addressed frames for all nontransmitted BSSIDs in the multiple BSSID sets and other APs belonging to the same AP MLD in the TIM element. The method of configuring the Group Addressed BU Indication Limit subfield may be as follows.

If (at least) one of the following conditions is satisfied, the Group Addressed BU Indication Limit subfield may be configured to 0, otherwise (i.e., none of the following conditions are satisfied), the Group Addressed BU Indication Limit subfield may be configured to 1.

Condition 1. The AP (the AP transmitting the EHT Operation element) does not belong to the multiple BSSID sets.

Condition 2. The AP (the AP transmitting the EHT Operation element, the AP transmitting the Beacon frame, or the AP corresponding to the transmitted BSSID) belongs to the multiple BSSID sets, and the number of bits required to indicate the presence of a buffered group addressed frame corresponding to all nontransmitted BSSIDs and all other APs belonging to the same AP MLD is not greater than 48 bits (i.e., 48 bits or less).

In addition, according to an embodiment, the Group Addressed BU Indication Exponent subfield may be used to indicate the number of bits (N) to be used to indicate the buffered group addressed frame corresponding to other APs in the MLD corresponding to each nontransmitted BSSID. The value of N may be further explained later.

In addition, according to an embodiment, the 48 bits mentioned above may be replaced with another number of bits. Accordingly, the bitmap overhead required to indicate group addressed traffic for other APs in the same MLD as the AP of the nontransmitted BSSID in the traffic indication virtual bitmap may vary. In the disclosure, 48 bits or the other bit number of bits may be referred to as "bitmap limit".

The Group Addressed BU Indication Limit subfield indicates whether there is a limit on the number of bits indicating the existence of buffered group addressed frames of all other APs affiliated to the same AP MLDs as all nontransmitted BSSIDs of multiple BSSID sets in the TIM element.

The Group Addressed BU Indication Limit subfield is configured to 0 when one of the following conditions is satisfied.

The AP is not included in multiple BSSID sets.

The AP is included in the multiple BSSID sets, and the total number of bits required to indicate the existence of buffered group addressed frames of all other APs affiliated to the same AP MLDs as all nontransmitted BSSIDs of the TIME element is not greater than 48 bits.

Otherwise, the Group Addressed BU Indication Limit subfield is configured to 1.

The Group Addressed BU Indication Exponent subfield is configured to the exponent by which N is calculated.

(Group Addressed Frame Transmission)

Figure 42:
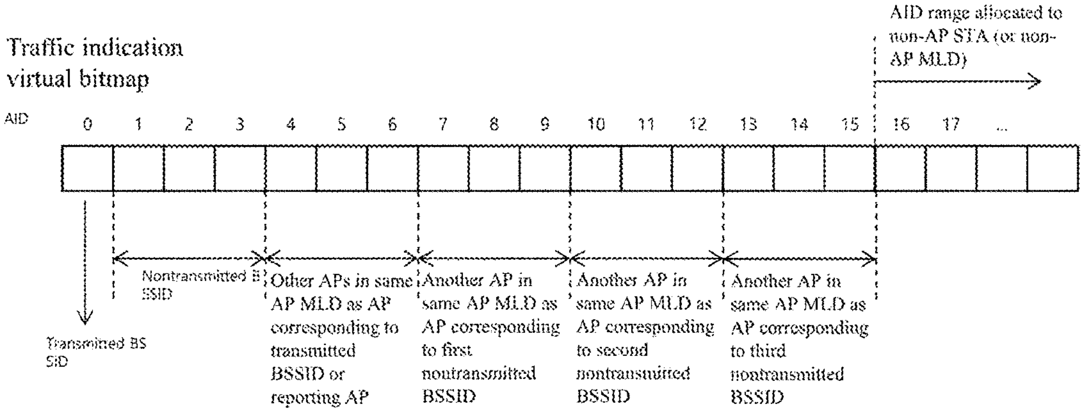
FIG. 42 is a drawing illustrating an example of a traffic indication virtual bitmap according to an embodiment of the disclosure.

FIG. 42 is a drawing illustrating an example of a traffic indication virtual bitmap according to an embodiment of the disclosure.

According to an embodiment of the disclosure, the traffic indication virtual bitmap may indicate group addressed traffic (frame and traffic may be used interchangeably in the disclosure) corresponding to APs in the same MLD as the transmitted BSSID or APs in the same MLD as the nontransmitted BSSID. Therefore, the STA receiving this indication may recognize that there is buffered group addressed traffic from the AP (or BSS) corresponding to itself, and may receive the buffered group addressed traffic. The indication of group addressed traffic and the operation when such an indication is received may refer to other embodiments described above.

In an embodiment of the disclosure, in the Traffic indication virtual bitmap, the part with a small AID value corresponding to the front part may correspond to group addressed traffic, and the part after the group addressed traffic may correspond to STA or MLD addressed traffic (which may be individually addressed).

According to an embodiment of the disclosure, an AP transmitting a TIM element may indicate a buffered group addressed frame corresponding to other APs included in the same AP MLD. For this purpose, N bits may be used after the last bit used to indicate the nontransmitted BSSID in the TIM element, Partial Virtual Bitmap field, or traffic indication virtual bitmap. If the AP does not belong to the multiple BSSID sets, the N bits after bit 0 may be used to indicate the buffered group addressed frame corresponding to other APs included in the same AP MLD. In this case, the N bits may indicate the group addressed frame of the corresponding link in order of the link ID.

To explain further, bits from X to X+N−1 of the Partial Virtual Bitmap field or the traffic indication virtual bitmap may indicate a group addressed frame corresponding to another AP belonging to the same AP MLD as the reporting AP (or the AP corresponding to the transmitted BSSID when the AP belongs to the multiple BSSID sets). In this case, X−1 may mean the last bit used to indicate a nontransmitted BSSID in the TIM element, the Partial Virtual Bitmap field, or the traffic indication virtual bitmap. If multiple BSSID sets are not used, X−1 may be 0. In addition, N may be N mentioned in the EHT Operation element description above. The N value may be determined based on the Group Addressed BU Indication Exponent subfield. The N value may be $2^{(Group\ Addressed\ BU\ Indication\ Exponent\ subfield\ value+1)}-1$. That is, when the Group Addressed BU Indication Exponent subfield value is 1, the N value may be $2^{(1+1)}-1$. That is, the N value may be 3. In addition, the N bits from bit X to X+N−1 may indicate the existence of group addressed traffic for each link in increasing order of link ID. The front n bit among the N bits may be used to indicate the group addressed frame corresponding to other APs of the same AP MLD, and the remaining bits may be configured to 0.

In an embodiment of the disclosure, the last bit used to indicate a nontransmitted BSSID in the TIM element, the Partial Virtual Bitmap field, or the traffic indication virtual bitmap may be a value considering the maximum number of possible BSSIDs of multiple BSSID sets. That is, even if the maximum number of nontransmitted BSSIDs possible with the BSSID of the multiple BSSID sets is not actually used, the last bit may be a bit corresponding to the maximum number of possible BSSIDs of the multiple BSSID sets. That is, when the maximum number of possible BSSIDs of the multiple BSSID sets is $2^n$, AID 1 to $2^n-1$ may be AIDs corresponding to nontransmitted BSSIDs, and the last bit may be a bit corresponding to AID $2^n-1$. Therefore, from bit $2^n$, a group addressed frame corresponding to another AP of the same MLD as the AP (reporting AP) of the transmitted BSSID may be indicated.

In another embodiment of the disclosure, the last bit used to indicate a nontransmitted BSSID in the TIM element, the Partial Virtual Bitmap field, or the traffic indication virtual bitmap may only consider the actual bit used as the nontransmitted BSSID. That is, when the maximum number of nontransmitted BSSIDs possible with the BSSID of the multiple BSSID sets is not actually used, the last bit may be the last bit corresponding to the nontransmitted BSSIDs actually used.

Referring to FIG. 42, a traffic indication virtual bitmap may exist. A part of the traffic indication virtual bitmap may be used to configure a Partial Virtual Bitmap field. Each bit of the traffic indication virtual bitmap or Partial Virtual Bitmap field may indicate whether buffered traffic corresponding to each AID exists. Each bit number may correspond to an AID value. Referring to FIG. 42, bit 0 may correspond to a transmitted BSSID. Alternatively, bit 0 may correspond to a reporting AP (AP transmitting an element). In the disclosure, AP, BSS, and BSSID may be used interchangeably. In addition, buffered traffic corresponding to an AP may be group addressed traffic. That is, bit 0 may correspond to a reporting AP when multiple BSSID sets are not used. In addition, bit 0 may correspond to a reporting AP or a transmitted BSSID when multiple BSSID sets are used.

In addition, in the embodiment of FIG. 42, bits 1 to 3 may correspond to nontransmitted BSSID. In this case, the X−1 value described above may be 3. In addition, bits 4 to 6 may correspond to other APs belonging to the same AP MLD as the reporting AP or transmitted BSSID. That is, in this case, the Group Addressed BU Indication Exponent subfield may be indicated as 1. Therefore, the N value may be 3.

According to an embodiment of the disclosure, an AP transmitting a TIM element may direct the buffered group addressed frame corresponding to other Aps corresponding to the same AP MLD as the AP corresponding to the nontransmitted BSSID of the same multiple BSSID sets.

To indicate the group addressed frame corresponding to other APs belonging to the AP MLD of the AP corresponding to each nontransmitted BSSID, the N bit existing after the last bit (i.e., bit X+N−1) used to indicate group addressed traffic corresponding to another AP belonging to the same AP MLD as the AP of the BSSID transmitted (previously described) from the TIM element, the Partial Virtual Bitmap field, or traffic identification virtual bitmap may be used. More specifically, to indicate the group addressed frame corresponding to other APs belonging to the AP MLD of the AP corresponding to the $k^{th}$ nontransmitted BSSID, $k^{th}$ N-bit group after the last bit (i.e., bit X+N−1) used to indicate group addressed traffic corresponding to another AP belonging to the same AP MLD as the AP of the BSSID transmitted (previously described) from the TIM element, the Partial Virtual Bitmap field, or traffic identification virtual bitmap may be used. In this case, the N bit corresponding to each nontransmitted BSSID may indicate the group addressed frame of the corresponding link in order of the link ID.

To explain further, bits from Y+(k−1)*N to Y+k*N−1 of the Partial Virtual Bitmap field or the traffic indication virtual bitmap may be used to indicate group addressed traffic corresponding to other APs in the same AP MLD as the AP of the $k^{th}$ nontransmitted BSSID. In this case, this may be only when the bit number is smaller than a preconfigured value. The preconfigured value may be determined based on a bitmap limit. The preconfigured value may be a Y+bitmap limit. In this case, k may be from 1 in the $k^{th}$ nontransmitted BSSID. Y−1 may be the last bit used to indicate a group addressed frame corresponding to the same AP ALD as the AP corresponding to the transmitted BSSID. That is, Y−1 may be the same value as X+N−1. In addition, N may be N mentioned in the EHT Operation element description above. The N value may be determined based on the Group Addressed BU Indication Exponent subfield. The N value may be $2^{(Group\ Addressed\ BUT\ Indication\ Exponent\ subfield\ value+1)}-1$. In addition, the N bits from bit Y+(k−1)*N to Y+k*N−1 may indicate the existence of group addressed traffic for each link in increasing order of link ID. The front n bit among the N bits may be used to indicate the group addressed frame corresponding to other APs of the same AP MLD, and the remaining bits may be configured to 0.

The above description for FIG. 42 may be omitted. In an embodiment of FIG. 42, Y may be 7. In addition, N may be 3.

Accordingly, bits from 7+(k−1)*3 to 7+k*3−1 may be used to indicate a group addressed frame corresponding to another AP of the same AP MLD as the AP corresponding to the $k^{th}$ nontransmitted BSSID. That is, bits from 7 to 9 may be used to indicate a group addressed frame corresponding to another AP of the same AP MLD as the AP corresponding to the first nontransmitted BSSID. In addition, the $k^{th}$ nontransmitted BSSID may be a nontransmitted BSSID corresponding to AID k.

That is, the traffic indication virtual bitmap or partial virtual bitmap field may include a part corresponding to the reporting AP (or the transmitted BSSID when using the multiple BSSID sets), a part corresponding to the nontransmitted BSSID (when using multiple BSSID sets), a part corresponding to another AP of the same AP ALD as the reporting AP, and a part corresponding to another AP of the same AP ALD as the AP of the nontransmitted BSSID (when using multiple BSSID sets) as part of group addressed frame. In addition, the order of inclusion may be the same as the order mentioned.

According to the embodiment described in FIG. 23, the AID Offset may not indicate a part corresponding to a group ID and a group addressed frame. That is, the AID Offset may indicate a value greater than a maximum value corresponding to the group ID and the group addressed frame. Alternatively, the AID Offset may indicate an individually addressed frame. Alternatively, the AID Offset may indicate a value corresponding to a non-AP STA or a non-AP MLD.

More specifically, in the embodiment described in FIG. 23, the maximum number of possible BSSIDs of multiple BSSID sets is considered in order for the AID Offset not to indicate a part corresponding to the group addressed frame, but according to the embodiments of FIGS. 41 to 42, there may be more factors to consider. This is because more bits than the maximum possible number of BSSIDs of the multiple BSSID sets may be used to indicate the group addressed frame.

According to an embodiment of the disclosure, the range of the value that AID Offset may indicate may be based on the number of bits required to indicate a group addressed frame corresponding to other APs in the same AP MLD as the AP corresponding to the transmitted BSSID or nontransmitted BSSID. For example, the range of the value may be based on the maximum number of possible BSSIDs of the multiple BSSID sets described above, and may be based on the number of bits required to indicate the group addressed frame corresponding to other APs in the same AP MLD as the AP corresponding to the transmitted BSSID or nontransmitted BSSID. In addition, the range of the value may be based on the bitmap limit.

According to an embodiment of the disclosure, the AID Offset may not be able to indicate a part corresponding to the group addressed frame. Alternatively, the AID Offset may indicate a part that does not correspond to the group addressed frame.

The part corresponding to the Group addressed frame may include a part corresponding to the reporting AP (or the transmitted BSSID when using the multiple BSSID sets), a part corresponding to the nontransmitted BSSID (when using multiple BSSID sets), a part corresponding to another AP of the same AP ALD as the reporting AP, and a part corresponding to another AP of the same AP ALD as the AP of the nontransmitted BSSID (when using multiple BSSID sets) as part of group addressed frame.

That is, the AID Offset may not be able to indicate a value less than or equal to X−1 plus N*((the number of nontransmitted BSSIDs or maximum number of nontransmitted BSSIDs)+1) and X−1 plus the bitmap limit (either value if the two values are the same). The AID Offset may indicate other values. X−1 may be the last bit used to indicate a group addressed frame for the same AP as the AP MLD corresponding to the reporting AP or transmitted BSSID as described above. That is, the AID Offset may not indicate a value less than or equal to min((X−1)+N*X, X−1+bitmap limit). The Offset may indicate a value greater than min((X−1)+N*X, X−1+bitmap limit). In this case, the previously described content such as N value and bitmap limit value may be omitted.

Another explanation for the same content is that (the maximum number of BSSIDs possible in the multiple BSSID sets) or (the number of BSSIDs in the multiple BSSID sets) may be referred to as M. The AID Offset not be able to indicate a value less than the 1) the value obtained by adding M*N to M−1 and 2) the value obtained by adding N+bitmap limit to M−1. The AID Offset may indicate other values. When multiple BSSID sets are not used, M may be 1.

The same content may also be expressed in cases where multiple BSSID sets are used and cases where they are not used. When multiple BSSID sets are not used, the AID Offset may not be able to indicate a value less than N. In addition, the AID Offset may be able to indicate a value more than N. If multiple BSSID sets are used, the AID Offset may not be able to indicate a value less than or equal to X−1 plus N*(the number of nontransmitted BSSIDs or maximum number of nontransmitted BSSIDs) and X−1 plus the bitmap limit (either value if the two values are the same). The AID Offset may indicate other values.

In an embodiment of the disclosure, min(A, B) may be the smaller value of A and B when the values of A and B are different, or the value of A when the values of A and B are the same. Alternatively, min(A, B) may be A when A<=B, or B when A>B. Alternatively, min(A, B) may be A when A<B, or B when A>=B.

In the previous embodiment, the number of nontransmitted BSSIDs or the number of BSSIDs of multiple BSSID sets may mean the number actually used in multiple BSSID sets. In addition, the maximum number of nontransmitted BSSIDs or the maximum number of possible BSSIDs in multiple BSSID sets may be a value (maximum number) based on the MaxBSSID indicator value.

According to the embodiments of the disclosure with respect to the embodiments of FIGS. 41 and 42, the range that may be allocated (to a non-AP STA or a non-AP MLD) with an association ID (AID) may be limited. This is because the AID range corresponding to the group addressed frame has been changed according to the embodiments of FIGS. 41 and 42. The AID may be a value that the AP a1 locates to the non-AP STA (or non-AP MLD). In addition, the AID may be transmitted to the non-AP STA (or non-AP MLD) in the association response frame or the reassociation response frame.

Previously (up to the HE standard), values from 1 to 2,007 may be allocated by the AID. If the multiple BSSID sets is used, the AID corresponding to the nontransmitted BSSID may not be allocated with the AID. That is, when the multiple BSSID sets is used, by the maximum number possible for BSSIDs in the multiple BSSID sets−1 may not be allocated with the AID. That is, AIDs may be allocated from (the maximum number possible for BSSIDs in multiple BSSID sets) to 2,007.

In addition, the value 2,007 may not be allocated with the AID in the EHT standard. This is because AID 2,007 is used to indicate the Special User Info field included in the Trigger frame. That is, when multiple BSSID sets are not used, values from 1 to 2,006 may be allocated with the AID. In addition, when multiple BSSID sets are used, values from (the maximum number possible for BSSIDs in the multiple BSSID sets) to 2,006 may be allocated with the AID.

In addition, according to an embodiment of the disclosure, the AID range that may be allocated based on the Group Addressed BU Indication Exponent field value or bitmap limit may be limited.

According to an embodiment, if multiple BSSID sets are not used, it is possible to allocate values from N+1 to 2,006 with the AID.

If multiple BSSID sets are used, the allocation with the AID may not performed by the value less than or equal to X−1 plus N*((the number of nontransmitted BSSIDs or maximum number of nontransmitted BSSIDs)+1) and X−1 plus the bitmap limit (either value if the two values are the same). That is the allocation with the AID may be performed for the value from the value less than or equal to X−1 plus N*((the number of nontransmitted BSSIDs or maximum number of nontransmitted BSSIDs)+1) and X−1 plus the bitmap limit (either value if the two values are the same) to 2,006.

That is, when multiple BSSID sets are used, the value between $2^{MaxBSSID\ Indicator}+2^{MaxBSSID\ Indicator}*(2^{Group\ Addressed\ BU\ Indication\ Exponent\ subfield}+1)-1$ to 2,006 may be allocated with the AID. In addition, other values may not be allocated.

That is, when multiple BSSID sets are not used, the AID range that may be allocated may be based on the value of the Group Addressed BU Indication Exponent subfield. In addition, when multiple BSSID sets are used, the AID range that may be allocated may be based on the values of the MaxBSSID Indicator subfield and the Group Addressed BU Indication Exponent subfield.

N, X, bitmap limit, Group Addressed BU Indication Exponent subfield, MaxBSSID Indicator subfield, etc. may be the values described in the previous embodiment. The MaxBSSID Indicator subfield may be included in the Multiple BSSID element, reduced neighbor report element, etc. The Multiple BSSID element or reduced neighbor report element may be included in the Beacon frame, Probe Response frame, association response frame, reassociation response frame, etc.

Figure 43:
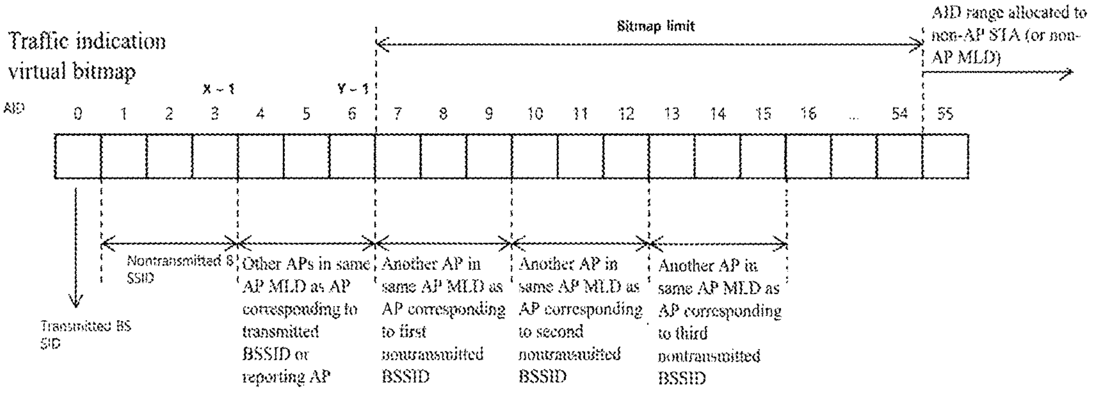
FIG. 43 is a drawing illustrating another example of a traffic indication virtual bitmap according to an embodiment of the disclosure.

FIG. 43 is a drawing illustrating another example of a traffic indication virtual bitmap according to an embodiment of the disclosure.

According to an embodiment of the disclosure, there may be an embodiment in which X−1 is replaced with Y−1 in the embodiments described in FIGS. 41 and 42. More specifically, in embodiments in which a bitmap limit is added to X−1, there may be embodiments in which X−1 is replaced with Y−1 and a bitmap limit is added to Y−1. That is, the bitmap limit may indicate the last bit that may be used to indicate a group addressed frame from among the bits corresponding to other APs belonging to the same AP MLD as the AP corresponding to the transmitted BSSID.

In the disclosure, the content described above may be omitted. For example, the content described above regarding the description of the parameter may be omitted. Alternatively, there may be an embodiment in which Y−1 is replaced with X−1 in the embodiment described in FIG. 43. More specifically, in embodiments in which a bitmap limit is added to Y−1, there may be embodiments in which Y−1 is replaced with X−1 and a bitmap limit is added to X−1.

The embodiment of FIG. 43 may be an embodiment of the same case as the embodiment illustrated in FIG. 42. Referring to FIG. 43, a traffic indication virtual bitmap may exist. A part of the traffic indication virtual bitmap may be used to configure a Partial Virtual Bitmap field. Each bit of the traffic indication virtual bitmap or Partial Virtual Bitmap field may indicate whether buffered traffic corresponding to each AID exists. Each bit number may correspond to an AID value. Referring to FIG. 43, bit 0 may correspond to a transmitted BSSID. Alternatively, bit 0 may correspond to a reporting AP (AP transmitting an element). In the disclosure, AP, BSS, and BSSID may be used interchangeably. In addition, buffered traffic corresponding to an AP may be group addressed traffic. That is, bit 0 may correspond to a reporting AP when multiple BSSID sets are not used. In addition, bit 0 may correspond to a reporting AP or a transmitted BSSID when multiple BSSID sets are used.

In addition, in the embodiment of FIG. 43, bits 1 to 3 may correspond to nontransmitted BSSID. In this case, the X−1 value described above may be 3. In addition, bits 4 to 6 may correspond to other APs belonging to the same AP MLD as the reporting AP or transmitted BSSID. That is, in this case, the Group Addressed BU Indication Exponent subfield may be indicated as 1. Therefore, the N value may be 3.

In addition, in an embodiment of FIG. 43, Y may be 7. In addition, N may be 3. Accordingly, bits from 7+(k−1)*3 to 7+k*3−1 may be used to indicate a group addressed frame corresponding to another AP of the same AP MLD as the AP corresponding to the $k^{th}$ nontransmitted BSSID. That is, bits from 7 to 9 may be used to indicate a group addressed frame corresponding to another AP of the same AP MLD as the AP corresponding to the first nontransmitted BSSID. In addition, the $k^{th}$ nontransmitted BSSID may be a nontransmitted BSSID corresponding to AID k.

That is, the traffic indication virtual bitmap or partial virtual bitmap field may include a part corresponding to the reporting AP (or the transmitted BSSID when using the multiple BSSID sets), a part corresponding to the nontransmitted BSSID (when using multiple BSSID sets), a part corresponding to another AP of the same AP ALD as the reporting AP, and a part corresponding to another AP of the same AP ALD as the AP of the nontransmitted BSSID (when using multiple BSSID sets) as part of group addressed frame. In addition, the order of inclusion may be the same as the order mentioned.

According to an embodiment, the AID range that may be allocated may be the same as the range of values that the AID Offset subfield may indicate. In addition, the AID range that cannot be allocated may be the same as the range of values that the AID Offset subfield cannot indicate. In addition, the AID range that may be allocated may be a range that does not correspond to a bit number that may be used to indicate that a group addressed frame is buffered. Alternatively, the AID range that may be allocated may be a range that is not an AID range corresponding to a bit that is used to indicate that a group addressed frame is buffered. Conversely, the AID range that cannot be allocated may be a range corresponding to a bit number that may be used to indicate that a group addressed frame is buffered. Alternatively, the AID range that cannot be allocated may be an AID range corresponding to a bit that is used to indicate that a group addressed frame is buffered.

In an embodiment of the disclosure, the value that the AID may indicate, the range that the AID may indicate, the AID value that may be allocated, the AID range that may be allocated, etc. may be used interchangeably. Parameters with the same name among the embodiment groups described below mean the same parameter and the description may be omitted.

Start of Embodiment Group 43*a*

According to an embodiment of the disclosure, the AID value that may be allocated may be based on the value of X or X−1. That is the AID value that may be allocated may be based on the maximum number of nontransmitted BSSIDs. In addition, the AID value that may be allocated may be based on N. That is, the AID value that may be allocated may be based on the Group Addressed BU Indication Exponent field.

According to an embodiment, the AID value that may be allocated may be based on the value of X−1 plus N*((the number of nontransmitted BSSIDs or the maximum number of nontransmitted BSSIDs)+1). For example, the AID value that may be allocated may be greater than the value of (X−1) plus N*((the number of nontransmitted BSSIDs or the maximum number of nontransmitted BSSIDs)+1). That is, the AID value that may be allocated may be greater than or equal to X−1 plus N*((Number of nontransmitted BSSIDs or maximum number of nontransmitted BSSIDs)+1) plus 1. In addition, the AID value that may be allocated may be less than or equal to 2,006. X−1 may correspond to the last bit used to indicate a nontransmitted BSSID in the TIM element, the Partial Virtual Bitmap field, or the traffic indication virtual bitmap. If multiple BSSID sets are not used, X−1 may be 0. If multiple BSSID sets are used, X−1 may be $(2^{MaxBSSID\ Indicator\ value}-1)$. The MaxBSSID Indicator value may indicate the maximum number of BSSIDs in the multiple BSSID sets. The maximum number of BSSIDs in the multiple BSSID sets may be $2^{MaxBSSID\ Indicator\ value}$.

Alternatively, the AID value that may be allocated may be greater than X−1 plus N*X. That is, the AID value that may be allocated may be greater than X−1 plus N*((the number of nontransmitted BSSIDs or the maximum number of nontransmitted BSSIDs)+1) plus 1.

Alternatively, it may be expressed as a case where multiple BSSID sets are used and a case where multiple BSSID sets are not used. If multiple BSSID sets are not used, the AID value that may be allocated may be more than N. That is, if multiple BSSID sets are not used, the AID value that may be allocated may be more than N+1. If multiple BSSID sets are used, the AID value that may be allocated may be more than X−1 plus N*((nontransmitted BSSID count or maximum nontransmitted BSSID count)+1). That is, if multiple BSSID sets are used, the AID value that may be allocated may be more than or equal to X−1 plus N*((nontransmitted BSSID count or maximum nontransmitted BSSID count)+1) plus 1. Alternatively, if multiple BSSID sets are used, the AID value that may be allocated may be more than or equal to $(2^{MaxBSSID\ Indicator\ value}-1)+(2^{MaxBSSID\ Indicator\ value})*(2^{Group\ Addressed\ BU\ Indication\ Exponent\ subfield\ value+1}-1)+1$. That is, if multiple BSSID sets are used, the AID value that may be allocated may be more than or equal to $2^{(MaxBSSID\ Indicator\ value+Group\ Addressed\ BU\ Indication\ Exponent\ subfield\ value+1)}$.

End of Embodiment Group 43*a*

Start of Embodiment Group 43*b*

According to an embodiment of the disclosure, the AID value that may be allocated may be based on the bitmap limit. For example, the bitmap limit may be 48 (bits). For example, the AID value that may be allocated may be based on the Y (or Y−1) value and the bitmap limit. For example, the AID value that may be allocated may be based on the value of Y−1 plus the bitmap limit. More specifically, the AID value that may be allocated may be greater than the value of Y−1 plus the bitmap limit. That is, the AID value that may be allocated may be greater than the value of Y−1 plus the bitmap limit plus 1.

As another embodiment, the AID value that may be allocated may be based on the X (or X−1) value and the bitmap limit. For example, the AID value that may be allocated may be based on the value of X−1 plus the bitmap limit. More specifically, the AID value that may be allocated may be greater than the value of X−1 plus the bitmap limit. That is, the AID value that may be allocated may be greater than the value of X−1 plus the bitmap limit plus 1.

Y−1 may be the last bit used to indicate a group addressed frame corresponding to the AP corresponding to the transmitted BSSID and the same AP MLD. That is, Y−1 may be the same value as X+N−1. In addition, N may be N as mentioned in the EHT Operation element description above. The value of N may be determined based on the Group Addressed BU Indication Exponent subfield. The value of N may be $2^{(Group\ Addressed\ BU\ Indication\ Exponent\ subfield\ value+1)}-1$. N may be the number of bits used to indicate a group addressed frame for one MLD minus 1. Alternatively, N may be the number of bits used to indicate a group addressed frame to other APs in each MLD to which the reporting AP, transmitted BSSID, or nontransmitted BSSID belongs. If multiple BSSID sets are not used, Y−1 may be N. If multiple BSSID sets are used, Y−1 may be X−1+N. Alternatively, if multiple BSSID sets are used, Y−1 may be (maximum number of BSSIDs in multiple BSSID sets−1)+N.

In the embodiment of FIG. 43, AIDs corresponding to bitmap limit bits after bit Y−1 may not be allocated to a non-AP STA or a non-AP MLD with the AID. That is, values exceeding (Y−1)+bitmap limit may be allocated to a non-AP STA or a non-AP MLD with the AID. That is, in an embodiment of FIG. 43, a value of 55 or more, which is a value greater than 6+48, may be allocated to a non-AP STA or a non-AP MLD with the AID.

As an embodiment, according to an embodiment in which the bitmap limit is 48, when multiple BSSID sets are not used, the AID value that may be allocated may be N+1 or more. In addition, when multiple BSSID sets are used, the AID value that may be allocated may be greater than or equal to Y+48.

End of Embodiment Group 43*b*

Start of Embodiment Group 43*c*

According to an embodiment of the disclosure, the AID value that may be allocated may be determined by using embodiment group 43*a* and embodiment group 43*b* together. For example, the AID value that may be allocated in embodiment group 43*a* or embodiment group 43*b* may be the AID value that may be finally allocated. For example, the AID value that may be allocated may be based on all of X, N, Y, the number of nontransmitted BSSIDs (or the maximum number of nontransmitted BSSIDs), and the bitmap limit. More specifically, the AID value that may be allocated may be greater than the smaller value (either value if the two values are the same) between the value of X−1 plus N*(nontransmitted BSSID count or maximum nontransmitted BSSID count+1) and the value of Y−1 plus the bitmap limit.

That is, the AID value that may be allocated may be greater than or equal to the smaller value (either value if the two values are the same) between the value of X−1 plus N*(nontransmitted BSSID count or maximum nontransmitted BSSID count+1) and the value of Y−1 plus the bitmap limit plus 1.

That is, the AID value that may be allocated may be greater than min((X−1)+N*X, Y−1+bitmap limit).

That is, the AID value that may be allocated may be greater than or equal to min((X−1)+N*X, Y−1+bitmap limit)+1. That is, the AID value that may be allocated may be greater than or equal to min(X+N*X, Y+bitmap limit).

If multiple BSSID sets are not used, the AID value that may be allocated may be greater than or equal to N+1. Alternatively, if multiple BSSID sets are not used, the AID value that may be allocated may be greater than or equal to the smaller value (either value if the two values are the same) between N+1 and Y+bitmap limit.

If multiple BSSID sets are used, the AID value that may be allocated may be greater than or equal to the smaller value (either value if the two values are the same) between X−1 plus N*((the number of nontransmitted BSSIDs or the maximum number of nontransmitted BSSIDs)+1) and Y−1 plus the bitmap limit. Alternatively, if multiple BSSID sets are used, the AID value that may be allocated may be greater than or equal to min((X−1)+N*X, Y−1+bitmap limit)+1. That is, if multiple BSSID sets are used, the AID value that may be allocated may be greater than or equal to min(X+N*X, Y+bitmap limit).

Alternatively, if multiple BSSID sets are used, the AID value that may be allocated may be greater than or equal to min((a), (b)).

$$\left(2^{MaxBSSID\ Indicator\ value}-1\right)+\left(2^{MaxBSSID\ Indicator\ value}\right)*\left(2^{Group\ Addressed\ BU\ Indication\ Exponent\ subfield\ value}+1\right)-1+1 \quad \text{(a)}$$

$$(Y-1)+\text{bitmap limit}+1=2^{MaxBSSID\ Indicator\ value}-1+2^{Group\ Addressed\ BU\ Indication\ Exponent\ subfield\ value}+1)-1+\text{bitmap limit}+1=2^{MaxBSSID\ Indicator\ value}+2^{Group\ Addressed\ BU\ Indication\ Exponent\ subfield\ value}+1)-1+\text{bitmap limit} \quad \text{(b)}$$

As an embodiment, according to an embodiment in which the bitmap limit is 48, when multiple BSSID sets are not used, the AID value that may be allocated may be N+1 or more. In addition, when multiple BSSID sets are used, the AID value that may be allocated may be greater than or equal to min(Y+48, Y+N*(the number of nontransmitted BSSIDs or maximum number of nontransmitted BSSIDs).

End of Embodiment Group 43*c*

If multiple BSSID sets are not used, the MaxBSSID Indicator value may be assumed to be 0 in the case of using the described multiple BSSID sets. In addition, if multiple BSSID sets are not used, the number of nontransmitted BSSIDs or the maximum number of nontransmitted BSSIDs may be assumed to be 0 in the case of using the described multiple BSSID sets.

In an embodiment of the disclosure, the AID may be an integer value. The may be a positive integer value. In addition, the AID value that may be allocated may be less than or equal to 2,006.

In the previous embodiment, the number of nontransmitted BSSIDs or the number of BSSIDs of multiple BSSID sets may mean the number actually used in multiple BSSID sets. In addition, the maximum number of nontransmitted BSSIDs or the maximum number of possible BSSIDs in multiple BSSID sets may be a value (maximum number) based on the MaxBSSID indicator value. The number of nontransmitted BSSIDs may be obtained from the Multiple BSSID element. Alternatively, the number of nontransmitted BSSIDs may be obtained from an element or frame indicating the maximum number of BSSIDs of multiple BSSID sets.

In addition, the bitmap limit may be a preconfigured value. For example, the bitmap limit may be 48.

As an additional embodiment of the disclosure, there may be an embodiment in which an embodiment described as multiple BSSID or multiple BSSID sets is replaced with a co-located BSSID or a co-located BSSID set (co-located BSSID list). The Co-located BSSID may be a BSSID corresponding to a BSS having the same physical location as the reporting AP. The Co-located BSSID may be a BSSID corresponding to the same physical device as the reporting BSS or the reporting AP.

If embodiment group 43*a* is used, when the number of BSSIDs in the multiple BSSID sets is small or Nis small, there is an advantage that the number of bits used to indicate a group addressed frame is small and the range available for the AID may be wide. However, when the number of BSSIDs in the multiple BSSID sets is large or N is large, there is an advantage that the number of bits used to indicate a group addressed frame is large and the range available for the AID may be narrow. The wide or narrow range available for the AID may mean that the number of STAs or MLDs that may be associated may be large or small, respectively. In addition, embodiment group 43*a* may have an advantage that the calculation or implementation is simpler than embodiment group 43*c*.

If embodiment group 43*b* is used, even if the number of BSSIDs in the multiple BSSID sets is large or N is large, there is an advantage that the number of bits used to indicate a group addressed frame is limited and the range available for the AID may not be greatly reduced. However, even if the number of BSSIDs in the multiple BSSID sets is small or N is small, there is a disadvantage that the range available for the AID may be somewhat limited. There may be an AID value that is not used as an AID and is not used to indicate a group addressed frame. In addition, embodiment group 43*b* may have an advantage that the calculation or implementation is simpler than embodiment group 43*c*.

If embodiment group 43*c* is used, there may be an advantage of combining the advantages of embodiment group 43*a* and embodiment group 43*b* and reducing the disadvantages of them.

Figure 44:
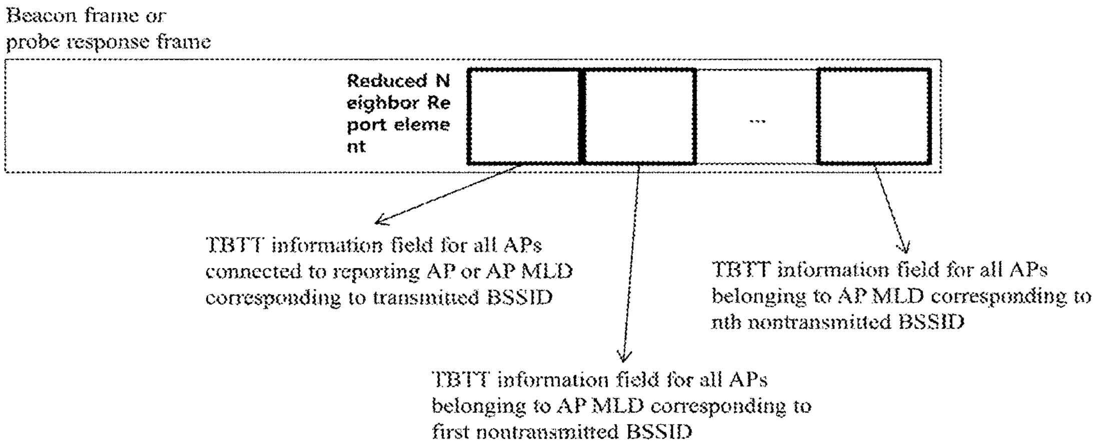
FIG. 44 is a drawing illustrating an example of a multi-link setup according to an embodiment of the disclosure.

FIG. 44 is a drawing illustrating an example of a multi-link setup according to an embodiment of the disclosure.

According to the embodiment described in FIGS. 41 to 43, N bits (e.g., bits from bit X to X+N−1 or bits from bit Y+(k−1)*N to Y+k*N−1) of the Partial Virtual Bitmap subfield or traffic indication virtual bitmap were used to indicate a group addressed frame corresponding to APs in a certain AP MLD. More specifically, the first n bits of the N bits were used to indicate a group addressed frame corresponding to APs in a certain AP MLD. The remaining bit(s) except the first n bits of the N bits were configured to 0. In addition, n bits may be mapped in the order of link ID. For example, n bits may be mapped in the ascending order of link ID. For example, in FIG. 43, 3 bits (N=3) corresponding to AIDs 4, 5, 6 may indicate a group addressed frame for other APs of the AP MLD corresponding to the transmitted BSSID or reporting AP. In addition, if the AP MLD operates two links, the bit corresponding to AID 4, i.e., 1 bit (n=1), may be used to indicate a group addressed frame. In addition, the bits for AIDs 5 and 6, which are the remaining bits except for the first n bits out of N bits, may be configured to 0.

However, according to an embodiment of the disclosure, a non-AP MLD may set up and operate using only some of the links operated by an AP MLD. For example, the AP MLD may operate link 0, link 1, and link 2. In addition, a non-AP MLD 1 that performs association and multi-link setup with the AP MLD may perform the multi-link setup on link 0 and link 1. In addition, a non-AP MLD 2 that performs association and multi-link setup with the AP MLD may perform the multi-link setup on link 0 and link 2. According to the previous embodiment, the AP MLD may indicate a group addressed frame for all links operated by the AP MLD. This is because the frame indicating the group addressed frame is a frame received by all associated STAs or all MLDs. That is, the group addressed frame indication transmitted on link 0 may include indications corresponding to both link 1 and link 2. For example, in FIG. 43, AID 4 and AID 5 may correspond to link 1 and link 2, respectively. In this case, even though the non-AP MLD 2 does not operate on link 1, it must be recognized that the AP MLD is also operating link 1 to determine that AID 5 corresponds to link 2. Therefore, a method of recognizing and determining all links, in which the non-AP MLD has completed multi-link setup, operated by the AP MLD may be needed.

In an embodiment of the disclosure, the inclusion of information on all links operated by the AP MLD in the element transmitted by the AP may be limited to the time when the element is included in a preconfigured frame. This is because if information on all links is always included, a large frame size may always have to be transmitted. For example, the inclusion of information (for example, TBTT Information field for all links) on all links operated by the AP MLD in the reduced neighbor report element transmitted by the AP may be limited to the time when the element is included in a preconfigured frame. For example, the preconfigured frame may be a beacon frame. More specifically, the preconfigured frame may be a delivery traffic indication map (DTIM) beacon frame. The DTIM Beacon frame may be a Beacon frame including a traffic indication map. In addition, the DTIM Beacon frame may be a Beacon frame transmitted or scheduled for each DTIM interval. In addition, it is possible to transmit a group addressed frame after the DTIM Beacon frame. In addition, the STA in a power save or doze state may have to be in a wake state at the time when the DTIM Beacon frame is transmitted or scheduled.

According to an embodiment of the disclosure, the reduced neighbor report element may include a TBTT information field for all APs of the AP MLD to which the AP transmitting the reduced neighbor report element belongs. Alternatively, according to an embodiment of the disclosure, the reduced neighbor report element may include a TBTT information field for all other APs of the AP MLD to which the AP transmitting the reduced neighbor report element belongs. The AP may be a reporting AP. In addition, if the AP belongs to the multiple BSSID sets, the AP may correspond to a transmitted BSSID. If the AP belongs to the multiple BSSID sets, the reduced neighbor report element may include a TBTT information field for all APs of the AP MLD including the AP corresponding to the nontransmitted BSSID belonging to the multiple BSSID sets to which the AP transmitting the reduced neighbor report element belongs. The reduced neighbor report element may be transmitted by being included in the beacon frame or the probe response frame. According to an embodiment, including the TBTT Information field for all APs or all other APs may always be the case when an AP transmits the Beacon frame or the Probe Response frame. In addition, the embodiment including the TBTT Information field described above may be limited to an embodiment including the TBTT Information field including the MLD Parameters field. According to an embodiment, in the embodiment described above, it may be possible for the reduced neighbor report element not to include a TBTT Information field corresponding to a transmitted BSSID or a nontransmitted BSSID of the multiple BSSID sets of the AP transmitting the reduced neighbor report element.

The non-AP STA or non-AP MLD receiving the reduced neighbor report element may receive information on all APs or all links operated by the multi-link setup AP MLD at least once. Alternatively, the non-AP STA or non-AP MLD may receive the reduced neighbor report element including information on all APs or all links operated by the multi-link setup AP MLD at least once. As described above, the reduced neighbor report element may include an MLD Parameters field. In addition, the MLD Parameters field may include an MLD ID subfield and a Link ID subfield. Therefore, the non-AP STA or non-AP MLD may receive link IDs of all links operated by the multi-link setup AP MLD. Therefore, in the signaling indicating the group addressed frame, it is possible to determine which link ID each of the n bits or N bits corresponding to one AP MLD corresponds to. In addition, the non-AP MLD may determine which of the n bits or N bits corresponding to an AP MLD in the signaling indicating a group addressed frame corresponds to the links in which the non-AP MLD has completed the multi-link setup.

For example, the non-AP MLD may receive information on all APs or all links operated by the AP MLD that has completed multi-link setup at least once before completing multi-link setup. In addition, the non-AP MLD may track a reduced neighbor report element if it includes the TBTT Information field for a new AP or a new link. In addition, the non-AP MLD may track a reduced neighbor report element if it does not include the TBTT Information field for the AP or link included in the reduced neighbor report element. The non-AP MLD may receive signaling for the group addressed frame from the partial virtual bitmap field or traffic indication virtual bitmap based on the tracked information. According to an embodiment of the disclosure, when the TBTT Information field for a new AP or new link is included and the TBTT Information field for the existing AP or link is not included, it may be classified as a critical update. When an event is classified as a critical update, the AP may transmit a signal that a critical update has occurred. In addition, the non-AP STA that receives the signal that a critical update has occurred may identify the updated information corresponding to the critical update.

In the disclosure, an embodiment in which a Beacon frame or a Probe Response frame includes a reduced neighbor report element or a multi-link element has been described, but the disclosure is not limited thereto, and may be extended to an embodiment in which another management frame (e.g., an association response frame, a reassociation response frame, or a FILS Discovery frame) includes a reduced neighbor report element or a multi-link element.

Referring to FIG. 44, AP 1 may transmit a Beacon frame or a Probe Response frame. In addition, the Beacon frame or the Probe Response frame may include a reduced neighbor report element. The reduced neighbor report element may include a TBTT Information field for all APs in the AP MLD to which AP 1 belongs. Since AP 1 is an AP that transmits a Beacon frame or a Probe Response frame, it may be an AP corresponding to a reporting AP or a transmitted BSSID. In addition, AP 1 may include a TBTT Information field corresponding to all APs in the AP MLD to which the nontransmitted BSSID of the multiple BSSID sets belonging to AP 1 belongs. That is, the $1^{st}$ nontransmitted BSSID, the $2^{nd}$ nontransmitted BSSID, . . . , the $n^{th}$ nontransmitted BSSID of the multiple BSSID sets belonging to AP 1 may exist. In this case, the reduced neighbor report element transmitted by the AP 1 may include a TBTT Information field corresponding to all APs in the AP MLD to which the AP of the $1^{st}$ nontransmitted BSSID belongs. In addition, the reduced neighbor report element transmitted by the AP 1 may include a TBTT Information field corresponding to all APs in the AP MLD to which the AP of the $2^{nd}$ nontransmitted BSSID belongs. The reduced neighbor report element transmitted by the AP 1 may include a TBTT Information field corresponding to all APs in the AP MLD to which the AP of the $n^{th}$ nontransmitted BSSID belongs. In this case, n may include values for all nontransmitted BSSIDs. In addition, AP 1 may always transmit according to this embodiment when transmitting the Beacon frame or the Probe Response frame. Therefore, the non-AP MLD has completed multi-link setup with the APMLD including AP1 or the AP of $n^{th}$ nontransmitted BSSID may receive the reduced neighbor report element transmitted by AP 1, and accordingly, the non-AP MLD may receive not only the link set up by the non-AP MLD, but also information on the link operated by the AP MLD that is not set up. Accordingly, signaling for the group addressed frame may be correctly received.

Figure 45:
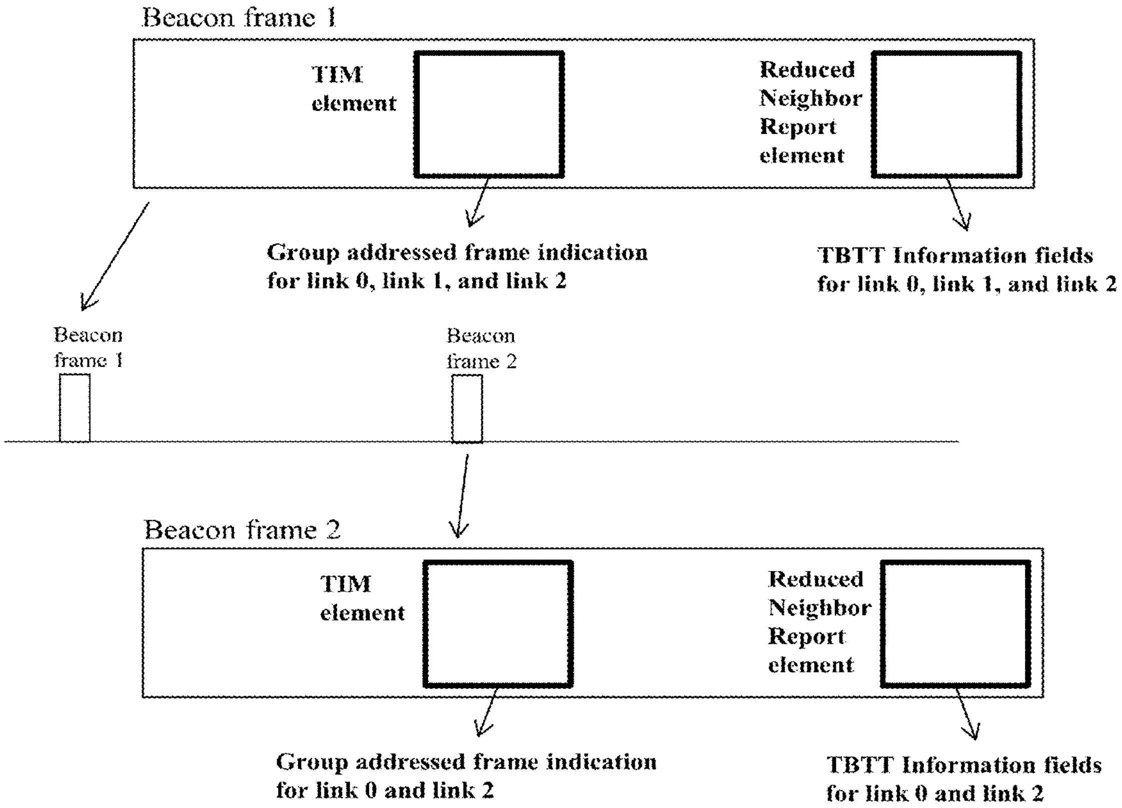
FIG. 45 is a drawing illustrating an example of a configuration of a reduced neighbor report (RNR) element and transmission of a beacon frame according to an embodiment of the disclosure.

FIG. 45 is a drawing illustrating an example of a configuration of a reduced neighbor report (RNR) element and transmission of a beacon frame according to an embodiment of the disclosure.

The embodiment of FIG. 45 may be intended to solve the problem described in FIG. 44. In addition, the content described above may be omitted.

According to an embodiment of the disclosure, it may be possible to interpret the TIM element included in the frame, based on which TBTT Information field corresponds to which AP is included in the reduced neighbor report element included in the frame transmitted by the AP. For example, it is possible to determine that which group addressed frame signaling for which AP is included the TIM element included in the frame, based on which TBTT Information field corresponds to which AP is included in the reduced neighbor report element included in the frame transmitted by the AP. In addition, if the TBTT Information field corresponds to any AP is included in the reduced neighbor report element included in the frame transmitted by the AP, the TIM element included in the frame may not include group addressed frame signaling for any AP. In the previously described embodiment, when indicating that a group addressed frame is buffered, it is described that n bits out of N bits for a certain AP MLD correspond to all links operated by the AP MLD in the Partial Virtual Bitmap subfield or the traffic indication virtual bitmap, but in an embodiment of the disclosure, n bits may correspond to APs corresponding to the information (TBTT Information field) included in the reduced neighbor report element included in the frame including the Partial Virtual Bitmap subfield or the traffic indication virtual bitmap.

For example, in signaling indicating a group addressed frame, n bits among the N bits corresponding to the reporting AP or transmitted BSSID may correspond to APs in the AP MLD to which the reporting AP or transmitted BSSID belongs among the TBTT Information fields included in the reduced neighbor report element included in the frame including the signaling. In addition, in signaling indicating a group addressed frame, n bits among the N bits corresponding to a certain nontransmitted BSSID may correspond to APs in the AP MLD to which the certain nontransmitted BSSID belongs among the TBTT Information fields included in the reduced neighbor report element included in the frame including the signaling.

Referring to FIG. 45, the AP may transmit a beacon frame 1 and a beacon frame 2. The beacon frame 1 and the beacon frame 2 may each include a TIM element and a reduced neighbor report element. In this case, the reduced neighbor report element included in the beacon frame 1 may include TBTT Information fields for link 0, link 1, and link 2. In this case, the buffered group addressed frame indication indicated by the TIM element included in the beacon frame 1 may be for link 0, link 1, and link 2. For example, when the beacon frame 1 is transmitted on link 0, the first two bits out of N bits may correspond to link 1 and link 2, respectively. In this case, the reduced neighbor report element included in the beacon frame 2 may include TBTT Information fields for link 0 and link 2. In this case, the buffered group addressed frame indication indicated by the TIM element included in the beacon frame 2 may be for link 0, link 2, excluding link 1. For example, when the beacon frame 2 is transmitted on link 0, the first bit out of N bits may correspond to link 2.

In the embodiment of the disclosure, it has been described that a buffered group addressed frame indication included in a TIM element is interpreted based on what AP information a reduced neighbor report element includes, but the disclosure is not limited thereto, and it is possible to extend it to interpreting the buffered group addressed frame indication included in the TIM element based on the element that may include information on one or more APs, for example, based on what AP information the multi-link element includes.

In an embodiment of the disclosure, there may be a case where a frame transmitted by an AP does not include a reduced neighbor report element, but includes a TIM element. In this case, the AP or AP MLD may indicate a group addressed frame in the TIM element only for the AP information included in the most recently transmitted reduced neighbor report element. In addition, a non-AP STA or non-AP MLD may interpret that a group addressed frame is indicated in the TIM element based on the AP information included in the most recently received reduced neighbor report element. For example, when transmitting a TIM frame, there may be a case where the AP does not include the reduced neighbor report element, but includes the TIM element. That is, in the embodiment described above, the TIM element has been interpreted based on the reduced neighbor report element included in the same frame as the TIM element, but in the disclosure, the TIM element may be interpreted based on the most recently received reduced neighbor report element.

Figure 46:
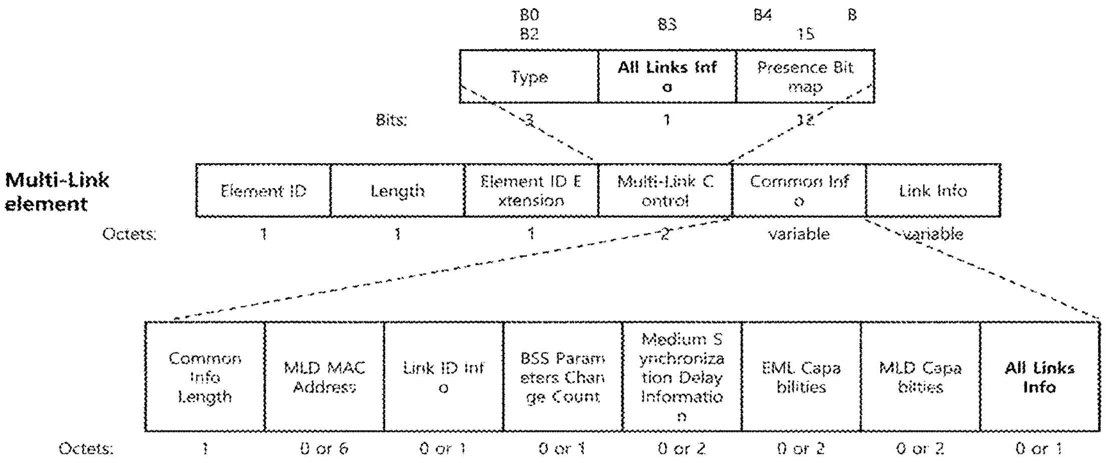
FIG. 46 is a drawing illustrating an example of a multi-link element according to an embodiment of the disclosure.

FIG. 46 is a drawing illustrating an example of a multi-link element according to an embodiment of the disclosure.

The embodiment of FIG. 46 may be intended to solve the problem described in FIG. 44. In addition, the content described above may be omitted.

According to an embodiment of the disclosure, All Links Info signaling may exist. The All Links Info signaling may indicate whether an element including the All Links Info signaling includes information on all links. Alternatively, the All Links Info signaling may indicate whether a frame including the All Links Info signaling includes information on all links. In this case, it may not indicate whether the frame includes all information on all links. For example, the All Links Info signaling may indicate whether the element (or frame) including the All Links Info signaling includes at least one piece of information on all links for each link. For example, the All Links Info signaling may have different meanings depending on the situation. For example, when the All Links Info signaling is transmitted by an AP or an AP MLD, it may have the same meaning as described. Alternatively, when the All Links Info signaling is included in a Beacon frame, a Probe Response frame, an association response frame, or a reassociation response frame, it may have the same meaning as described. In this case, all links may be different from the links that actually set up or have the intention to set up, and may mean all links operated by the MLD transmitting the All Links Info signaling. That is, the All Links Info signaling transmitted by the AP MLD 1 to the non-AP MLD 1 may indicate whether the element (or frame) containing the signaling includes information on all links operated by AP MLD 1. In addition, in this case, the non-AP MLD 1 may perform multi-link setup on the AP MLD 1 and all the links operated by the AP MLD 1, or may perform multi-link setup on some of the links among all the links.

According to an embodiment of the disclosure, the All Links Info signaling may indicate the STA or MLD receiving the All Links Info signaling to request transmission including information on all links. In this case, it may not be required to include all information on all links. For example, the All Links Info signaling may indicate the STA or MLD receiving the All Links Info signaling to request to include at least one piece of information on all links for each link. For example, the All Links Info signaling may have different meanings depending on the situation. For example, when the All Links Info signaling is transmitted by a non-AP STA or a non-AP MLD, it may have the same meaning as described. Alternatively, when the All Links Info signaling is included in a Probe Request frame, an Association Request frame, or a Reassociation Request frame, it may have the same meaning as described. In this case, all links may be different from the links that actually set up or have the intention to set up, and may mean all links operated by the MLD that are required to transmit all link information. That is, the All Links Info signaling transmitted by the non-AP MLD 1 to the AP MLD 1 may indicate whether the AP MLD 1 is required to transmit information including information on all links operated. In addition, in this case, the non-AP MLD 1 may perform multi-link setup on the AP MLD 1 and all the links operated by the AP MLD 1, or may perform multi-link setup on some of the links among all the links.

According to an embodiment, the All Links Info signaling may be included in a multi-link element. For example, the Multi-Link Control field included in the multi-link element may include the All Links Info signaling. Referring to FIG. 46, the bit of B3 of the Multi-Link Control field may be the All Links Info signaling. In addition, the All Links Info signaling may be 1-bit. As another embodiment, the All Links Info signaling may be included in a Common Info field included in the multi-link element.

According to an embodiment, information on all links requested or indicated by the All Links Info signaling may be included in link ID information. That is, information on all links requested or indicated by the All Links Info signaling may be link ID information for all links. In addition, link ID information for a link may be included in the Link Info field included in the multi-link element. More specifically, link ID information for each link may be included in a per-STA profile sub-element (field) of each link included in the Link Info field. In addition, the per-STA Profile subsection may include an STA Control field, and the STA Control field may include a Link ID subfield. Link ID information for each link may be included in the link ID subfield.

According to an embodiment of the disclosure, a Complete Profile subfield may exist separately from the described All Links Info signaling. The complete profile subfield may indicate that information on a link including the complete profile subfield includes a complete profile for the link. Alternatively, the Complete Profile subfield may indicate a request to transmit the complete profile for the link including the Complete Profile subfield. The Complete Profile subfield may be included in the STA Control field.

According to an embodiment of the disclosure, the non-AP MLD may transmit the All Links Info signaling requesting information on all links at least once. Alternatively, the non-AP MLD may receive at least once All Links Info signaling indicating that information on all links is included from the AP MLD performing multi-link setup. At least once may be at least once until the multi-link setup is completed.

For example, the non-AP MLD may transmit a Probe Request frame or an Association Request frame with the All Links Info signaling configured to a value requesting information on all links. In this case, in response to the Probe Request frame or the Association Request frame, the AP MLD may transmit a Probe Response frame or an association response frame, respectively, with information on all links, and by configuring the All Links Info signaling to a value indicating that information on all links is included in the frame.

According to an embodiment of the disclosure, the AP MLD may include information on all links when transmitting a frame regarding association or multi-link setup, for example, an association response frame or a reassociation response frame. More specifically, the frame regarding association or multi-link setup may be a frame signaling acceptance of the association or multi-link setup. In this case, the All Links Info signaling described above may not be included in the frame. In this case, the non-AP MLD receiving the frame may determine that the information on all links included in the frame is information on all links operated by the AP MLD. In reality, the link that the non-AP MLD has multi-link setup with the AP MLD may be different from all the links. For example, the link that the non-AP MLD has multi-link setup with the AP MLD may be a link that the non-AP MLD has requested to setup. The requested link may be a link that includes information in a requesting frame, for example, an Association Request frame or a Reassociation Request frame.

For example, when transmitting a frame regarding association or multi-link setup, for example, an association response frame, a reassociation response frame, a Probe Response frame, or a Beacon frame, to the non-AP MLD, the AP MLD may include information on all links at least once until the multi-link setup is completed. In addition, when receiving a frame regarding association or multi-link setup, for example, an association response frame, a reassociation response frame, a Probe Response frame, or a Beacon frame, from the AP MLD, the non-AP MLD may receive a frame including information on all links at least once until the multi-link setup is completed. In addition, the AP MLD may signal that a link is added or removed when a new link is added or a previously used link is removed after the multi-link setup. In addition, the non-AP MLD may receive the signal that a link is added or removed after the multi-link setup, and obtain information on all the links that the AP MLD is operating. Therefore, the non-AP MLD may correctly receive and interpret the buffered group addressed frame indication based on this.

According to an embodiment of the disclosure, there may be a method for determining whether an element transmitted by an AP includes information on all links. For example, it may be determined how many links the information included by the element corresponds to. For example, it may be determined based on how many Per-STA Profile subelements the element includes or how many MLD Parameters fields the element includes. In addition, there may be a Maximum Number of Simultaneous Links subfield transmitted by the AP. If the AP transmitting the Maximum Number of Simultaneous Links subfield does not belong to the NSTR mobile AP MLD, the Maximum Number of Simultaneous Links subfield may indicate the number of links operated by the AP MLD to which the AP belongs. Therefore, if the AP transmitting the Maximum Number of Simultaneous Links subfield does not belong to the NSTR mobile AP MLD, the Maximum Number of Simultaneous Links subfield may determine whether the element includes information on all links based on the result of determining the value of the Maximum Number of Simultaneous Links subfield and the number of links for which the information included in the element corresponds. For example, when the value obtained by adding 1 to the Maximum Number of Simultaneous Links subfield value matches the result of determining how many links the information included in the element corresponds to, it may be determined that the element includes information on all links, otherwise, it may be determined that the element does not include information on all links. If the AP MLD corresponds to the NSTR mobile AP MLD, and if the information included in the element transmitted by the AP corresponds to a preconfigured number of links, it may be determined that the element includes information on all links. The preconfigured may be 2.

According to an embodiment described in FIGS. 44 to 46, when determining the buffered group addressed frame indication included in the Partial Virtual Bitmap field or the traffic indication virtual bitmap, n bits out of N bits for one AP MLD may correspond to links in the order of link ID (e.g., ascending order).

Figure 47:
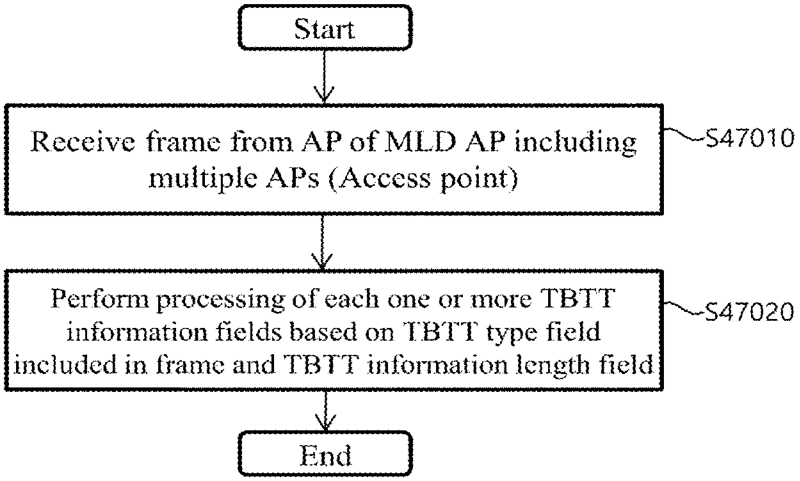
FIG. 47 is a drawing illustrating an example of an operation method of an MLD according to an embodiment of the disclosure.

FIG. 47 is a drawing illustrating an example of an operation method of an MLD according to an embodiment of the disclosure.

Referring to FIG. 47, a non-AP multi-link device (MLD) including multiple stations operating on multiple links, respectively, may receive a frame from an AP MLD including multiple Access Points (APs) operating on each of the multiple links (S47010), and may perform processing of each of one or more TBTT information fields based on the TBTT information type subfield and the TBTT information length field included in the frame (S47020).

In this case, the frame may include a reduced neighbor report (RNR) element including one or more Neighbor AP information fields including information related to other APs included in the AP MLD.

The neighbor AP information field may include a TBTT information set field including a target beacon transmission time (TBTT) information field type subfield, a TBTT information length field, and one or more TBTT information fields.

When the value of the TBTT information type subfield is "0", each of the one or more TBTT information fields may be processed only up to the first octet value or the second octet value by comparing the value of the TBTT information length field with the first threshold value and/or the second threshold value, and when the value of the TBTT information type subfield is "1", each of the one or more TBTT information fields may be processed only up to the third octet value by comparing the value of the TBTT information length field with the third threshold value.

Specifically, all TBTT information fields included in the neighbor AP information field may have the same format, length, and content, etc., and the length may be indicated by the TBTT information length subfield. When the length of the TBTT information field is indicated by the TBTT information length subfield, the format and content of the TBTT information field may be determined depending on the length. For example, the content included may vary depending on the length of the TBTT information field.

In addition, the operation of processing the TBTT information field by the terminal may be different based on the value of the TBTT information field type subfield and the value of the TBTT information length subfield included in the TBTT information header field of the neighbor AP information field. Specifically, the length of the TBTT information field processed by the terminal may vary depending on format) of the TBTT information field is configured to the first value (e.g., "0") or the second value (e.g., "1"). In addition, the length of the TBTT information field processed may additionally be considered based on the value of the TBTT information length subfield. That is, when the value of the TBTT information field subfield is configured to the first value or the second value, the terminal may process all or only part of the TBTT information field, or may not process all of the TBTT information field, by comparing the value of the TBTT information length subfield with the first threshold value (e.g., 16 octets), the second threshold value (e.g., 13 octets), and/or the third threshold value (e.g., 3 octets). For example, when the value of the recognizable TBTT information field subfield is "0", if the length of the TBTT information field indicated by the TBTT information length subfield is less than the second threshold value, the terminal may ignore the entire TBTT information field of the received frame (e.g., a beacon frame or a probe response frame, etc.) without processing the entire TBTT information field. However, when the value of the recognizable TBTT information field subfield is "0", if the length of the TBTT information field indicated by the TBTT information length subfield is equal to or greater than the second threshold value and less than the first threshold value, the terminal may process the TBTT information field of the received frame only up to first the second octet value (e.g., 13 Octet) and ignore remaining octets without processing the remaining octets. However, when the value of the recognizable TBTT information field subfield is "0", if the length of the TBTT information field indicated by the TBTT information length subfield is equal to or greater than the first threshold value, the terminal may process the TBTT information field of the received frame only up to first the first octet value (e.g., 16 Octet) and ignore remaining octets without processing the remaining octets.

If the value of the recognizable TBTT information field subfield is "1", and if the length of the TBTT information field indicated by the TBTT information length subfield is less than the third threshold value, the terminal may ignore the entire TBTT information field of the received frame (e.g., a beacon frame or a probe response frame, etc.) without processing the entire TBTT information field. However, when the value of the recognizable TBTT information field subfield is "1", if the length of the TBTT information field indicated by the TBTT information length subfield is equal to or greater than the third threshold value, the terminal may process the TBTT information field of the received frame only up to first the third octet value (e.g., 3 Octet) and ignore remaining octets without processing the remaining octets.

In addition, each of the one or more TBTT information fields may include a neighbor AP TBTT offset subfield, and the neighbor AP TBTT offset subfield may indicate an offset between the TBTT for the AP to transmit a beacon frame and the TBTT for another AP to transmit a beacon frame.

In this case, when the other AP is included in the AP MLD, the offset value indicated by the neighbor AP TBTT offset subfield may be configured to a value excluding the preconfigured value related to Unknown. The preconfigured value may be "255".

The above description of the disclosure is for illustrative purposes, and those skilled in the art will understand that the disclosure may be easily modified into other specific forms without changing the technical idea or essential features of the disclosure. Therefore, it should be understood that the embodiments described above are exemplary in all respects and not limited in all respects. For example, each component described as a single type may be implemented in a distributed manner, and likewise, components described as distributed may be implemented in a combined form.

The scope of the disclosure is indicated by the claims described below rather than the detailed description above, and all changes or modifications derived from the meaning and scope of the claims and their equivalent concepts should be interpreted as being included in the scope of the disclosure.

The invention claimed is:

1. A multi-link device (MLD) comprising:

a plurality of stations (STAs) operating on a plurality of links, and a processor configured to:

receive a management frame from an access point (AP) in an AP MLD comprising the AP and at least one other AP, wherein the management frame includes a reduced neighbor report (RNR) element including at least one neighbor AP information field that is related to the at least one other AP and includes i) a target beacon transmission time (TBTT) information field type subfield, ii) a TBTT information length subfield, and iii) a TBTT information set field including one or more TBTT information fields, wherein, when the TBTT information field type subfield is set to 0, the processor is configured to perform one of the following operations, based on the TBTT information length subfield:

(i) ignore each of the one or more TBTT information fields;

(ii) process a number of octets of each of the one or more TBTT information fields up to a first threshold value; or (iii) process a number of octets of each of the one or more TBTT information fields up to a second threshold value, and wherein, when the TBTT information field type subfield is set to 1, and based on a value of the TBTT information length subfield being greater than a third threshold value, the processor is configured to process a number of octets of each of the one or more TBTT information fields up to the third threshold value and ignore remaining octets of each of the one or more TBTT information fields above the third threshold value.

2. The MLD of claim 1, wherein the TBTT information field type subfield is used together with the TBTT information length subfield to identify a format of the one or more TBTT information fields.

3. The MLD of claim 1, wherein, when the TBTT information field type subfield is set to 0, the processor is configured to ignore each of the one or more TBTT information fields when the value of the TBTT information length subfield is equal to or less than the first threshold value.

4. The MLD of claim 1, wherein, when the TBTT information field type subfield is set to 0, the processor is configured to process the number of octets of each of the one or more TBTT information fields up to the first threshold value and to ignore remaining octets of each of the one or more TBTT information fields when the value of the TBTT information length subfield is greater than the first threshold value.

5. The MLD of claim 1, wherein, when the TBTT information field type subfield is set to 0, the processor is configured to process the number of octets of each of the one or more TBTT information fields up to the second threshold value and to ignore remaining octets of each of the one or more TBTT information fields when the value of the TBTT information length subfield is greater than the second threshold value.

6. The MLD of claim 1, wherein the third threshold value is 3.

7. The MLD of claim 1, wherein each of the one or more TBTT information fields includes an MLD parameters subfield when i) the TBTT information field type subfield is set to 1 and ii) the value of the TBTT information length subfield is set to a specific value.

8. The MLD of claim 1, wherein each of the one or more TBTT information fields includes a neighbor AP TBTT offset subfield, and wherein the neighbor AP TBTT offset subfield indicates an offset between a TBTT for the AP to transmit a beacon frame and a TBTT for the at least one other AP to transmit a beacon frame.

9. The MLD of claim 8, wherein an offset value indicated by the neighbor AP TBTT offset subfield is set to a value excluding a predetermined value related to Unknown.

10. The MLD of claim 9, wherein the predetermined value is 255.

11. A method performed by a multi-link device (MLD) comprising a plurality of stations (STAs) operating on a plurality of links in a wireless communication system, the method comprising:

receiving a management frame from an access point (AP) in an AP MLD comprising the AP and at least one other AP, wherein the management frame includes a reduced neighbor report (RNR) element including at least one neighbor AP information field that is related to the at least one other AP and includes i) a target beacon transmission time (TBTT) information field type subfield, ii) a TBTT information length subfield, and iii) a TBTT information set field including one or more TBTT information fields;

when the TBTT information field type subfield is set to 0, and based on the TBTT information length subfield, performing one of the following operations:

(i) ignoring each of the one or more TBTT information fields;

(ii) processing a number of octets of each of the one or more TBTT information fields up to a first threshold value; or (iii) processing a number of octets of each of the one or more TBTT information fields up to a second threshold value, and when the TBTT information field type subfield is set to 1, and based on a value of the TBTT information length subfield being greater than a third threshold value, processing a number of octets of each of the one or more TBTT information fields up to the third threshold value and ignoring remaining octets of each of the one or more TBTT information fields above the third threshold value.

12. The method of claim 11, wherein the TBTT information field type subfield is used together with the TBTT information length subfield to identify a format of the one or more TBTT information fields.

13. The method of claim 11, wherein, when the TBTT information field type subfield is set to 0, the method comprises ignoring each of the one or more TBTT information fields when the value of the TBTT information length subfield is equal to or less than the first threshold value.

14. The method of claim 11, wherein, when the TBTT information field type subfield is set to 0, the method comprises processing the number of octets of each of the one or more TBTT information fields up to the first threshold value and ignoring remaining octets of each of the one or more TBTT information fields when the value of the TBTT information length subfield is greater than the first threshold value.

15. The method of claim 11, wherein, when the TBTT information field type subfield is set to 0, the method comprises processing the number of octets of each of the one or more TBTT information fields up to the second threshold value and ignoring remaining octets of each of the one or more TBTT information fields when the value of the TBTT information length subfield is greater than the second threshold value.

16. The method of claim 11, wherein the third threshold value is 3.

17. The method of claim 11, wherein each of the one or more TBTT information fields includes an MLD parameters subfield when i) the TBTT information field type subfield is set to 1 and ii) the value of the TBTT information length subfield is set to a specific value.

18. The method of claim 11, wherein each of the one or more TBTT information fields includes a neighbor AP TBTT offset subfield, and wherein the neighbor AP TBTT offset subfield indicates an offset between a TBTT for the AP to transmit a beacon frame and a TBTT for the at least one other AP to transmit a beacon frame.

19. The method of claim 18, wherein an offset value indicated by the neighbor AP TBTT offset subfield is set to a value excluding a predetermined value related to Unknown.

20. The method of claim 19, wherein the predetermined value is 255.

* * * * *